US012483642B2

(12) United States Patent
Liu et al.

(10) Patent No.: US 12,483,642 B2
(45) Date of Patent: Nov. 25, 2025

(54) FOLDING MECHANISM, HOUSING APPARATUS, AND ELECTRONIC DEVICE

(71) Applicant: HUAWEI TECHNOLOGIES CO., LTD., Guangdong (CN)

(72) Inventors: Ting Liu, Shanghai (CN); Chunjun Ma, Shanghai (CN); Linhui Niu, Shanghai (CN); Zhengyi Xu, Shanghai (CN); Yunyong Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 396 days.

(21) Appl. No.: 18/250,360

(22) PCT Filed: Oct. 27, 2021

(86) PCT No.: PCT/CN2021/126814

§ 371 (c)(1),
(2) Date: Apr. 25, 2023

(87) PCT Pub. No.: WO2022/089500

PCT Pub. Date: May 5, 2022

(65) Prior Publication Data

US 2023/0403347 A1 Dec. 14, 2023

(30) Foreign Application Priority Data

Oct. 29, 2020 (CN) ......................... 202011183401.7
Oct. 29, 2020 (CN) ......................... 202011187735.1
Oct. 31, 2020 (CN) ......................... 202011197784.3

(51) Int. Cl.
*H04M 1/02* (2006.01)
*G06F 1/16* (2006.01)

(52) U.S. Cl.
CPC .......... *H04M 1/022* (2013.01); *G06F 1/1618* (2013.01); *H04M 1/0268* (2013.01)

(58) Field of Classification Search
CPC .. H04M 1/0216; H04M 1/022; H04M 1/0266; H04M 1/0268; G06F 1/1681; G06F 1/1652
See application file for complete search history.

(56) References Cited

U.S. PATENT DOCUMENTS 10,110,717 B1 10/2018 Liu
10,627,873 B2 * 4/2020 Lan ........................... E05D 3/14
(Continued)

FOREIGN PATENT DOCUMENTS

CN 108428408 A 8/2018
CN 208421694 U 1/2019
(Continued)

*Primary Examiner* — Patrick F Marinelli

(57) ABSTRACT

This application discloses a folding mechanism and an electronic device. The folding mechanism is applied to a housing apparatus of an electronic device, and is configured to connect two housings of the housing apparatus. The folding mechanism can form display accommodating space through automatic avoidance in a folding process, and a flexible display is accommodated in the display accommodating space, so that a folding action performed by the housing apparatus on the flexible display is stable, and a squeezing force is small. This helps reduce a risk that the flexible display is damaged due to excessive squeezing of the folding mechanism, and makes the flexible display more reliable.

18 Claims, 105 Drawing Sheets

(56) References Cited

U.S. PATENT DOCUMENTS

| | | | | |
|---|---|---|---|---|
| 10,761,573 | B2 * | 9/2020 | Hsu | G06F 1/1681 |
| 11,016,530 | B2 * | 5/2021 | Watamura | G06F 1/1652 |
| 11,294,431 | B2 * | 4/2022 | Torres | G06F 1/1681 |
| 11,455,017 | B2 * | 9/2022 | Liu | G06F 1/1626 |
| 12,216,508 | B2 * | 2/2025 | Hwang | H04M 1/022 |
| 2018/0341295 | A1 * | 11/2018 | Lan | G06F 1/1616 |
| 2019/0073002 | A1 | 3/2019 | Wu et al. | |
| 2020/0103935 | A1 * | 4/2020 | Hsu | G06F 1/1681 |
| 2020/0293094 | A1 * | 9/2020 | Liu | F16M 11/04 |
| 2020/0329574 | A1 | 10/2020 | Lee | |
| 2021/0011513 | A1 * | 1/2021 | Watamura | G06F 1/1652 |
| 2021/0034117 | A1 * | 2/2021 | Torres | E05D 3/06 |
| 2023/0359252 | A1 * | 11/2023 | Kang | H04M 1/022 |
| 2023/0403347 | A1 * | 12/2023 | Liu | H04M 1/022 |

FOREIGN PATENT DOCUMENTS

| | | | |
|---|---|---|---|
| CN | 208656822 | U | 3/2019 |
| CN | 109658826 | A | 4/2019 |
| CN | 208686793 | U | 4/2019 |
| CN | 109780403 | A | 5/2019 |
| CN | 109799877 | A | 5/2019 |
| CN | 110445913 | A | 11/2019 |
| CN | 110714977 | A | 1/2020 |
| CN | 110782791 | A | 2/2020 |
| CN | 110784570 | A | 2/2020 |
| CN | 110830623 | A | 2/2020 |
| CN | 210609275 | U | 5/2020 |
| CN | 210694021 | U | 6/2020 |
| CN | 111583791 | A | 8/2020 |
| CN | 211239890 | U | 8/2020 |
| CN | 111614806 | A | 9/2020 |
| CN | 111692196 | A | 9/2020 |
| CN | 111698355 | A | 9/2020 |
| CN | 111749974 | A | 10/2020 |
| CN | 111828462 | A | 10/2020 |
| EP | 3723351 | A2 | 10/2020 |
| WO | 2020010987 | A1 | 1/2020 |

* cited by examiner

FOLDING MECHANISM, HOUSING APPARATUS, AND ELECTRONIC DEVICE

CROSS-REFERENCE TO RELATED APPLICATIONS

This application is a National Stage of International Application No. PCT/CN2021/126814, filed on Oct. 27, 2021, which claims priority to Chinese Patent Application No. 202011187735.1, filed on Oct. 29, 2020, and Chinese Patent Application No. 202011183401.7, filed on Oct. 29, 2020, and Chinese Patent Application No. 202011197784.3, filed on Oct. 31, 2020. All of the aforementioned applications are hereby incorporated by reference in their entireties.

TECHNICAL FIELD

This application relates to the field of foldable electronic product technologies, and in particular, to a folding mechanism, a housing apparatus, and an electronic device.

BACKGROUND

In recent years, flexible displays are widely used in various foldable electronic devices because of characteristics such as lightness, thinness, and non-fragileness. The foldable electronic device further includes a housing apparatus configured to carry the flexible display. The housing apparatus generally includes two housings and a folding mechanism connected between the two housings. The two housings are folded or unfolded relative to each other through deformation of the folding mechanism, and drive the flexible display to be folded or unfolded. In a conventional inward foldable screen electronic device, when the electronic device is folded, a flexible display is folded inside a housing apparatus, and a bending portion of the flexible display is likely to be damaged due to excessive squeezing by the housing apparatus. Consequently, reliability of the flexible display is poor, and a service life of the flexible display is short.

SUMMARY

An objective of this application is to provide a folding mechanism, a housing apparatus, and an electronic device. The folding mechanism is applied to a housing apparatus of an electronic device, and is configured to connect two housings of the housing apparatus. The housing apparatus is configured to cent a flexible display. In a folding process of the housing apparatus, the folding mechanism of the housing apparatus can form display accommodating space through automatic avoidance in the folding process. A folding action performed by the housing apparatus on the flexible display is stable, and a squeezing force is small. This helps reduce a risk that the flexible display is damaged due to excessive squeezing of the folding mechanism, and makes the flexible display more reliable.

According to a first aspect, this application provides a folding mechanism, and the folding mechanism may be applied to a housing apparatus of an electronic device. The electronic device may further include a flexible display mounted on the housing apparatus. The electronic device implements screen inward folding by using the housing apparatus, and the electronic device may be bent.

The folding mechanism includes a middle housing, a first fixing bracket, a second firing bracket, a first swing arm, a second swing arm, a first support plate, and a second support plate. One end of the first swing arm is slidably connected to the first fixing bracket, and the other end of the first swing arm is rotatably connected to the middle housing. One end of the second swing arm is slidably connected to the second fixing bracket, and the other end of the second swing arm is rotatably connected to the middle housing. The first support plate is rotatably connected to the first fixing bracket, and is rotatably connected to the middle housing. The second support plate is rotatably connected to the second fixing bracket, and is rotatably connected to the middle housing.

When the folding mechanism is in art open state, a support surface of the first support plate is flush with a support surface of the second support plate; or when the folding mechanism is in a closed state, a support surface of the first support plate and a support surface of the second support plate are disposed opposite to each other, and are away from each other in a direction close to the middle housing.

In this application, the first support plate and the second support plate form display accommodating space through automatic avoidance for accommodating a flexible display, so that a folding action performed by the housing apparatus on the flexible display is stable, and a squeezing force is small. This helps reduce a risk that the flexible display is damaged due to excessive squeezing of the folding mechanism, and makes the flexible display more reliable.

Two ends of the first support plate are notably connected to the first fixing bracket and the middle housing respectively, and two ends of the second support plate are rotatably connected to the second fixing bracket and the middle housing respectively. Therefore, moving tracks of the first support plate and the second support plate are restricted by other components of the folding mechanism. In a process in which the first housing and the second housing are folded relative to each other, the moving tracks of the first support plate and the second support plate are accurate. Therefore, display accommodating space can be formed by automatically avoiding in a closed state, and the display accommodating space is accurately controlled, so that a folding action performed by the housing apparatus on the flexible display is stable, and a squeezing force is small. This helps reduce a risk that the flexible display is damaged due to excessive squeezing of the folding mechanism, and makes the flexible display more reliable.

In addition, the first swing arm is rotatably connected to the middle housing, and is slidably connected to the first fixing bracket, to form a connecting rod slider structure. The first support plate is rotatably connected to the middle housing, and is rotatably connected to the first fixing bracket, to form a connecting rod structure. The second swing arm is rotatably connected to the middle housing, and is slidably connected to the second fixing bracket, to form a connecting rod slider structure. The second support plate is rotatably connected to the middle housing, and is rotatably connected to the second fixing bracket, to form a connecting rod structure. The folding mechanism implements a connection between the housing and the middle housing by using the connecting rod slider structure and the connecting rod structure. The folding mechanism has a few constituent parts with a simple fitting relationship and simple fitting locations. The constituent components are easy to manufacture and assemble, thereby facilitating mass production. In addition, because the middle housing is associated with the first fixing bracket by using the first swing arm and the first support plate, and is associated with the second fixing bracket by using the second swing arm and the second support plate the folding mechanism has an accurate moving track, and a better mechanism stretching-resistance capability and mechanism squeezing-resistance capability.

When the flexible display is mounted on the support surface of the first support plate and the support surface of the second support plate a flat form can be presented, that is, it is considered that the support surface of the first support plate is flush with the support surface of the second support plate. For example, the case in which the support surface of the first support plate is flush with the support surface of the second support plate may include but is not limited to the following scenarios: The support surface of the first support plate is flush with the support surface of the second support plate; or a bonding layer is disposed on the support surface of the first support plate, and a bonding layer is disposed on the support surface of the second support plate, so that heights of the two support surfaces with the bonding layers are equal; or a stiffening plate is disposed on the flexible display, so that heights of the two support surfaces on which the stiffening plate is stacked are equal.

When the folding mechanism is unfolded relative to each other to the open state, the support surface of the first support plate is flush with the support surface of the first housing, and the support surface of the second support plate is flush with the support surface of the second housing. In this case, the plurality of support surfaces that are of the housing apparatus and that are used to provide support for the flexible display are flush with each other, so that the flexible display is unfolded and has a flat support environment. This can improve user experience such as a touch operation and image viewing.

Both the support surface of the first support plate and the support surface of the first housing are planes, and the two are coplanar, so as to better support the flexible display. In this case, an adhesive layer between the flexible display and the support surface of the first support plate may be as thick as an adhesive layer between the flexible display and the support surface of the first housing.

When the support surface of the first support plate and the support surface of the first housing are parallel to each other but are slightly misplaced, after the flexible display is fastened to the support surface of the first support plate and the support surface of the first housing by a slight difference between a thickness of the adhesive layer between the flexible display and the support surface of the first support plate and a thickness of the adhesive layer between the flexible display and the support surface of the first housing, the corresponding region of the flexible display is still a planar region. In this case, it is also considered that the support surface of the first support plate is flush with the support surface of the first housing.

In a possible implementation, the middle housing includes an outer cover, and the outer cover is bent to form an inner space. When the folding mechanism is in the open state, the first support plate covers a part of the inner space, and the second support plate covers a part of the inner space. In this case, the first support plate and the second support plate are close to each other, and a distance between the support surface of the first support plate and the support surface of the second support plate is small. The folding mechanism may provide relatively complete planar support for a bending portion of the flexible display in the open state by using a two-plate structure.

In a possible implementation, when the folding mechanism is in the closed state, the first support plate partially extends into the inner space, and the second support plate partially extends into the inner space.

In this implementation, a part of the space between the first support plate and the second support plate in the inner space of the middle housing is released, to form a part of the display accommodating space, and the flexible display may partially extend into the inner space of the middle housing, thereby improving space utilization. In this way components of the electronic device are arranged more compactly, thereby facilitating miniaturization of the electronic device.

In a possible implementation, when the folding mechanism is in the open state, the first support plate is spliced with the second support plate. In this case, the first support plate and the second support plate can provide smooth and powerful support for the flexible display, so as to improve user experience such as a touch operation and image viewing.

In this application, a case in which the first support plate is spliced with the second support plate may include but is not limited to the following scenario: On part of the first support plate and one part of the second support plate are connected to each other, without a gap between the two, and a notch or gap may be formed between the other part of the first support plate and the other part of the second support plate, or the first support plate and the second support plate are connected to each other, without a gap between the two; or one part of the first support plate and one part of the second support plate are close to each other, with a small gap between the parts close to each other, and a notch or a gap may be formed between the other part of the first support plate and the other part of the second support plate; or the first support plate and the second support plate are integrally close to each other, with a small gap between the two. When there is a small gap between the first support plate and the second support plate, or there is a small gap between a part of the first support plate and a part of the second support plate, a user presses a region that is of the flexible display and that corresponds to the gap, without forming an obvious dent in the corresponding region of the flexible display. Therefore, the bending region support surface can provide strong support for the flexible display.

When there is a notch or a gap between the first support plate and the second support plate, or there is a notch or a gap between a part of the first support plate and a part of the second support plate, an area of the notch or the gap may be reduced as much as possible by optimizing a size and a shape of a component of the folding mechanism, so that a region that is of the flexible display and that corresponds to the notch or the gap may be slightly indented under pressing of the user, instead of forming an obvious dent. In addition, in some embodiments, a support plate or a stiffening plate that can be bent and has specific structural strength may be disposed on a side that is of the flexible display and that faces the housing apparatus, and the support plate or the stiffening plate covers at least the notch or the gap between the first support plate and the second support plate, to improve anti-pressing strength of the flexible display.

In a possible implementation, the first support plate includes a first plate body, a first rotation part, and a second rotation part. The first rotation part and the second rotation pert are fastened on the first plate body in a mutually spaced manner, the first rotation part is rotatably connected to the first fixing bracket, and the second rotation part is rotatably connected to the middle housing. The second support plate includes a second plate body, a third rotation part, and a fourth rotation part. The third rotation peat and the fourth rotation part are fastened on the second plate body in a mutually spaced manner, the third rotation part is rotatably connected to the second fixing bracket, and the fourth rotation part is rotatably connected to the middle housing.

When the folding mechanism is in the open state, the second rotation part and the fourth rotation part are located between the first rotation part and the third rotation part. When the folding mechanism is in the closed state, a spacing between the first rotation part and the third rotation part is less than a spacing between the second rotation part and the fourth rotation part. In this case, the first support plate and the second support plate form display accommodating space through automatic avoidance. The display accommodating space gradually increases in a direction close to the middle housing.

In this implementation, positions of the first rotation part and the second rotation part restrict a position of the first support plate, and positions of the third rotation part and the fourth rotation part restrict a position of the second support plate. The first rotation part is rotatably connected to the first fixing bracket, the third rotation part is rotatably connected to the second fixing bracket, and the second rotation part and the third rotation part are rotatably connected to the middle housing, therefore, the housing apparatus can control relative positions of the first support plate and the second support plate by setting positions of a structure of the middle housing, the first fixing bracket, and the second fixing bracket that move relative to the middle housing. In this case, the first support plate and the second support plate can be unfolded in the open state, thereby providing flat and strong support for the flexible display. In the closed state, the first support plate and the second support plate form display accommodating space through automatic avoidance to accommodate the flexible display, so that a folding action performed by the housing apparatus on the flexible display is stable and a squeezing force is small. This helps reduce a risk that the flexible display is damaged due to excessive squeezing of the folding mechanism, and makes the flexible display more reliable.

In a possible implementation, the folding mechanism further includes a first hinge and a second hinge. The first hinge is inserted into the first rotation part and the first fixing bracket, and the second hinge is inserted into the second rotation part and the middle housing. The folding mechanism further includes a third hinge and a fourth hinge. The third hinge is inserted into the third rotation part and the second fixing bracket, and the fourth lunge is inserted into the fourth rotation part and the middle housing. A rotatable connection relationship between the first support plate and the first fixing bracket and the middle housing, and a rotatable connection relationship between the second support plate and the second fixing bracket and the middle housing are both implemented by using a physical shaft. The connection relationship is reliable, processing precision is high, and an undesirable movement during rotation is small, so that a rotation action is accurate and stable.

In a possible implementation, the middle housing includes a first convex part and a second convex part. The second hinge is inserted into the first convex part. The first convex part is embedded into the first support plate. The fourth hinge is inserted into the second convex part. The second convex part is embedded into the second support plate.

In this implementation, positions of hinge holes of the first convex part and the second convex part of the middle housing, a position of a hinge hole of the second rotation part of the first support plate, and a position of a hinge hole of the fourth rotation part of the second support plate are designed, so that the middle housing may be rotatably connected to the first support plate through the second hinge, and the middle housing may be rotatably connected to the second support plate through the fourth hinge, that is, the middle housing, the first support plate, and the second support plate may be rotatably connected by using a physical shaft. Therefore, a connection relationship is reliable, and an undesirable movement during rotation is small, so that a rotation action is accurate and stable.

In addition, based on an embedding relationship between the first convex part and the first support plate, an embedding relationship between a first connection bump and the first support plate, an embedding relationship between the second convex part and the second support plate, and an embedding relationship between a second connection bump and the second support plate, the first support plate, the first fixing bracket, and the middle housing can limit each other in a direction parallel to a rotation center, and the second support plate, the second fixing bracket, and the middle housing can limit each other in a direction parallel to the rotation center. This improves reliability of a rotatable connection structure of the folding mechanism.

In a possible implementation, the first plate body includes a first body part and a first extension part. The first extension part is fastened to a side of the first body part and protrudes relative to the first body part. A first notch is formed on a side that is of the first body part and that is away from the first extension part, and the first rotation part is located in the first notch and is fastened to the first body part. A second notch is formed on a side that is of the first body part and that is close to the first extension part, and the second rotation part is located in the second notch, and is fastened to the first body part.

The second plate body includes a second body part and a second extension part. The second extension part is fastened to a side of the second body part and protrudes relative to the second body part. A third notch is formed on a side that is of the second body part and that is away from the second extension part, and the third rotation part is located in the third notch and is fastened to the second body part. A fourth notch is formed on a side that is of the second body part and that is close to the second extension part, and the fourth rotation part is located in the fourth notch and is fastened to the second body part.

In a process of unfolding the folding mechanism, the first extension part and the second extension part are close to each other, and in a process of folding the folding mechanism, the first extension part and the second extension part are away from each other.

In this implementation, when the first housing and the second housing are in the open state, the first support plate and the second support plate are close to each other, and a distance between the support surface of the first support plate and the support surface of the second support plate is small. The folding mechanism may provide relatively complete planar support for a bending portion of the flexible display in the open state by using a two-plate structure. When the folding mechanism is in a closed state, that is, when the first housing and the second housing are folded relative to each other to the closed state, the first support plate and the second support plate are approximately V-shaped. The support surface of the first support plate and the support surface of the second support plate are disposed opposite to each other, and are away from each other in a direction close to the middle housing.

In a possible implementation, when the first housing and the second housing are unfolded relative to each other to the open state, the first extension part is spliced with the second extension part, that is, the first support plate is spliced with the second support plate. In this case, the support surface of the first support plate and the support surface of the second support plate may be spliced to form a bending region support surface. The folding mechanism of the housing apparatus can fully support the bending portion of the flexible display in the open state by using the bending region support surface, so that the flexible display is not easily dented under pressing of the user, thereby improving a service life and reliability of the flexible display.

A case in which the first extension part is spliced with the second extension pert may include a case in which the first extension part and the second extension part are connected to each other and there is no gap between the first extension part and the second extension part, or may include a case in which the first extension part and the second extension part are close to each other and there is a small gap between the first extension part and the second extension part. When there is a small gap between the first extension part and the second extension part, a user presses a neon that is of the flexible display and that corresponds to the gap, without forming an obvious dent in the corresponding region of the flexible display. Therefore, the bending region support surface can provide strong support for the flexible display.

In a possible implementation, the first support plate firms avoidance notches on two sides of the first extension part, and the second support plate forms avoidance notches on two sides of the second extension part. The avoidance notch is used to avoid interference between the first support plate and the second support plate, and a partial structure of the middle housing in a process of moving the housing apparatus, that is, to implement avoidance, thereby improving reliability of movement between the folding mechanism and the housing apparatus. In this embodiment, when the first housing and the second housing are in the open state, the avoidance notch of the first support plate and the avoidance notch of the second support plate are combined, and the bending region support surface is a special-shaped surface.

A size and a shape of a component of the folding mechanism may be optimized, to reduce an area of the avoidance notch as much as possible, so that a region that is of the flexible display and that corresponds to the avoidance notch may be slightly dented under pressing of the user, instead of forming an obvious dent. In addition, in some embodiments, a support plate or a stiffening plate that can be bent and has specific structural strength may be disposed on a side that is of the flexible display and that faces the housing apparatus, and the support plate or the stiffening plate covers at least the avoidance notch of the first support plate and the avoidance notch of the second support plate, to improve anti-pressing strength of the flexible display.

In a possible implementation, the first swing arm includes a sliding end and a rotation end. The first fixing bracket is provided with a first sliding slot, the sliding end of the first swing arm is mounted in the first sliding slot, and the rotation end of the first swing arm is rotatably connected to the middle housing. The second swing arm includes a sliding end and a rotation end, the second fixing bracket is provided with a second sliding slot, the sliding end of the second swing arm is mounted in the second sliding slot, and the rotation end of the second swing arm is rotatably connected to the middle housing.

In a possible implementation, the folding mechanism further includes a plurality of synchronous gears Each of the synchronous gears is rotatably connected to the middle housing. The plurality of synchronous gears are engaged with each other, and the rotation end of the first swing arm is engaged with the rotation end of the second swing arm by using the plurality of synchronous gears.

In this implementation, the rotation end of the first swing arm is connected to the rotation end of the second swing arm by using the plurality of synchronous gears, so that a rotation angle of the rotation end of the first swing arm and a rotation angle of the rotation end of the second swing arm are the same in size and opposite in direction. In this case, rotation actions of the first swing arm and the second swing arm relative to the middle housing are synchronous, that is, the first swing arm and the second swing arm are synchronously close to each other or away from each other.

In a possible implementation, the rotation end of the first swing arm, the plurality of synchronous gears, and the rotation end of the second swing arm are arranged in an arc shape to fully use the inner space of the middle housing, so that another part of the inner space of the middle housing can be released to form display accommodating space for accommodating a part of the flexible display when the electronic device is closed. This helps improve compactness of component arrangement of the electronic device and reduce a size of the electronic device.

In a possible implementation, the folding mechanism further includes a first blocker and a first elastic part. The first blocker and the first elastic part are mounted in the middle housing, and the tint blocker is located between the tint elastic part and the synchronous gear. When the first elastic part is in a compressed state, the first blocker abuts against the synchronous gear through an elastic force generated by the first elastic part. When the folding mechanism ism is in the open state, the first blocker and the synchronous gear form a first clamping structure. When the folding mechanism is in the closed state, the first blocker and the synchronous gear from a second clamping structure.

When the first elastic part is in a compressed state, the first blocker abuts against the synchronous gear through an elastic force generated by the first elastic part. In this case, the first blacker and the second blacker cooperate with each other to press the rotation end of the first swing arm, the synchronous gear, and the rotation end of the second swing arm, so that the clamping structure between the rotation end of the first swing arm, the synchronous gear, the rotation end of the second swing arm and the first blocker, and the clamping structure between the rotation end of the first swing arm, the synchronous gem the rotation aid of the second swing arm and the second blocker arm stable.

In this implementation, the first clamping structure and the second clamping structure can keep the synchronous gear at a specific position relative to the first blocker, even if the first swing arm and the second swing arm maintain a specific relative position relationship relative to the middle housing, so that the first housing and the second housing can better remain in the open state or the closed state, thereby improving user experience. In addition, the first clamping structure and the second clamping structure may provide specific resistance in a process in which the electronic device is unfolded to enter the open state and in a process in which the electronic device is folded to end the open state, so that the user can experience a better sense of operation of the mechanism.

In a possible implementation, the folding mechanism further includes a first rotatable connecting shaft, a second rotatable connecting shaft, a third rotatable connecting shaft, a second blocker, and a fastening plate that are mounted in the middle housing. The second blocker is located on a side that is of the synchronous gear and that is away from the first blocker. The fastening plate is located on a side that is of the first elastic part and that is away from the first blocker, and the first elastic part includes a plurality of springs.

The first rotatable connecting shaft is inserted into the second blocker, the rotation end of the first swing arm, the first blocker, one of the springs, and the fastening plate. The third rotatable connecting shaft is inserted into the second blocker, the synchronous gear, the first blocker, another spring, and the fastening plate. The second rotatable connecting shaft is instated into the second blocker, the rotation end of the second swing arm, the first blocker, the another spring, and the fastening plate.

The first blocker includes a plurality of first bump groups. Each of the first bump groups includes a plurality of first bumps, and the plurality of first bumps are arranged in a ring shape and are spaced from each other. The second blocker includes a plurality of second bump groups. Each of the second bump groups includes a plurality of second bumps, and the plurality of second bumps are arranged in a ring shape and are spaced from each other. The rotation end of the first swing arm, the synchronous gear, and the rotation end of the second swing arm each include a plurality of first protrusions and a plurality of second protrusions that are disposed back to each other, the plurality of first protrusions are arranged in a ring shape and are spaced from each other, and the plurality of second protrusions are arranged in a ring shape and are spaced from each other.

A plurality of first protrusions of the first swing arm and a plurality of first bumps of one of the first bump groups are alternately arranged to form a clamping structure, and a plurality of second protrusions of the first swing arm and a plurality of second bumps of one of the second bump groups are alternately arranged to form a clamping structure. A plurality of first protrusions of the synchronous gear and a plurality of first bumps of another first bump group are alternately arranged to form a clamping structure, and a plurality of second protrusions of the synchronous gear and a plurality of second bumps of another second bump group are alternately arranged to form a clamping structure. A plurality of first protrusions of the second swing arm and a plurality of first bumps of another first bump group are alternately arranged to form a clamping structure, and a plurality of second protrusions of the second swing arm and a plurality of second bumps of another second bump group are alternately arranged to form a clamping structure.

In this implementation, when the rotation end of the first swing arm, the rotation end of the second swing arm, and the synchronous gear rotate relative to the first blocker and the second blocker, relative positions of the plurality of first protrusions and the plurality of first bumps can change to form different clamping structures, and relative positions of the plurality of second protrusions and the plurality of second bumps arm change to form different clamping strictures.

In a possible implementation, the first fixing bracket is further provided with a first mounting groove, and the first mounting groove communicates with the first sliding slot. The folding mechanism further includes a first stopper, and the first stopper is mounted in the first mounting groove. When the folding mechanism is in the open state, the first stopper abuts against the sliding end of the first swing arm.

In this implementation, the first stopper is configured to limit the first swing arm when the housing apparatus is in the open state, so that the housing apparatus remains in the open state when no relatively large external fora a is applied, thereby improving use experience of the user. In addition, the first stopper and the first swing arm can further cooperate with each other to provide resistance in a process in which the electronic device is unfolded to enter the open state and in a process in which the electronic device is folded to end the open state, so that the user can experience a better sense of operation of the mechanism.

In a possible implementation, the first stopper includes a holder and a second elastic part. The holder includes a control part and a pressing part. One end of the second elastic part is mounted on the control part of the holder, aid the other end of the second elastic part abuts against a groove wall of the first mounting groove. When the folding mechanism is in the open state, the pressing part of the holder abuts against the sliding end of the first swing arras.

In this implementation, the second elastic part of the first stopper can deform under an external force, so that the first stopper can move relative to the sliding end of the first swing arm, thereby improving reliability of limiting between the first stopper and the sliding end of the first swing arm.

The first stopper may further include a buffer, and the buffer is mounted on the pressing part of the holder The buffer may be made of a material with small stiffness, so that when being subjected to an external force, the buffer can absorb an impact force through deformation, thereby implementing buffering. Because the buffer is sleeved on the pressing part of the holder, the first stopper abuts against the sliding end of the first swing arm by using the buffer having a buffer function. This helps reduce a risk of wear between the holder of the first stopper and the sliding end of the first swing arm in a long-time relative movement process, improve limiting reliability of the stopper, and improve reliability of the folding mechanism.

In a possible implementation, the first fixing bracket includes a top surface, a bottom surface, and a second side surface. The top surface and the bottom surface are disposed back to each other. The second side surface is located between the top surface and the bottom surface, the top surface faces the first support plate, the second side surface faces the middle housing, and the top surface and the bottom surface are close to each other in a direction close to the second side surface.

In this implementation, the top surface of the first fixing bracket faces the first support plate, and the bottom surface of the first fixing bracket is away from the first support plate. The top surface of the second fixing bracket faces the second support plate, and the bottom surface of the second fixing bracket is away from the second support plate. When the folding mechanism is in an open state, the bottom surface of the first fixing bracket and the bottom surface of the second fixing bracket face in a same direction, and the two may be disposed in parallel or flush with each other. The top surface of the first fixing bracket tilts relative to the first support plate, and a gap is formed between the top surface of the first fixing bracket and the first support plate. The top surface of the second fixing bracket tilts relative to the second support plate, and a gap is formed between the top surface of the second fixing bracket and the second support plate. Aside end of the outer cover of the middle housing may abut against and support the first support plate and the second support plate when the folding mechanism is in the open state. Therefore, the outer cover can stop the first support plate and the second support plate, to prevent the housing apparatus from being over-folded during unfolding, thereby reducing a force exerted on the flexible display and improving reliability of the flexible display and the electronic device. The outer cover can further increase support strength of the first support plate and the second support plate, to provide a more reliable support structure for the flexible display.

When the folding mechanism is in the closed state, the bottom surface of the first fixing bracket and the bottom surface of the second fixing bracket face in opposite directions, and the two may be parallel to each other. The top surface of the first fixing bracket and the top surface of the second fixing bracket face each other, and the top surface of the first fixing bracket and the top surface of the second fixing bracket are inclined relative to each other to form a “V” shape, so that an appropriate space is formed between the first fixing bracket and the second fixing bracket. The first support plate and the second support plate can be accommodated in the space, and display accommodating space is formed between the first support plate and the second support plate. For example, when the folding mechanism is in the closed state, the top surface of the first fixing bracket may abut against and support the first support plate, and the top surface of the second fining bracket may abut against and support the second support plate.

In a possible implementation, in the direction close to the second side surface, an extension direction of the first sliding slot and the bottom surface are away from each other. In this case, the inclined design of the first sliding slot helps reduce a thickness of the folding mechanism and optimize the structure of the mechanism.

According to a second aspect, this application provides another folding mechanism, and the folding mechanism may be applied to a housing apparatus of an electronic device. The electronic device may further include a flexible display mounted on the housing apparatus. The electronic device implements screen inward folding by using the housing apparatus, and the electronic device may be bent.

The folding mechanism includes a middle housing, a first fixing bracket, a second fixing bracket, a first swing arm, a second swing arm, a first support plate, and a second support plate. The first fixing bracket is rotatably connected to the middle housing, and the second fixing bracket is rotatably connected to the middle housing. The first swing arm includes a rotation end and a movable end, the rotation end of the first swing arm is rotatably connected to the middle housing, and the movable end of the first swing arm is slidably connected to the first fixing bracket. The second swing arm includes a rotation end and a movable end, the rotation end of the second swing arm is rotatably connected to the middle housing, and the movable end of the second swing arm is slidably connected to the first fixing bracket.

The first support plate is notably connected to the first fixing bracket, and the first support plate is slidably connected to the movable end of the first swing arm. The second support plate is rotatably connected to the second fixing bracket, and the second support plate is slidably connected to the movable end of the second swing arm. When the folding mechanism is in an open state, a support surface of the first support plate is lush with a support surface of the second support plate; or when the folding mechanism is in a closed state, a support surface of the first support plate and a support surface of the second support plate are disposed opposite to each other, and are away from each other in a direction close to the middle housing.

The support surface of the first support plate and the support surface of the second support plate are disposed opposite to each other, that is, the support surface of the first support plate and the support surface of the second support plate are in a face-to-face position relationship, and the support surfer’s of the first support plate is disposed obliquely relative to the support surface of the second support plate That is, an included angle is formed between the support surface of the first support plate and the support surface of the second support plate. The first support plate and second support plates are approximately V-shaped.

In this application, the first support plate and the second support plate form display accommodating space through automatic avoidance for accommodating a flexible display; so that a folding action performed by the housing apparatus of the electronic device on the flexible display is stable, and a squeezing force is small. This helps reduce a risk that the flexible display is damaged due to excessive squeezing of the folding mechanism, and makes the flexible display more reliable.

In a possible implementation, the middle housing includes an outer cover, and the outer cover is bent to form an inner space. When the folding mechanism is in the open state, the first support plate covers a part of the inner space, and the second support plate covers a part of the inner space. In this case, the first support plate and the second support plate are close to each other, and a distance between the support surface of the first support plate and the support surface of the second support plate is small. The folding mechanism may provide relatively complete planar support for a betiding portion of the flexible display in the open state by using a two-plate structure. When the folding mechanism is in the closed state, the first support plate partially extends into the inner space, and the second support plate partially extends into the inner space. In this case, a part of the space between the first support plate and the second support plate in the inner space of the middle housing is released, to form the display accommodating space, and the flexible display may partially extend into the inner space of the middle housing, thereby improving space utilization. In this way; components of the electronic device are arranged more compactly, thereby facilitating miniaturization of the electronic device.

In a possible implementation, when the folding mechanism is in the open state, the first support plate is spliced with the second support plate. The support surface of the first support plate and the support surface of the second support plate may be spliced to form a bending region support surface. The folding mechanism can fully support the bending portion of the flexible display in the open state by using the bending region support surface, so that the flexible display is not easily dented under pressing of the user, thereby improving a service life and reliability of the flexible display.

In a possible implementation, the first fixing bracket includes a first arc-shaped arm, and the first arc-shaped arm is rotatably connected to the middle housing. The second fixing bracket includes a second arc-shaped arm, and the second arc-shaped arm is rotatably connected to the middle housing. In other words, the first fixing bracket is rotatably connected to the middle housing by using the first arc-shaped arm, and the second fixing bracket is rotatably connected to the middle housing by using the second arc-shaped arm.

In a possible implementation, the movable end of the second swing arm is further rotatably connected to the first fixing bracket, and the movable end of the second swing arm is further rotatably connected to the first fixing bracket.

In a possible implementation, the first fixing bracket includes a first fixed body, the first fixed body is provided with a first sliding slot, the second fixing bracket includes a second fixed body, and the second fixed body is provided with a second sliding slot. When the folding mechanism is in the closed state, in the direction close to the middle housing, an extension direction of the second sliding slot is away from an extension direction of the first sliding slot. The movable end of the first swing arm includes a first hinge, and the first hinge is mounted in the first sliding slot and can slide in the first sliding slot, so that the movable end of the first swing arm is slidably connected to the first fixing bracket. The movable end of the second swing arm includes a second hinge, and the second hinge is mounted in the second sliding slot and can slide in the second sliding slot, so that the movable end of the second swing arm is slidably connected to the second fixing bracket.

It may be understood that, when the folding mechanism is in the closed state, in the direction close to the middle housing, the extension direction of the second sliding slot is away from the extension direction of the first sliding slot. Therefore, in a process in which the folding mechanism switches from the open state to the closed state, both the movable and of the first swing arm and the movable end of the second swing arm are close to the middle housing and are away from each other, the movable end of the first swing arm drives a first rotatable connecting member to be close to one end (referred to as the movable end for short) that is of the first support plate and that is close to the middle housing, and drives, by using the first rotatable connecting member, the movable end of the first support plate to be away from the second support plate. The movable end of the second swing arm drives a second rotatable connecting member to slide to be close to one end (referred to as the movable end for short) that is of the second support plate and that is close to the middle housing, and drives, by the using second rotatable connecting member, the movable end of the second support plate to be away from the first support plate. Therefore, when the folding mechanism is folded to the closed state, a distance between the rotation end of the first support plate and the rotation end of the second support plate is less than a distance between the movable end of the first support plate and the movable end of the second support plate, the first support plate and the second support plate are V-shaped, and the support surface of the first support plate and the support surface of the second support plate are disposed opposite relative to each other and are away from each other in a direction close to the middle housing.

In a possible implementation, the first hinge can further rotate in the first sliding slot, and the second hinge can further rotate in the second sliding slot, so that the movable end of the first swing arm is rotatably connected to the first fixing bracket, and the movable end of the second swing arm is rotatably connected to the second fixing bracket.

In a possible implementation, the first support plate is further rotatably connected to the movable aid of the first swing arm, and the second support plate is further rotatably connected to the movable end of the second swing arm. In this case, the first support plate is rotatably connected to the first swing arm, and the second support plate is rotatably connected to the second swing arm.

In a possible implementation, the folding mechanism further includes a first rotatable connecting member and a second rotatable connecting member. The first rotatable connecting member includes a rotation part and a sliding part, the rotation part of the first rotatable connecting member is rotatably connected to the movable and of the first swing arm, and the sliding part of the first rotatable connecting member is slidably connected to the first support plate. The second rotatable connecting member includes a rotation part and a sliding part, the rotation part of the second rotatable connecting member is rotatably connected to the movable end of the second swing arm, and the sliding part of the second rotatable connecting member is slidably connected to the second support plate. In this case, the second support plate is slidably and rotatably connected to the movable end of the second swing arm.

In a possible implementation, the movable end of the first swing arm is claw-shaped. The movable end of the first swing arm includes a plurality of first claw teeth that are spaced from each other. The first hinge includes two pails, and the two parts of the first hinge are respectively located at two sides of the plurality of first claw teeth, and are connected to the different first claw teeth. The rotation part of the first rotatable connecting member is embedded between the plurality of first claw teeth. The folding mechanism further includes a first rotatable connecting shaft, and the first rotatable connecting shaft is inserted into the first hinge, the plurality of first claw teeth, and the rotation part of the first rotatable connecting member.

In a possible implementation, the rotation part of the first rotatable connecting member is claw-shaped, the rotation part of the first rotatable connecting member includes a plurality of third claw teeth that are spaced from each other, and the plurality of third claw teeth and the plurality of first claw teeth are arranged in a staggered manner.

In a possible implementation, the movable end of the first swing arm is provided with a first rotation hole. The fast rotation hole penetrates through the first hinge and the plurality of first claw teeth A rotation center of the first rotation hole coincides with a rotation center of the first hinge, and the first rotatable connecting shaft is inserted into the first rotation hole.

In a possible implementation, the first support plate includes a first plate body and a first sliding radii. The support surface of the first support plate is formed on the fast plate body. The first plate body includes a fixing surface, and the fixing surface is disposed opposite to the support surface of the first support plate. The first sliding rail is fastened on the fixing surface, and the sliding part of the first rotatable connecting member is slidably connected to the first sliding rail.

In a possible implementation, the first fixed body is further provided with a first mounting groove, and the first mounting groove communicates with the first sliding slot. The folding mechanism further includes a first stopper, and the first stopper is mounted in the first mounting groove. When the folding mechanism is in the open state, the first stopper abuts against the first hinge, to prevent the first swing arm from moving in a direction close to the middle housing.

In a possible implementation, the first stopper includes a holder and an elastic part. The holder includes a control part and a pressing part, one end of the elastic parts mounted on the control part of the holder, and the other end of the elastic part abuts against a groove wall of the first mounting groove. When the folding mechanism is in the open state, the pressing part of the holder abuts against the first hinge. In this application, the elastic part of the first stopper can deform under an external force, so that the first stopper can move relative to the movable end of the first swing arm, thereby improving reliability of limiting between the first stopper and the movable end of the first swing arm.

In a possible implementation, the first fixed body includes a top surface, a bottom surface, and a second side surface. The top surface and the bottom surface are disposed bade to each other, the second side surface is located between the top surface and the bottom surface, the top surface faces the first support plate, the second side surface faces the middle housing, and the top surface and the bottom surface are close to each other in a direction close to the second side surface.

In a possible implementation, in the direction close to the second side surface, the extension direction of the first sliding slot and the bottom surface are close to each other.

In a possible implementation, the folding mechanism further includes a plurality of synchronous gears. Each of the synchronous gears is rotatably connected to the middle housing, two adjacent synchro nous gears are engaged with each other, and the rotation end of the first swing arm is engaged with the rotation end of the second swing arm by using the plurality of synchronous gears. In this application, the plurality of synchronous gears are disposed, so that actions of the first swing arm and the second swing arm are synchronous, that is, the first swing arm and the second swing arm are synchronously close to each other or are away from each other, thereby improving mechanism operation experience of the electronic device.

In a possible implementation, the rotation and of the first swing arm, the plurality of synchronous gears, and the rotation end of the second swing arm are arranged in an arc shape. That is, a rotation center of the rotation end of the first swing arm, rotation centers of the plurality of synchronous gears, and a rotation center of the rotation end of the second swing arm are arranged in an arc shape. In this case, the rotation end of the first swing arm, the plurality of synchronous gears, and the rotation end of the second swing arm can fully use inner space of the middle housing, so that the inner space of the riddle housing can be released more to form display accommodating space for accommodating a part of the flexible display when the electronic device is closed. This helps improve compactness of component arrangement of the electronic device and reduce a size of the electronic device.

According to a third aspect, this application further provides a folding mechanism, and the folding mechanism may be applied to a housing apparatus of an electronic device. The electronic device may further include a flexible display mounted on the housing apparatus. The electronic device implements screen inward folding by using the housing apparatus, and the electronic device may be bent.

The folding mechanism includes a middle housing, a first fixing bracket, a second fixing bracket, a first support plate, and a second support plate. The first fixing bracket is rotatably connected to the middle housing, and the second fixing bracket is rotatably connected to the middle housing. The first support plate is slidably connected to the first fixing bracket and is rotatably connected to the middle housing. The second support plate is slidably connected to the second fixing bracket and is rotatably connected to the middle housing. When the folding mechanism is in an open state, a support surface of the first support plate is flush with a support surface of the second support plate; or when the folding mechanism is in a closed state, a support surface of the first support plate and a support surface of the second support plate are disposed opposite to each other, and are away from each other in a direction close to the middle housing.

In this application, when the folding mechanism is in the open state, the support surface of the first support plate is flush with the support surface of the second support plate, so that the flexible display is in an unfolded state. When the folding mechanism is in a closed state, a support surface of the first support plate and a support surface of the second support plate are disposed opposite to each other, and are away from each other in a direction close to the middle housing, so that the flexible display is in a folded state, and a bending portion of the flexible display is in a water drop shape.

A main moving mechanism of the folding mechanism of the housing apparatus is a single-stage rotatable connection between the first fixing bracket and the second fixing bracket and the middle housing Because of a small quantity of parts, a simple part fitting relationship, a degree of freedom of 1, a short size chain, and a small accumulated error, the main moving mechanism of the folding mechanism is high in control precision. Two ends of the first support plate are respectively connected to the first fixing bracket and the middle housing, and two ends of the second support plate are respectively connected to the second fixing bracket and the middle housing. Therefore, a moving track of the first support plate is restricted by relative positions of the first fixing bracket and the middle housing, and a moving track of the second support plate is restricted by relative positions of the second fixing bracket and the middle housing. The first support plate and the second support plate form display accommodating space through automatic avoidance, so that a folding action performed by the housing apparatus on the flexible display is stable, and a squeezing force is small. This helps reduce a risk that the flexible display is damaged due to excessive squeezing of the folding mechanism, and makes the flexible display more reliable.

When the flexible display is mounted on the support surface of the first support plate and the support surface of the second support plate, a flat form can be presented, that is, it is considered that the support surface of the first support plate is flush with the support surface of the second support plate. For example, the case in which the support surface of the first support plate is flush with the support surface of the second support plate may include but is not limited to the following scenarios: The support surface of the first support plate is flush with the support surface of the second support plate; or a bonding layer or a steel sheet is disposed on the support surface of the first support plate, and a bonding layer or a steel sheet is disposed on the support surface of the second support plate, so that heights of the two support surfaces with the bonding layers or the steel sheets are equal; or a stiffening plate is disposed on the flexible display, so that heights of the two support surfaces on which the stiffening plate is stacked are equal.

The case in which the support surface of the first support plate is flush with the support surface of the second support plate includes: The support surface of the first support plate is a plane, the support surface of the second support plate is a plane, and the two are flush with each other, or the support surface of the first support plate includes a planar region used to support the flexible display, the support surface of the second support plate includes a planar region used to support the flexible display; and the planar regions of the two are flush with each other. For example, a main region of the support surface of the first support plate is a planar region used to implement support, and an inclined region used to implement rotation avoidance may be disposed on a periphery of the support surface of the first support plate, which is not strictly limited in this application. A main region of the support surface of the second support plate is a planar region used to implement support, and an inclined region used to implement rotation avoidance may be disposed on a periphery of the support surface of the second support plate, which is not strictly limited in this application.

In some possible implementations, the middle housing has inner space. When the folding mechanism is in the open state, the first support plate covers a part of the inner space, and the second support plate covers a part of the inner space. When the folding mechanism is in the closed state, the first support plate partially extends into the inner space, and the second support plate partially extends into the inner space.

In this implementation, when the folding mechanism is in the open state, the first support plate and the second support plate are close to each other, and a distance between the support surface of the first support plate and the support surface of the second support plate is small. The folding mechanism may provide relatively complete planar support for a bending portion of the flexible display in the open state by using a two-plate structure.

In addition, when the folding mechanism is in the closed state, because the first support plate partially extends into the inner space, and the second support plate partially extends into the inner space, a part of the space between the first support plate and the second support plate in the inner space of the middle housing is released, to form a part of the display accommodating space, and the flexible display may partially extend into the inner space of the middle housing, thereby improving space utilization. In this way, components of the electronic device are arranged more compactly; thereby facilitating miniaturization of the electronic device.

In some possible implementations, when the folding mechanism is in the open state, the first support plate is spliced with the second support plate. In this case, the support surface of the first support plate and the support surface of the second support plate may be spliced to form a bending region support surface. The folding mechanism of the housing apparatus can fully support the bending portion of the flexible display in the open state by using the bending region support surface, so that the flexible display is not easily dented under pressing of the user, thereby improving a service life and reliability of the flexible display.

A case in which the first support plate is spliced with the second support plate may include but is not limited to the following scenario: One part of the first support plate and one part of the second support plate are connected to each other without a gap between the two, and a notch or a gap may be formed between the other part of the first support plate and the other part of the second support plate; or the first support plate and the second support plate are connected to each other, without a gap between the two; or one part of the first support plate and one part of the second support plate are close to each other, with a small gap between the parts close to each other, and a notch or a gap may be formed between the other part of the first support plate and the other part of the second support plate; or the first support plate and the second support plate are close to each other, with a small gap between the two. When there is a small gap between the first support plate and the second support plate, or there is a small gap between a part of the first support plate and a part of the second support plate, a user presses a region that is of the flexible display and that corresponds to the gap, without forming an obvious dent in the corresponding region of the flexible display Therefore, the bending region support surface can provide strong support for the flexible display.

When there is a notch or a gap between the first support plate and the second support plate, or there is a notch or a gap between a part of the first support plate and a part of the second support plate, an area of the notch or the gap may be reduced as much as possible by optimizing a size and a shape of a component of the folding mechanism, so that a region that is of the flexible display and that corresponds to the notch or the gap may be slightly indented under pressing of the user, instead of forming an obvious dent. In addition, in some implementations, a support plate or a stiffening plate that can be bent and has specific structural strength may be disposed on a side that is of the flexible display and that faces the housing apparatus, and the support plate or the stiffening plate covers at least the notch or the gap between the first support plate and the second support plate, to improve anti-pressing strength of the flexible display.

The notch on the first support plate and the second support plate may include an avoidance notch, which is used to avoid interference between the first support plate and the second support plate and a middle housing or another structure during relative rotation, that is, to implement avoidance, thereby improving reliability of movement between the folding mechanism and the housing apparatus. In this implementation, when the first housing and the second housing are in the open state, the avoidance notch of the first support plate and the avoidance notch of the second support plate are combined, and the bending region support surface is a special-shaped surface.

The folding mechanism may further include a bendable steel sheet. The bendable steel sheet may be located above the first support plate and the second support plate, and cover the notch or the gap between the first support plate and the second support plate, so as to provide a more flat and complete support environment for the flexible display, thereby improving user experience of pressing and using.

In some possible implementations, the first fixing bracket includes a first arc-shaped arm, the second fixing bracket includes a second arc-shaped arm the middle housing has a first arc-shaped groove and a second arc-shaped groove, the first arc-shaped arm is mounted in the first arc-shaped groove, and the second arc-shaped arm is mounted in the second arc-shaped groove.

The first fixing bracket is rotatably connected to the middle housing by using a virtual shaft, and the second fixing bracket is rotatably connected to the middle housing by using a virtual shaft, which helps reduce design difficulty of a rotatable connection structure.

In some possible implementations, the first support plate is further rotatably connected to the first fixing bracket, and the second support plate is further rotatably connected to the second fixing bracket.

In some possible implementations, the first support plate includes a first plate body, a first movable part, and a first rotation part. The support surface of the first support plate is formed on the first plate body; and the first movable part and the first rotation part are fastened on the first plate body. The first movable part is slidably connected to the first fixing bracket, and the first rotation part is rotatably connected to the middle housing. The second support plate includes a second plate body, a second movable part, and a second rotation part. The support surface of the second support plate is formed on the second plate body; and the second movable part and the second rotation part are fastened on the second plate body. The second movable part is slidably connected to the second fixing bracket, and the second rotation part is rotatably connected to the middle housing.

In a process of switching from the open state to the closed state, the first fixing bracket drives the first movable part to move relative to the middle housing, the second fixing bracket drives the second movable part to move relative to the middle housing, the first movable pad and the second movable part are close to each other, and the first rotation part and the second rotation part are away from each other, so that the first support plate and the second support plate are approximately arranged in a V shape, and the support surface of the first support plate and the support surface of the second support plate are disposed opposite to each other, and are away from each other in a direction close to the middle housing. In this case, a large display accommodating space is formed between the support surface of the first support plate and the support surface of the second support plate.

In some possible implementations, the first plate body is provided with a fixing surface and a first avoidance notch. The fixing surface of the first plate body is disposed had: to the support surface of the first support plate. The first rotation part is an arc-shaped arm, one end of the first rotation part is fastened to the fixing surface of the first plate body, and the other end of the first rotation part is located in the first avoidance notch. In this case, the first avoidance notch is not only used to accommodate a part of the first rotation part, but also used to avoid another structure. The second plate body is provided with a fixing surface and a second avoidance notch. The fixing surface of the second plate body is disposed back to the support surface of the second support plate. The second rotation part is an arc-shaped arm, one end of the second rotation part is fastened to the fixing surface of the second plate body, and the other end of the second rotation part is located in the second avoidance notch. In this case, the second avoidance notch is not only used to accommodate a part of the second rotation part, but also used to avoid another structure. The middle housing is provided with a third arc-shaped groove and a fourth arc-shaped groove. The first rotation part is mounted in the third arc-shaped groove, and the second rotation part is mounted in the fourth arc-shaped groove.

In some possible implementations, the first movable part is further rotatably connected to the first fixing bracket, and the second movable part is further rotatably connected to the second fixing bracket.

In some possible implementations, the first fixing bracket is provided with a first sliding slot. The first movable part includes a hinge, and the hinge of the first movable part is mounted in the first sliding slot, and can slide in the first sliding slot. The second fixing bracket is provided with a second sliding slot. The second movable part includes a hinge, and the hinge of the second movable part is mounted in the second sliding slot, and can slide in the second sliding slot.

In some possible implementations, when the folding mechanism is in the closed state, in the direction close to the middle housing, an extension direction of the first sliding slot and an extension direction of the second sliding slot are away from each other. In this case, a relative position relationship between the first sliding slot and the second sliding slot helps reduce design difficulty of the folding mechanism, and improve implementability.

In some possible implementations, the hinge of the first movable part ran further rotate in the first sliding slot, and the hinge of the second movable part can further rotate in the second sliding slot.

In some possible implementations, the folding mechanism further includes a third fixing bracket, a fourth fixing bracket, a first swing arm, a second swing arm, and a plurality of synchronous gears. The first swing arm includes a movable end and a rotation end, the movable end of the first swing arm is slidably connected to the third fixing bracket, and the rotation end of the first swing arm is rotatably connected to the middle housing. The second swing arm includes a movable aid and a rotation end, the movable end of the second swing arm is slidably connected to the fourth fixing bracket, and the rotation end of the second swing arm is rotatably connected to the middle housing. Each of the synchronous gears is rotatably connected to the middle housing, two adjacent synchronous gears are engaged with each other, and the rotation end of the first swing arm is engaged with the rotation end of the second swing arm by using the plurality of synchronous gears.

In this implementation, because the rotation end of the first swing arm and the rotation end of the second swing arm are associated by using the plurality of synchronous gears, the plurality of synchronous gears are used to enable the first swing arm and the second swing arm to synchronously rotate in a motion process of the housing apparatus, that is, to be synchronously close to or away from each other.

In some possible implementations, the movable end of the first swing arm is further rotatably connected to the third fixing bracket, and the movable end of the second swing arm is further rotatably connected to the fourth fixing bracket.

In some possible implementations, the movable end of the first swing arm includes a hinge. The third fixing bracket is provided with a third sliding slot, and the hinge of the movable end of the first swing arm is mounted in the third sliding slot, and can slide in the third sliding slot. The movable end of the second swing arm includes a hinge, the fourth fixing bracket is provided with a fourth sliding slot, and the hinge of the movable end of the second swing arm is mounted in the fourth sliding slot, and can slide in the fourth sliding slot.

In some possible implementations, the hinge of the movable end of the first swing arm can further rotate in the third sliding slot, and the hinge of the movable end of the second swing arm can further rotate in the fourth sliding slot.

In some possible implementations, the rotation end of the first swing arm, the plurality of synchronous gears, and the rotation end of the second swing arm are arranged in an arc shape, to fully use inner space of the middle housing, so that the inner space of the middle housing can be released more to form display accommodating space for accommodating a part of the flexible display when the electronic device is closed. This helps improve compactness of component arrangement of the electronic device and reduce a size of the electronic device.

In some possible implementations, the folding mechanism further includes a first blocker and an elastic part. The first blocker and the elastic part are mounted in the middle housing. The first blocker is located between the elastic part and the synchronous gear. When the elastic part is in a compressed state, the first blocker abuts against the synchronous gear through an elastic force generated by the elastic part. When the folding mechanism is in the open state, the first blocker and the synchronous gear form a first clamping structure. When the folding mechanism is in the closed state, the first blocker and the synchronous gear form a second clamping structure.

In this implementation, the first clamping structure and the second clamping structure can keep the synchronous gear at a specific position relative to the first blocker, even if the first swing arm and the second swing arm maintain a specific relative position relationship relative to the middle housing, so that the first housing and the second housing can better remain in the open state or the closed state, thereby improving user experience.

In addition, a synchronization assembly enables the first blocker to press the synchronous gear through an elastic force of the elastic part, so that a relative position relationship between the first clamping structure and the second clamping structure is maintained between the first blocker and the synchronous gear. The synchronization assembly has motion resistance that prevents the relative position relationship from changing. Therefore, the first clamping structure and the second clamping structure may provide specific resistance in a process in which the electronic device is unfolded to enter the open state and in a process in which the electronic device is folded to end the open state, so that the user can experience a better sense of operation of the mechanism.

In some possible implementations, the folding mechanism further includes a first rotatable connecting shaft, a second rotatable connecting shaft, a third rotatable connecting shaft, a second blocker, and a fastening plate that are mounted in the middle housing. The second blocker is located on a side that is of the synchronous gear and that is away from the first blocker. The fastening plate is located on a side that is of the elastic part and that is away from the first blocker. The elastic part includes a plurality of springs.

The first rotatable connecting shaft is inserted into the second blocker, the rotation end of the first swing arm, the first blocker, one of the springs, and the fastening plate. The third rotatable connecting shaft is inserted into the second blocker, the synchronous gear, the first blocker, another spring, and the fastening plate. The second rotatable connecting shaft is inserted into the second blocker, the rotation end of the second swing arm, the first blocker, the another spring, and the fastening plate.

The first blocker includes a plurality of first bump groups. Each of the first bump groups includes a plurality of first bumps, and the plurality of first bumps are arranged in a ring shape and are spaced from each other. The second blocker includes a plurality of second bump groups. Each of the second bump groups includes a plurality of second bumps, and the plurality of second bumps are arranged in a ring shape and are spaced from each other. The rotation end of the first swing ism, the synchronous gear, and the rotation end of the second swing arm each include a plurality of first protrusions and a plurality of second protrusions that are disposed back to each other, the plurality of first protrusions are arranged in a ring shape and are spaced from each other, and the plurality of second protrusions are arranged in a ring shape and are spaced from each other.

A plurality of first protrusions of the first swing arm and a plurality of first bumps of one of the first bump groups are alternately arranged to fore a clamping structure, and a plurality of second protrusions of the first swing arm and a plurality of second bumps of one of the second bump groups are alternately arranged to form a clamping structure. A plurality of first protrusions of the synchronous gear and a plurality of first bumps of another first bump group are alternately arranged to form a clamping structure, and a plurality of second protrusions of the synchronous gear and a plurality of second bumps of another second bump group are alternately arranged to form a clamping structure. A plurality of first protrusions of the second swing arm and a plurality of first bumps of another first bump group are alternately arranged to form a clamping structure, and a plurality of second protrusions of the second swing arm and a plurality of second bumps of another second bump group are alternately arranged to form a clamping structure.

In this implementation, the rotation end of the first swing arm, the rotation end of the second swing arm, and the synchronous gear are all clamped to the first blocker and the second blacker, to form a clamping structure, so that the first swing arm and the second swing arm can stay at some positions.

In addition, when the elastic part is in a compressed state, the first blocker abuts against the synchronous gear through an elastic force generated by the elastic part. In this case, the first blocker and the second blocker cooperate with each other to press the rotation end of the first swing arm, the synchronous gear, and the rotation end of the second swing arm, so that the clamping structure between the rotation end of the first swing arm, the synchronous gear, the rotation end of the second swing arm and the first blocker, and the clamping structure between the rotation end of the first swing arm, the synchronous gear the rotation aid of the second swing arm and the second blocker arm stable.

When the rotation end of the first swing arm, the rotation end of the second swing arm, and the synchronous gear rotate relative to the first blocker and the second blocker, relative positions of the plurality of first protrusions and the plurality of first bumps can change to form different clamping structures, and relative positions of the plurality of second protrusions and the plurality of second bumps cam change to form different clamping structures.

According to a fourth aspect, this application further provides a housing apparatus, including a first housing, a second housing, and the folding mechanism according to any one of the possible implementations. The folding mechanism connects the first housing and the second housing, and the folding mechanism is configured to enable the first housing and the second housing to be folded or unfolded relative to each other.

In this application, in a folding process of the housing apparatus, the folding mechanism of the housing apparatus can form display accommodating space through automatic avoidance in the folding process for accommodating a flexible display A folding action performed by the housing apparatus on the flexible display is stable, and a squeezing force is small. This helps reduce a risk that the flexible display is damaged due to excessive squeezing of the folding mechanism, and makes the flexible display more reliable.

According to a fifth aspect, this application further provides an electronic device, including a flexible display, a first housing, a second housing, and the folding mechanism according to any one of the possible implementations. The folding mechanism connects the first housing and the second housing, and the folding mechanism is configured to enable the first housing and the second housing to be folded or unfolded relative to each other. The flexible display includes a first non-bending portion, a bending portion, and a second non-bending portion that are sequentially arranged. The first non-bending portion is fixedly connected to the first housing, the second non-bending portion is fixedly connected to the second housing, and the bending portion deforms in a process in which the first housing and the second housing are folded or unfolded relative to each other.

In this application, in a folding process of a housing apparatus, the folding mechanism of the housing apparatus can form display accommodating space through automatic avoidance in the folding process for accommodating a flexible display. A folding action performed by the housing apparatus on the flexible display is stable, and a squeezing force is small. This helps reduce a risk that the flexible display is damaged due to excessive squeezing of the folding mechanism, makes the flexible display more reliable, and makes a service life of the electronic device long.

In some possible implementations, a first fastening groove is disposed on a side that is of the first housing and that is close to the folding mechanism, a first fixing bracket is mounted in the first fastening groove, a second fastening groove is disposed on a side that is of the second housing and that is close to the folding mechanism, and a second fixing bracket of the folding mechanism is mounted in the second fastening groove. In this case, the first fixing bracket is fixedly connected to the first housing, and the second fixing bracket is fixedly connected to the second housing.

The middle housing includes an appearance surface. When the first housing and the second housing are in an open state, the first housing and the second housing cover the appearance surface. When the first housing and the second housing are in a closed state, the appearance surface is exposed relative to the first housing and the second housing.

In this implementation, the first housing and the second housing can shield the middle housing from a bad side of the housing apparatus in the open state. In this case, the first housing and the second housing can also shield other components of the folding mechanism from the back side of the housing apparatus, so that the housing apparatus implements self-shielding on the back side, thereby protecting the folding mechanism. In addition, appearances of the housing apparatus and the electronic device are complete, so that appearance experience is good, and waterproof and dust-proof performance is good.

In some possible implementations, the appearance surface includes a first arc surface part, a planar part, and a second arc surface part. The first arc surface part and the second arc surface part are respectively connected to two sides of the planar part; or the appearance surface is an arc surface.

In this implementation, the appearance surface forms an arc surface or a shape similar to an arc surface, which helps improve appearance experience and holding experience of the electronic device when the electronic device is in a closed state. In addition, a middle part of the appearance surface is a planar part, so that a thickness of an outer cover is small, an overall thickness of the housing apparatus in the open state is small, and an overall width of the housing apparatus in the closed state is small, to facilitate miniaturization and thinning of the electronic device. In some other implementations, the appearance surface may alternatively be an arc surface or another smooth curved surface.

BRIEF DESCRIPTION OF DRAWINGS

FIG. 120 is a schematic diagram of the structure shown in FIG. 119 in another use state;

FIG. 121 is a schematic diagram of the structure shown in FIG. 118 when cut along H-H;

FIG. 122 is a schematic diagram of a structure of a cross section of the electronic device shown in FIG. 93 when cut along J-J;

FIG. 123 is a schematic diagram of a structure of a cross section of the electronic device shown in FIG. 94 when cut along K-K;

FIG. 124 is a schematic diagram of the structure shown in FIG. 118 when cut along I-I;

FIG. 125 is a schematic diagram of a structure of the structure shown in FIG. 124 in a closed state;

FIG. 126 is a schematic diagram of a structure of a cross section of the electronic device shown in FIG. 93 when cut along N-N;

FIG. 127 is a schematic diagram of a structure of a cross section of the electronic device shown in FIG. 94 when cut along O-O;

FIG. 128 is a schematic diagram of structures of a first swing arm, a second swing arm, and a synchronization assembly shown in FIG. 100;

FIG. 129 is a schematic exploded view of the structure shown in FIG. 128;

FIG. 130 is a schematic diagram of the structure shown in FIG. 129 from another angle;

FIG. 131 is a schematic diagram of a partial structure of a folding mechanism shown in FIG. 96;

Figure 93:
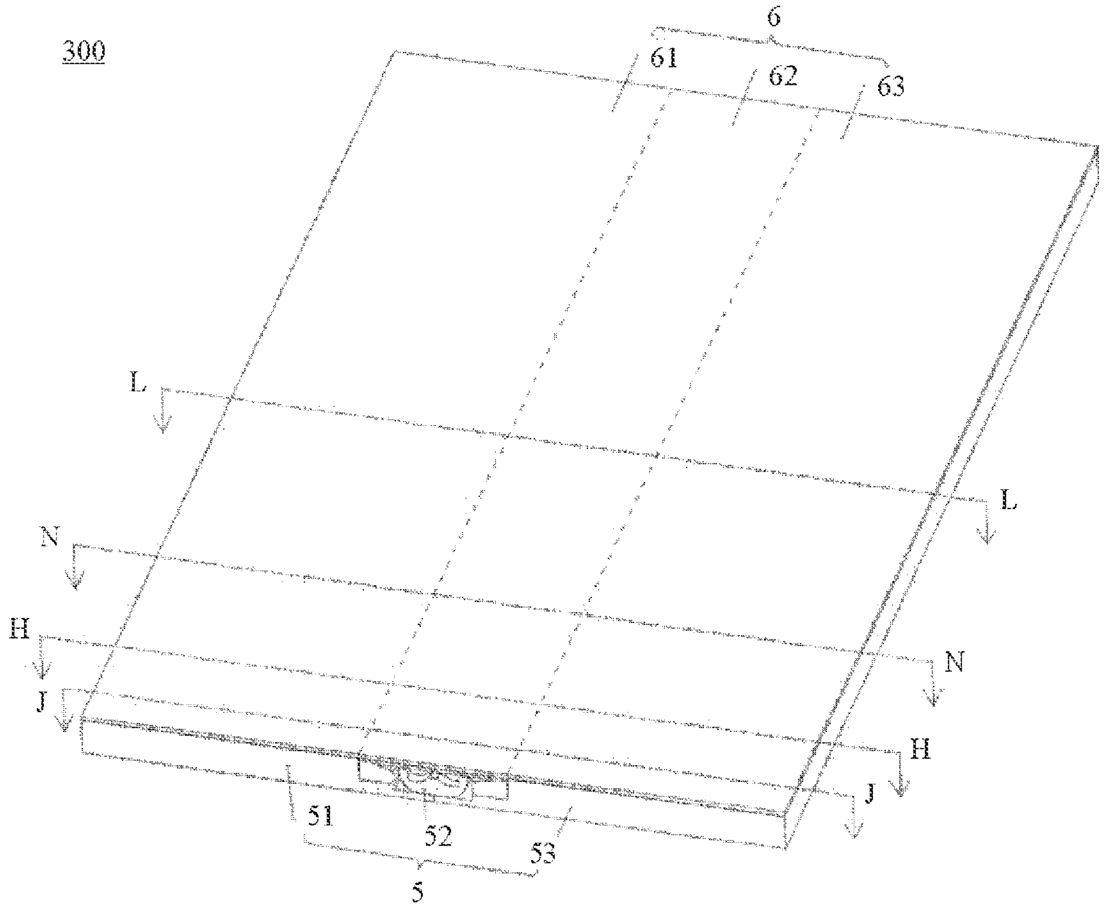
FIG. 93 is a schematic diagram of a structure of an electronic device in an open state in some embodiments according to an embodiment of this application.
Figure 94:
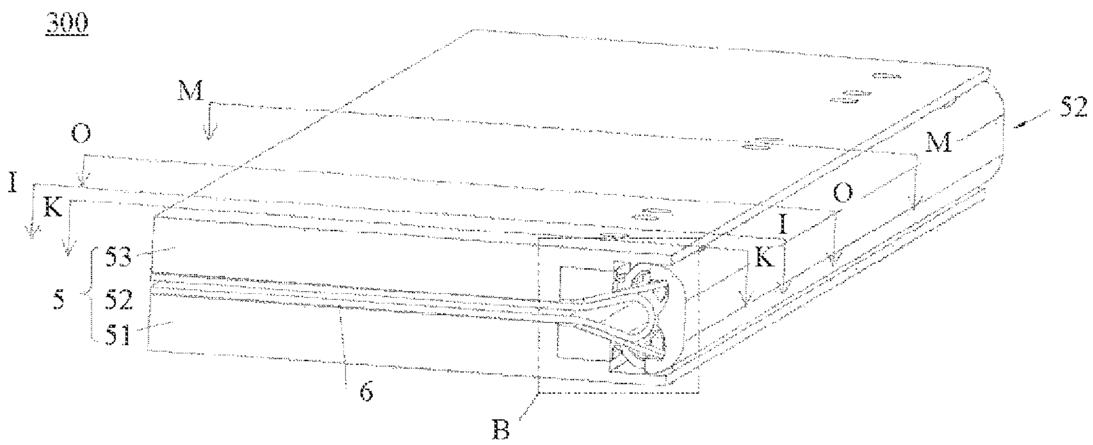
FIG. 94 is a schematic diagram of a structure of the electronic device shown in FIG. 93 in a closed state.
Figure 96:
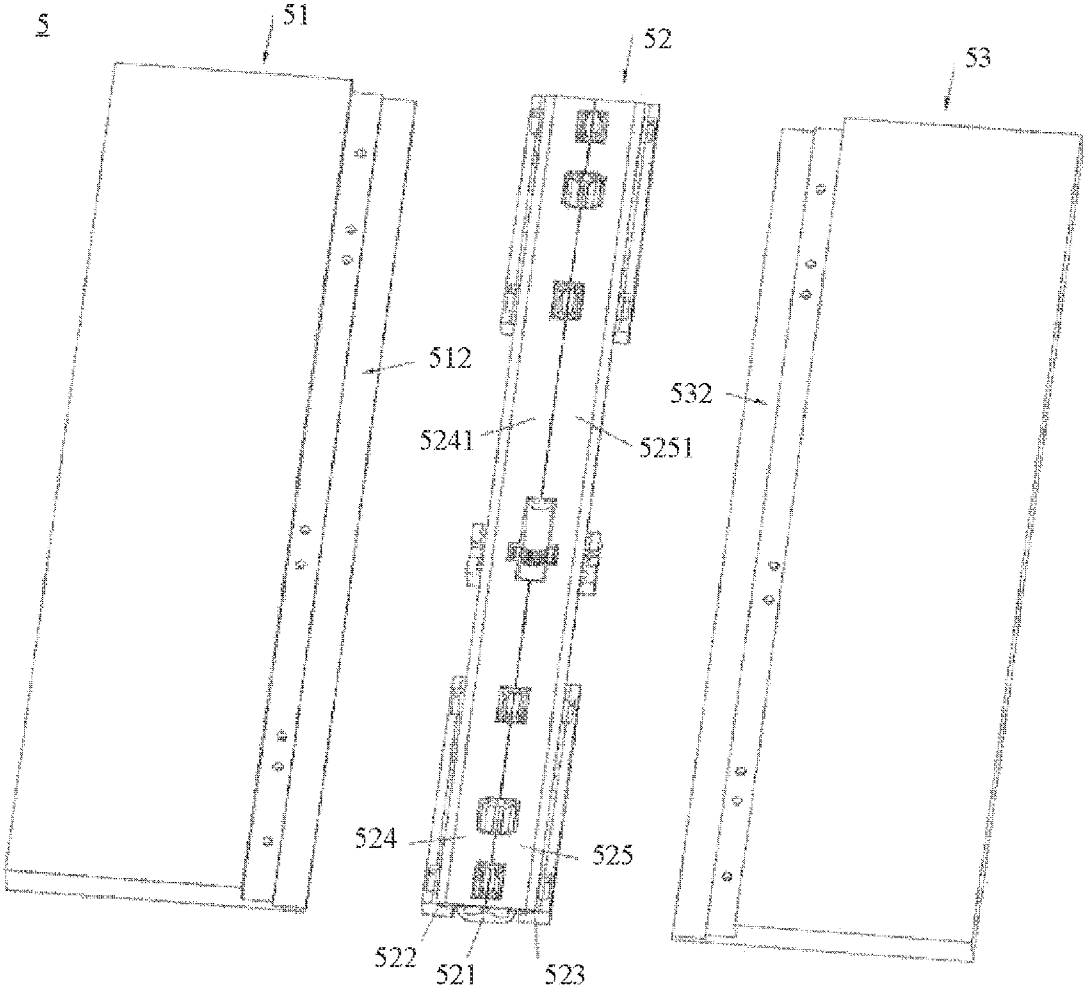
FIG. 96 is a schematic exploded view of a partial structure of a housing apparatus shown in FIG. 95.
Figure 131:
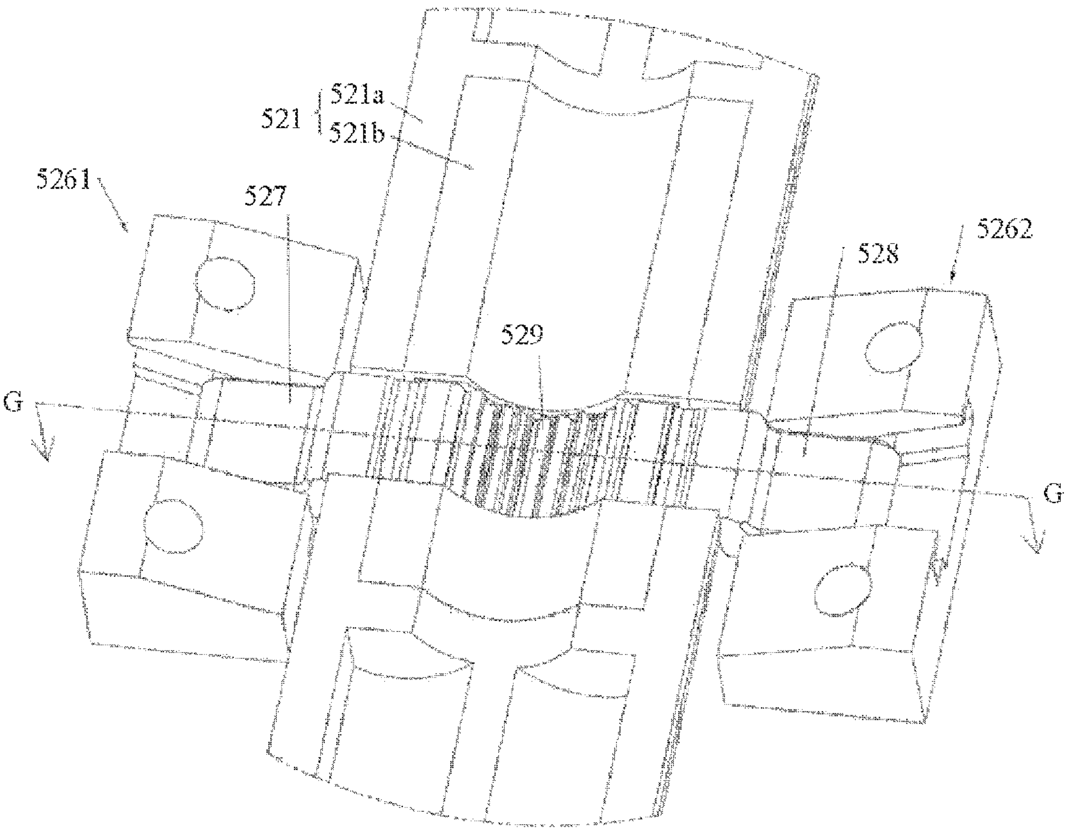
Figure 132:
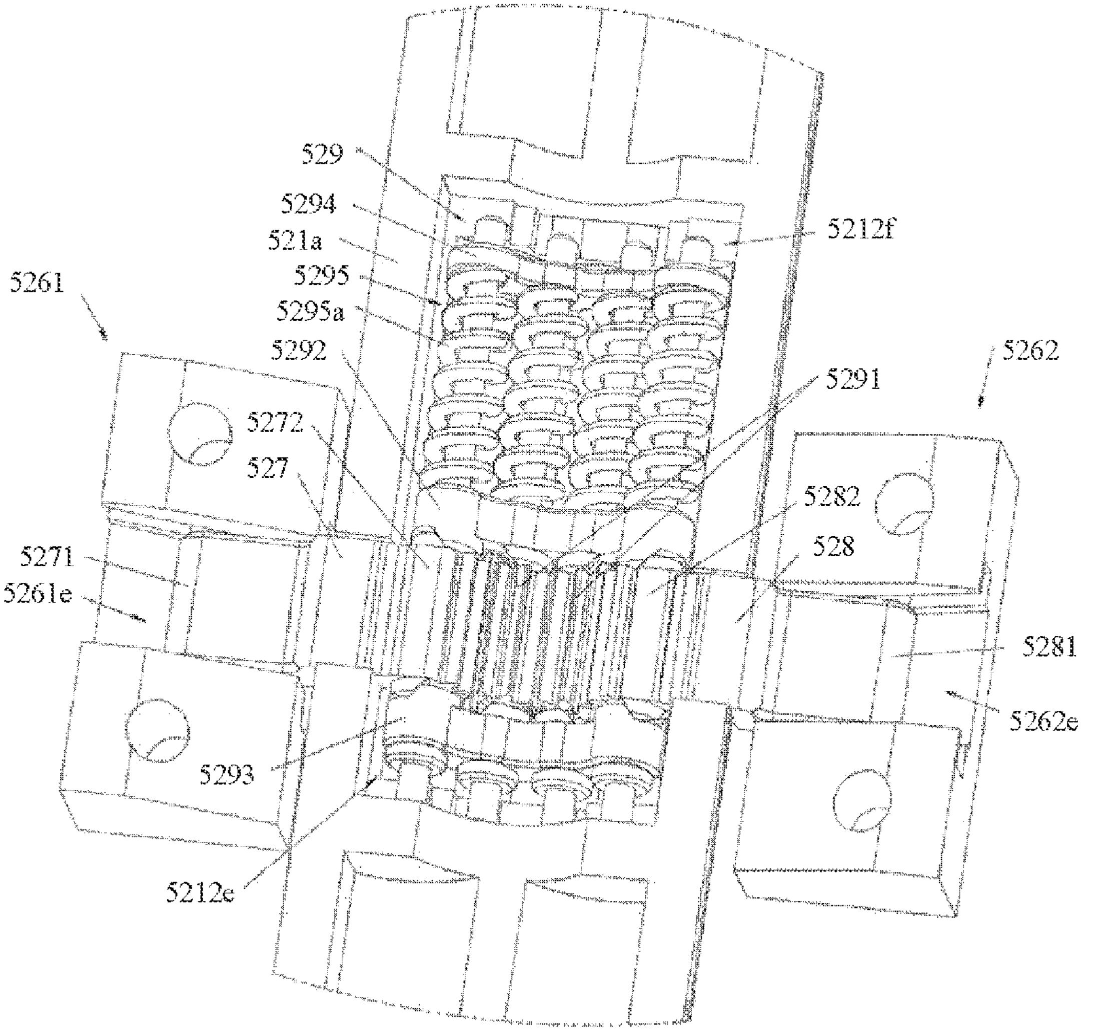
Figure 133:
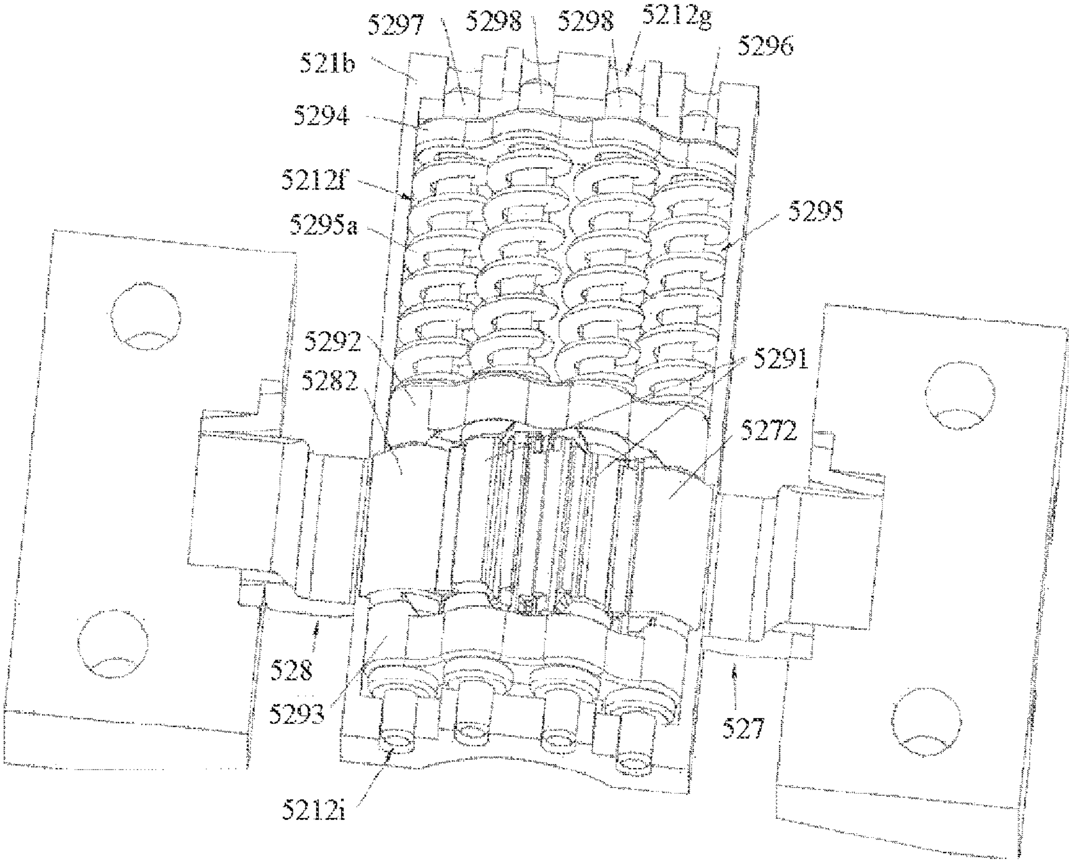
Figure 134:
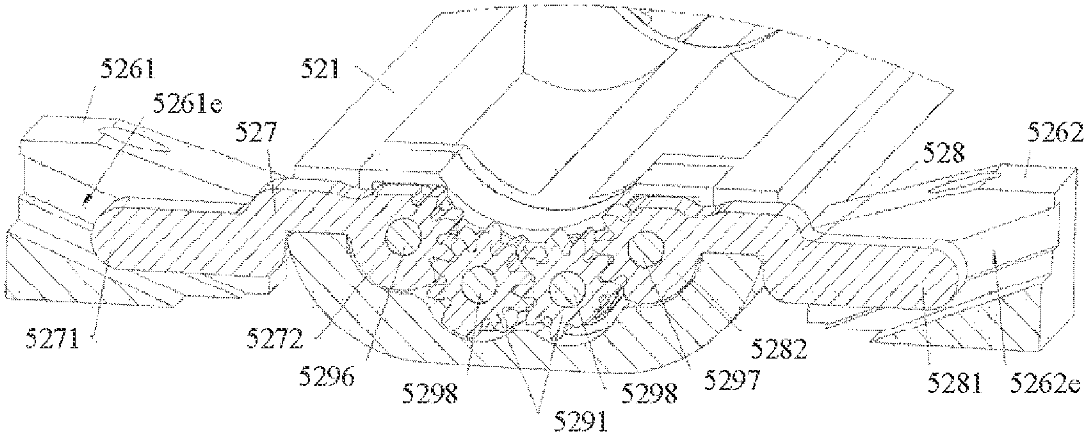
Figure 135:
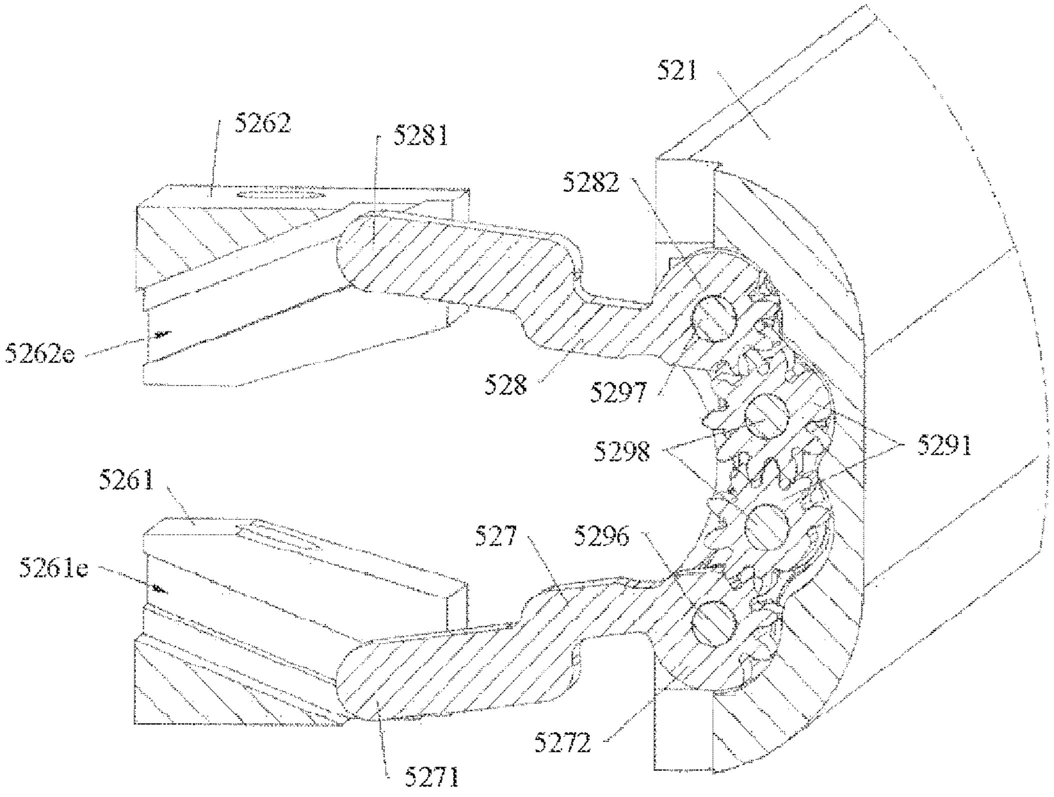
Figure 136:
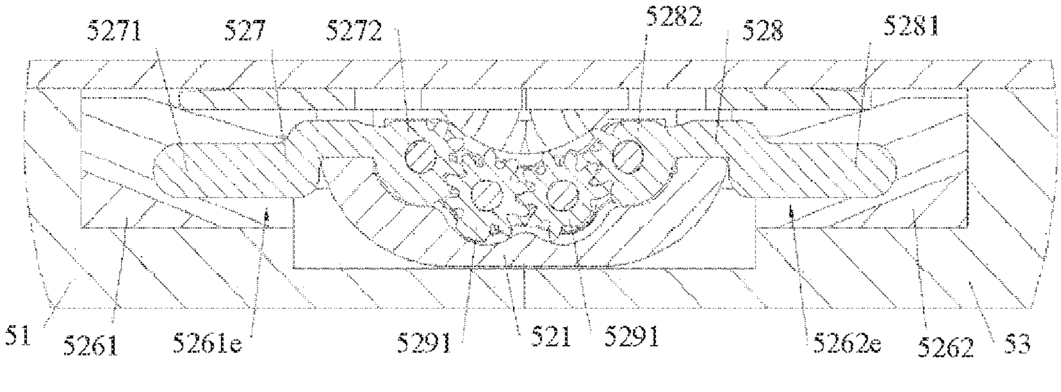
Figure 137:
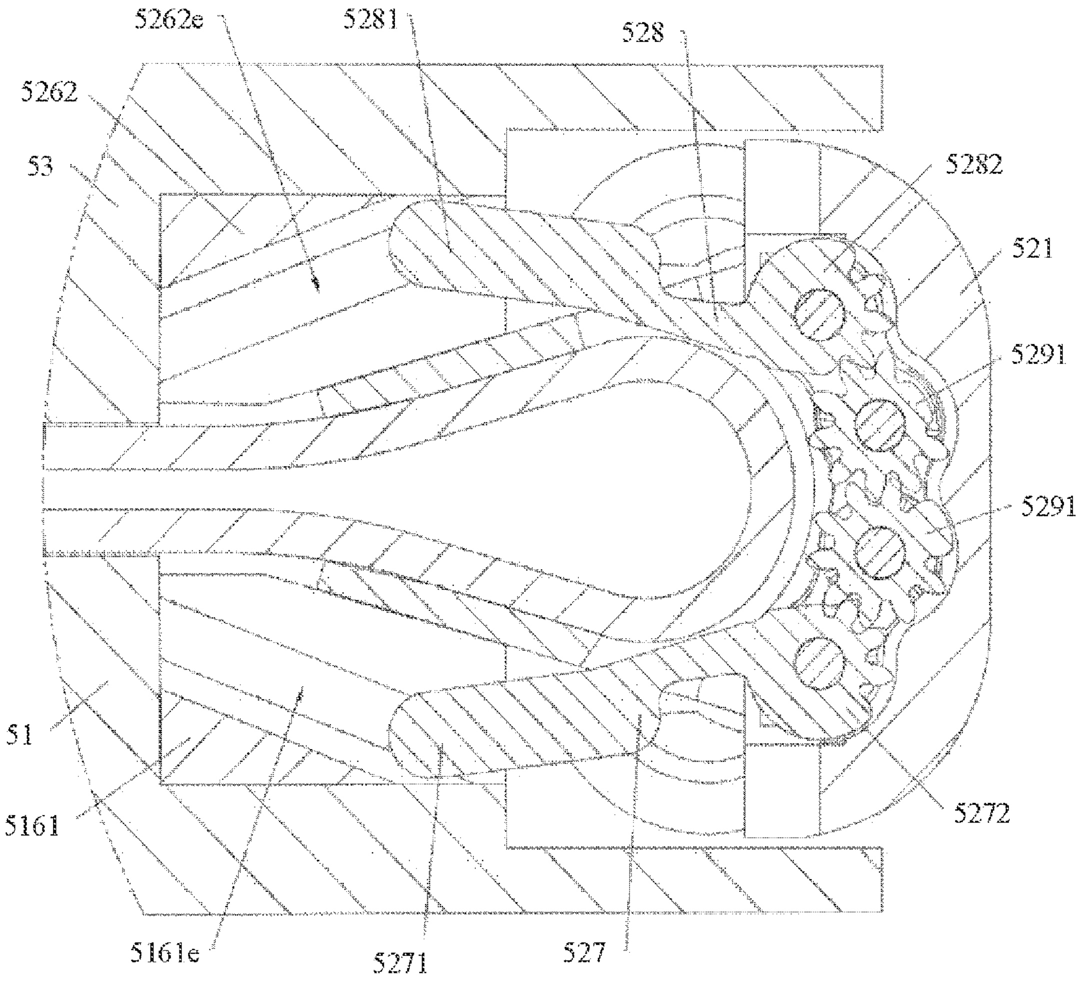
Figure 138:
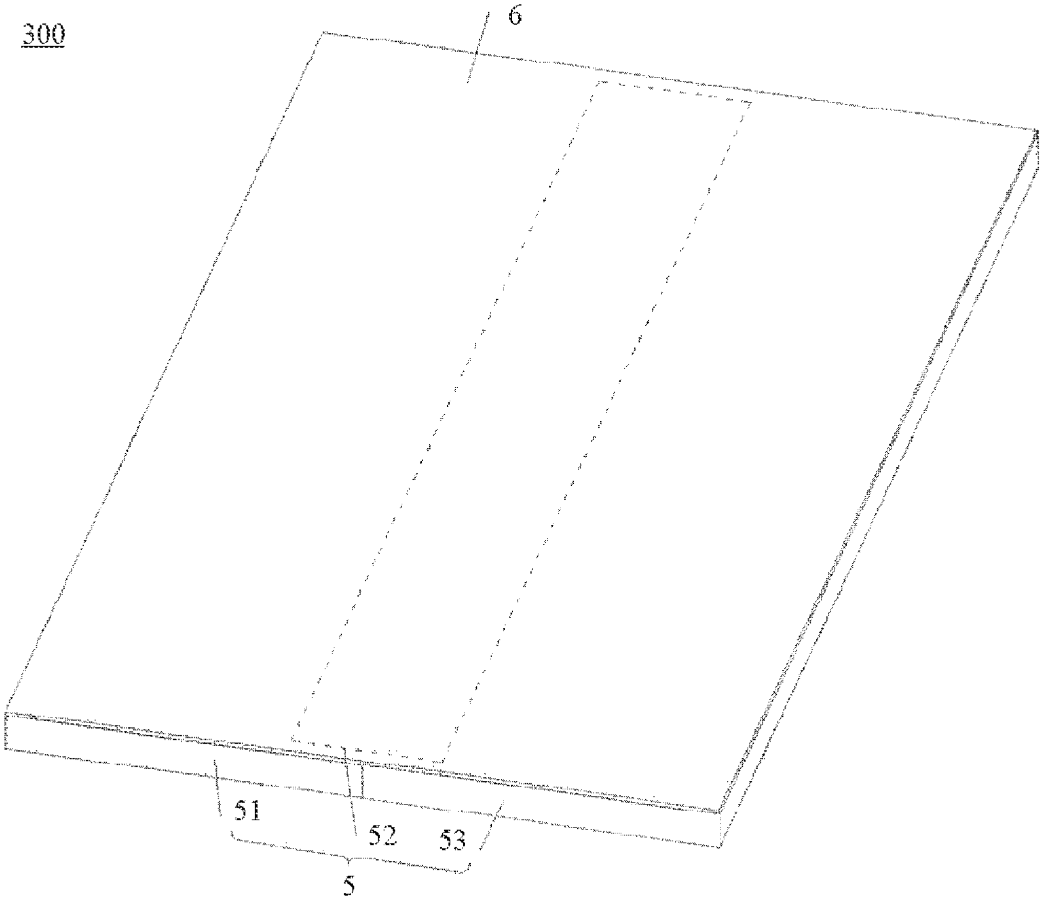
Figure 139:
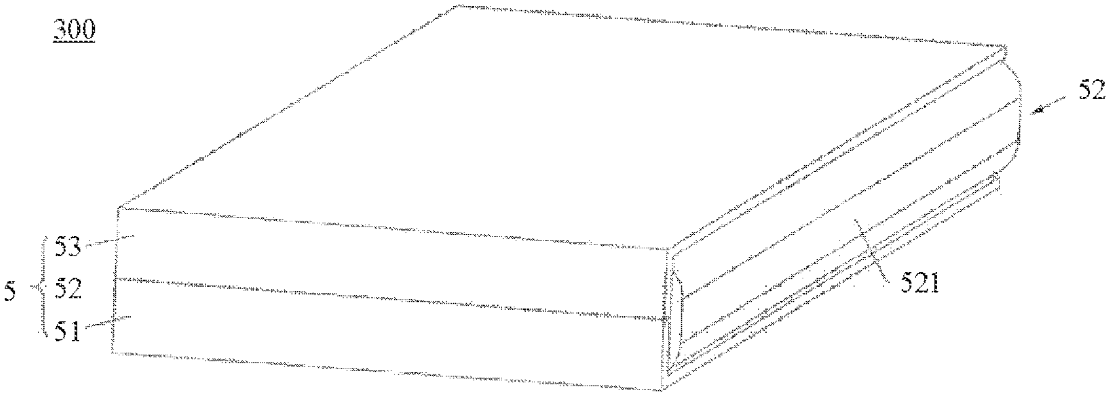
Figure 140:
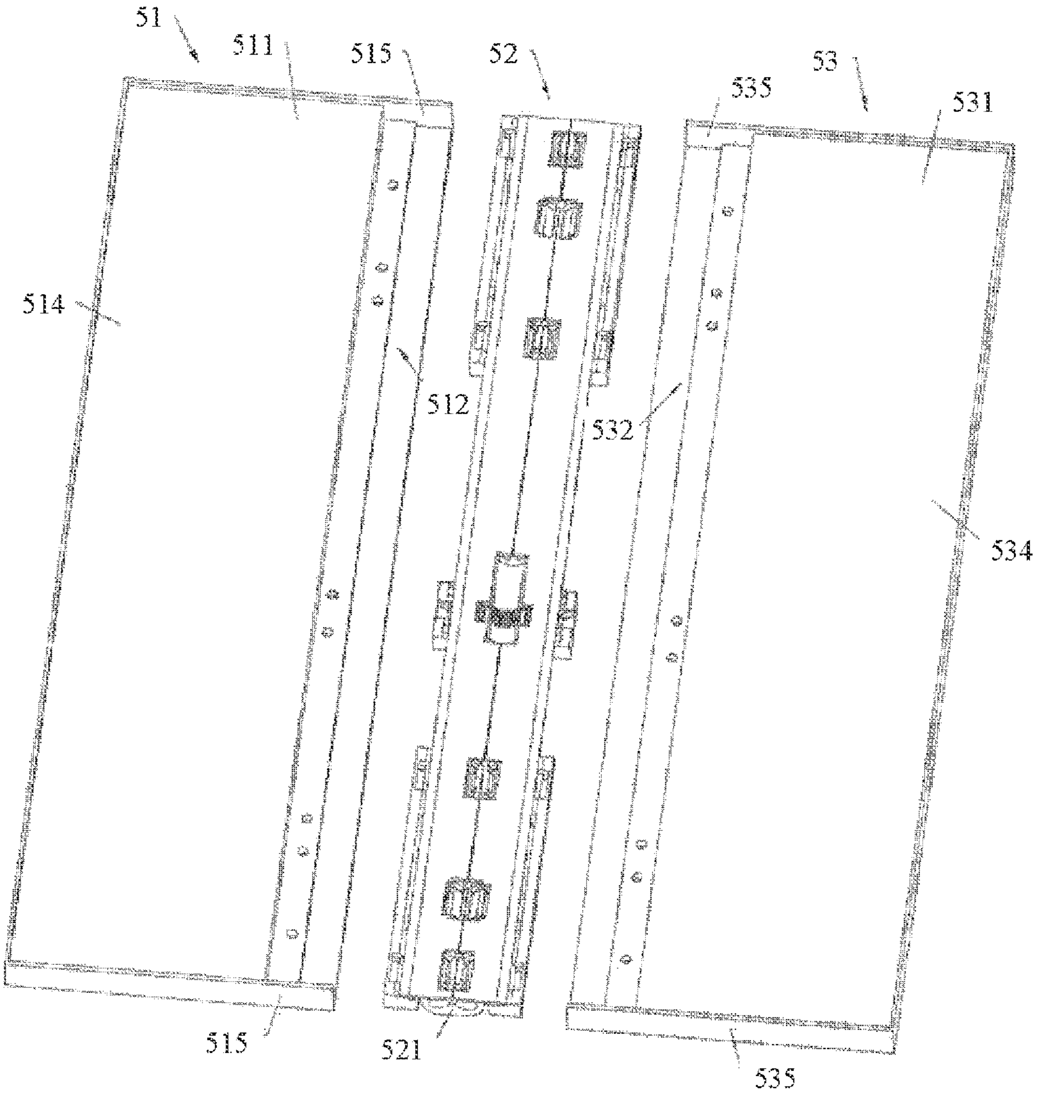

FIG. 132 is a schematic diagram of another partial structure of a folding mechanism shown in FIG. 96;

FIG. 133 is a schematic diagram of another partial structure of a folding mechanism shown in FIG. 96;

FIG. 134 is a schematic diagram of the structure shown in FIG. 131 when cut along G-G;

FIG. 135 is a schematic diagram of a structure of the structure shown in FIG. 134 in a closed state;

FIG. 136 is a schematic diagram of a structure of a cross section of the electronic device shown in FIG. 93 when cut along L-L;

FIG. 137 is a schematic diagram of a structure of a cross section of the electronic device shown in FIG. 94 when cut along M-M;

FIG. 138 is a schematic diagram of a structure of an electronic device in an open state in some other embodiments according to an embodiment of this application;

FIG. 139 is a schematic diagram of a structure of the electronic device shown in FIG. 138 in a closed state; and FIG. 140 is a schematic exploded view of a partial structure of a housing apparatus of the electronic device shown in FIG. 138.

DESCRIPTION OF EMBODIMENTS

The following describes embodiments of this application with reference to the accompanying drawings in embodiments of this application.

In the descriptions of embodiments of this application, it should be noted that terms “mount” and “connection” should be understood in a broad sense unless there is a clear stipulation and limitation. For example, “connection” may be a detachable connection, an un-detachable connection, a direct connection, or an indirect connection through an intermediate medium. “Fixed connection” means a connection to each other and a relative position relationship unchanged after the connection. “Rotatable connection” means a connection to each other and a relative rotation after the connection. “Slidable connection” means a connection to each other and a relative slide after the connection. Orientation terms mentioned in embodiments of this application, for example, “on”, “below”, “left”, “right”, “inside”, and “outside”, are merely directions based on the accompanying drawings. Therefore, the orientation terms are used to better and more clearly describe and understand embodiments of this application, instead of indicating or implying that a specified apparatus or element should have a specific orientation, and be constructed and operated in the specific orientation. Therefore, this cannot be understood as a limitation on embodiments of this application. “A plurality of” means at least two. The term “and/or” describes an association relationship between associated objects and indicates that three relationships may exist. For example. A and/or B may indicate the following cases: Only A exists, both A and B exist, and only B exists.

This application provides an electronic device. The electronic device may be an electronic product such as a mobile phone, a tablet computer, a notebook computer, or a wearable device. Embodiments of this application are described by using an example in which the electronic device is a mobile phone.

The electronic device includes a flexible display and a housing apparatus, and the housing apparatus is configured to carry the flexible display. The housing apparatus can drive the flexible display to fold or unfold. For example, the electronic device may be a two-fold foldable structure. The housing apparatus includes a first housing, a second housing, and a folding mechanism. The folding structure connects the first housing and the second housing, and is configured to enable the first housing and the second housing to be folded or unfolded relative to each other. The electronic device, the housing apparatus, and the folding mechanism correspondingly have an open state and a closed state.

The folding mechanism includes a middle housing, a first support plate, a second support plate, a first fixing bracket, a second fixing bracket, and a connection assembly. The first fixing bracket is fastened to the first housing, the second fixing bracket is fastened to the second housing, the middle housing is connected between the first fixing bracket and the second fixing bracket by using the connection assembly, the first support plate is connected to the first fixing bracket and/or the middle housing, and the second support plate is connected to the second fixing bracket and/or the middle housing.

The first support plate and the second support plate are configured to support a bending portion of the flexible display. When the folding mechanism is in an open state, the first support plate and the second support plate are unfolded, so that the bending portion of the flexible display is unfolded. When the folding mechanism is in a closed state, the first support plate and the second support plate areaway from each other in a direction close to the middle housing, and the first support plate and the second support plate are jointly in a "V"-shaped opening shape, so as to form a water drop-shaped display accommodating space together with the middle housing. In this case, the bending portion of the flexible display can be accommodated in the display accommodating space in a water drop shape.

When the folding mechanism is in the open state, the first support plate and the second support plate may be spliced, to support the flexible display by using a two-plate structure. When the folding mechanism is in the closed state, the first support plate and the second support plate partially extend into inner space of the middle housing, so that the inner space of the middle housing can form a part of the display accommodating space, thereby improving space utilization of the folding mechanism.

Two connection structures are formed between the first support plate and the first fixing bracket and/or the middle housing, and two connection structures are formed between the second support plate and the second fixing bracket and/or the middle housing, so that moving tracks of the first support plate and the second support plate are determined in a folding process of the folding mechanism. The first support plate and the second support plate form the display accommodating space through automatic avoidance and a squeezing action of the folding mechanism on the flexible display can be properly controlled, so that a folding action performed by the folding mechanism and the housing apparatus on the flexible display is stable, and a squeezing force is small. This helps reduce a risk that the flexible display is damaged due to excessive squeezing of the folding mechanism, and makes the flexible display more reliable.

When the folding mechanism is in the open state, an avoidance gap is formed between a top surface that is of the first fixing bracket and that faces the first support plate and the first support plate, and an avoidance gap is formed between a top surface that is of the second fixing bracket and that faces the second support plate and the second support plate. When the folding mechanism is in the closed state, the first support plate is close to the top surface of the first fixing bracket, so that the avoidance gap is reduced or eliminated; and the second support plate is close to the top surface of the second fixing bracket, so that the avoidance gap is reduced or eliminated. The first support plate and the second support plate are away from each other in a direction close to the middle housing, and the two are in a "V"-shaped opening shape.

The folding mechanism may further include one or more synchronization assemblies, configured to enable the first fixing bracket and the second fixing bracket to rotate synchronously relative to the middle housing, so as to improve operation experience of synchronous rotation of the housing apparatus and the electronic device.

The following provides embodiments as examples for describing the solutions of this application.

Figure 1:
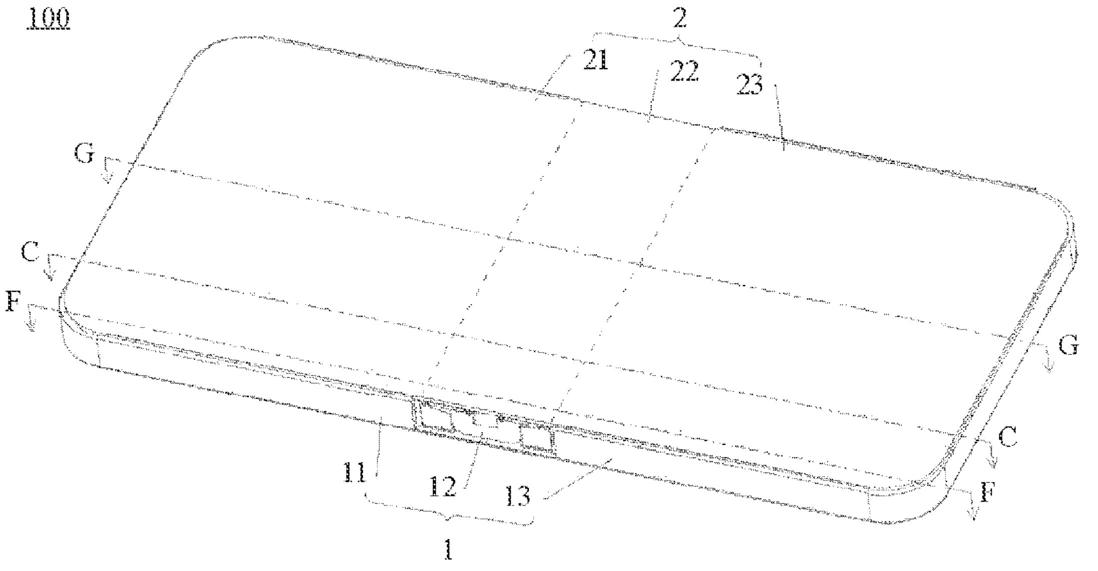
FIG. 1 is a schematic diagram of a structure of an electronic device in an open state in some embodiments according to an embodiment of this application.
Figure 2:
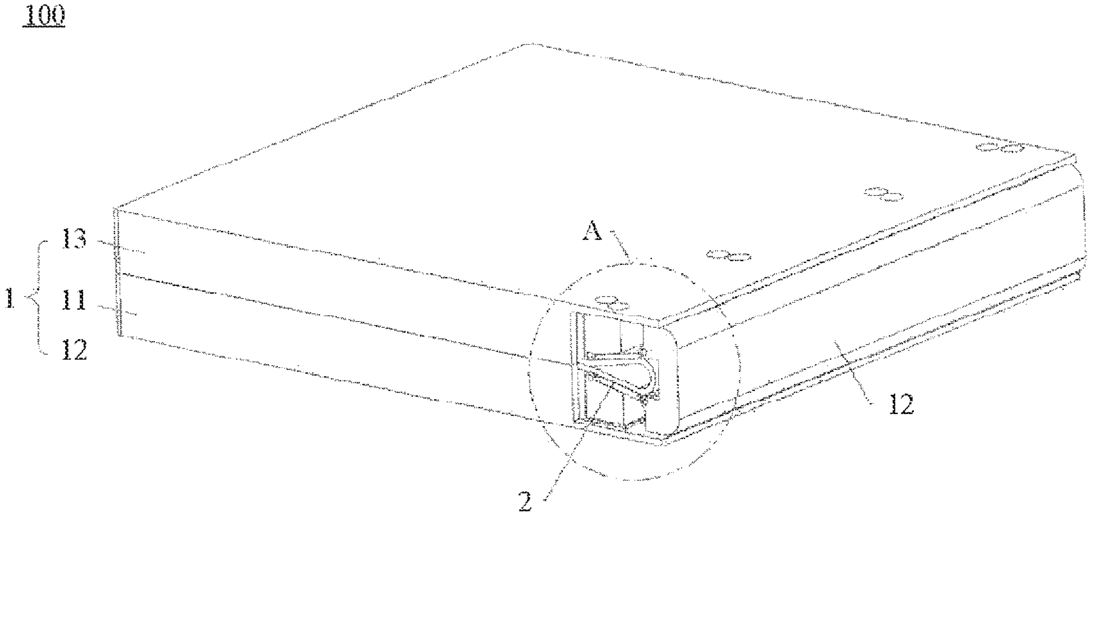
FIG. 2 is a schematic diagram of a structure of the electronic device shown in FIG. 1 in a closed state.

In some embodiments, FIG. 1 is a schematic diagram of a structure of an electronic device 100 in an open state in some embodiments according to an embodiment of this application. FIG. 2 is a schematic diagram of a structure of the electronic device 100 shown in FIG. 1 in a closed state.

The electronic device 100 includes a housing apparatus 1 and a flexible display 2. The flexible display 2 is mounted on the housing apparatus 1. The flexible display 2 is configured to display an image, and the housing apparatus 1 is configured to drive the flexible display 2 to move. The housing apparatus 1 includes a first housing 11, a folding mechanism 12, and a second housing 13 that are sequentially connected. The folding mechanism 12 can deform, so that the first housing 11 and the second housing 13 are folded or unfolded relative to each other. The folding mechanism 12 is configured to enable the first housing 13 and the second housing 11 to be folded or unfolded relative to each other. That is, the folding mechanism 12 can deform, so that the first housing 13 and the second housing 11 are folded or unfolded relative to each other.

As shown in FIG. 1, the first housing 11 and the second housing 13 may be unfolded relative to each other to an open state, so that the folding mechanism 12, the housing apparatus 1, and the electronic device 100 are all in an open state. The flexible display 2 is unfolded with the housing apparatus 1, so as to be in an unfolded state. For example, what the housing apparatus 1 is in the open state, an included angle between the first housing 11 and the second housing 13 may be approximately 180°. In some other embodiments, when the housing apparatus 1 is in the open state, an angle between the first housing 11 and the second housing 13 may have a slight deviation relative to 180°, for example, 165°, 177°, or 185°.

As shown in FIG. 2, the first housing 11 and the second housing 13 may be folded relative to each other to a closed state, so that the folding mechanism 12, the housing apparatus 1, and the electronic device 100 are all in a closed state. The flexible display 2 is folded with the housing apparatus 1, so as to be in a folded state. The flexible display 2 is located inside the housing apparatus 1, and is wrapped by the housing apparatus 1.

The first housing 11 and the second housing 13 may alternatively be unfolded or folded relative to each other to an intermediate state, so that the folding mechanism 12, the housing apparatus 1, and the electronic device 100 are all in an intermediate state, and the intermediate state may be any state between an open state and a closed state. The flexible display 2 moves along with the housing apparatus 1.

In this embodiment, the flexible display 2 can be unfolded and folded with the housing apparatus 1. When the electronic device 100 is in an open state, the flexible display 2 is in an unfolded state, and can display in full screen, so that the electronic device 100 has a large display area, to improve viewing experience and operation experience of a user. When the electronic device 100 is in a closed state, a planar size of the electronic device 100 is small (with a small width size), so that it is convenient for a user to carry and receive the electronic device 100.

For example, as shown in FIG. 1, when the housing apparatus 1 is in the open state, the first housing 11 may be spliced with the second housing 13. The splicing of the first housing 11 and the second housing 13 includes a case in which the first housing 11 and the second housing 13 abut against each other, or may include a cue in which there is a small gap between the first housing 11 and the second housing 13. In this embodiment, the first housing 11 and the second housing 13 can be spliced to stop an unfolding action of the housing apparatus 1, so as to prevent the housing apparatus 1 from being over-folded during unfolding. This reduces a force exerted on the flexible display 2 and improves reliability of the flexible display 2 and the electronic device 100.

In addition, as shown in FIG. 2, when the housing apparatus 1 is in the closed state, the first housing 11 and the second housing 13 can be fully closed, and there is no big gap between the first housing 11 and the second housing 13, so that an appearance experience of the housing apparatus 1 and the electronic device 100 is good, and waterproof, dust-proof, and anti-foreign matter performance is good. A case in which the first housing 11 and the second housing 13 are fully closed includes a case in which the first housing 11 and the second housing 13 abut against each other, or may include a case in which there is a small gap between the first housing 11 and the second housing 13. When there is a small gap between the first housing 11 and the second housing 13, some foreign matter (for example, a nil, a paper clip, or broken glass) outside the electronic device 100 does not enter between the first housing 11 and the second housing 13 through the gap, to avoid damage to the flexible display 2 by the foreign matter, so that reliability of the electronic device 104 is improved.

In some embodiments, the electronic device 100 may further include a plurality of modules (not shown in the figure), and the plurality of modules may be accommodated inside the housing apparatus 1. The plurality of modules of the electronic device 100 may include but are not limited to a mainboard, a processor, a memory, a battery; a camera module, an earpiece module, a speaker module, a microphone module, an antenna module, a sensor module, and the like. A quantity, types, locations, and the like of modules of the electronic device 100 are not specifically limited in this embodiment of this application.

It may be understood that, when a user holds the electronic device 100, a location of the earpiece module of the electronic device 100 may be defined as an upper edge of the electronic device 100, a location of the microphone module of the electronic device 100 may be defined as a lower edge of the electronic device 100, and two sides that are of the electronic device 100 and that are held by a left hand and a right hand of the user may be defined as left and right sides of the electronic device 100. In some embodiments, the electronic device 100 may be folded leftward or rightward. In some other embodiments, the electronic device 100 may be folded upward or downward.

In some embodiments, as shown in FIG. 1, the flexible display 2 includes a first non-bending portion 21, a bending portion 22, and a second non-bending portion 23 that are sequentially arranged. The first non-bending portion 21 is fixedly connected to the first housing 11, and the second non-bending portion 23 is fixedly connected to the second housing 13. In a process in which the first housing 11 and the second housing 13 are folded or unfolded relative to each other, the bending portion 22 deforms. In the process in which the first housing 11 and the second housing 13 are folded or unfolded relative to each other, the first housing 11 drives the first non-bending portion 21 to move, and the second housing 13 drives the second non-bending portion 23 to move. The first non-bending portion 21 and the second non-bending portion 23 are folded or unfolded relative to each other.

In some embodiments, the flexible display 2 may be an organic light-emitting diode (organic light-emitting diode, AILED) display, an active-matrix organic light-emitting diode (active-matrix organic light-emitting diode, AMOLED) display, a mini organic light-emitting diode (mini organic light-emitting diode) display, a micro light-emitting diode (micro light-emitting diode) display, a micro organic light-emitting diode (micro organic light-emitting diode) display, or a quantum dot light emitting diode (quantum dot light emitting diode, QLED) display.

Figure 3:
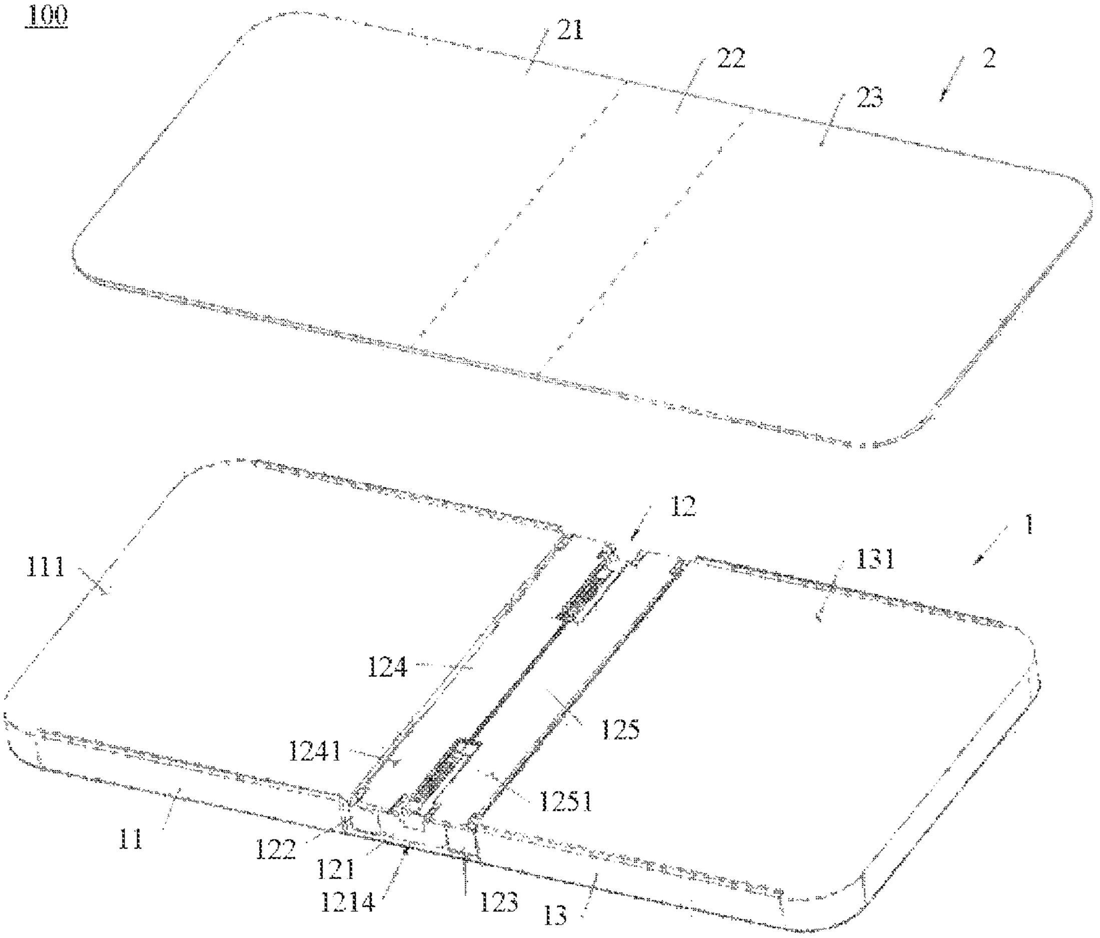
FIG. 3 is a schematic exploded view of a partial structure of the electronic device shown in FIG. 1.

In some embodiments, FIG. 3 is a schematic exploded view of a partial structure of the electronic device 100 shown in FIG. 1.

The first housing 11 includes a support surface 111 configured to carry the flexible display 2, and the second housing 13 includes a support surface 131 configured to carry the flexible display 2. For example, the first non-bending portion 21 of the flexible display 2 may be fixedly connected to the support surface 111 of the first housing 11. For example, the first non-bending portion 21 may be bonded to the support surface 111 of the first housing 11 by using an adhesive layer. The second non-bending portion 23 is fixedly connected to the support surface 131 of the second housing 13. For example, the first non-bending portion 21 may be bonded to the support surface 131 of the second housing 13 by using an adhesive layer.

In this embodiment, because the first non-bending portion 21 is fixedly connected to the first housing 11, and the second non-bending portion 23 is fixedly connected to the second housing 13, when the first housing 11 and the second housing 13 are folded or unfolded relative to each other, relative folding and unfolding actions between the first non-bending portion 21 and the second non-bending portion 23 can be accurately controlled, so that a deformation process and a movement form of the flexible display 2 are controllable, and reliability is high.

In some other embodiments, the first housing 11 may include a main body part and a sliding part. The main body part is connected to the folding mechanism 12, the sliding part is slidably connected to the main body part, the sliding part may slightly slide relative to the main body part, and the support surface 111 of the first housing 11 is formed on the sliding part. The second housing 13 may include a main body part and a sliding part. The main body part is connected to the folding mechanism 12, the sliding part is slidably connected to the main body part, the sliding part may slightly slide relative to the main body part, and the support surface 131 of the second housing 13 is formed in the sliding part. In this case, the first non-bending portion 21 and the second non-beading portion 23 of the flexible display 2 may slightly slide relative to the sliding parts and the main body parts in the first housing 11 and the second housing 13, to implement position fine adjustment in a process in which the first housing 11 and the second housing 13 are folded or unfolded relative to each other. This implements good switching between an unfolded state and a folded state, reduces a probability of damage to the flexible display 2, and improves reliability of the flexible display 2.

Figure 4:
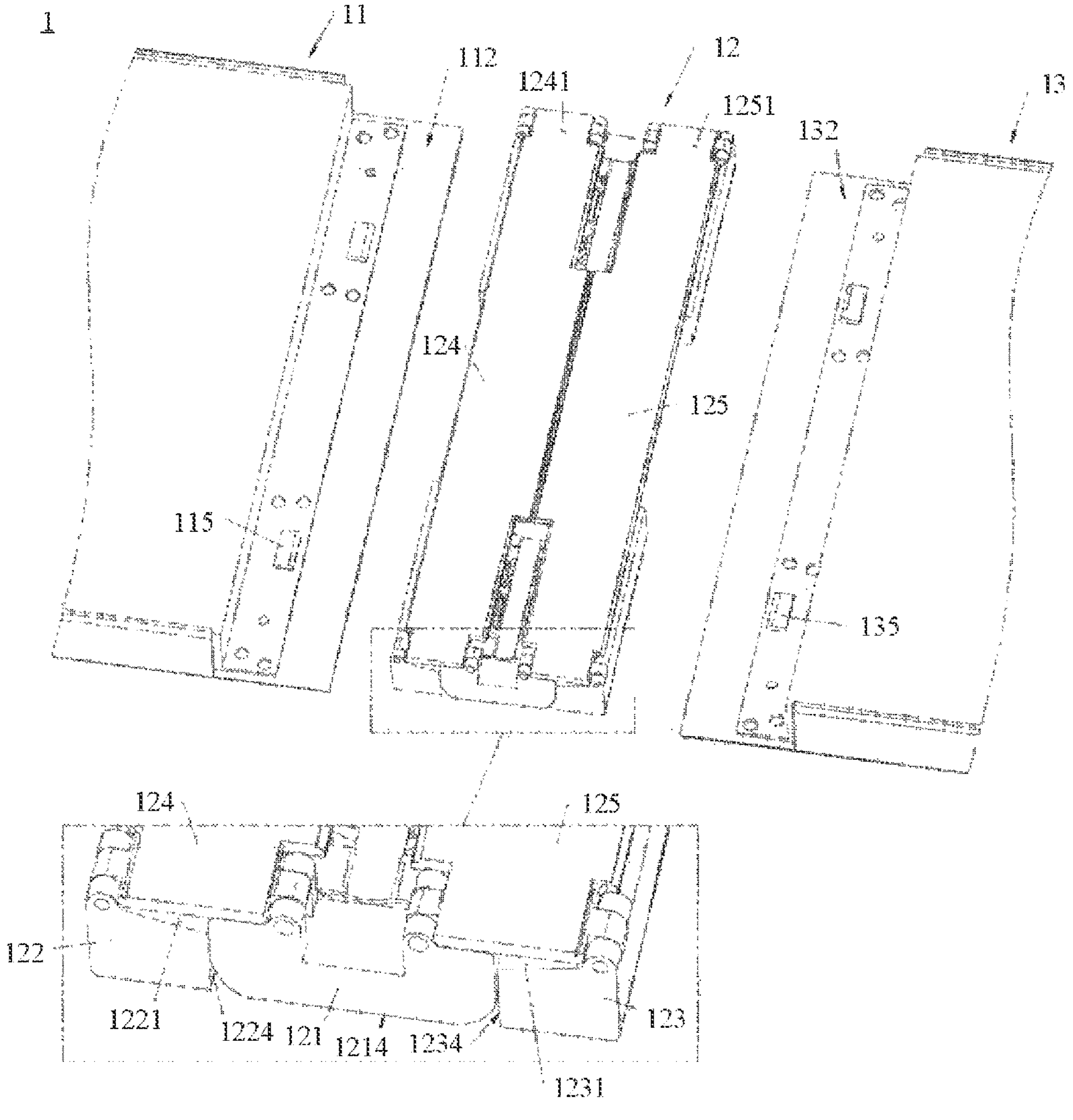
FIG. 4 is a schematic exploded view of a partial structure of a housing apparatus shown in FIG. 3.
Figure 5:
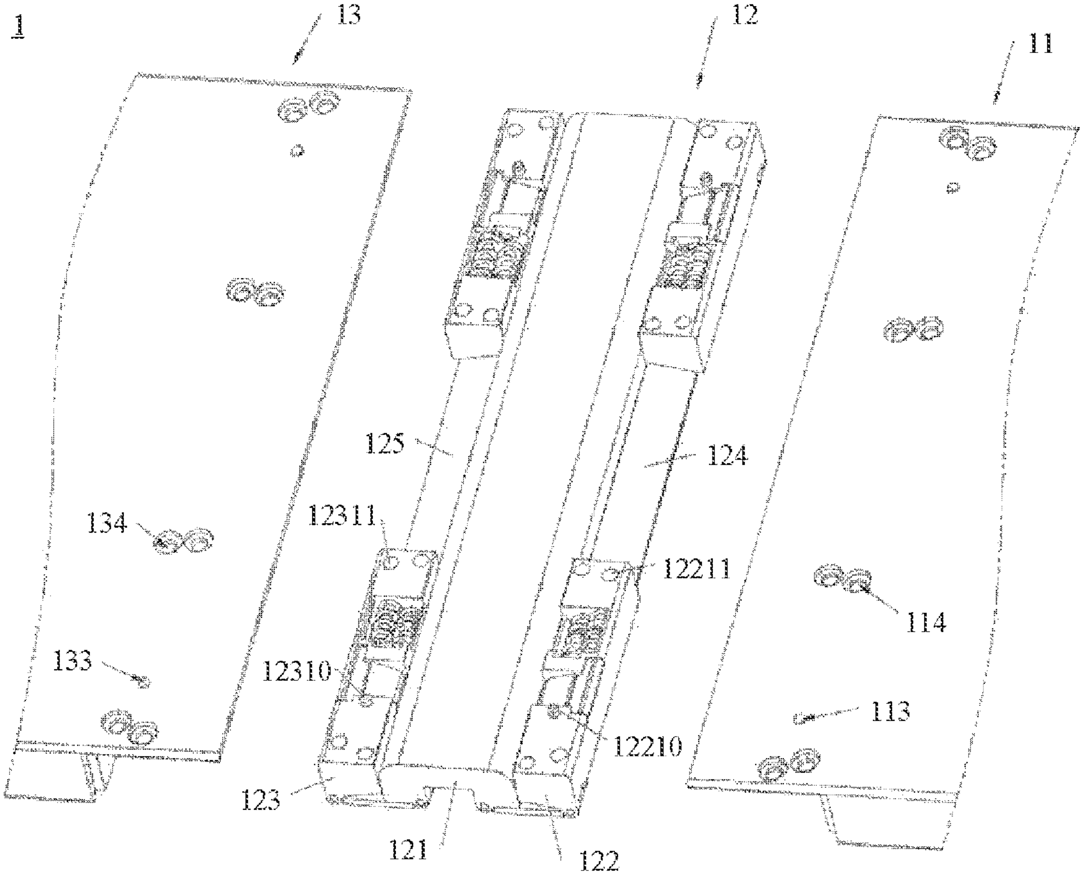
FIG. 5 is a schematic diagram of a structure of the housing apparatus shown in FIG. 4 from another angle.

In some embodiments, refer to FIG. 3 to FIG. 5. FIG. 4 is a schematic exploded view of a partial structure of the housing apparatus 1 shown in FIG. 3. FIG. 5 is a schematic diagram of a structure of the housing apparatus 1 shown in FIG. 4 from another angle. An angle of view of the housing apparatus 1 shown in FIG. 5 is reversed horizontally relative to an angle of view of the housing apparatus 1 shown in FIG. 4.

The folding mechanism 12 includes a middle housing 121, a first fixing bracket 122, a second fixing bracket 123, a first support plate 124, and a second support plate 125. The first fixing bracket 122 is configured to be fixedly connected to the first housing 11. For example, a first fastening groove 112 is provided on a side that is of the first housing 11 and that is close to the folding mechanism 12, and the first fixing bracket 122 is mounted in the first fastening groove 112, to fixedly connect to the first housing 11. The fast fixing bracket 122 may be mounted in the first fastening groove 112 by using a fastener, welding, bonding, fastening, or the like, so as to implement that the first fixing bracket 112 is fastened to the first housing 11.

The second fixing bracket 123 is configured to be fixedly connected to the second housing 13. A second fastening groove 132 is provided on a side that is of the second housing 13 and that is close to the folding mechanism 12, and the second fixing bracket 123 is mounted in the second fastening groove 132, to fixedly connect to the second housing 13. The second fixing bracket 123 may be mounted in the second fastening groove 132 by using a fastener, welding, bonding, fastening, or the like, so as to implement that the second fixing bracket 123 is fastened to the second housing 13.

The middle horsing 121 is connected between the first housing 11 and the second housing 13. The first support plate 124 is rotatably connected to the first fixing bracket 122 and is rotatably connected to the middle housing 121, and the second support plate 125 is rotatably connected to the second fixing bracket 123 and is rotatably connected to the middle housing 121. That is, the first support plate 124 is connected between the first housing 11 and the middle housing 121, and the second support plate 125 is connected between the middle housing 121 and the second housing 13. In this embodiment of this application, that the two are rotatably connected means that the two are connected to each other, and the two may rotate relative to each other after being connected.

In some embodiments, as shown in FIG. 3 and FIG. 4, the first support plate 124 includes a support surface 1241 configured to carry the flexible display 2, and the second support plate 125 includes a support surface 1251 configured to carry the flexible display 2. The bending portion 22 of the flexible display 2 includes a first part close to the first non-bending portion 21, a second part close to the second non-bending portion 23, and a third part located between the first part and the second part. The first part may be fixedly connected to a part of a region of the support surface 1241 of the first support plate 124, for example, may be bonded and fastened by using a bonding layer. The second part may be fixedly connected to a pad of a region of the support surface 1251 of the second support plate 125, for example, may be bonded and fastened by using a bonding layer. The third part corresponds to the other part of the region of the support surface 1241 of the first support plate 124 and the other part of the region of the support surface 1251 of the second support plate 125. The third part may move relative to the two parts.

An adhesive layer located between the first non-bending portion 21 and the support surface 111 of the first housing 11, an adhesive layer located between the bending portion 22 and the support surface 1241 of the first support plate 124, an adhesive layer located between the bending portion 22 and the support surface 1251 of the second support plate 125, and an adhesive layer located between the second non-bending portion 23 and the support surface 131 of the second housing 13 may be continuous entire adhesive layers, or may be dot-break adhesive layers, or may be adhesive layers having hollowed-out regions. A specific solution of the adhesive layer is not strictly limited in this embodiment of this application.

In some embodiments, as shown in FIG. 3, when the first housing 11 and the second housing 13 are unfolded relative to each other to an open state, the folding mechanism 12 is in the open state, and the support surface 1241 of the first support plate 124 is flush with the support surface 1251 of the second support plate 125. In other words, when the folding mechanism 12 is in the open state, the support surface 1241 of the first support plate 124 and the support surface 1251 of the second support plate 125 are configured to enable the flexible display 2 to be in an unfolded state. In this case, the first support plate 124 and the second support plate 125 can provide smooth and powerful support for the flexible display 2, so as to improve user experience such as a touch operation and image viewing.

When the flexible display is 2 mounted on the support surface 1241 of the first support plate 124 and the support surface 1251 of the second support plate 125, a flat form can be presented, that is, it is considered that the support surface 1241 of the first support plate 124 is flush with the support surface 1251 of the second support plate 125. For example, the case in which the support surface 1241 of the first support plate 124 is flush with the support surface 1251 of the second support plate 125 may include but is not limited to the following scenarios: The support surface 1241 of the first support plate 124 is flush with the support surface 1251 of the second support plate 125; or a bonding layer is disposed on the support surface 1241 of the first support plate 124, and a bonding layer is disposed on the support surface 1251 of the second support plate 125, so that heights of the two support surfaces (1241 and 1251) with the bonding layers are equal; or a stiffening plate is disposed on the flexible display 2, so that heights of the two support surfaces (1241 and 1251) on which the stiffening plate is stacked are equal.

For example, when the first housing 11 and the second housing 13 are unfolded relative to each other to the open state, the support surface 1241 of the first support plate 124 is flush with the support surface 111 of the first housing 11, and the support surface 1251 of the second support plate 125 is flush with the support surface 131 of the second housing 13. In this case, the plurality of support surfaces that are of the housing apparatus 1 and that are used to provide support for the flexible display 2 are flush with each other, so that the flexible display 2 is unfolded and has a flat support environment. This can improve user experience such as a touch operation and image viewing.

For example, both the support surface 1241 of the first support plate 124 and the support surface 111 of the first housing 11 are planes, and are coplanar, to better support the flexible display 2. In this case, the adhesive layer between the flexible display 2 and the support surface 1241 of the first support plate 124 may be as thick as the adhesive layer between the flexible display 2 and the support surface 111 of the first housing 11.

It can be understood that when the support surface 1241 of the first support plate 124 and the support surface 111 of the first housing 11 are parallel to each other but are slightly misaligned, after the flexible display 2 is fastened to the support surface 124 of the first support plate 124 and the support surface 111 of the first housing 11 by a slight difference between a thickness of the adhesive layer between the flexible display 2 and the support surface 1241 of the first support plate 124 and a thickness of the adhesive layer between the flexible display 2 and the support surface 111 of the first housing 11, the corresponding region of the flexible display 2 is still a planar region. In this case, it is also considered that the support surface 1241 of the first support plate 124 is flush with the support surface 111 of the first housing 11.

In some other embodiments, there may be no fixed connection relationship between the bending portion 22 of the flexible display 2 and the support surface 1241 of the first support plate 124, that is, there is no connection adhesive layer between bending portion 22 of the flexible display 2 and the support surface 1241 of the first support plate 124, and the two may be in direct contact. In this case, the support surface 1241 of the fast support plate 124 and the support surface 111 of the first housing 11 are parallel to each other, the support surface 1241 of the first support plate 124 slightly protrudes relative to the support surface 111 of the first housing 11, and the support surface 1241 of the first support plate 124 is flush with the support surface 111 of the first housing 11 after the adhesive layer is disposed, so that the flexible display 2 can still obtain planar support. In this case, it is also considered that the support surface 1241 of the first support plate 124 is flush with the support surface 111 of the first housing 11.

In some other embodiments, the support surface 111 of the first housing 11 may include a planar part close to the first support plate 124 and an arc surface part away from the first support plate 124, and the support surface 1241 of the first support plate 124 is a plane. The support surface 1241 of the first support plate 124 and the planar part of the support surface 111 of the first housing 11 are coplanar, or are parallel to each other but slightly misaligned. In this case, it is also considered that the support surface 1241 of the first support plate 124 is flush with the support surface 111 of the first housing 11. In this embodiment, the housing apparatus 1 may support the flexible display 2 to present a 313 display effect.

Related designs of the support surface 1251 of the second support plate 125, the support surface 131 of the second housing 13, a connection relationship between the two and the flexible display 2, and the like may be the same as technical solutions of the support surface 1241 of the first support plate 124, the support surface 111 of the first housing 11, a connection relationship between the two and the flexible display 2, and the like. Details are not described in this application.

Figure 6:
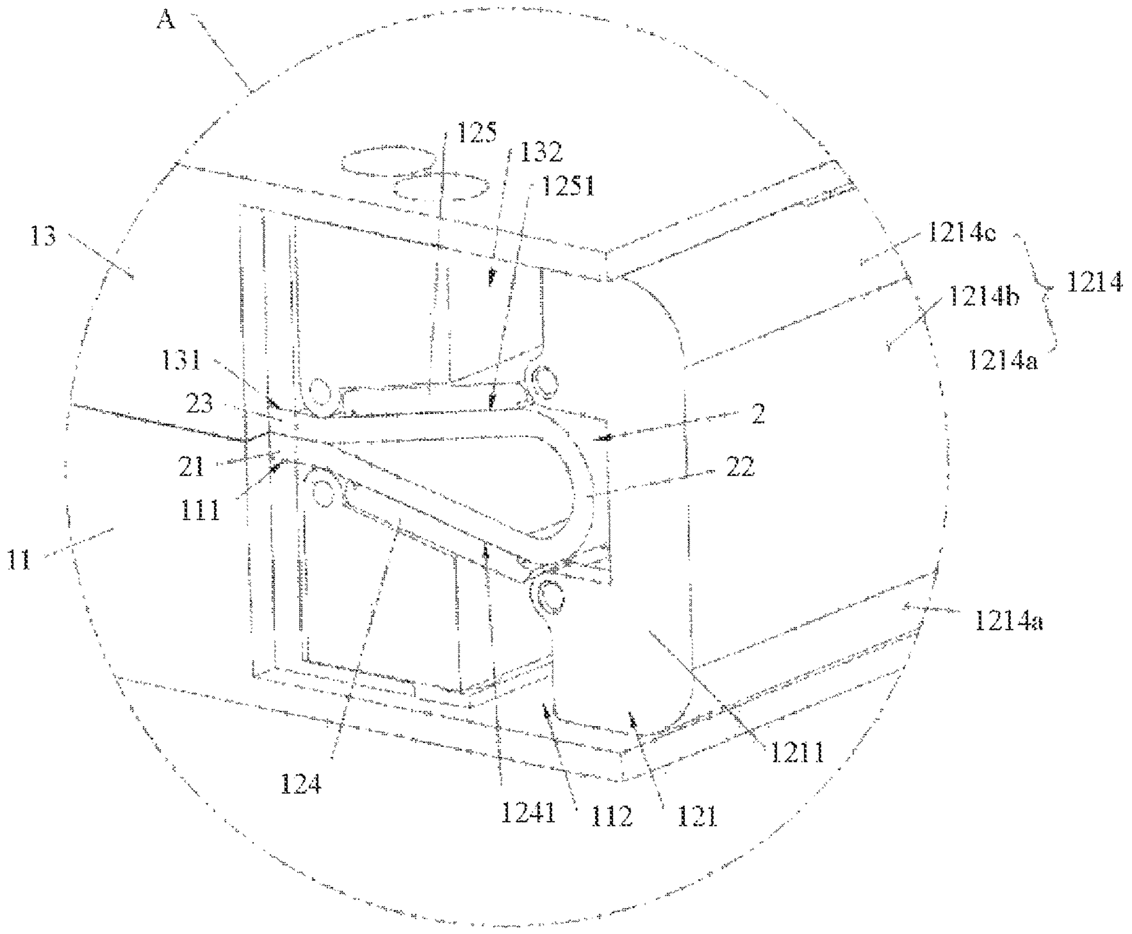
FIG. 6 is an enlarged schematic diagram of a structure at A of the electronic device shown in FIG. 2.

In some embodiments, FIG. 6 is an enlarged schematic diagram of a structure at A of the electronic device 100 shown in FIG. 2. When the first housing 11 and the second housing 13 are folded relative to each other to a closed state, the support surface 1241 of the first support plate 124 and the support surface 1251 of the second support plate 125 are disposed opposite to each other, and are away from each other in a direction close to the middle housing 121. The support surface 1241 of the first support plate 124 and the support surface 1251 of the second support plate 125 are disposed opposite to each other, that is, the support surface 1241 of the first support plate 124 and the support surface 1251 of the second support plate 125 are in a face-to-face position relationship. The support surface 1241 of the first support plate 124 is disposed in an inclined manner relative to the support surface 1251 of the second support plate 125, and an included angle is formed between the support surface 1241 of the first support plate 124 and the support surface 1251 of the second support plate 125.

In this embodiment, the first support plate 124 and the second support plate 125 form display accommodating space for accommodating a flexible display 2 through automatic avoidance, so that a folding action performed by the housing apparatus 1 on the flexible display 2 is stable, and a squeezing force is small. This helps reduce a risk that the flexible display 2 is damaged due to excessive squeezing of the folding mechanism 12, and makes the flexible display 2 more reliable.

For example, when the first housing 11 and the second housing 13 are folded relative to each other to a closed state, the support surface 1241 of the first support plate 124 is inclined relative to the support surface 111 of the first housing 11, the support surface 1251 of the second support plate 125 is inclined relative to the support surface 131 of the second housing 13, and the support surface 111 of the first housing 11 is parallel to the support surface 131 of the second housing 13. In this case, the first non-bending portion 21 and the second non-bending portion 23 of the flexible display 2 can approach each other to a closed state, and the bending portion 22 is bent into a water drop shape.

Figure 7:
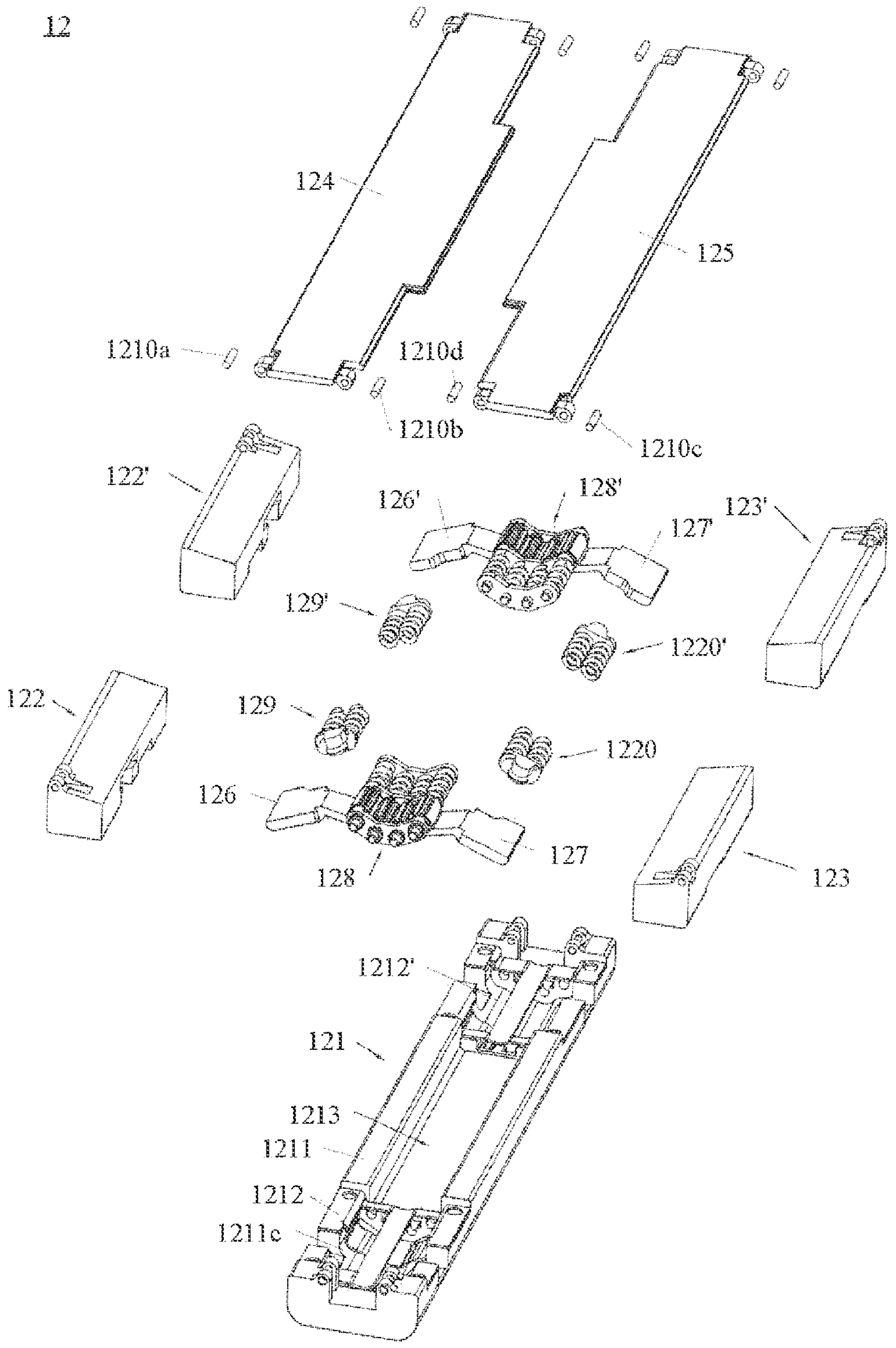
FIG. 7 is a schematic exploded view of a partial structure of a folding mechanism shown in FIG. 3.
Figure 8:
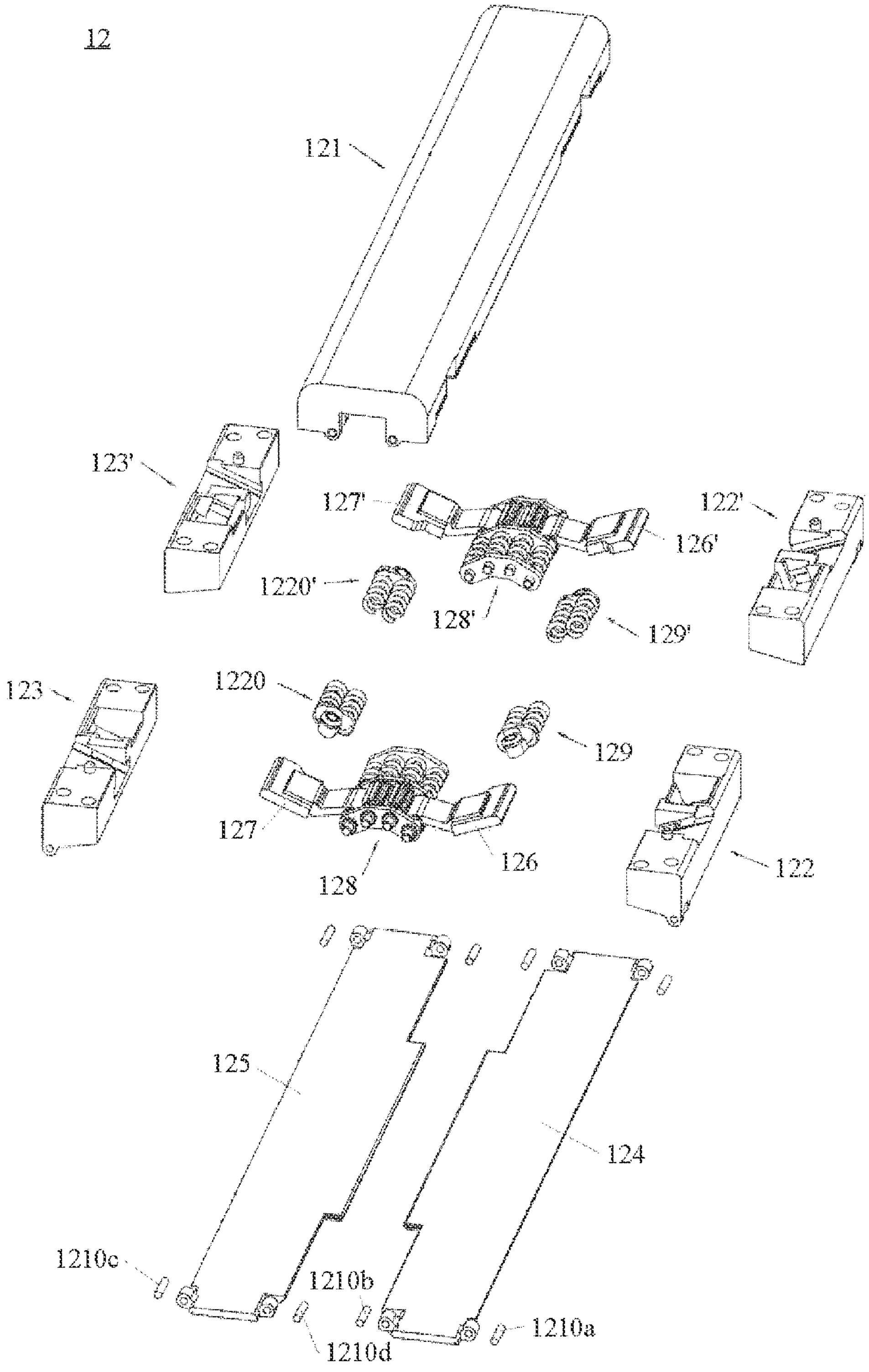
FIG. 8 is a schematic diagram of a structure of the folding mechanism shown in FIG. 7 from another angle.

In some embodiments, FIG. 7 is a schematic exploded view of a partial structure of the folding mechanism 12 shown in FIG. 3. FIG. 8 is a schematic diagram of a structure of the folding mechanism 12 shown in FIG. 7 from another angle. An angle of view of the folding mechanism 12 shown in FIG. 8 is horizontally reversed relative to an angle of view of the folding mechanism 12 shown in FIG. 7.

The folding mechanism 12 includes a middle housing 121, a first fixing bracket 122, a second fixing bracket 123, a first support plate 124, a second support plate 125, a first swing arm 126, a second swing arm 127, a synchronization assembly 128, a first stopper 129, and a second stopper 1220.

The first fixing bracket 122, the second fixing bracket 123, the first swing arm 126, the second swing arm 127, the synchronization assembly 128, the first stopper 129, and the second stopper 1220 may jointly form a first rotation assembly. For example, the first rotation assembly may be used as a bottom rotation assembly of the folding mechanism 12. The fielding mechanism 12 may further include a second rotation assembly, and the second rotation assembly may be used as a top rotation assembly of the folding mechanism 12. Roth the first rotation assembly and the second rotation assembly are connected to the middle housing 121, the first support plate 124, and the second support plate 125.

The second rotation assembly and the first rotation assembly may have a same or similar structure, a symmetric or partially symmetric structure, or different structures. In some embodiments, the second rotation assembly and the first rotation assembly are mirror symmetric structures. For a basic design of a component structure of the second rotation assembly, a design of a connection relationship between components, and a design of a connection relationship between components and other structures except the components, refer to a related solution of the first rotation assembly. In addition, the second rotation assembly and the first rotation assembly are allowed to be slightly different in terms of a detailed structure or position arrangement of the components.

For example, the second rotation assembly may include a first fixing bracket 122', a second fixing bracket 123', a first swing arm 126', a second swing arm 127', a synchronization assembly 128', a first stopper 129', and a second stopper 1220'. For structures of components of the second rotation assembly, an interconnection relationship between components, and a connection relationship between each component and the middle housing 121, the first support plate 124, and the second support plate 125, refer to related descriptions of the first rotation assembly, and details are not described in this embodiment of this application.

The first fixing bracket 122 of the first rotation assembly and the first fixing bracket 122' of the second rotation assembly may be mechanical parts independent of each other, or may be two parts of an integrated mechanical part. The second fixing bracket 123 of the first rotation assembly and the second fixing bracket 123' of the second rotation assembly may be mechanical parts independent of each other, or may be two parts of an integrated mechanical part. In some other embodiments, the folding mechanism 12 may alternatively include a first rotation assembly and another rotation assembly. A structure of the another rotation assembly may be the same as or different from a structure of the first rotation assembly. This is not strictly limited in this application.

In some embodiments, the synchronization assembly 128 may be mounted in the middle housing 121. One and of the first swing arm 126 may be connected to the first fixing bracket 122, and the other end of the first swing arm 126 may be connected to the middle housing 121 and connected to the synchronization assembly 128. One end of the second swing arm 127 may be connected to the second fixing bracket 123, and the other end of the second swing arm 127 may be connected to the middle housing 121 and connected to the synchronization assembly 128. The synchronization assembly 128 is configured to enable the first swing arm 126 and the second swing arm 127 to rotate synchronously in a movement process of the housing apparatus 1, so as to improve mechanism operation experience of the housing apparatus 1 and the electronic device 10).

The first stopper 129 tray be mounted on the first fixing bracket 122, and the second stopper 1220 may be mounted on the second fixing bracket 123. The first stopper 129 and the second stopper 1220 are configured to limit the first swing arm 126 and the second swing arm 127 respectively when the housing apparatus 1 is in the open state, so that the housing apparatus 1 remains in the open state when no relatively large external tierce is applied, thereby improving user experience. In addition, in some embodiments, fitting between the first stopper 129 and the first swing arm 126 and fitting between the second stopper 1220 and the second swing arm 127 can further provide resistance in a process in which the electronic device 100 is unfolded to enter the open state and in a process in which the electronic device 100 is folded to end the opal state, so that the user can experience a better sense of operation of the mechanism.

In some other embodiments, there may be one stopper of the folding mechanism 12, and the stopper may be mounted on the first fixing bracket 122 and configured to limit the first swing arm 126, or may be mounted on the second fixing bracket 123 and configured to limit the second swing arm 127. In some other embodiments, the rotation assembly may not include a stopper. In some other embodiments, the synchronization assembly 128 may alternatively be in a non-direct connection relationship with the first swing arm 126 and the second swing arm 127. Two olds of the synchronization assembly 128 are respectively connected to the first fixing bracket 122 and the second fixing bracket 123, and are configured to keep the first fixing bracket 122 and the second fixing bracket 123 rotating synchronously in a movement process of the housing apparatus 1. A component composition of the rotation assembly and a specific component composition are not strictly limited in this embodiment of this application.

In some embodiments, as shown in FIG. 7 and FIG. 8, the folding mechanism 12 may further include a hinge assembly. The hinge assembly includes a plurality of hinges, and the first support plate 124 and the second support plate 125 are rotatably connected to the first fixing bracket 122, the second fixing bracket 123, and the middle housing 121 through the plurality of hinges. For example, the plurality of hinges include a first hinge 1210*a*, a second hinge 1210*b*, a third hinge 1210*c*, and a fourth hinge 1210*d*. The first support plate 124 may be rotatably connected to the first fixing bracket 122 through the first hinge 1210*a*, and rotatably connected to the middle housing 121 through the second hinge 1210*b* The second support plate 125 may be rotatably connected to the second fixing bracket 123 through the third hinge 1210*c*, and rotatably connected to the middle housing 121 through the fourth hinge 1210*d*.

It may be understood that the hinge assembly may be located at the bottom of the folding mechanism 12. In some embodiments, the folding mechanism 12 may further include another hinge assembly located at the top, and a plurality of hinges of the hinge assembly may enable the first support plate 124 and the second support plate 125 to be rotatably connected to the first fixing bracket 122', the second fixing bracket 123', and the middle housing 121'.

Figure 9:
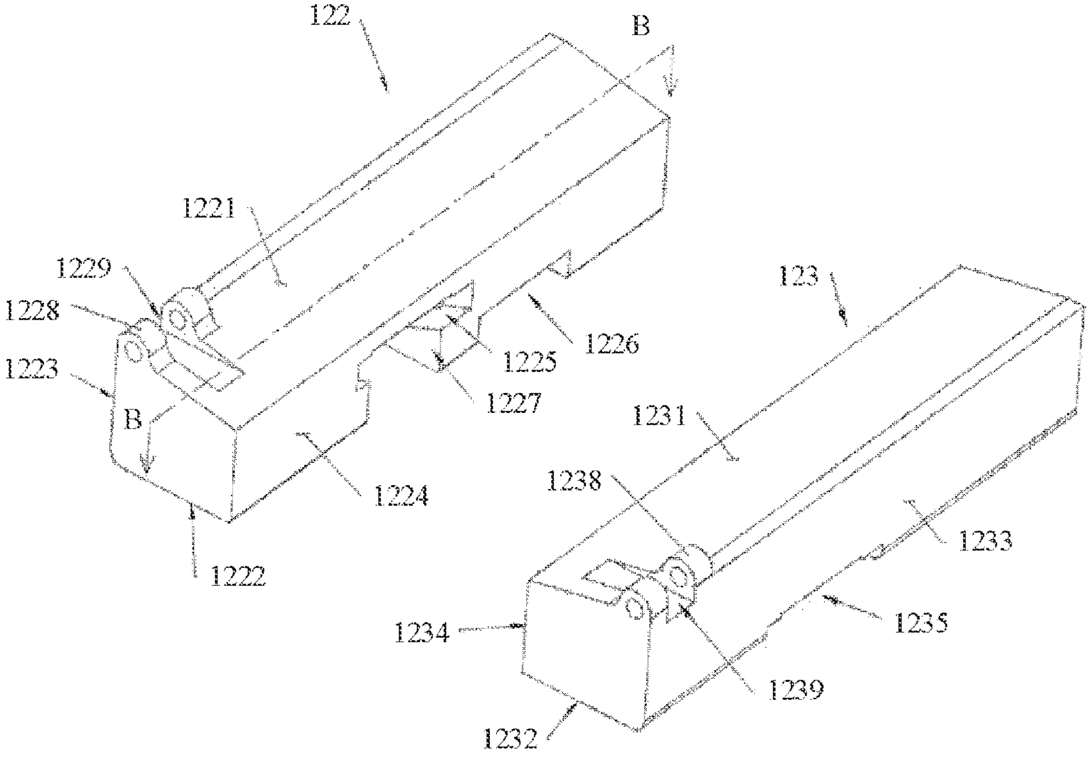
FIG. 9 is a schematic diagram of structures of a first fixing bracket and a second fixing bracket shown in FIG. 7.
Figure 10:
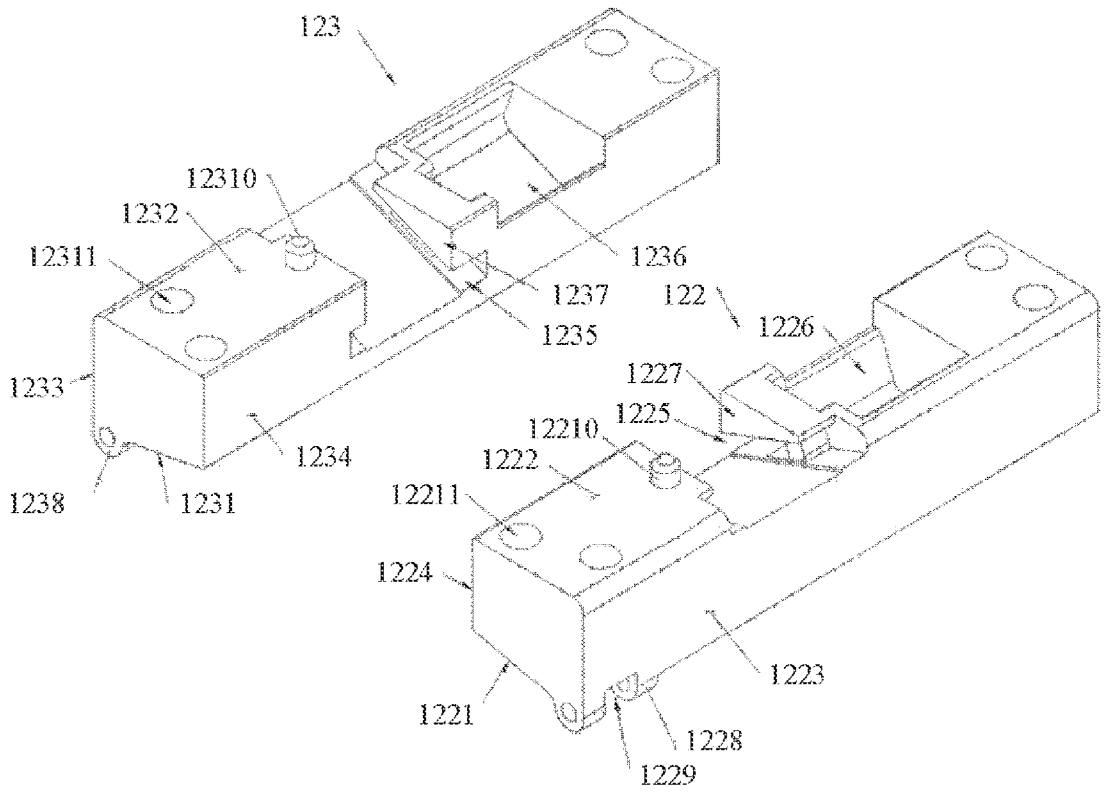
FIG. 10 is a schematic diagram of structures of the first fixing bracket and the second fixing bracket shown in FIG. 9 from another angle.

In some embodiments, FIG. 9 is a schematic diagram of structures of the first fixing bracket 122 and the second fixing bracket 123 shown in FIG. 7. FIG. 10 is a schematic diagram of structures of the first fixing bracket 122 and the second fixing bracket 123 shown in FIG. 9 from another angle. A field of view shown in FIG. 10 is reversed horizontally relative to a field of view shown in FIG. 9.

The first fixing bracket 122 includes a top surface 1221, a bottom surface 1222, a first side surface 1223, and a second side surface 1224. The top surface 1221 and the bottom surface 1222 are disposed back to each other, the first side surface 1223 and the second side surface 1224 are disposed back to each other, and the first side surface 1223 and the second side surface 1224 are located between the top surface 1221 and the bottom surface 1222. The top surface 1221 of the first fixing bracket 122 is disposed in an inclined manner relative to the bottom surface 1222 of the first fixing bracket 122, and an included angle is formed between the top surface 1221 of the first fixing bracket 122 and the bottom surface 1222 of the first fixing bracket 122. The top surface 1221 of the fast fixing bracket 122 and the bottom surface 1222 of the first fixing bracket 122 are close to each other in a direction close to the second side surface 1224 of the first fixing bracket 122.

The first fixing bracket 122 is provided with a first sliding slot 1225 and a first mounting groove 1226. For example, the first sliding slot 1225 may be disposed in an inclined manner relative to the bottom surface 1222 of the first fixing bracket 122, that is, an included angle is formed between an extension direction of the first sliding slot 1225 and the bottom surface 1222. The first sliding slot 1225 may alternatively be disposed in an inclined manner relative to the top surface 1221 of the first fixing bracket 122, that is, an included angle is formed between an extension direction of the first sliding slot 1225 and the top surface 3221. In a direction close to the second side surface 1224 of the first fixing bracket 122, the extension direction of the first sliding slot 1225 is away from the bottom surface 1222 of the first fixing bracket 122. The first sliding slot 1225 may form an opening on the second side surface 1224.

For example, the first fixing bracket 122 may be further provided with a first guide groove 1227, and the first guide groove 1227 communicates with the first sliding slot 1225. The first guide groove 1227 may form an opening on the bottom surface 1222 of the first fixing bracket 122. The first mounting groove 1226 forms an opening on the bottom surface 1222 of the first fixing bracket 122.

The first fixing bracket 122 may include a first correction bump 1228. The first connection bump 1228 protrudes relative to the top surface 1221 of the first fixing bracket 122, and the first connection bump 1228 is provided with a hinge hole. The first fixing bracket 122 may further include a first sinking groove 1229, and the first sinking groove 1229 is recessed in a direction from the top surface 1221 of the first fixing bracket 122 to the bottom surface 1222. The first sinking groove 1229 may penetrate through the first connection bump 1228 for dividing the first connection bump 1228 into two parts.

In some embodiments, as shown in FIG. 9 and FIG. 10, the second fixing bracket 123 includes a top surface 1231, a bottom surface 1232, a first side surface 1233, and a second side surface 1234. The top surface 1231 and the bottom surface 1232 are disposed back to each other, the first side surface 1233 and the second side surface 1234 are disposed back to each other, and the first side surface 1233 and the second side surface 1234 are located between the top surface 1231 and the bottom surface 1232. The top surface 1231 of the second fixing bracket 123 is disposed in an inclined manner relative to the bottom surface 1232 of the second fixing bracket 123, and an included angle is formed between the top surface 1231 of the second fixing bracket 123 and the bottom surface 1232 of the second fixing bracket 123. The top surface 1231 of the second fixing bracket 123 and the bottom surface 1232 of the second fixing bracket 123 are close to each other in a direction close to the second side surface 1234 of the second fixing bracket 123.

The second fixing bracket 123 is provided with a second sliding slot 1235 and a second mounting groove 1236. For example, the second sliding slot 1235 may be disposed in an inclined manner relative to the bottom surface 1232 of the second fixing bracket 123, that is, an included angle is formed between an extension direction of the second sliding slot 1235 and the bottom surface 1232. The second sliding slot 1235 may alternatively be disposed in an inclined manner relative to the top surface 1231 of the second fixing bracket 123, that is, an included angle is formed between an extension direction of the second sliding slot 1235 and the top surface 1231. In a direction close to the second side surface 1234 of the second fixing bracket 123, the extension direction of the second sliding slot 1235 is away from the bottom surface 1232 of the second fixing bracket 123. The second sliding slot 1235 may form an opening on the second side surface 1231.

For example, the second fixing bracket 123 may be further provided with a second guide groove 1237, and the second guide groove 1237 communicates with the second sliding slot 1235. The second guide groove 1237 may form an opening on the bottom surface 1232 of the second fixing bracket 123. The second mounting groove 1236 forms an opening on the bottom surface 1232 of the second fixing bracket 123.

The second fixing bracket 123 may include a second connection bump 1238, the second connection bump 1238 protrudes relative to the top surface 1231 of the second fixing bracket 123, and the second connection bump 1238 is provided with a hinge hole. The second fixing bracket 123 may further include a second sinking groove 1239, and the second sinking groove 1239 is recessed in a direction from the top surface 1231 of the second fixing bracket 123 to the bottom surface 1232. The second sinking groove 1239 may penetrate through the second connection bump 1238 for dividing the second connection bump 1238 into two parts.

Figure 11:
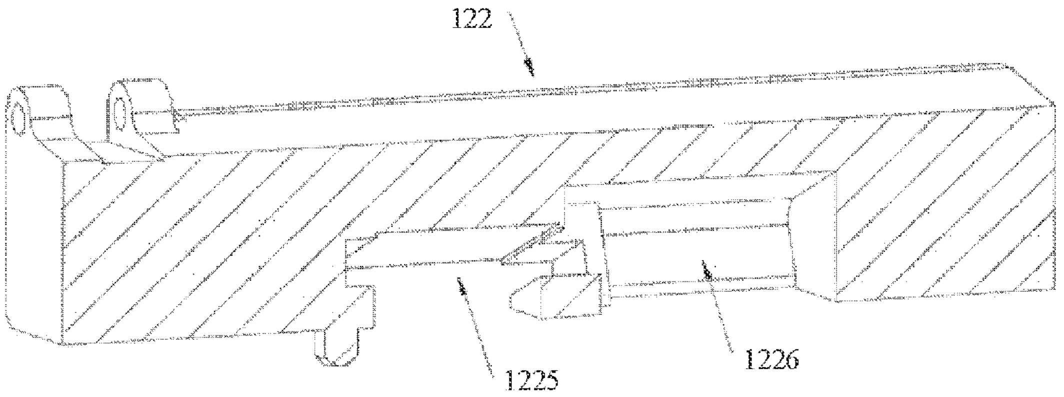
FIG. 11 is a schematic diagram of a structure of the first fixing bracket shown in FIG. 9 when cut along B-B.

FIG. 11 is a schematic diagram of a structure of the first fixing bracket 122 shown in FIG. 9 when cut along B-B. The first mounting groove 1226 of the first fixing bracket 122 communicates with the first sliding slot 1225. A component mounted in the first mounting groove 1226 may partially extend into the first sliding slot 1225. Similarly, refer to FIG. 10. The second mounting groove 1236 of the second fixing bracket 123 communicates with the second sliding slot 1235, and a component mounted in the second mounting groove 1236 may partially extend into the second sliding slot 1235.

In some embodiments, as shown in FIG. 10, the first fixing bracket 122 may further include a first positioning post 12210 and a first fastening hole 12211. The first positioning post 12210 protrudes relative to the bottom surface 1222 of the first fixing bracket 122, and an opening of the first fastening hole 12211 is located at the bottom surface 1222 of the first fixing bracket 122. There may be one or more first positioning posts 12210, and there may be one or more first fastening holes 12211. The second fixing bracket 123 may further include a second positioning post 12310 and a second fastening hole 12311. The second positioning post 12310 protrudes relative to the bottom surface 1232 of the second fixing bracket 123, and an opening of the second fastening hole 12311 is located at the bottom surface 1232 of the second fixing bracket 123. There may be one or more second positioning posts 12310, and there may be one or more second fastening holes 12311.

As shown in FIG. 5, the fast housing 11 is provided with a positioning hole 113 and a fastening hole 114. When the fast fixing bracket 122 is connected to the first housing 11, the first positioning post 12210 may extend into the positioning hole 113 of the first housing 11, and the first fastening hole 12211 may be disposed opposite to the fastening hole 114 of the first housing 11 to lock by using a fastener (not shown in the figure). The second housing 13 is provided with a positioning hole 133 and a fastening hole 134. When the second fixing bracket 123 is connected to the second housing 13, the second positioning post 12310 may extend into the positioning hole 133 of the second housing 13, and the second fastening hole 12311 may be disposed opposite to the fastening hole 134 of the second housing 13 to lock by using a fastener (not shown in the figure).

In some embodiments, as shown in FIG. 4, when the first fixing bracket 122 cooperates with another structure of the folding mechanism 12, the top surface 1221 of the first fixing bracket 122 faces the first support plate 124, the second side surface 1224 of the first fixing bracket 122 faces the middle housing 121, the top surface 1231 of the second fixing bracket 123 faces the second support plate 125, and the second side surface 1234 of the second fixing bracket 123 faces the middle housing 121. The first housing 11 is provided with a bump 115, and the bump 115 is located in the first fastening groove 112. The second housing 13 is provided with a bump 135, and the bump 135 is located in the second fastening groove 132.

Figure 12:
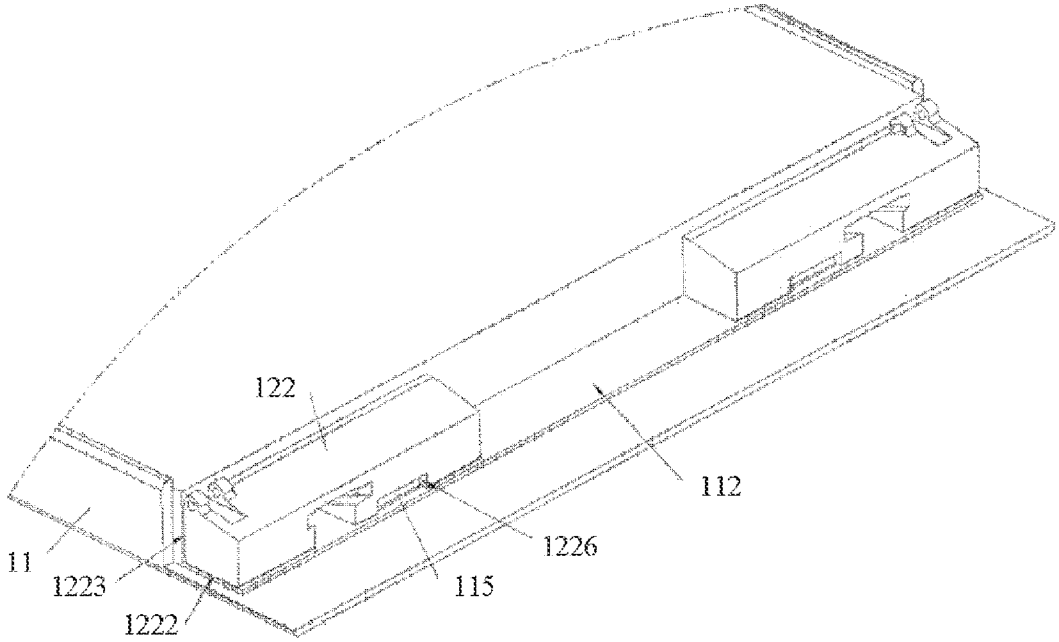
FIG. 12 is a schematic diagram of a structure of a connection between a first housing and a first fixing bracket shown in FIG. 3.

In some embodiments, FIG. 12 is a schematic diagram of a structure of a connection between the first housing 11 and the first fixing bracket 122 shown in FIG. 3.

When the first fixing bracket 122 is fastened to the first housing 11, the first side surface 1223 of the first fixing bracket 122 faces a side wall of the first fastening groove 112, the bottom surface 1222 of the first fixing bracket 122 faces a bottom wall of the first fastening groove 112, and the bump 115 is clamped into the first mounting groove 1226 of the first fixing bracket 122. In this case, the first fixing bracket 122 and the first housing 11 can be positioned with each other through fitting between the first positioning post 12210 and the positioning hole 113 of the first housing 11 (as shown in FIG. 4), and can alternatively be positioned with each other through fitting between the bump 115 of the first housing 11 and the first mounting groove 1226. Therefore, stability of a connection structure between the first fixing bracket 122 and the first housing 11 is high.

In addition, the bump 115 of the first housing 11 and the groove wall of the first mounting groove 1226 may jointly enclose an accommodating space with an appropriate size, to accommodate another component. In addition, a position of the accommodating space can be flexibly adjusted by controlling a height of the bump 115 and a depth of the first mounting groove 1226, so as to better meet an assembly requirement between a plurality of components.

It may be understood that, when the second fixing bracket 123 is fastened to the second housing 13, the first side surface 1233 of the second fixing bracket 123 faces a side wall of the second fastening groove 132, the bottom surface 1232 of the second fixing bracket 123 faces a bottom wall of the second fastening groove 132, and the bump 115 may be clamped into the second mounting groove 1236 of the second fixing bracket 123.

Figure 13:
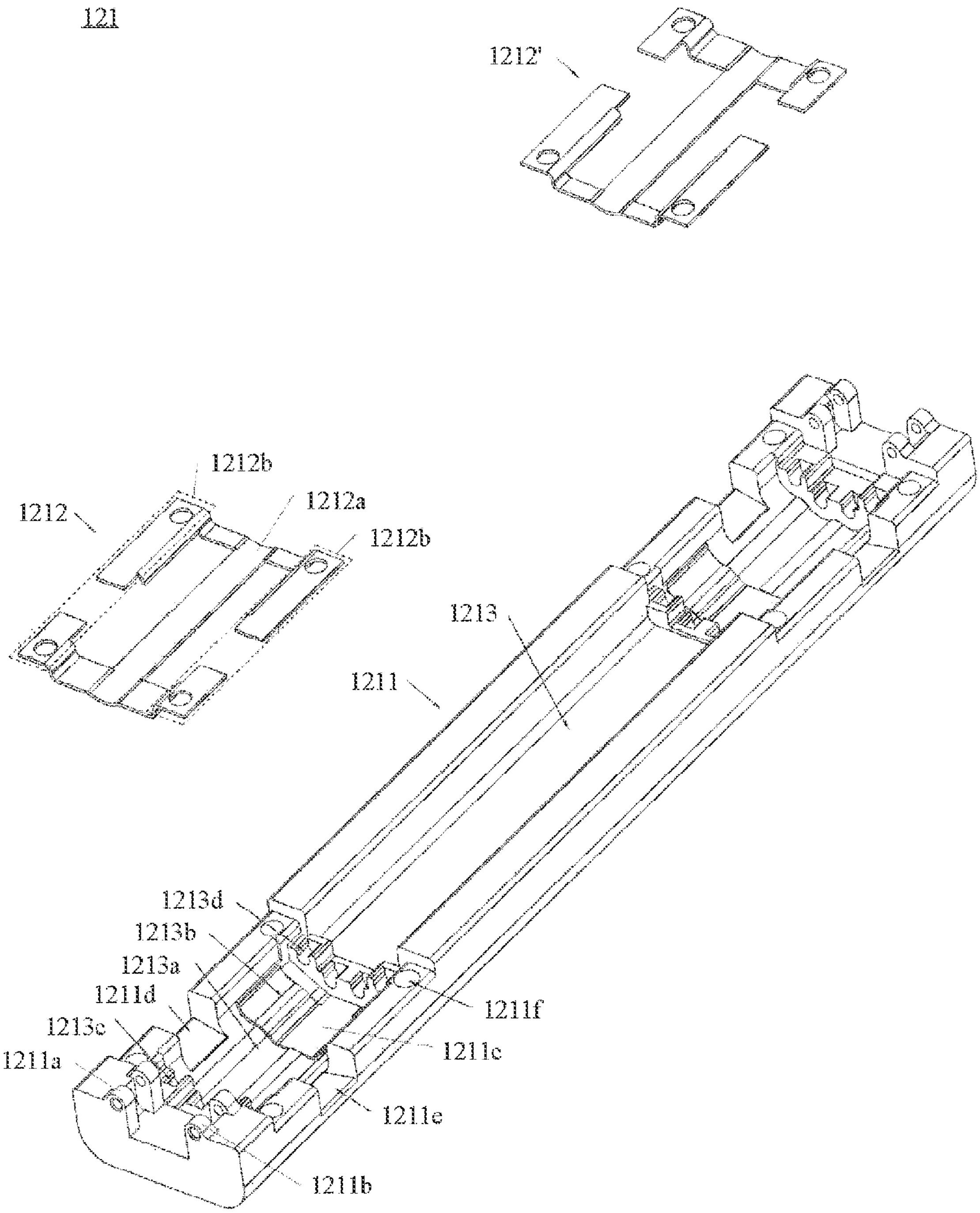
FIG. 13 is a schematic exploded view of a structure of a middle housing shown in FIG. 7.

In some embodiments, FIG. 13 is a schematic exploded view of a structure of the middle housing 121 shown in FIG. 7. The middle housing 121 includes an outer cover 1211 and a fastener 1212. For example, the outer cover 1211 is bent to form an inner space 1213 of the middle housing 121, and the inner space 1213 is located inside the outer cover 1211. The outer cover 1211 includes a first convex part 1211*a*, a second convex part 1211*b*, and a mounting part 1211*c*. The first convex part 1211*a* and the second convex part 1211*b* are disposed close to the inner space 1213, and are spaced from each other. The mounting part 1211*c* forms a first mounting space 1213*a*, a second mounting space 1213*b*, a plurality of first hinge grooves 1213*c*, and a plurality of second hinge grooves 1213*d*. The plurality of first hinge grooves 1213*c*, the first mounting space 1213*a*, the second mounting space 1213*b*, and the plurality of second hinge grooves 1213*d* are arranged in an axial direction of the middle housing 121, and communicate with each other. The axial direction of the middle housing 121 is parallel to a rotation center of the housing apparatus 1, and the first housing 11 and the second housing 13 rotate relative to the rotation center of the housing apparatus 1. The first hinge groove 1213*c*, the first mounting space 1213*a*, the second mounting space 1213*b*, and the second hinge groove 1213*d* are all a part of the inner space 1213.

A first avoidance notch 1211*d* and a second avoidance notch 1211*e* are further disposed on the outer cover 1211, and the first avoidance notch 1211*d* and the second avoidance notch 1211*e* are respectively located on two sides of the first mounting space 1213*a*, and communicate with the first mounting space 1213*a*. A plurality of fastening holes 1211*f* may be further disposed on a side end of the outer cover 1211, the plurality of fastening holes 1211*f* are disposed close to the mounting part 1211*c*, and at lot one fastening hole 1211*f* is disposed on each side of the mounting part 1211*c*.

The first convex part 1211*a*, the second convex part 1211*b*, and the mounting part 1211*c* forma group of mounting structure of the outer cover 1211, and the group of mounting structures may be located at the bottom of the outer cover 1211. In some embodiments, the outer cover 1211 may further include another group of mounting structures, and the another group of mounting structures may be located on the top of the outer cover 1211. The two groups of mounting structures of the outer cover 1211 may be of a mirror symmetric structure. The outer cover 1211 may be an integrally formed mechanical part, or may be assembled to form an integral structure.

For example, the fastener 1212 includes a pressing part 1212*a* and two fastening parts 1212*b*, and the two fastening parts 1212*b* are respectively connected to two sides of the pressing part 1212*a* In same embodiments, the pressing part 1212*a* may be of an "t"-shaped structure. One fastening part 1212*b* may be divided into two parts, which are respectively connected to two ends of one side of the pressing part 1212*a*. The other fastening part 1212*b* may also be divided into two parts, which are respectively connected to two ends of the other side of the pressing part 1212*a*. The fastener 1212 may be an integrally formed mechanical part, or may be assembled to form an integral structure.

In some embodiments, refer to FIG. 7 and FIG. 13 together. The fastener 1212 may be fastened corresponding to a mounting structure at the bottom of the outer cover 1211. For example, the fastener 1212 is fixedly connected to the outer cover 1211 and partially accommodated in the inner space 1213 of the middle housing 121. The fastener 1212 is fastened corresponding to the mounting part 1211*c* of the outer cover 1211. The two fastening parts 1212*b* of the fastener 1212 are respectively fastened to two side ends of the outer cover 1211. The pressing part 1212*a* is accommodated in the inner space 1213, and the pressing part 1212*a* sinks in a direction close to the mounting part 1211*c* relative to the two fastening part 1212*b*. The pressing part 1212*a* of the fastener 1212 can press a component mounted on the mounting part 1211*c*, so that the component is stably connected to the middle housing 121.

The middle housing 121 may further include another fastener 1212', and the fastener 1212' may be fastened corresponding to a mounting structure on the top of the outer cover 1211. The fastener 1212' and the fastener 1212 may be of a mirror symmetric structure. The fastener 1212' is fixedly connected to the outer cover 1211 and partially accommodated in the inner space 1213 of the middle housing 121. For a specific connection structure between the fastener 1212' and the outer cover 1211, refer to the connection structure between the fastener 1212 and the outer cover 1211, and details are not described herein again.

In some embodiments, refer to FIG. 3 and FIG. 4 together. The outer cover 1211 of the middle housing 121 has an appearance surface 1214, the appearance surface 1214 is disposed opposite to the first support plate 124 and the second support plate 125, and the appearance surface 1214 is also an outer side surface of the outer cover 1211. When the first housing 11 and the second housing 13 are in the open state, the middle housing 121 is partially located in the first fastening groove 112, and is partially located in the second Fastening groove 132. The first housing 11 and the second housing 13 cover the appearance surface 1214 of the middle housing 121.

In this embodiment, the first housing 11 and the second housing 13 can shield the middle housing 121 from a back side (namely a side back to the flexible display 2) of the housing apparatus 1 in the open state. In this case, the first housing 11 and the second housing 13 can also shield other components of the folding mechanism 12 from the back side of the housing apparatus 1, so that the housing apparatus 1 implements self-shielding on the back side, thereby protecting the folding mechanism 12. In addition, appearance of the housing apparatus 1 and the electronic device 100 are complete, so that appearance experience is good, and waterproof and dust-proof performance is good.

In some embodiments, as shown in FIG. 6, when the first housing 11 and the second housing 13 are in the closed state, the middle housing 121 partially extends out from the first fastening groove 112 and the second fastening groove 132, and the appearance surface 1214 of the middle housing 121 is exposed relative to the first housing 11 and the second housing 13. In this embodiment, the first housing 11, the second housing 13, and the outer cover 1211 jointly form appearance parts of the housing apparatus 1 and the electronic device 100. Therefore, the housing apparatus 1 and the electronic device 100 can implement back-side self-shielding in the closed state, which helps improve appearance integrity, and implements good waterproof and dust proof performance.

For example, the appearance surface 1214 of the outer cover 1211 includes a first arc surface part 1214*a*, a planar part 1214*b*, and a second arc surface part 1214*c*. The first arc surface part 1214*a* and the second arc surface part 1214*c* are respectively connected to two sides of the planar part 1214*b*. In this embodiment, the appearance surface 1214 forms a shape similar to an arc surface, which helps improve appearance experience and holding experience of the electronic device 100 when the electronic device 100 is in a closed state. In addition, the middle part of the appearance surface 1214 is the planar part 1214*h*, so that a thickness (a size in a direction perpendicular to the planar part 1214*b*) of the outer cover 1211 is small, an overall thickness of the housing apparatus 1 in an open state is small, and an overall width of the housing apparatus 1 in a closed state is small, which facilitates miniaturization and thinning of the electronic device 100. In some other embodiments, the appearance surface 1214 may alternatively be an arc surface or another smooth curved surface.

In some embodiments, the housing apparatus 1 may further include a top side end cover (not shown in the figure) and a bottom side end cover (not shown in the figure). The top side end cover is located on a top side of the folding mechanism 12, and the bottom side end cover is located on a bottom side of the folding mechanism 12. When the first housing 11 and the second housing 13 are in an open state, the top side end cover shields the middle housing 121 from a top side of the housing apparatus 1, and the bottom side end cover shields the middle housing 121 from a bottom side of the housing apparatus 1. When the first homing 11 and the second housing 13 are in a closed state, a part that is of the middle housing 121 and that does not extend out from the first fastening groove 112 and the second fastening groove 132 is shielded by the top side end cover from the top side of the housing apparatus 1, and is shielded by the bottom side end cover from the bottom side of the housing apparatus 1.

For example, when the first housing 11 and the second housing 13 are in an open state or a closed state, another component of the folding mechanism 12 may be shielded by the top side end cover from the top side of the housing apparatus 1, or may be shielded by the bottom side end cover from the bottom side of the housing apparatus 1, or may be shielded by the first housing 11 and the second housing 13 from the top side and the bottom side of the housing apparatus 1. Therefore, the housing apparatus 1 can perform all-round shielding on the folding mechanism 12 in the open state and the closed state, so that the housing apparatus 1 can better implement self-shielding.

The top side end cover and the bottom side end coven may be a part of the middle housing 121, or may be a component that is independent of the middle housing 121 and connected to the folding mechanism 12, or may be a component that is independent of the middle housing 121 and connects the fug housing 11 and the second housing 13. Specific structures and mounting manners of the top side end cover and the bottom side end cover are not strictly limited in this application.

Figure 14:
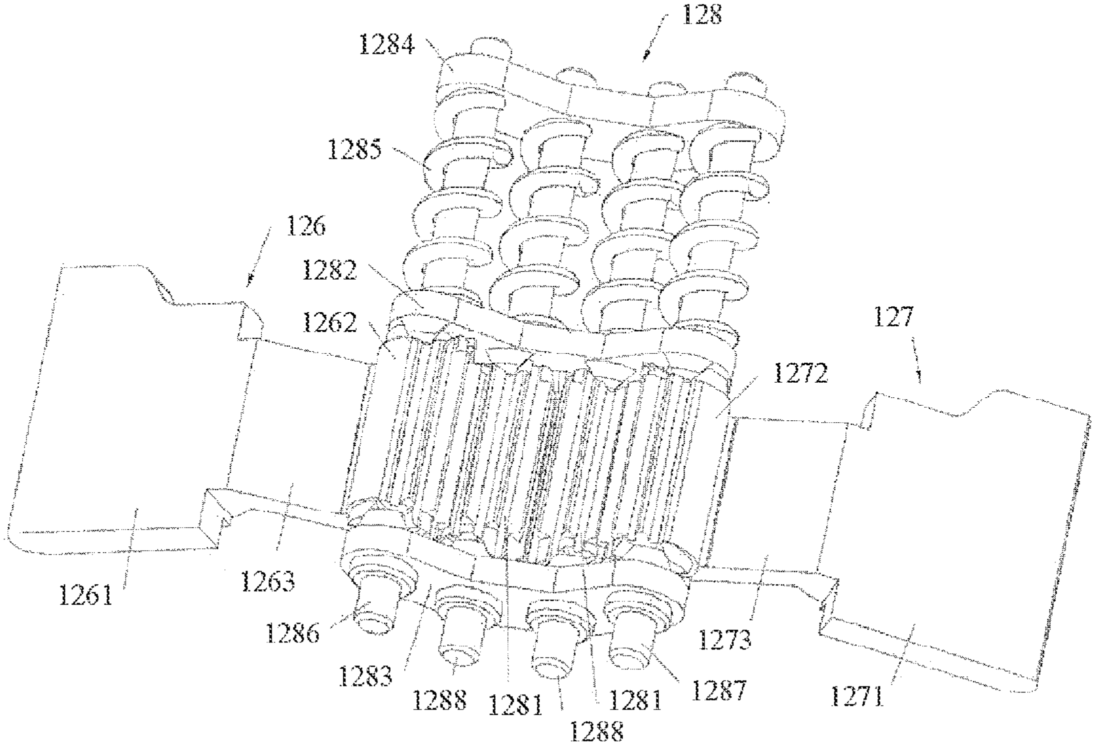
FIG. 14 is a schematic diagram of structures of a first swing arm, a second swing arm, and a synchronization assembly shown in FIG. 7.
Figure 15:
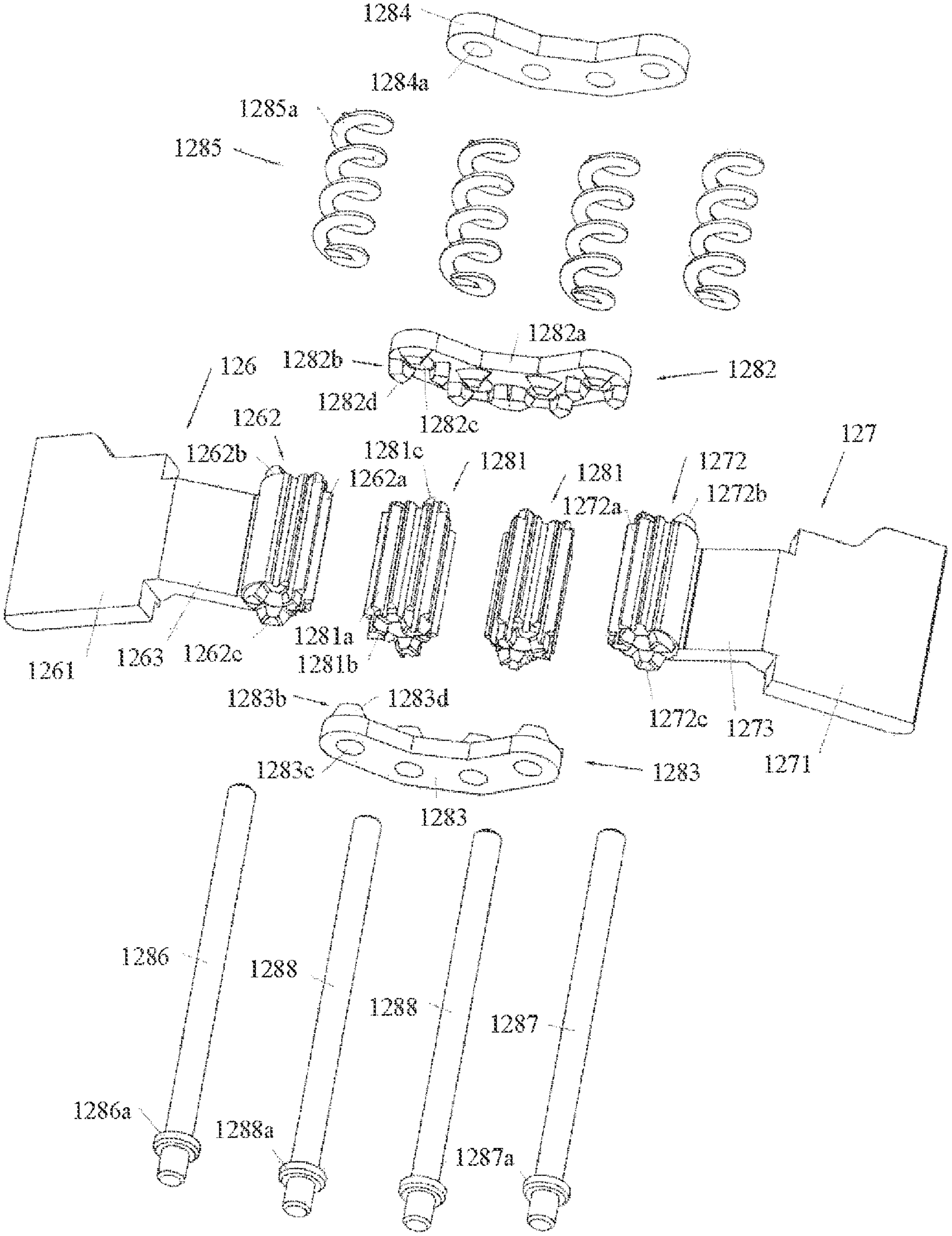
FIG. 15 is a schematic exploded view of the structure shown in FIG. 14.
Figure 16:
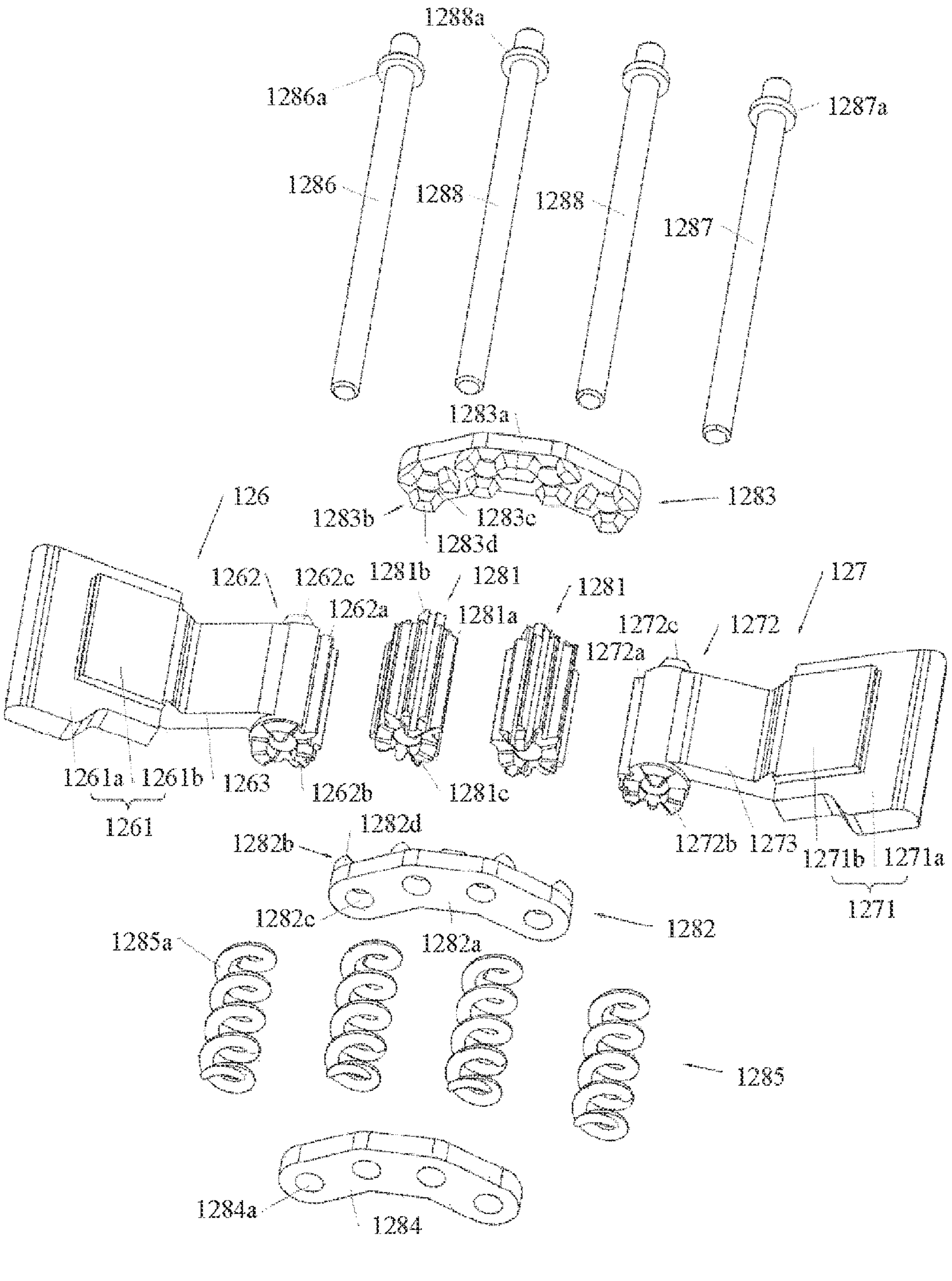
FIG. 16 is a schematic diagram of the structure shown in FIG. 15 from another angle.

In some embodiments, FIG. 14 is a schematic diagram of structures of the first swing arm 126, the second swing arm 127, and the synchronization assembly 128 shown in FIG. 7. FIG. 15 is a schematic exploded view of the structure shown in FIG. 14. FIG. 16 is a schematic diagram of the structure shown in FIG. 15 from another angle. A field of view shown in FIG. 16 is vertically reversed relative to a field of view shown in FIG. 15.

The first swing arm 126 includes a sliding end 1261 and a rotation end 1262. The sliding end 1261 of the first swing arm 126 may include a first sliding body 1261*a* and a first limiting protrusion 1261*b*. The first sliding body 1261*a* may be approximately in a shape of a flat plate, and the first limiting protrusion 1261*b* is fastened on a side surface of the first sliding body 1261*a*.

For example, the rotation end 1262 of the first swing arm 126 includes a gear part 1262*a*, a plurality of first protrusions 1262*b*, and a plurality of second protrusions 1262*c*. The gear part 1262*a* may be provided with a hinge hole. The plurality of first protrusions 1262*b* and the plurality of second protrusions 1262*c* are disposed back to each other at two ends of the gear part 1262*a*, and the plurality of first protrusions 1262*b* are arranged in a ring shape and are spaced from each other. The plurality of first protrusions 1262*b* are disposed around the hinge hole of the gear part 1262*a*, the plurality of second protrusions 1262*c* are arranged in a ring shape and are spaced from each other, and the plurality of second protrusions 1262*c* are disposed around the hinge hole of the gear part 1262*a*. The first swing arm 126 may further include a connection segment 1263 that connects the sliding end 1261 and the rotation end 1262, and the connection segment 1263 may be bent relative to the first sliding body 1261*a*, so that shapes of the first swing arm 126 are more diversified. The first swing arm 126 may be an integrally formed mechanical part, so as to have high structural strength.

The second swing arm 127 includes a sliding end 1271 and a rotation end 1272. The sliding end 1271 of the second swing arm 127 may include a second sliding body 1271*a* and a second limiting protrusion 1271*b*. The second sliding body 1271*a* may be approximately in a shape of a flat plate, and the second limiting protrusion 1271*b* is fastened on a side surface of the second sliding body 1271*a*. For example, the rotation end 1272 of the second swing arm 127 includes a gear part 1272*a*, a plurality of first protrusions 1272*b*, and a plurality of second protrusions 1272*c*. The gear part 1272*a* may be provided with a hinge hole. The plurality of first protrusions 12721) and the plurality of second protrusions 1272*c* are disposed back to each other at two ends of the gear part 1272*a*, and the plurality of first protrusions 1272*b* are arranged in a ring shape and are spaced from each other. The plurality of first protrusions 1272*b* are disposed around the hinge hole of the gear part 1272*a*, the plurality of second protrusions 1272*c* are arranged in a ring shape and are spaced from each other, and the plurality of second protrusions 1272*c* are disposed around the hinge hole of the gear part 1272*a*. The second swing arm 127 may further include a connection segment 1273 that connects the sliding end 1271 and the rotation end 1272, and the connection segment 1273 may be bent relative to the second sliding body 1272*a*, so that shapes of the second swing arm 127 are more diversified. The second swing arm 127 may be an integrally formed mechanical part, so as to have high structural strength.

In some embodiments, as shown in FIG. 14 to FIG. 16, the synchronization assembly 128 includes a plurality of synchronous gears 1281, the plurality of synchronous gears 1281 are engaged with each other, and the rotation and 1262 of the first swing arm 126 is engaged with the rotation end 1272 of the second swing arm 127 by using the plurality of synchronous gears 1281. For example, the plurality of synchronous gears 1281 may be arranged into a string, two adjacent synchronous gears 1281 are engaged with each other, and the two synchronous gears 1281 located at the end parts are respectively engaged with the rotation end 1262 of the first swing arm 126 and the rotation end 1272 of the second swing arm 127.

In this embodiment, the rotation end 1262 of the first swing arm 126 is connected to the rotation end 1272 of the second swing arm 127 by using the plurality of synchronous gears 1281, so that a rotation angle of the rotation end 1262 of the first swing arm 126 and a rotation angle of the rotation end 1272 of the second swing arm 127 are the same in size and opposite in direction. In this case, rotation actions of the first swing arm 126 and the second swing arm 127 relative to the middle housing 121 are synchronous, that is, the first swing arm 126 and the second swing arm 127 are synchronously close to each other or away from each other.

For example, the synchronous gear 1281 includes a gear part 1281*a*, a plurality of first protrusions 1281*b*, and a plurality of second protrusions 1281*c*. The gear part 1281*a* may be provided with a hinge hole. The plurality of first protrusions 1281*b* and the plurality of second protrusions 1281*c* are disposed back to each other at two ends of the gear part 1281*a*, and the plurality of first protrusions 1281*b* are arranged in a ring shape and are spaced from each other. The plurality of first protrusions 1281*b* an disposed around the hinge hole of the gear part 1281*a*, the plurality of second protrusions 1281*c* are arranged in a ring shape and are spaced from each other, and the plurality of second protrusions 1281*c* are disposed around the hinge hole of the gear pert 1281*a*. The synchronous gear 1281 may be an integrally formed mechanical part, so as to have high structural strength.

In some embodiments, the synchronization assembly 128 further includes a first blacker 1282, a second blocker 1283, a fastening plate 1284, a first elastic part 1285, a first rotatable connecting shall 1286, a second rotatable connecting shaft 1287, and a plurality of third rotatable connecting shafts 1288. The first blocker 1282 is located between the first elastic part 1285 and the synchronous gear 1281. The second blocker 1283 is located on a side that is of the synchronous gear 1281 and that is away from the first blocker 1282, and the fastening plate 1284 is located on a side that is of the first elastic part 1285 and that is away from the first blocker 1282. The second blocker 1283, the plurality of synchronous gears 1281, the first blocker 1282, the first elastic part 1285, and the fastening plate 1284 are sequentially arranged in a direction parallel to the rotation center of the housing apparatus 1. The rotation end 1262 of the first swing arm 126 and the rotation end 1272 of the second swing arm 127 are located between the first blocker 1282 and the second blocker 1283.

In some embodiments, as shown in FIG. 15 and FIG. 16, the first blocker 1282 includes a first blocking plate 1282*a* and a plurality of first bump groups 1282*b*, and the plurality of first bump groups 1282*b* are fastened on a same side surface of the first blocking plate 1282*a*. The first blocking plate 1282*a* includes a plurality of first through holes 1282*c*, and the plurality of first through holes 1282*c* are spaced from each other. The plurality of first bump groups 1282*b* are disposed in a one-to-one correspondence with the plurality of first through holes 1282*c*. Each of the first bump groups 1282*b* may include a plurality of first bumps 1282*d*. The plurality of first bumps 1282*d* are arranged in a ring shape and are spaced from each other. The plurality of first bumps 1282*d* are disposed around the first through hole 1282*c*. A blocking slot is formed between two adjacent first bumps 1282*d*. The first blocker 1282 may be an integrally formed mechanical part, so as to have high structural strength.

In some embodiments, as shown in FIG. 15 and FIG. 16, the second blocker 1283 includes a second blocking plate 1283*a* and a plurality of second bump groups 1283*b*, and the plurality of second bump groups 1283*b* are fastened on a same side surface of the second blocking plate 1283*a*. The second blocking plate 1283*a* includes a plurality of second through holes 1283*c*, and the plurality of second through holes 1283*c* are spaced from each other. The plurality of second bump groups 1283*b* are disposed in a one-to-one correspondence with the plurality of second through holes 1283*c*. Each of the second bump groups 1283*b* may include a plurality of second bumps 1283*d* The plurality of second bumps 1283*d* are arranged in a ring shape and are spaced from each other. The plurality of second bumps 1283*d* are disposed around the second through hole 1283*c*. A blocking slot is formed between two adjacent second bumps 1283*d*. The second blocker 1283 may be an integrally formed mechanical part, so as to have high structural strength.

In some embodiments, as shown in FIG. 15 and FIG. 16, the fastening plate 1284 may be of a plate body structure. The fastening plate 1284 include; a plurality of third through holes 1284*a*, and the plurality of third through holes 1284*a* are spaced from each other. For example, the plurality of first through holes 1282*c*, the plurality of second through holes 1283*c*, and the plurality of third through hole; 1284*a* may have a wane arrangement shape and arrangement spacing.

In some embodiments, as shown in FIG. 14 to FIG. 16, the first elastic part 1285 includes a plurality of springs 1285*a*. The first rotatable connecting shaft 1286 is inserted into the second blocker 1283, the rotation end 1262 of the first swing arm 126, the first blocker 1282, one of the springs 1285*a*, and the fastening plate 1284. The first rotatable connecting shaft 1286 passes through one second through hole 1283*c* of the second Mocker 1283, a hinge hole of the first swing arm 126, one first through hole 1282*c* of the first blocker 1282, inner space of one spring 1285*a*, and one third through hole 1284*a* of the fastening plate 1284. The first rotatable connecting shaft 1286 includes a first end part and a second end part that are disposed back to each other. The first end part of the first rotatable connecting shaft 1286 is close to the second blocker 1283 and protrudes from the second blocker 1283, and the second end part of the first rotatable connecting shaft 1286 is close to the fastening plate 1284 and protrudes from the fastening plate 1284. For example, a limiting flange 1286*a* may be disposed at the first end part of the first rotatable connecting shaft 1286, the limiting flange 1286*a* is located on a side that is of the second blocker 1283 and that is away from the first blocker 1282, and the limiting flange 1286*a* may abut against the second blocker 1283 to implement limiting. The second end part of the first rotatable connecting shaft 1286 may be fixedly connected to the fastening plate 1284 by welding, bonding, or the like. The spring 1285*a* is in a compressed state.

A quantity of third rotatable connecting shafts 1288 is the same as a quantity of synchronous gears 1281, and the third rotatable connecting shaft 1288, the synchronous gear 1281, and some of the plurality of springs 1285*a* are disposed in a one-to-one correspondence. The third rotatable connecting shaft 1288 is inserted into the second blocker 1283, the synchronous gear 1281, the first blocker 1282, another spring 1285*a*, and the fastening plate 1284. The third rotatable connecting shaft 1288 passes through another second through hole 1283*c* of the second blocker 1283, a hinge hole of the synchronous gear 1281, another first through hole 1282*c* of the first blocker 1282, inner space of another spring 1285*a*, and another third through hole 1284*a* of the fastening plate 1284.

The third rotatable connecting shaft 1288 includes a first end part and a second end part that are disposed back to each other. The first end part of the third rotatable connecting shaft 1288 is close to the second blocker 12113 and protrudes from the second blocker 1283, and the second end point of the third rotatable connecting shaft 1288 is close to the fastening plate 1284 and protrudes from the fastening plate 1284. For example, a limiting flange 1288*a* may be disposed at the first end part of the third rotatable connecting shaft 1288, the limiting flange 1288*a* is located on a side that is of the second blocker 1283 and that is away from the first blocker 1282, and the limiting flange 1288*a* may abut against the second Mocker 1283 to implement limiting. The second end part of the third rotatable connecting shaft 1288 may be fixedly connected to the fastening plate 1284 by welding, bonding, or the like. The spring 1285*a* is in a compressed state.

The second rotatable connecting shaft 1287 is inserted into the second blocker 1283, the rotation end 1272 of the second swing arm 127, the first blocker 1282, another spring 1285*a*, and the fastening plate 1284. The second rotatable connecting shall 1287 passes through another second through hole 1283*c* of the second blocker 1283, a hinge hole of the second swing arm 127, another first through hole 1282*c* of the first blocker 1282, inner space of another spring 1285*a*, and another third through hole 1284*a* of the fastening plate 1284.

The second rotatable connecting shaft 1287 includes a first end part and a second end part that are disposed back to each other. The first end part of the second rotatable connecting shaft 1287 is close to the second blocker 1283 and protrudes from the second blocker 1283, and the second end part of the second rotatable connecting shaft 1287 is close to the fastening plate 1284 and protrudes from the fastening plate 1284. For example, a limiting flange 1287*a* may be disposed at the first end part of the second rotatable connecting shaft 1287, the limiting flange 1287*a* is located on a side that is of the second blocker 1283 and that is away from the first blocker 1282, and the limiting flange 1287*a* may abut against the second blocker 1283 to implement limiting. The second end part of the second rotatable connecting shaft 1287 may be fixedly connected to the fastening plate 1284 by welding, bonding, or the like. The spring 1285*a* is in a compressed state.

In some embodiments, as shown in FIG. 14 to FIG. 16, the rotation end 1262 of the first swing arm 126, the synchronous gear 1281, and the rotation end 1272 of the second swing arm 127 are arranged in an arc shape. For example, the plurality of first through holes 1282*c* of the first blocker 1282 are arranged in an arc shape, and the first blocking plate 1262*a* may be arc-shaped or approximately arc-shaped. The plurality of second through holes 1283*c* of the second blocker 1283 are arranged in an arc shape, and the second blocking plate 1283*a* may be arc-shaped or approximately arc-shaped. The plurality of third through holes 1284*a* of the fastening plate 1284 are arranged in an arc shape, and the fastening plate 1284 may be arc-shaped or approximately arc-shaped. Positions of the first rotatable connecting shall 1286, the third rotatable connecting shaft 1288, and the second rotatable connecting shaft 1287 are limited by using positions of the first through hole 1282*c*, the second through hole 1283*c*, and the third through hole 1284*a*, so that the rotation end 1262 of the first swing arm 126, the synchronous gear 1281, and the rotation end 1272 of the second swing arm 127 are arranged in an arc shape.

In some embodiments, as shown in FIG. 14 to FIG. 16, a plurality of first protrusions 1262*b* of the first swing arm 126 and a plurality of first bumps 1282*d* of one first bump group 1282*b* are alternately arranged to form a clamping structure. A plurality of second protrusions 1262*c* of the first swing arm 126 and a plurality of second bumps 1263*d* of one second bump group 1283*b* are alternately arranged to form a clamping structure. A plurality of first protrusions 1281*b* of the synchronous gear 1281 and a plurality of first bumps 1282*d* of another first hump group 1282*b* are alternately arranged to form a clamping structure A plurality of second protrusions 1281*c* of the synchronous gear 1281 and a plurality of second bumps 1283*d* of another second bump group 1283*b* are alternately arranged to form a clamping structure. A plurality of first protrusions 1272*b* of the second swing arm 127 and a plurality of first bumps 1282*d* of another first bump group 1282*b* are alternately arranged to form a clamping structure. A plurality of second protrusions 1272*c* of the second swing arm 127 and a plurality of second bumps 1283*d* of another second bump group 1283*b* are alternately arranged to form a clamping structure.

In this embodiment, the rotation end 1262 of the first swing arm 126, the rotation end 1272 of the second swing arm 127, and the synchronous gear 1281 are all claimed to the first blocker 1282 and the second blocker 1283 to form a clamping structure, so that the first swing arm 126 and the second swing arm 127 can stay at some positions.

In addition, when the first elastic part 1285 is in a compressed state, the first blocker 1282 abuts against the synchronous gear 1281 through an elastic fore generated by the first elastic part 1285. In this case, the first blocker 1282 and the second blocker 1283 cooperate with each other to press the rotation end 1262 of the first swing arm 126, the synchronous gear 1281, and the rotation end 1272 of the second swing arm 127, so that the clamping structure between the rotation end 1262 of the first swing arm 126, the synchronous gear 1281, and the rotation and 1272 of the second swing arm 127 and the first blocker 1282, and the damping structure between the rotation end 1262 of the first swing arm 126, the synchronous gear 1281, and the rotation end 1272 of the second swing arm 127 and second blocker 1283 are stable.

When the rotation end 1262 of the first swing arm 126, the rotation end 1272 of the second swing arm 127, and the synchronous gear 1281 rotate relative to the first blocker 1282 and the second blocker 1283, relative positions of the plurality of first protrusions 1262*b* and the plurality of first bumps 1282*d* can change to form different clamping structures, and relative positions of the plurality of second protrusions 1262*c* and the plurality of second bumps 1283*d* can change to form different clamping structures.

In some embodiments, as shown in FIG. 14 to FIG. 16, the first blocker 1282 and the second blocker 1283 may be of a mirror symmetric structure, the plurality of first protrusions 1262*b* and the plurality of second protrusions 1262*c* of the first swing arm 126 are of a mirror symmetric structure, the plurality of first protrusions 1262*b* and the plurality of second protrusions 1262*c* of the second swing arm 127 are of a mirror symmetric structure, and the plurality of first protrusions 1262*b* and the plurality of second protrusions 1262*c* of the synchronous gear 1281 are of a mirror symmetric structure.

Figure 17:
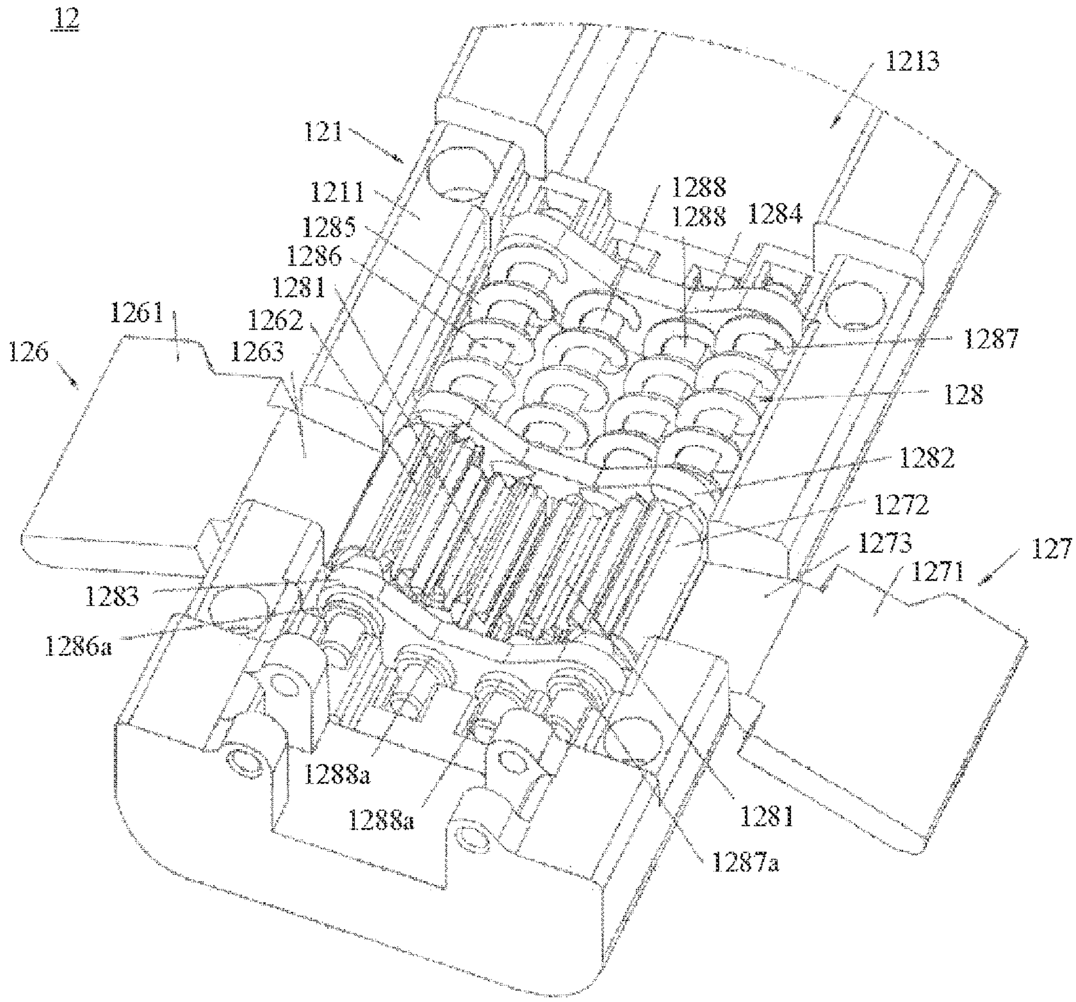
FIG. 17 is a schematic diagram of a partial structure of a folding mechanism shown in FIG. 4.

In some embodiments, refer to FIG. 13 and FIG. 17. FIG. 17 is a schematic diagram of a partial structure of the folding mechanism 12 shown in FIG. 4 FIG. 17 shows an assembly structure in which the first swing arm 126, the second swing arm 127, and the synchronization assembly 128 are mounted on the outer cover 1211 of the middle housing 121. The rotation end 1262 of the first swing arm 126, the rotation end 1272 of the second swing arm 127, and the synchronization assembly 128 are mounted on the middle housing 121. When the folding mechanism 12 is in the state shown in FIG. 17, the connection segment 1263 of the first swing arm 126 may be clamped into the first avoidance notch 1211*d* of the outer cover 1211 of the middle housing 121, and the sliding end 1261 of the first swing arm 126 is located outside the outer cover 1211. The connection segment 1263 of the second swing arm 127 may be clamped into the second avoidance notch 1211*e* of the outer cover 1211, and the sliding end 1261 of the second swing arm 126 is located outside the outer cover 1211.

Two ends of the first rotatable connecting shaft 1286 are respectively disposed in a corresponding group of first hinge grooves 1213*c* and second hinge grooves 1213*d*, and the first rotatable connecting shaft 1286 passes through the first mounting space 1213*a* and the second mounting space 1213*b*. Two ends of the second rotatable connecting shaft 1287 are respectively disposed in another corresponding group of first hinge grooves 1213*c* and second hinge grooves 1213*d*, and the second rotatable connecting shaft 1287 passes through the first mounting space 1213*a* and the second mounting space 1213*b*. Two ends of the third rotatable connecting shaft 1288 are respectively disposed in another corresponding group of first hinge grooves 1213*c* and second hinge grooves 1213*d*, and the third rotatable connecting shaft 1288 passes through the first mounting space 1213*a* and the second mounting space 1213*b*.

The second blocker 1283, the rotation end 1262 of the first swing arm 126, the rotation end 1272 of the second swing arm 127, the synchronous gear 1281, and the first blocker 1282 may be mounted in the first mounting space 1213*a*. The rotation end 1262 of the first swing arm 126 is rotatably connected to the middle housing 121 through the first rotatable connecting shaft 1286, the synchronous gear 1281 is rotatably connected to the middle housing 121 through the third rotatable connecting shad 1288, and the rotation end 1272 of the second swing arm 127 is rotatably connected to the middle housing 121 through the second rotatable connecting shaft 1287.

The fastening plate 1284 may be mounted in the second mounting space 1213*b*. A large part of the first elastic part 1285 is located in the second mounting space 1213*b*, and a small part of the first elastic part 1285 may be located in the first mounting space 1213*a*. One end of the first elastic part 1285 abuts against the fastening plate 1284, and the other end of the first elastic part 1285 abuts against the first blocker 1282.

Figure 18:
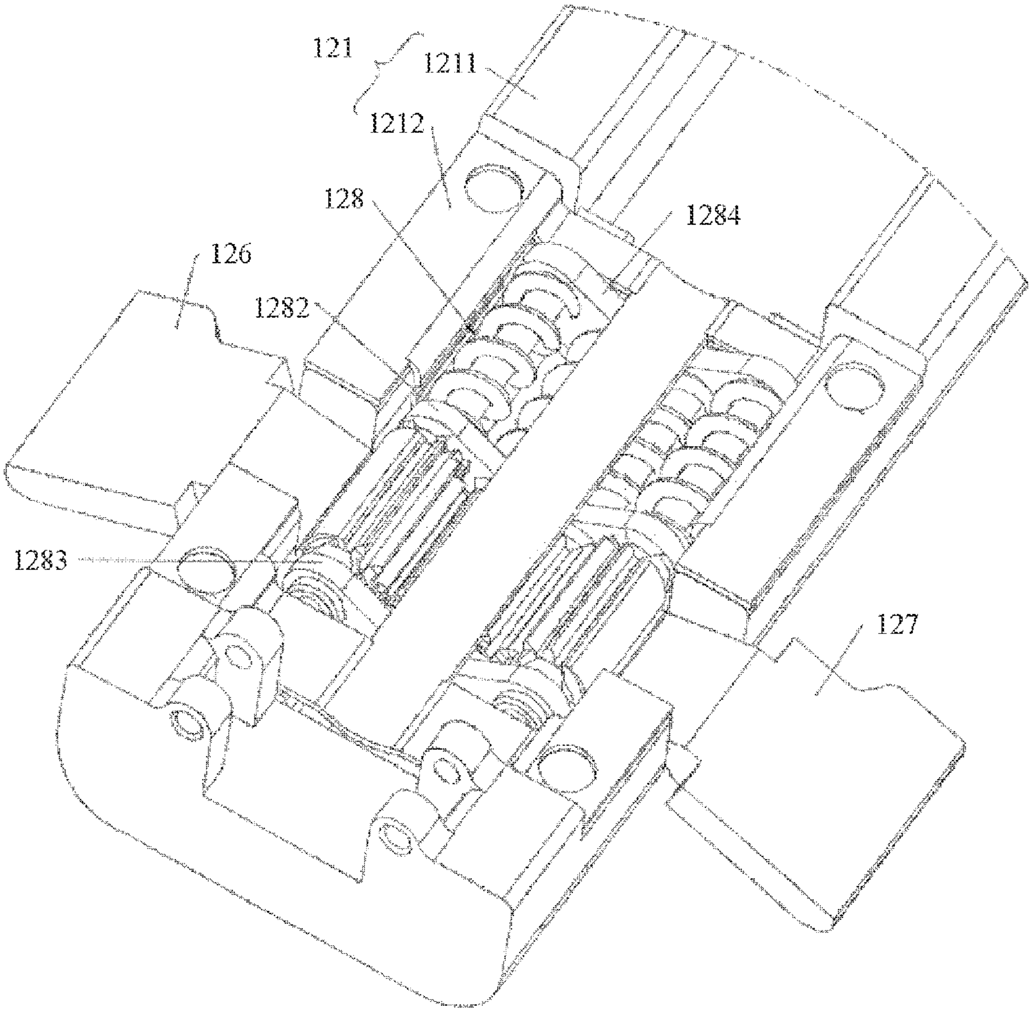
FIG. 18 is a schematic diagram of a partial structure of a folding mechanism shown in FIG. 4.

In some embodiments, refer to FIG. 17 and FIG. 18. FIG. 18 is a schematic diagram of a partial structure of the folding mechanism 12 shown in FIG. 4. FIG. 17 shows an assembly structure in which the first swing arm 126, the second swing arm 127, and the synchronization assembly 128 are mounted on the middle housing 121. The fastener 1212 may be located above the synchronization assembly 128. The fastener 1212 cooperates with the outer cover 1211 to Jointly fasten the second blocker 1283, the first blocker 1282, and the fastening plate 1284, so that the first swing arm 126, the synchronization assembly 128, and the second swing arm 127 are stably mounted on the middle housing 121, and are not easy to shake or detach from the middle housing 121. In this way, reliability of the folding mechanism ism 12 is improved.

The rotation end 1262 of the first swing arm 126, the plurality of synchronous gears 1281, and the rotation end 1272 of the second swing arm 127 are arranged in an arc shape, so that one part of the inner space 1213 of the middle housing 121 can be fully used, and the other part of the inner space 1213 of the middle housing 121 can be released to form display accommodating space for accommodating a part of the flexible display 2 when the electronic device 100 is closed. This helps improve compactness of component arrangement of the electronic device 100, and reduce a size of the electronic device 100.

It may be understood that a quantity, sizes, and the like of the synchronous gears 1281 may be designed based on a specific model such as a product form and a size. This is not strictly limited in this application. The larger quantity of synchronous gears 1281, the smaller size of the synchronous gear 1281, so that more space is released. The smaller quantity of synchronous gears 1281, the larger size of the synchronous gear 1281, and the smaller accumulated transmission error of the synchronous gear 1281, which helps improve movement accuracy.

It may be understood that the synchronization assembly 128 in this application may have a plurality of implementation strictures. In some other embodiments, the synchronization assembly 128 may indirectly limit a position of the first swing arm 126 and a position of the second swing arm 127 by limiting a position of the synchronous gear 1281. For example, a clamping structure is formed between the first blocker 1282 and the second blocker 1283 and the synchronous gear 1281, and there is no clamping structure between the rotation end 1262 of the first swing arm 126 and the rotation end 1272 of the second swing arm 127 and the first blocker 1282 and the second blocker 1283, in some other embodiments, the second blocker 1283 may not be disposed on the synchronization assembly 128, and the first swing arm 126 and the second swing arm 127 can stay at some positions by using a clamping structure between the first blocker 1282 and the synchronous gear 1281, the first swing arm 126, and the second swing arm 127. In some other embodiments, the synchronization assembly 128 may not be provided with the fastening plate 1284, two ends of the first elastic part 1285 may respectively abut against the first blocker 1282 and a wall surface of the second mounting space 1213*b*, and the first elastic part 1285 is compressed between the first blocker 1282 and the middle housing 121. In some other embodiments, the first elastic part 1285 may alternatively use another structure, for example, an elastic rubber block. The foregoing embodiment is an example structure of the synchronization assembly 128. The synchronization assembly 128 may also have another implementation structure. This is not strictly limited in this application.

In some other embodiments, no synchronization assembly 128 connecting the rotation end 1262 of the first swing arm 126 and the rotation end 1272 of the second swing arm 127 is disposed between the rotation end 1262 of the first swing arm 126 and the rotation and 1272 of the second swing arm 127. The rotation end 1262 of the first swing arm 126 may be rotatably connected to the middle housing 121 through a hinge, whet, the hinge may be a part of the rotation end 1262 of the first swing arm 126, or may be an independent mechanical part and is inserted into the rotation end 1262 of the first swing arm 126. Alternatively, the rotation end 1272 of the second swing arm 127 may be rotatably connected to the middle housing 121 through a hinge, where the hinge may be a part of the rotation end 1272 of the second swing arm 127, or may be an independent mechanical part and is inserted into the rotation end 1272 of the second swing arm 127.

Figure 19:
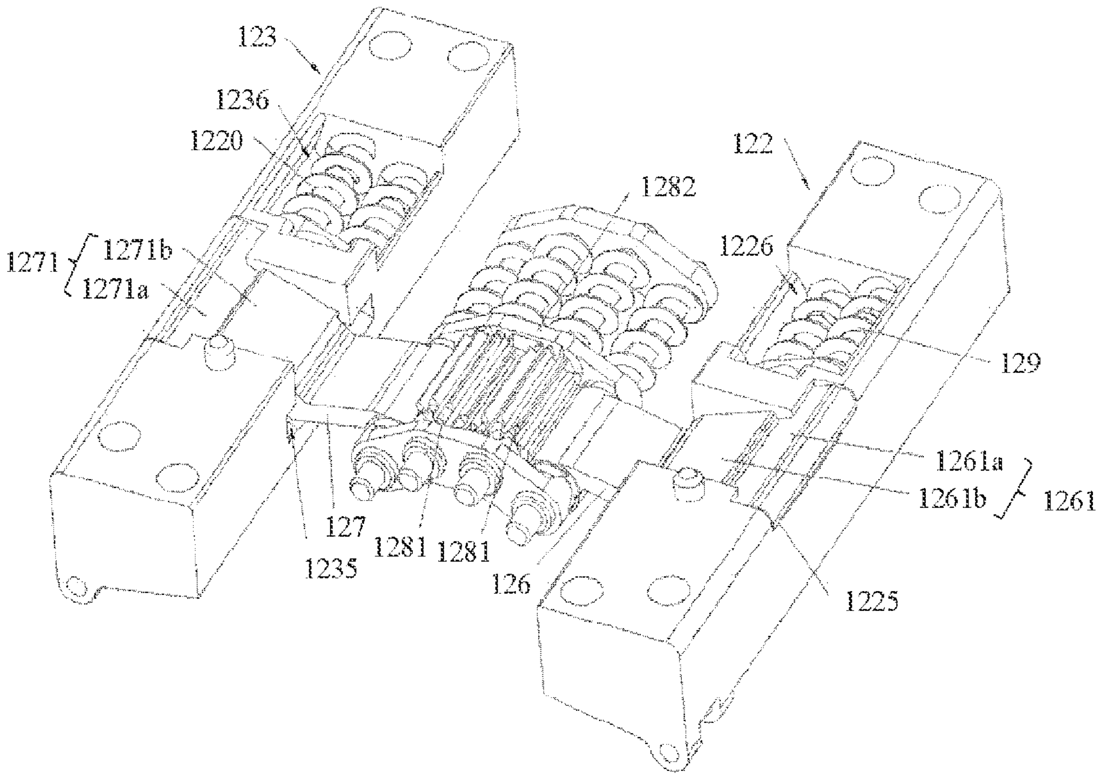
FIG. 19 is a schematic diagram of a partial structure of a folding mechanism shown in FIG. 5.

In some embodiments, refer to FIG. 10 and FIG. 19. FIG. 19 is a schematic diagram of a partial structure of the folding mechanism 12 shown in FIG. 5. FIG. 19 shows an assembly structure of the first fixing bracket 122, the first swing arm 126, the synchronization assembly 128, the second swing arm 127, and the second fixing bracket 123 of the folding mechanism 12. One end of the first swing arm 126 is slidably connected to the first fixing bracket 122, and one end of the second swing arm 127 is slidably connected to the second fixing bracket 123. In this embodiment of this application, that the two are slidably connected means that the two are connected to each other, and the two may slide relative to each other after being connected.

For example, the sliding end 1261 of the first swing arm 126 is slidably mounted in the first sliding slot 1225 of the first fixing bracket 122. The first sliding body **1261*a* of the first swing arm 126 may be located in the first sliding slot 1225, and the first limiting protrusion 1261*b* may be located in the first guide groove 1227. The first sliding body 1261*a* and the first sliding slot 1225 can cooperate with each other to limit a sliding direction of the sliding end 1261 of the first swing arm 126 when the sliding end 1261 slides relative to the first fixing bracket 122. The first guide groove 1227 and the first limiting protrusion 1261*b* can cooperate with each other to limit the first swing arm 126 in a vertical direction of the sliding direction of the first swing arm 126, so that stability of the first swing arm 126 when the first swing arm 126 slides relative to the first fixing bracket 122** is improved, and shaking is avoided.

The sliding end 1271 of the second swing arm 127 is slidably mounted in the second sliding slot 1235 of the second fixing bracket 123. The second sliding body **1271*a* of the second swing arm 127 may be located in the second sliding slot 1235, and the second limiting protrusion 1271*b* may be located in the second guide groove 1237. The second sliding body 1271*a* and the second sliding slot 1235 can cooperate with each other to limit a sliding direction of the sliding end 1271 of the second swing arm 127 when the sliding end 1271 slides relative to the second fixing bracket 123. The second guide groove 1237 and the second limiting protrusion 1271*b* can cooperate with each other to limit the second swing arm 127 in a vertical direction of the sliding direction of the second swing arm 127, so that stability of the second swing arm 127 when the second swing rein 127 slides relative to the second fixing bracket 123** is improved, and shaking is avoided.

Figure 20:
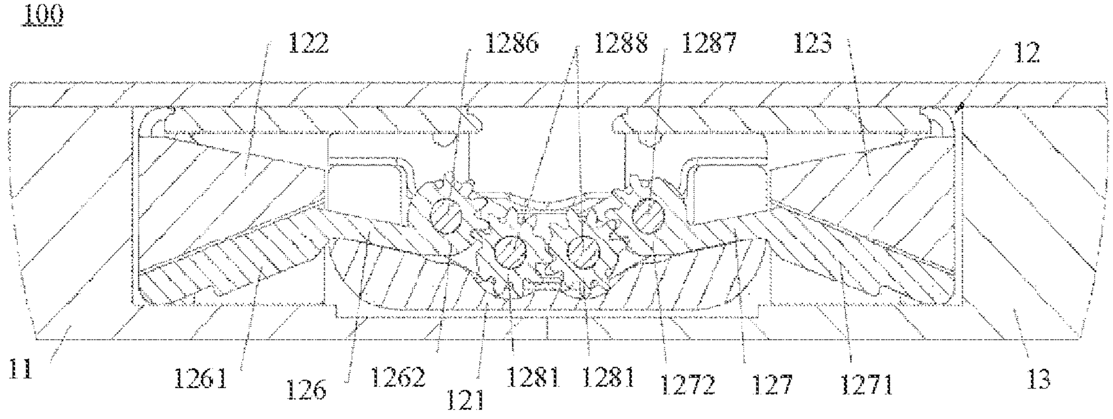
FIG. 20 is a schematic diagram of a structure of the electronic device shown in FIG. 1 when cut along C-C.
Figure 21:
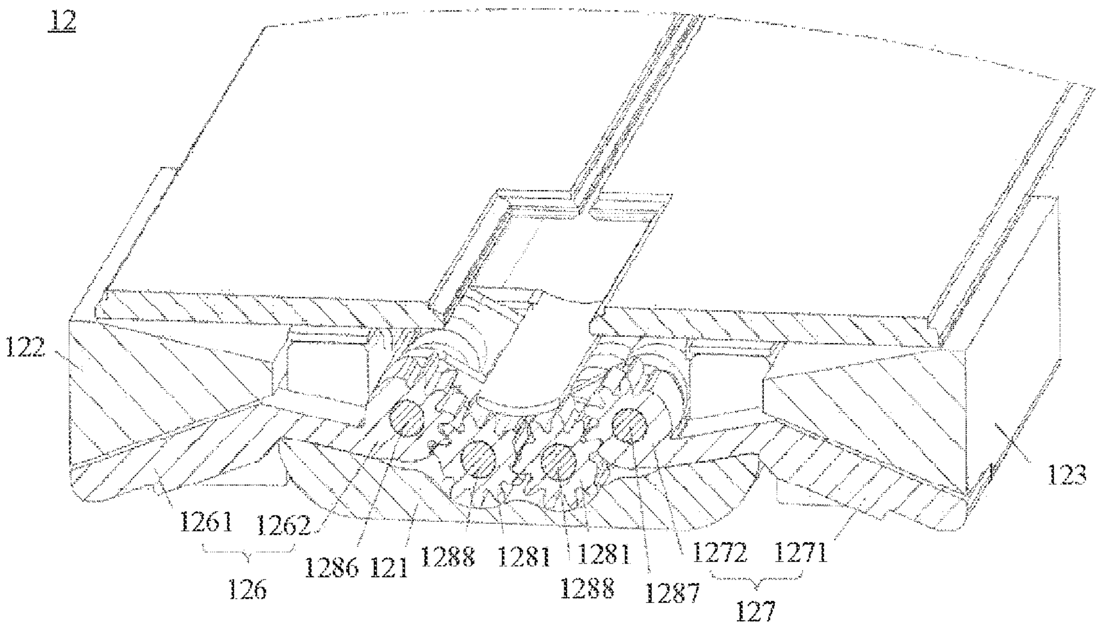
FIG. 21 is a schematic diagram of a partial structure of the structure shown in FIG. 20.
Figure 22:
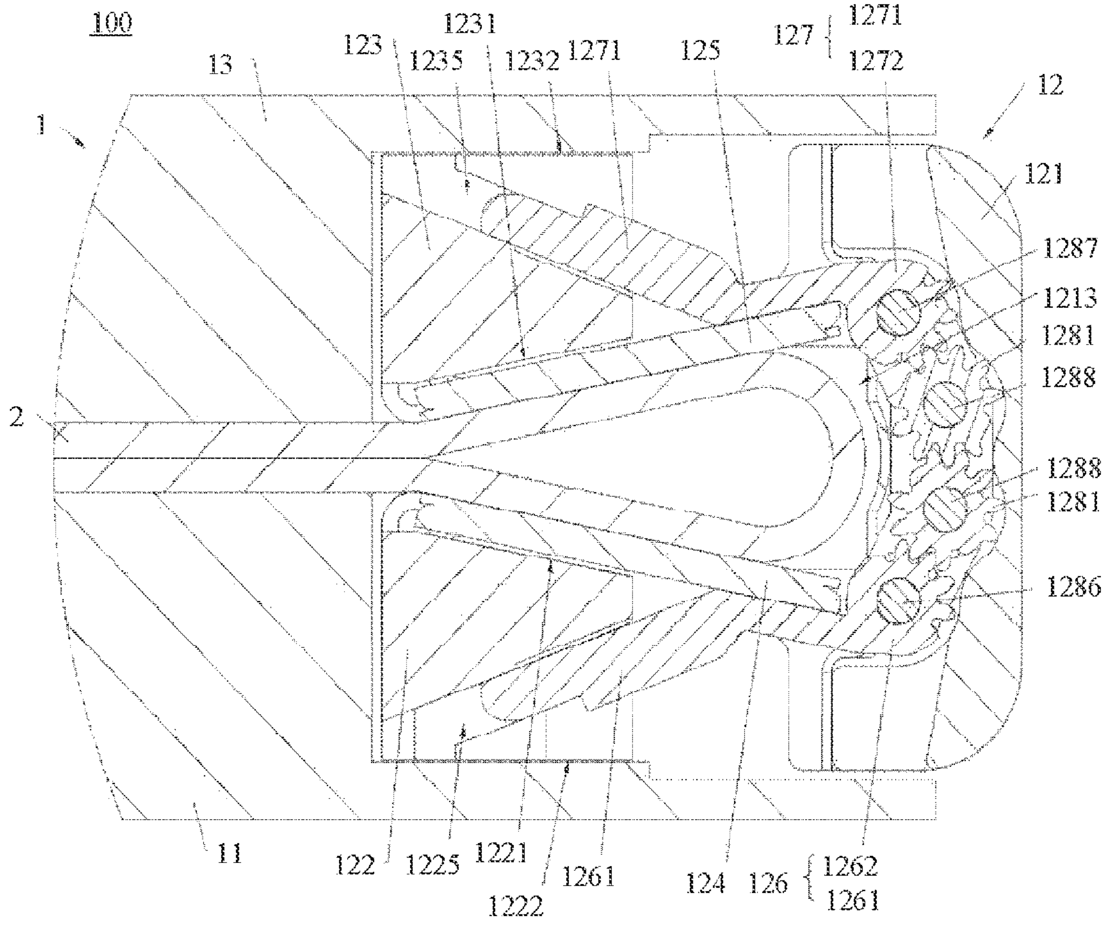
FIG. 22 is a schematic diagram of the structure shown in FIG. 20 in another use state.
Figure 23:
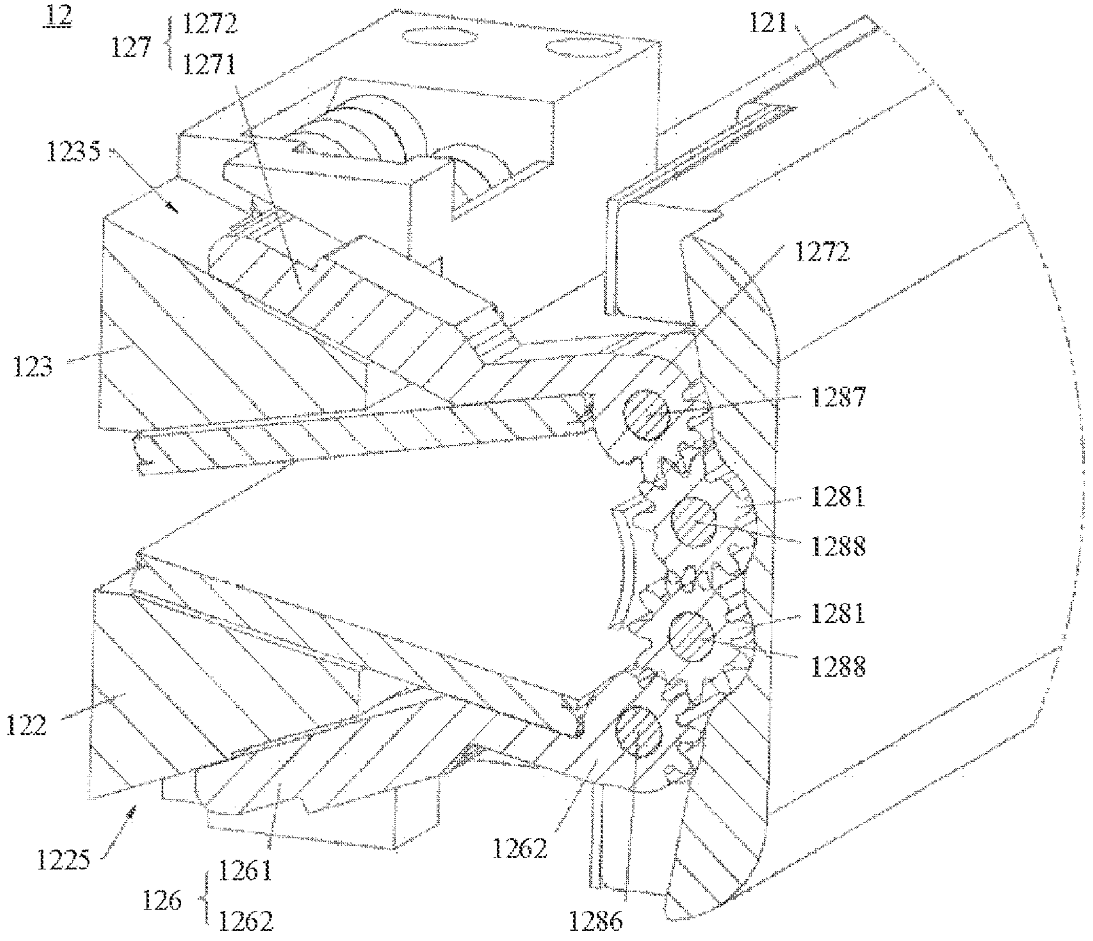
FIG. 23 is a schematic diagram of a partial stricture of the structure shown in FIG. 22.

In some embodiments, FIG. 20 is a schematic diagram of a structure of the electronic device 100 shown in FIG. 1 when cut along C-C. FIG. 21 is a schematic diagram of a partial structure of the structure shown in FIG. 20. FIG. 22 is a schematic diagram of the structure shown in FIG. 20 in another use state. FIG. 23 is a schematic diagram of a partial structure of the structure shown in FIG. 22. The structures shown in FIG. 20 and FIG. 21 are in an open state, and the structures shown in FIG. 22 and FIG. 23 are in a closed state.

The first fixing bracket 122 is fixedly connected to the first housing 11, and the second fixing bracket 123 is fixedly connected to the second housing 13. One end of the first swing arm 126 is slidably connected to the first fixing bracket 122, and the other end of the first swing arm 126 is rotatably connected to the middle housing 121. One end of the second swing arm 127 is slidably connected to the second fixing bracket 123, and the other end of the second swing arm 127 is rotatably connected to the middle housing 121. The sliding end 1261 of the first swing arm 126 may be mounted in the first sliding slot 1225, to slidably connect to the first fixing bracket 122. The rotation end 1262 of the first swing arm 126 is rotatably connected to the middle housing 121 by using the first rotatable connecting shaft 1286. The sliding end 1271 of the second swing arm 127 may be mounted in the second sliding slot 1235, to slidably connect to the second fixing bracket 123. The rotation end 1272 of the second swing atm 127 is rotatably connected to the middle housing 121 through the second rotatable connecting shaft 1287.

The rotation end 1262 of the first swing arm 126 is engaged with the rotation end 1272 of the second swing arm 127 by using a plurality of synchronous gears 1281, and the plurality of synchronous gears 1281 are engaged with each other Each synchronous gear 1281 is rotatably connected to the middle housing 121, and the synchronous gear 1281 may be rotatably connected to the huddle housing 121 by using the third rotatable connecting shaft 1288.

In this embodiment, because the rotation end 1262 of the first swing arm 126 and the rotation end 1272 of the second swing arm 127 are associated by using the plurality of synchronous gears 1281, the plurality of synchronous gears 1281 are configured to enable the first swing arm 126 and the second swing arm 127 to rotate synchronously in a movement proems of the housing apparatus, that is, be synchronously close to or away from each other. The first swing arm 126 is slidably connected to the first fixing bracket 122 fastened on the first housing 11, and the second swing arm 127 is slidably connected to the second fixing bracket 123 fastened on the second housing 13. Therefore, rotation actions of the first housing 11 and the second housing 13 relative to the middle housing 121 are good in synchronization, so that mechanism operation experience of the housing apparatus 1 and the electronic device 100 is improved.

As shown in FIG. 22, the rotation end 1262 of the first swing arm 126, the plurality of synchronous gears 1281, and the rotation end 1272 of the second swing arm 127 are arranged in an arc shape. The rotation end 1262 of the first swing arm 126, the plurality of synchronous gears 1281, and the rotation end 1262 of the second synchronous swing arm are arranged in an arc shape, so that one part of the inner space 1213 of the middle housing 121 is fully used, and the other part of the inner space 1213 of the middle housing 121 is released to form display accommodating space. When the flexible display 2 is in a closed state, a part of the flexible display 2 can be accommodated in the inner space 1213 of the middle housing 121. This helps improve compactness of component arrangement of the electronic device 100, and reduce a size of the electronic device 100.

As shown in FIG. 22, the top surface 1221 of the first fixing bracket 122 and the bottom surface 1222 of the first fixing bracket 122 are close to each other in a direction close to the middle housing 121, and the top surface 1221 of the first fixing bracket 122 faces the first support plate 124. For example, the top surface 1221 of the first fixing bracket 122 may support the first support plate 124. In a direction close to the middle housing 121, an extension direction of the first sliding slot 1225 of the first fixing bracket 122 is away from the bottom surface 1222 of the first fixing bracket 122, and the first sliding slot 1225 is disposed in an inclined manner relative to the bottom surface 1222 of the first fixing bracket 122. The inclined design of the first sliding slot 1225 helps reduce a thickness of the folding mechanism 12 and optimize the structure of the mechanism. In some other embodiments, the first sliding slot 1225 may alternatively be parallel to the bottom surface 1222 of the first fixing bracket 122. This is not strictly limited in this application.

The top surface 1231 of the second fixing bracket 123 and the bottom surface 1232 of the second fixing bracket 123 are close to each other in a direction close to the middle housing 121, and the top surface 1231 of the second fixing bracket 123 faces the second support plate 125. For example, the top surface 1231 of the second fixing bracket 123 may support the second support plate 125. In a direction close to the middle housing 121, an extension direction of the second sliding slot 1235 of the second fixing bracket 123 is away from the bottom surface 1232 of the second fixing bracket 123, and the second sliding slot 1235 is disposed in an inclined manner relative to the bottom surface 1232 of the second fixing bracket 123. The inclined design of the second sliding slot 1235 helps reduce a thickness of the folding mechanism 12 and optimize the structure of the mechanism. In some other embodiments, the second sliding slot 1235 may alternatively be parallel to the bottom surface 1232 of the second fixing bracket 123. This is not strictly limited in this application.

It may be understood that, as shown in FIG. 17 and FIG. 20, in this embodiment of this application, the first fixing bracket 122 is fastened to the first housing 11, one end of the first swing arm 126 is rotatably connected to the middle housing 121, the other end of the first swing arm 126 is slidably connected to the first fixing bracket 122, the second fixing bracket 123 is fastened to the second housing 13, one end of the second swing arm 127 is rotatably connected to the middle housing 121, and the other end of the second swing arm 127 is slidably connected to the second fixing bracket 123, therefore, when the first housing 11 and the second housing 13 rotate relative to each other, the first housing 11 drives, by using the first fixing bracket 122, the first swing arm 126 to rotate relative to the middle housing 121, and the second housing 13 drives, by using the second fixing bracket 123, the second swing arm 127 to rotate relative to the middle housing 121. The first blocker 1282 is fixedly mounted on the middle housing 121, therefore, in a process in which the first housing 11 and the second housing 13 rotate relative to each other, the first swing arm 126 and the second swing arm 127 rotate relative to the first blocker 1282, the synchronous gear 1281 rotates with the first swing arm 126 and the second swing arm 127 relative to the first blocker 1282, and different clamping structures are formed between the synchronous gear 1281 and the first blocker 1282.

For example, when the folding mechanism 12 is in an open state, the first blocker 1282 and the synchronous gear 1281 form a first clamping structure. When the folding mechanism 12 is in a closed state, the first blocker 1282 and the synchronous gear 1281 form a second clamping structure. In this embodiment, the first clamping structure and the second clamping structure can keep the synchronous gear 1281 at a specific position relative to the first blocker 1282, even if the first swing arm 126 and the second swing arm 127 maintain a specific relative position relationship relative to the middle housing 121, so that the first housing 11 and the second housing 13 can better remain in the open state or the closed state, thereby improving user experience. In addition, the first clamping structure and the second clamping structure may provide specific resistance in a process in which the electronic device is 100 is unfolded to enter the open state and in a process in which the electronic device 100 is folded to end the open state, so that the user can experience a better sense of operation of the mechanism.

Refer to FIG. 14 to FIG. 16 again. When the first blocker 1282 and the synchronous gear 1281 are in the first clamping structure or the second clamping structure, a plurality of first protrusions 1281*b* of the synchronous gear 1281 and a plurality of first bumps 1282*d* on the first blocker 1282 are in an alternately arranged clamping structure. In other words, the plurality of first protrusions 1281*b* of the synchronous gear 1281 and a groove (formed between two adjacent first bumps 1282*d*) on the first blocker 1282 are in a concave and convex clamping structure. A difference between the lint clamping structure and the second clamping structure lies in that the synchronous gear 1281 rotates relative to the first blocker 1282, and a same first protrusion 1281*b* on the synchronous gear 1281 matches different grooves on the first blocker 1282.

For example, when the first blocker 1282 and the synchronous gear 1281 are in the first clamping structure or the second clamping structure, the rotation end 1262 of the first swing arm 126, the synchronous gear 1281, and the protrusion on the rotation end 1272 of the second swing arm 127 may all be in an alternately arranged clamping structure with the bumps on the first blocker 1282 and the second blocker 1283. In other words, the protrusions on the rotation end 1262 of the first swing arm 126, the synchronous gear 1281, and the rotation end 1272 of the second swing arm 127 may all in a concave and convex clamping structure with the grooves (formed between two adjacent bumps) on the first blocker 1282 and the second blocker 1283. A difference between the first clamping structure and the second clamping structure lies in that the rotation end 1262 of the first swing arm 126, the synchronous gear 1281, and the rotation aid 1272 of the second swing arm 127 rotate relative to the first blocker 1282 and the second blocker 1283, a same protrusion on the rotation card 1262 of the first swing arm 126, the synchronous gear 1281, and the rotation end 1272 of the second swing arm 127 matches different grooves on the first blocker 1282 and the second blocker 1283.

When the folding mechanism 12 is in an intermediate state, the rotation end 1262 of the first swing arm 126, the synchronous gear 1281, and the rotation end 1272 of the second swing arm 127 rotate relative to the first blocker 1282 and the second Mocker 1283. A same protrusion on the rotation end 1262 of the first swing arm 126, the synchronous gear 1281, and the rotation end 1272 of the second swing arm 127 may slide out from one of the grooves on the first blocker 1282 and the second blocker 1283, and then slide into another groove, that is, a “protrusion-groove” fitting structure is changed to a “protrusion-bump” transition structure, and then to a fitting structure of "protrusion-another groove". The first blocker 1282 and the second blocker 1283 are in a position relationship of "close-away-close" relative to the rotation end 1262 of the first swing arm 126, the synchronous gear 1281, and the rotation end 1272 of the second swing arm 127.

Figure 24:
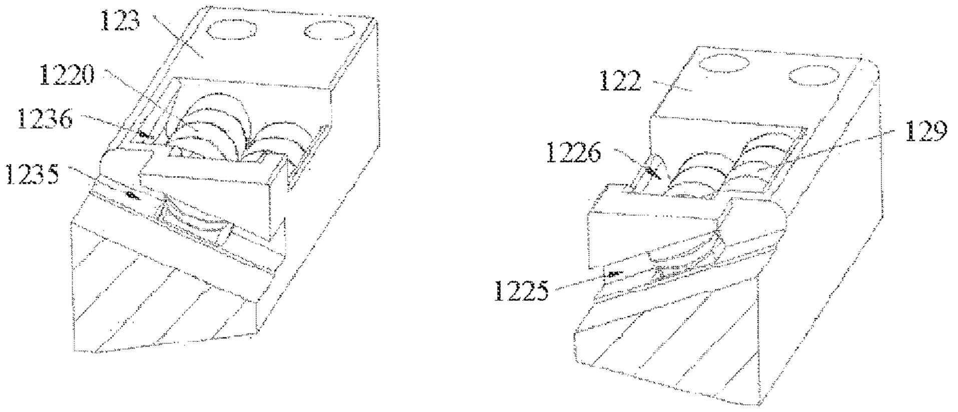
FIG. 24 is a schematic diagram of a partial structure of the structure shown in FIG. 19.

In some embodiments, refer to FIG. 19 and FIG. 24. FIG. 21 is a schematic diagram of a partial structure of the structure shown in FIG. 19. The first stopper 129 of the folding mechanism 12 is mounted in the first mounting groove 1226 of the first fixing bracket 122, and the first stopper 129 may partially extend into the first sliding slot 1225. The second stopper 1220 is mounted in the second mounting groove 1236 of the second fixing bracket 123, and the second stopper 1220 may partially extend into the second sliding slot 1235.

When the folding mechanism 12 is in an open state, the first stopper 129 abuts against the sliding end 1261 of the first swing arm 126, and the second stopper 1220 abuts against the sliding end 1271 of the second swing arm 127. The first stopper 129 and the second stopper 1220 are configured to limit the first swing arm 126 and the second swing arm 127 respectively when the housing apparatus 1 is in the open state, so that the housing apparatus 1 remains in the open state when no relatively large external force is applied, thereby improving user experience. In addition, fitting between the first stopper 129 and the first swing arm 126 and fitting between the second stopper 1220 and the second swing arm 127 can further provide resistance in a process in which the electronic device 100 is unfolded to enter the open state and in a process in which the electronic device 100 is folded to end the open state, so that the user can experience a better sense of operation of the mechanism.

In some other embodiments, a structure and a size of the sliding end 1261 of the first swing arm 126 and a structure and a size of the sliding end 1271 of the second swing arm 127 may be set, so that the first stopper 129 and the second stopper 1220 can also limit the sliding end 1261 of the first swing arm 126 and the sliding end 1271 of the second swing arm 127 when the folding mechanism 12 is in a closed state. In this case, the housing apparatus 1 remains in a folded state without being subjected to a large external force, so as to improve user experience. In addition, fitting between the first stopper 129 and the first swing arm 126 and fitting between the second stopper 1220 and the second swing arm 127 can further provide resistance in a process in which the electronic device 100 is folded to the closed state and in a process in which the electronic device 100 is unfolded to end the closed state, so that the user can experience a better sense of operation of the mechanism. In some other embodiments, the first swing arm 126 may be limited by using two stoppers. For example, one stopper abuts against the sliding end 1261 of the first swing arm 126 when the folding mechanism 12 is in the open state, and the other stopper abuts against the sliding end 1271 of the second swing arm 127 when the folding mechanism 12 is in the closed state. Similarly, the second swing arm 127 is also limited by using two stoppers.

Figure 25:
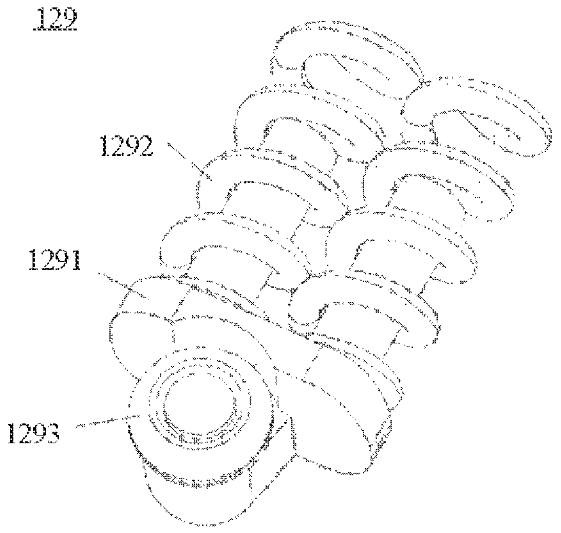
FIG. 25 is a schematic diagram of a structure of a first stopper shown in FIG. 7.
Figure 26:
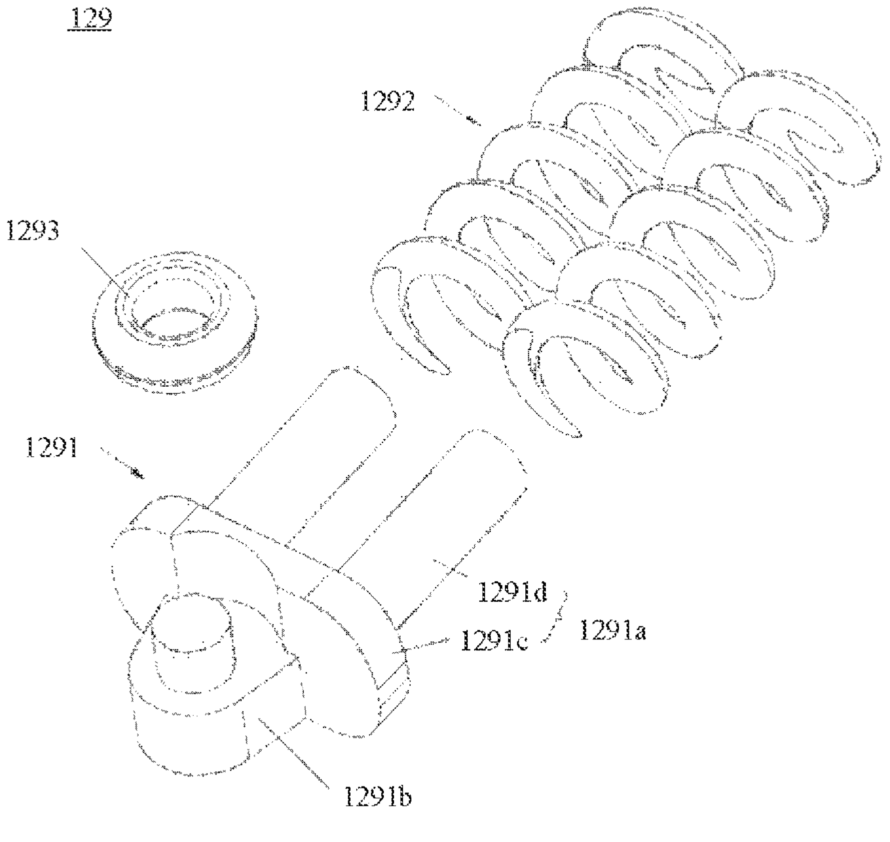
FIG. 26 is a schematic exploded view of a structure of the first stopper shown in FIG. 25.

In some embodiments, FIG. 25 is a schematic diagram of a structure of the first stopper 129 shown in FIG. 7. FIG. 26 is a schematic exploded view of a structure of the first stopper 129 shown in FIG. 25.

The first stopper 129 includes a holder 1291 and a second elastic part 1292. The holder 1291 is of a rigid structure, and is not prone to deformation under an external force. The second elastic part 1292 is of an elastic structure, and is prone to deformation under an external force. The holder 1291 includes a control part 1291*a* and a pressing part 1291*b*. One end of the second elastic part 1292 is mounted on the control part 1291*a* of the holder 1291, and the other end of the second elastic part 1292 is configured to abut against a groove wall of the first mounting groove 1226 (as shown in FIG. 19). For example, the control part 1291*a* may include a plate body 1291*c* and a guide post 1291*d* fastened on one side of the plate body 1291*c*, the pressing part 1291*b* is fastened on the other side of the plate body 1291*c* and there may be one or more guide posts 1291*d*. The second elastic part 1292 may be a spring, a quantity of springs corresponds to a quantity of guide posts 1291*d*, and the spring may be sleeved on the guide post 1291*d*. What the first housing 11 and the second housing 13 are in an open state, the pressing part 1291*b* of the holder 1291 abuts against the sliding end 1261 of the first swing arm 126.

In this embodiment, the second elastic part 1292 of the first stopper 129 can deform under an external force, so that the first stopper 129 can move relative to the sliding end 1261 of the first swing arm 126, thereby improving reliability of limiting between the first stopper 129 and the sliding end 1261 of the first swing arm 126.

The first stopper 129 may further include a buffer 1293, and the buffer 1293 is mounted on the pressing part 1291*b* of the holder 1291. The buffer 1293 may be made of a material (for example, rubber) with small stiffness, so that when being subjected to an external force, the buffer 1293 can absorb an impact force through deformation, thereby implementing buffering. Because the buffer 1293 is sleeved on the pressing part 1291*b* of the holder 1291, the fast stopper 129 abuts against the sliding end 1261 of the first swing arm 126 by using the buffer 1293 having a buffer function. This helps reduce a risk of wear of the holder 1291 of the first stopper 129 and the sliding end 1261 of the first swing arm 126 in a long-time relative movement process, improve limiting reliability of the stopper 129, and improve reliability of the folding mechanism 12.

A structure of the second stopper 1220 may be the same as a structure of the first stopper 129, so as to simplify material types of the housing apparatus 1 and reduce costs. A specific structure of the second stopper 1220 is not described in detail in this embodiment.

It may be understood that the foregoing embodiment shows an implementation structure of the first stopper 129 by using an example. The first stopper 129 in this embodiment of this application may also have another structure, for example, an elastic rubber block. This is not strictly limited in this application.

Figure 27:
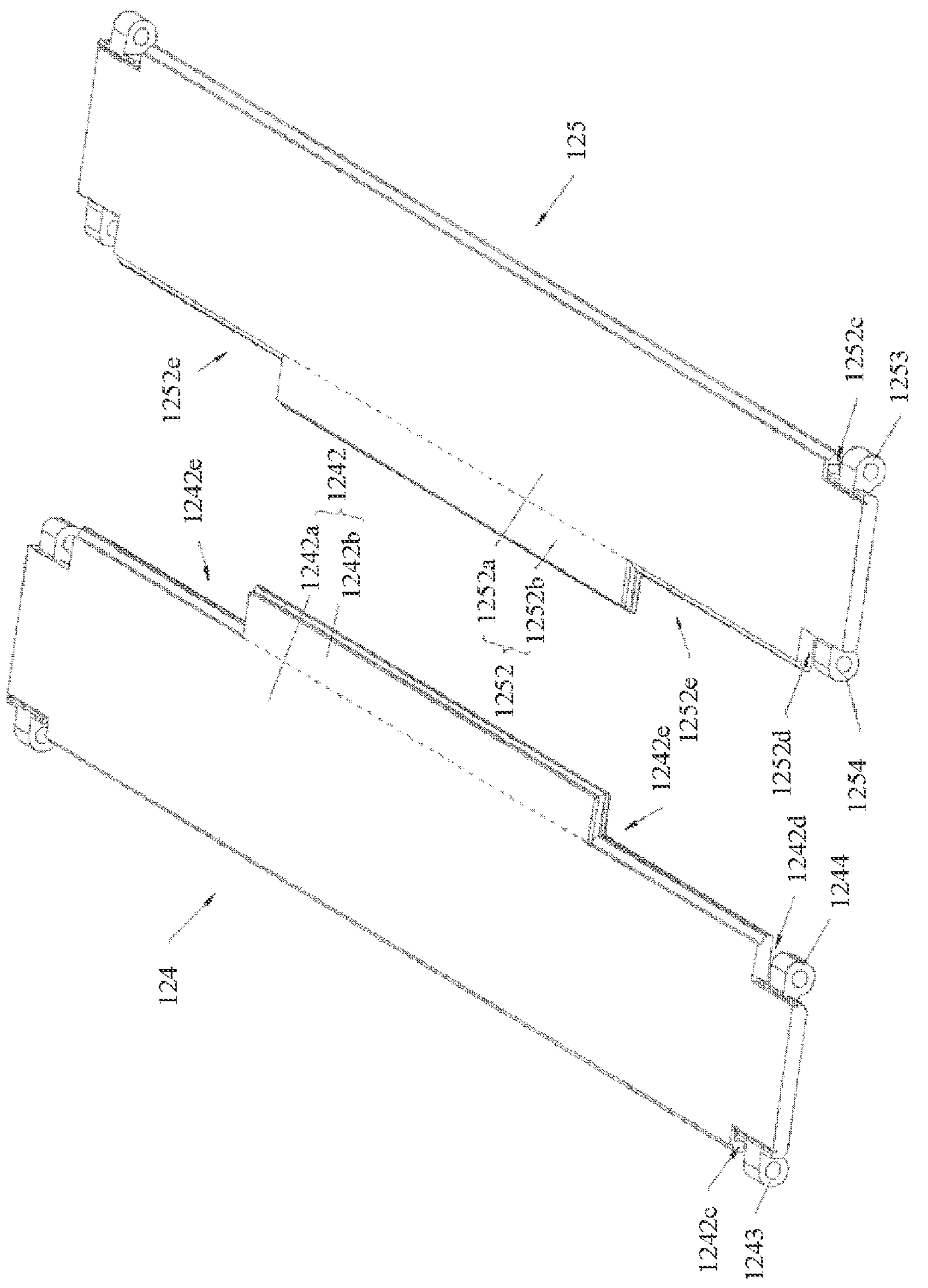
FIG. 27 is a schematic diagram of structures of a first support plate and a second support plate shown in FIG. 7.

In some embodiments, FIG. 27 is a schematic diagram of structures of the first support plate 124 and the second support plate 125 shown in FIG. 7. The first support plate 124 includes a first plate body 1242, a first rotation part 1243, and a second rotation part 1244. The first rotation part 1243 and the second rotation part 1244 are fastened on the first plate body 1242 in a mutually spaced manner. Both the first rotation part 1243 and the second rotation part 1244 may be provided with a hinge hole each. A quantity of first rotation parts 1243 may be the same as or different from a quantity of second rotation parts 1244. For example, there may be two first rotation parts 1243, and the two first rotation parts 1243 may be fastened at the top and the bottom of the first plate body 1242 respectively There may be two second rotation parts 1244, and the two second rotation parts 1244 may be fastened at the top and the bottom of the first plate body 1242 respectively.

In some other embodiments, there may alternatively be one or three or more first rotation parts 1243, and/or one or three or more second rotation parts 1244. The first support plate 124 may be an integrally formed mechanical part, or may be assembled to form an integrated mechanical part. In this embodiment of this application, A and/or B may include three solutions: solution A, solution B, and solutions A and B.

For example, the first plate body 1242 includes a first body part 1242*a* and a first extension part 1242*b*, and the first extension part 1242*b* is fastened on one side of the first body part 1242*a* and protrudes relative to the first body part 1242*a*. A first notch 1242*c* is formed on a side that is of the first body part 1242*a* and that is away from the first extension part 1242*b*, and the first rotation part 1243 is located in the first notch 1242*c* and fastened to the first body part 1242*a*. A quantity and positions of first notches 1242*c* correspond to a quantity and positions of first rotation parts 1243. A second notch 1242*d* is formed on a side that is of the first body part 1242*a* and that is close to the first extension part 1242*b*, and the second rotation part 1244 is located in the second notch 1242*d* and fastened to the first body part 1242*a*. A quantity and positions of second notches 1242*d* correspond to a quantity and positions of second rotation parts 1244. Both the first body part 1242*a* and the first extension part 1242*b* may be in a long strip shape.

In some embodiments, the second support plate 125 includes a second plate body 1252, a third rotation part 1253, and a fourth rotation part 1254, and the third rotation part 1253 and the fourth rotation part 1254 are fastened on the second plate body 1252 in a mutually spaced manner. Both the third rotation part 1253 and the fourth rotation part 1254 are provided with a hinge hole each. A quantity of fourth rotation parts 1254 may be the same as or different from a quantity of third rotation parts 1253. For example, there may be two third rotation parts 1253, and the two third rotation parts 1253 may be fastened at the top and the bottom of the second plate body 1252 respectively. There may be two fourth rotation parts 1254, and the two fourth rotation parts 1254 may be fastened at the top and the bottom of the second plate body 1252 respectively. In some other embodiments, there may alternatively be one or three or more third rotation parts 1253, and/or one or three or more fourth rotation shafts 1254. The second support plate 125 may be an integrally formed mechanical part or may be assembled to form an integrated mechanical part.

For example, the second plate body 1252 includes a second body part 1252*a* and a second extension part 1252*b*, and the second extension part 1252*b* is fastened on one side of the second body part 1252*a* and protrudes relative to the second body part 1252*a*. A third notch 1252*c* is formed on a side that is of the second body part 1252*a* and that is away from the second extension part 1252*b*, and the third rotation part 1253 is located in the third notch 1252*c* and fastened to the second body part 1252*a*. A quantity and positions of third notches 1252*c* correspond to a quantity and positions of third rotation path 1253. A fourth notch 1252*d* is formed on a side that is of the second body part 1252*a* and that is close to the second extension part 1252*b*, and the fourth rotation part 1254 is located in the fourth notch 1252*d* and fastened to the second body part 1252*a*. A quantity and positions of fourth notches 1252*d* correspond to a quantity and positions of fourth rotation parts 1254. Both the second body part 1252*a* and the second extension part 1252*b* may be in a long strip shape.

Figure 28:
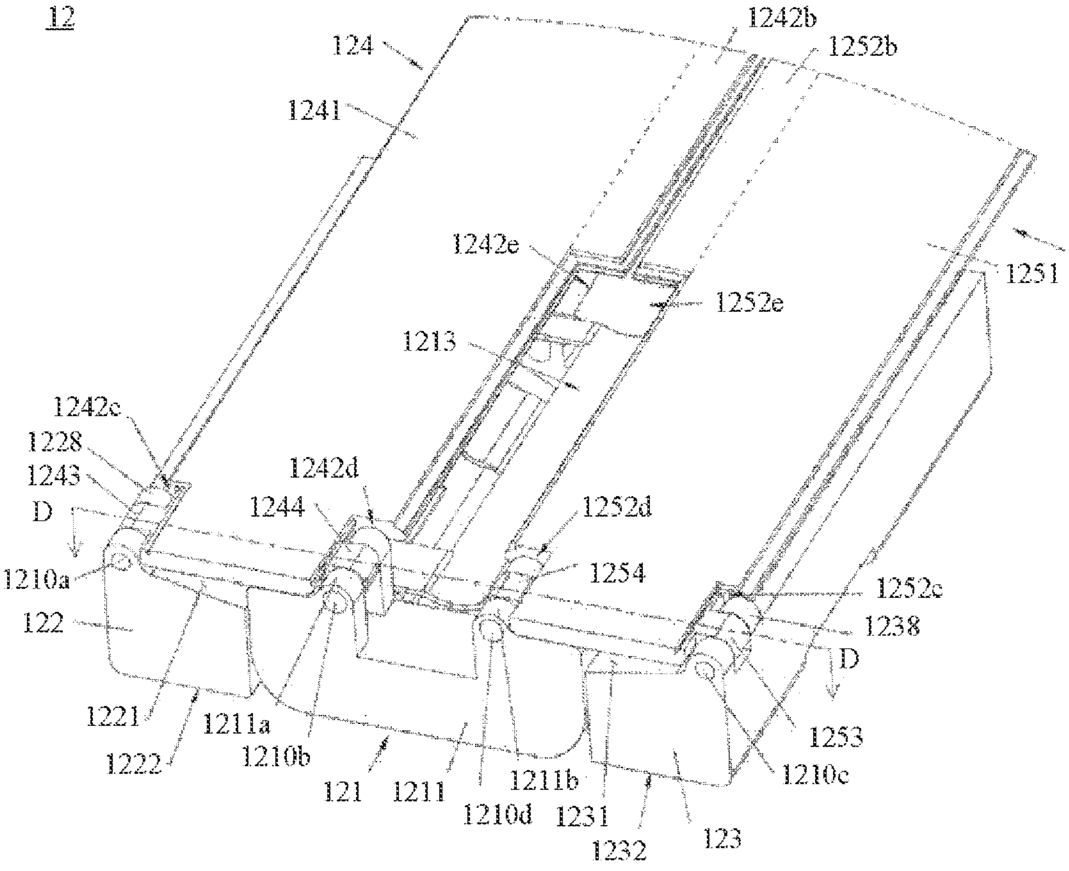
FIG. 28 is a schematic diagram of a partial structure of a folding mechanism shown in FIG. 4.
Figure 29:
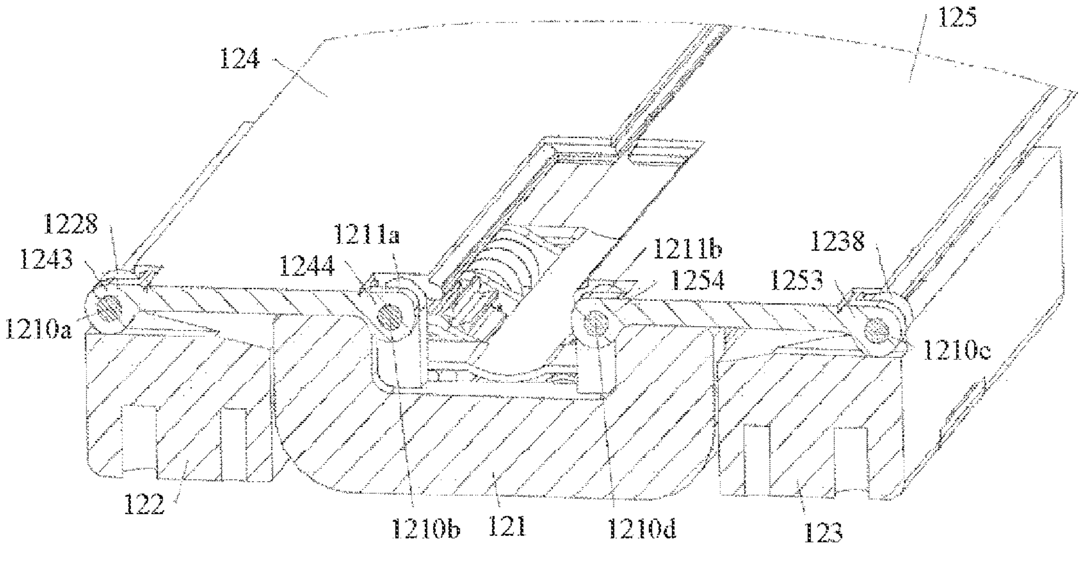
FIG. 29 is a schematic diagram of the structure shown in FIG. 28 when cut along D-D.

In some embodiments, FIG. 28 is a schematic diagram of a partial structure of the folding mechanism 12 shown in FIG. 4. FIG. 29 is a schematic diagram of the structure shown in FIG. 28 when cut along D-D.

The first support plate 124 is rotatably connected to the first fixing bracket 122, and is rotatably connected to the middle housing 121. The first rotation part 1243 of the first support plate 124 is rotatably connected to the first fixing bracket 122, and the second rotation part 1244 is rotatably connected to the middle housing 121. The first hinge 1210*a* is inserted into the first rotation part 1243 and the first fixing bracket 122, and the second hinge 1210*b* is inserted into the second rotation part 1244 and the middle housing 121. For example, the second hinge 1210*b* is inserted into the first convex part 1211*a* of the middle housing 121, the first convex part 1211*a* is embedded into the first support plate 124, and the first convex part 1211*a* may be at least partially located in the second notch 1242*d* of the first support plate 124. For example, the first hinge 1210*a* is inserted into the first connection bump 1228 of the first fixing bracket 122, the first connection bump 1228 is embedded into the first support plate 124, and the first connection bump 1228 may be at least partially located in the first notch 1242*c* of the first support plate 124.

The second support plate 125 is rotatably connected to the second fixing bracket 123, and is rotatably connected to the middle housing 121. The third rotation part 1253 of the second support plate 125 is rotatably connected to the second fixing bracket 123, and the fourth rotation part 1254 is rotatably connected to the middle housing 121. The third hinge 1210*c* is inserted into the third rotation part 1253 and the second fixing bracket 123, and the fourth hinge 1210*d* is inserted into the fourth rotation part 1254 and the middle housing 121. For example, the fourth hinge 1210*d* is inserted into the second convex part 1211*b* of the middle housing 121, and the second convex part 1211*b* is embedded into the second support plate 125. The second convex part 1211*b* may be at least partially located in the fourth notch 1252*d* of the second support plate 125. For example, the third hinge 1210*c* is inserted into the second connection bump 1238 of the second fixing bracket 123, the second connection bump 1238 is embedded into the second support plate 125, and the second connection bump 1238 may be at least partially located in the third notch 1252*c* of the second support plate 125.

In this embodiment, positions of hinge holes of the first convex part 1211*a* and the second convex part 1211*b* of the middle housing 121, a position of a hinge hole of the second rotation part 1244 of the first support plate 124, and a position of a hinge hole of the fourth rotation part 1254 of the second support plate 125 are designed, so that the middle housing 121 may be rotatably connected to the first support plate 124 through the second hinge 1210*b*, and the middle housing 121 may be rotatably connected to the second support plate 125 through the fourth hinge 1210*d*, that is, the middle housing 121, the first support plate 124, and the second support plate 125 may be rotatably connected by using a physical shaft. Therefore, a connection relationship is reliable, and an undesirable movement during rotation is small, so that a rotation action is accurate and stable.

In addition, based on an embedding relationship between the first convex part 1211*a* and the first support plate 124, an embedding relationship between the first connection bump 1228 and the first support plate 124, an embedding relationship between the second convex part 1211*b* and the second support plate 125, and an embedding relationship between the second connection bump 1238 and the second support plate 125, the first support plate 124, the first fixing bracket 122, and the middle housing 121 can limit each other in a direction parallel to a rotation center, and the second support plate 125, the second fixing bracket 123, and the middle housing 121 can limit each other in a direction parallel to the rotation center. This improves reliability of a rotatable connection structure of the folding mechanism 12.

In some other embodiments, the first support plate 124 may alternatively be rotatably connected to the first fixing bracket 122 through a virtual shaft the first support plate 124 may be rotatably connected to the middle housing 121 through a virtual shall, the second support plate 125 may be rotatably connected to the second fixing bracket 123 through a virtual shaft, and the second support plate 125 may be rotatably connected to the middle housing 121 through a virtual shaft. The rotatable connection using the virtual shaft can reduce design difficulty of a connection structure, so that an overall thickness of the connection structure is small.

For example, the first support plate 124 may be provided with an arc-shaped arm, the middle housing 121 may be provided with an arc-shaped groove, and the arc-shaped arm is mounted in the arc-shaped shape. The first support plate 124 is rotatably connected to the middle housing 121 by using a virtual shaft through relative movement of the am-shaped groove and the arc-shaped arm. The second support plate 125 may be provided with an arc-shaped arm, the middle housing 121 may be provided with an arc-shaped groove, and the arc-shaped arm is mounted in the am-shaped groove. The second support plate 125 is rotatably connected to the middle housing 121 by using a virtual shaft through relative movement of the arc-shaped groove and the arc-shaped arm. In the four rotatable connection structures between the first support plate 124 and the first fixing bracket 122, between the first support plate 124 and the middle housing 121, between the second support plate 125 and the second fixing bracket 123, and between the second support plate 125 and the middle housing 121, the four rotatable connection structures may all be connected by using a physical shaft, or may all be connected by using a virtual shaft, or may be connected by using both a physical shaft and a virtual shaft. This is not strictly limited in this application.

In some embodiments, as shown in FIG. 28, when the folding mechanism 12 is in an open state, that is, when the first housing 11 and the second housing 13 are in the open state, the second rotation part 1244 and the fourth rotation part 1254 are located between the first rotation part 1243 and the third rotation part 1253. The first support plate 124 covers a part of the inner space 1213 of the middle housing 121, and the second support plate 125 covers a part of the inner space 1213 of the middle housing 121. In a process in which the first housing 11 and the second housing 13 are unfolded relative to each other, that is, in a process in which the folding mechanism 12 is unfolded, the first extension part **1242*b* of the first support plate 124 is close to the second extension part 1252*b* of the second support plate 125**.

In this embodiment, when the first housing 11 and the second housing 13 are in the open state, the first support plate 124 and the second support plate 125 are close to each other, and a distance between the support surface 1241 of the first support plate 124 and the support surface 1251 of the second support plate 125 is small. The folding mechanism 12 may provide relatively complete planar support for a bending portion 22 of the flexible display 2 in the open state by using a two-plate structure.

For example, when the first housing 11 and the second housing 13 are unfolded relative to each other to the open state, the first extension part **1242*b* is spliced with the second extension part 1252*b*, that is, the first support plate 124 is spliced with the second support plate 125. In this case, the support surface 1241 of the first support plate 124 and the support surface 1251 of the second support plate 125 may be spliced to form a bending region support surface. The folding mechanism 12 of the housing apparatus 1 can fully support the bending portion 22 of the flexible display 2 in the open state by using the bending region support surface (refer to FIG. 3), so that the flexible display 2 is not easily dented under pressing of the user, thereby improving a service life and reliability of the flexible display 2**.

A case in which the first extension part **1242*b* and the second extension part 1252*b* are spliced may include a case in which the first extension part 1242*b* and the second extension part 1252*b* are connected to each other and there is no gap between the first extension part 1242*b* and the second extension part 1252*b*, or may include a case in which the first extension part 1242*b* and the second extension part 1252*b* are close to each other and there is a small gap between the first extension part 1242*b* and the second extension part 1252*b*. When there is a small gap between the first extension part 1242*b* and the second extension part 1252*b*, a user presses a region that is of the flexible display 2 and that corresponds to the gap, without forming an obvious dent in the corresponding region of the flexible display 2. Therefore, the bending region support surface can provide strong support for the flexible display 2**.

In some embodiments, refer to FIG. 27 and FIG. 28. The first support plate 124 forms avoidance notches **1242*e* on two sides of the fast extension part 1242*b*, and the second support plate 125 forms avoidance notches 1252*e* on two sides of the second extension part 1252*b*. The avoidance notches (1242*e* and 1252*e*) are used to avoid interference between the first support plate 124 and the second support plate 125, and a partial structure of the middle housing 121 in a process of moving the housing apparatus 1, that is, to implement avoidance, thereby improving reliability of movement between the folding mechanism 12 and the housing apparatus 1. In this embodiment, when the first housing 11 and the second housing 13 are in the open state, the avoidance notch 1242*e* of the first support plate 124 and the avoidance notch 1252*e* of the second support plate 125** are combined, and the bending region support surface is a special-shaped surface.

A size and a shape of a component of the folding mechanism 12 may be optimized, to reduce an area of the avoidance notches (**1242*e* and 1252*e*) as much as possible, so that a region that is of the flexible display 2 and that corresponds to the avoidance notches (1242*e* and 1252*e*) may be slightly dented under pressing of the user; instead of forming an obvious dent. In addition, in some embodiments, a support plate or a stiffening plate that can be bait and has specific structural strength may be disposed on a side that is of the flexible display 2 and that faces the housing apparatus 1, and the support plate or the stiffening plate covers at least the avoidance notch 1242*e* of the first support plate 124 and the avoidance notch 1252*e* of the second support plate 125, to improve anti-pressing strength of the flexible display 2**.

In this application, when the folding mechanism 12 is in the open state, the first support plate 124 is spliced with the second support plate 125. A case in which the first support plate 124 is spliced with the second support plate 125 may include but is not limited to the following scenario: One part of the first support plate 124 and one part of the second support plate 125 are connected to each other, without a gap between the two, and a notch or a gap may be formed between the other part of the first support plate 124 and the other part of the second support plate 125; or the first support plate 124 and the second support plate 125 are connected to each other, without a gap between the two, or one part of the first support plate 124 and one part of the second support plate 125 are close to each other, with a small gap between the parts close to each other, and a notch or a gap may be formed between the other part of the first support plate 124 and the other part of the second support plate 125; or the first support plate 124 and the second support plate 125 are close to each other, with a small gap between the two. When there is a small gap between the first support plate 121 and the second support plate 125, or there is a small gap between a part of the first support plate 124 and a part of the second support plate 125, a user presses a region that is of the flexible display 2 and that corresponds to the gap, without forming an obvious dent in the corresponding region of the flexible display 2. The bending region support surface can provide strong support for the flexible display 2.

When there is a notch or a gap between the first support plate 124 and the second support plate 125, or there is a notch or a gap between a part of the first support plate 124 and a part of the second support plate 125, an area of the notch or the gap may be reduced as much as possible by optimizing a size and a shape of a component of the folding mechanism 12, so that a region that is of the flexible display 2 and that corresponds to the notch or the gap may be slightly indented under pressing of the user, instead of forming an obvious dent. In addition, in some embodiments, a support plate or a stiffening plate that can be bent and has specific structural strength may be disposed on a side that is of the flexible display 2 and that faces the housing apparatus 1, and the support plate or the stiffening plate covers at least the notch or the gap between the first support plate 124 and the second support plate 125, to improve anti-pressing strength of the flexible display 2.

Figure 30:
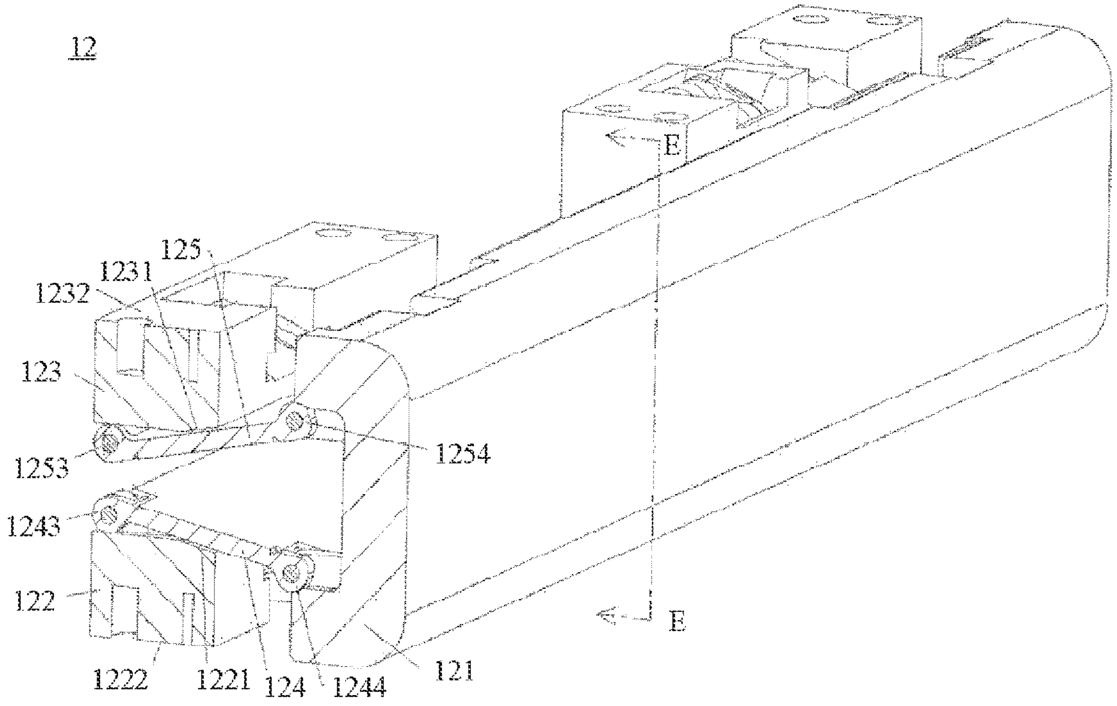
FIG. 30 is a schematic diagram of the structure shown in FIG. 29 in another use state.

In some embodiments, FIG. 30 is a schematic diagram of the structure shown in FIG. 29 in another use state. FIG. 30 corresponds to a closed state.

When the folding mechanism 12 is in the closed state, that is, when the first housing 11 and the second housing 13 are in the closed state, a spacing between the first rotation part 1243 and the third rotation part 1253 is less than a spacing between the second rotation part 1244 and the fourth rotation part 1254. In this case, the first support plate 124 and the second support plate 125 form display accommodating space through automatic avoidance. The display accommodating space gradually increases in a direction close to the middle housing 121.

In this embodiment, positions of the first rotation part 1243 and the second rotation part 1244 restrict a position of the first support plate 124, and positions of the third rotation part 1253 and the fourth rotation part 1254 restrict a position of the second support plate 125. The first rotation part 1243 is rotatably connected to the first fixing bracket 122, the third rotation part 1253 is Notably connected to the second fixing bracket 123, and the second rotation part 1244 and the third rotation part 1253 are rotatably connected to the middle housing 121, therefore, the housing apparatus 1 can control relative positions of the first support plate 124 and the second support plate 125 by setting positions of a structure of the middle housing 121, the first fixing bracket 122, and the second fixing bracket 123 that move relative to the middle housing 121. In this case, the first support plate 124 and the second support plate 125 can be unfolded in the open state, thereby providing flat and strong support for the flexible display 2. In the closed state, the first support plate 124 and the second support plate 125 form display accommodating space through automatic avoidance to accommodate the flexible display 2, so that a folding action performed by the housing apparatus 1 on the flexible display 2 is stable and a squeezing force is small. This helps reduce a risk that the flexible display 2 is damaged due to excessive squeezing of the folding mechanism 12, and makes the flexible display 2 more reliable.

Figure 31:
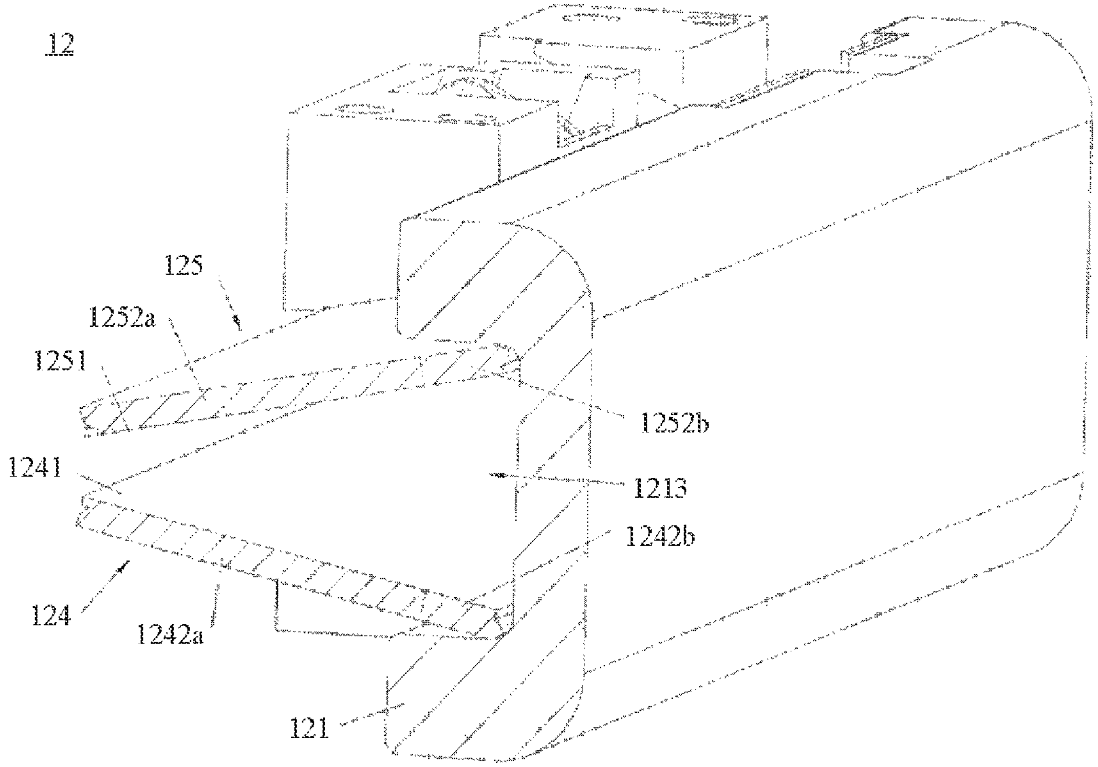
FIG. 31 is a schematic diagram of the structure shown in FIG. 30 when cut along E-E.

In some embodiments, refer to FIG. 30 and FIG. 31. FIG. 31 is a schematic diagram of the structure shown in FIG. 30 when cut along E-E.

In a folding process of the folding mechanism 12, that is, in a process in which the first housing 11 and the second housing 13 are folded relative to each other, the first extension part **1242*b* and the second extension part 1252*b* are away from each other, and the first body part 1242*a* and the second body part 1252*a* are close to each other. When the folding mechanism 12 is in a closed state, that is, when the first housing 11 and the second housing 13 are folded relative to each other to the closed state, the first support plate 124 and the second support plate 125 are approximately V-shaped. The support surface 1241 of the first support plate 124 and the support surface 1251 of the second support plate 125 are disposed opposite to each other, and are away from each other in a direction close to the middle housing 121**.

The first support plate 124 partially extends into the inner space 1213 of the middle housing 121, and the second support plate 125 partially extends into the inner space 1213 of the middle housing 121. For example, the first extension part **1242*b* of the first support plate 124 extends into the inner space 1213 of the middle housing 121, and the first body part 1242*a* may partially extend into the inner space 1213 of the middle housing 121, or may not extend into the inner space 1213 of the middle housing 121. The second extension part 1252*b* of the second support plate 125 extends into the inner space 1213 of the middle housing 121, and the second body pert 1252*a* may partially extend into the inner space 1213 of the middle housing 121, or may not extend into the inner space 1213 of the middle housing 121**.

In this embodiment, a part of the space between the first support plate 124 and the second support plate 125 in the inner space 1213 of the middle housing 121 is released, to form a part of display accommodating space, and the flexible display 2 may partially extend into the inner space 1213 of the middle housing 121, thereby improving space utilization. In this way; components of the electronic device 100 are arranged more compactly, thereby facilitating miniaturization of the electronic device 100.

In some embodiments, refer to FIG. 29 again. The top surface 1221 of the first fixing bracket 122 faces the first support plate 124, and the bottom surface 1222 of the first fixing bracket 122 is away from the first support plate 124. The top surface 1231 of the second fixing bracket 123 faces the second support plate 125, and the bottom surface 1232 of the second fixing bracket 123 is away from the second support plate 125. When the folding mechanism 12 is in an open state, the bottom surface 1222 of the first fixing bracket 122 and the bottom surface 1232 of the second fixing bracket 123 face in a same direction, and the two may be disposed in parallel or flush with each other. The top surface 1221 of the first fixing bracket 122 tilts relative to the first support plate 124, and a gap is formed between the top surface 1221 of the first fixing bracket 122 and the first support plate 124. The top surface 1231 of the second fixing bracket 123 tilts relative to the second support plate 125, and a gap is formed between the top surface 1231 of the second fixing bracket 123 and the second support plate 125. A side end of the otter cover 1211 of the middle housing 121 may abut against and support the first support plate 124 and the second support plate 125 when the folding mechanism 12 is in the open state. Therefore, the outer cover 1211 can stop the first support plate 124 and the second support plate 125, to prevent the housing apparatus 1 from being over-folded during unfolding, thereby reducing a force exerted on the flexible display 2 and improving reliability of the flexible display 2 and the electronic device 100. The outer cover 1211 can further increase support strength of the first support plate 124 and the second support plate 125, to provide a more reliable support structure for the flexible display 2.

In some embodiments, refer to FIG. 30 again. When the folding mechanism 12 is in a closed state, the bottom surface 1222 of the first fixing bracket 122 and the bottom surface 1232 of the second fixing bracket 123 face in opposite directions, and the two may be parallel to each other. The top surface 1221 of the first fixing bracket 122 and the top surface 1231 of the second fixing bracket 123 face each other, and the top surface 1221 of the first fixing bracket 122 and the top surface 1231 of the second fixing bracket 123 are inclined relative to each other to form a "V" shape, so that an appropriate space is formed between the first fixing bracket 122 and the second fixing bracket 123. The first support plate 124 and the second support plate 125 can be accommodated in the space, and display accommodating space is formed between the first support plate 124 and the second support plate 125. For example, when the folding mechanism 12 is in the closed state, the top surface 1221 of the first fixing bracket 122 may abut against and support the first support plate 124, and the top surface 1231 of the second fixing bracket 123 may abut against and support the second support plate 125.

Figure 32:
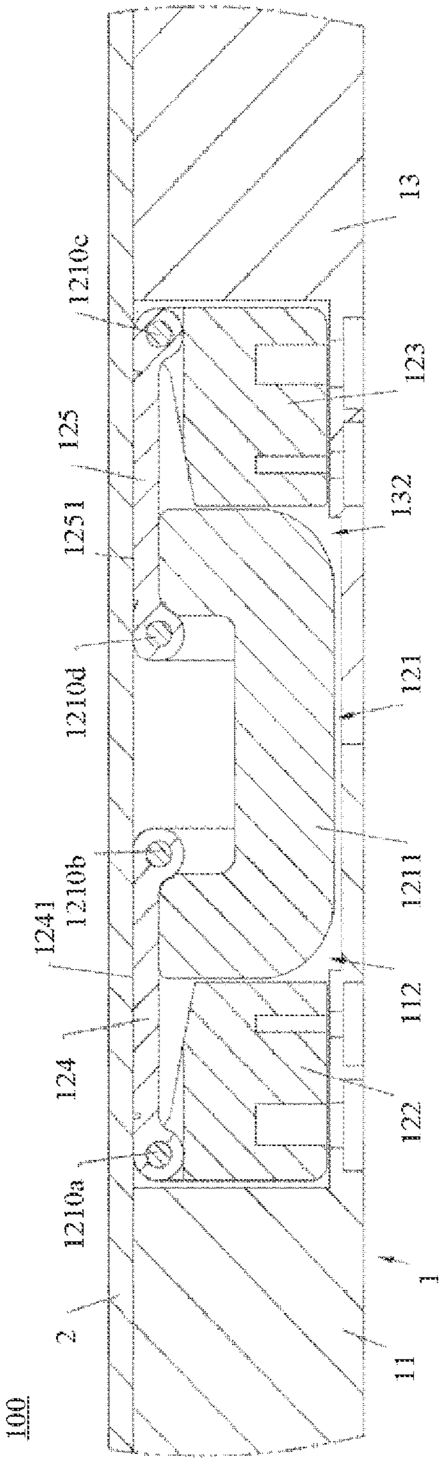
FIG. 32 is a schematic diagram of a structure of the electronic device shown in FIG. 1 when cut along F-F.
Figure 33:
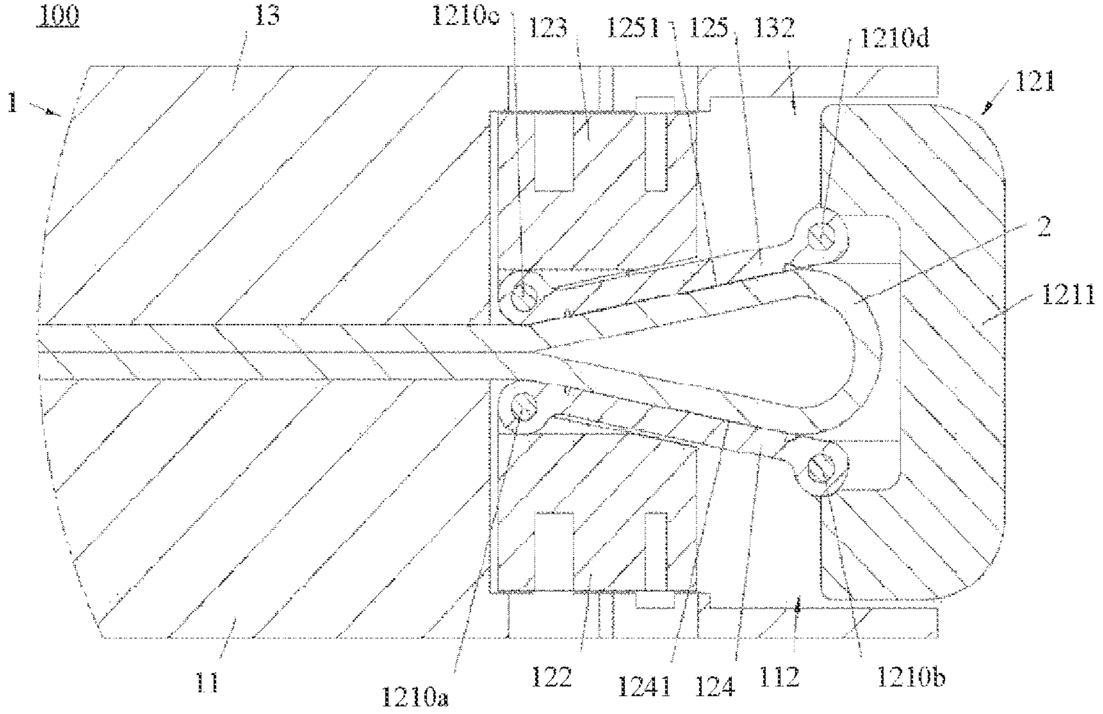
FIG. 33 is a schematic diagram of the structure shown in FIG. 32 in another use state.

In some embodiments, refer to FIG. 32 and FIG. 33. FIG. 32 is a schematic diagram of a structure of the electronic device 100 shown in FIG. 1 when cut along F-F. FIG. 33 is a schematic diagram of the structure shown in FIG. 32 in another use state. The electronic device 100 shown in FIG. 32 is in an open state, and the electronic device 100 shown in FIG. 33 is in a closed state.

The first support plate 124 is rotatably connected to the first fixing bracket 122 and is rotatably connected to the middle housing 121, and the second support plate 125 is rotatably connected to the second fixing bracket 123 and is rotatably connected to the middle housing 121. The first support plate 124 may be rotatably connected to the first fixing bracket 122 through the first hinge 1210*a*, and rotatably connected to the middle housing 121 through the second hinge 1210*b*. The second support plate 125 may be rotatably connected to the second fixing bracket 123 through the third hinge 1210*c*, and rotatably connected to the middle housing 121 through the fourth hinge 1210*d*.

The first housing 11, the first support plate 124, the second support plate 125, and the second housing 13 jointly carry the flexible display 2. As shown in FIG. 32, when the first housing 11 and the second housing 13 are unfolded relative to each other to an open state, the support surface 1241 of the first support plate 124 is flush with the support surface 1251 of the second support plate 125. The flexible display 2 is in an unfolded state. As shown in FIG. 33, when the first housing 11 and the second housing 13 are folded relative to each other to a closed state, the support surface 1241 of the first support plate 124 and the support surface 1251 of the second support plate 125 are disposed opposite to each other, and are away from each other in a direction close to the middle housing 121. The flexible display 2 is in a folded state, and a bending portion of the flexible display 2 is in a water drop shape.

In this embodiment, the electronic device 100 uses the housing apparatus 1 to inclement screen inward folding, and the electronic device 100 may be bent. Refer to FIG. 20, FIG. 22, FIG. 32, and FIG. 33. The first swing arm 126 is rotatably connected to the middle housing 121 and is slidably connected to the first fixing bracket 122, to form a connecting rod slider structure, and the fast support plate 124 is rotatably connected to the middle housing 121 and is rotatably connected to the first fixing bracket 122, to form a connecting rod structure. The second swing arm 127 is rotatably connected to the middle housing 121 and is slidably connected to the second fixing bracket 123, to form a connecting rod slider structure. The second support plate 125 is rotatably connected to the middle housing 121, and is rotatably connected to the second fixing bracket 123, to form a connecting rod structure. The folding mechanism 12 implements a connection between the housing and the middle housing 121 by using the connecting rod slider structure and the connecting rod structure. The folding mechanism has a few constituent parts with a simple fitting relationship and simple fitting locations. The constituent components are easy to manufacture and assemble, thereby facilitating mass production. In addition, because the middle housing 121 is associated with the first fixing bracket 122 by using the first swing arm 126 and the first support plate 124, and is associated with the second fixing bracket 123 by using the second swing arm 127 and the second support plate 125, the folding mechanism 12 has an accurate moving trade, and a better mechanism stretching-resistance capability and mechanism squeezing-resistance capability.

As shown in FIG. 32 and FIG. 33, two ends of the first support plate 124 are rotatably connected to the first fixing bracket 122 and the middle housing 121 respectively, and two ends of the second support plate 125 arm rotatably connected to the second fixing bracket 123 and the middle housing 121 respectively. Therefore, moving tracks of the first support plate 124 and the second support plate 125 are restricted by other components of the fielding mechanism 12, in a process in which the first housing 11 and the second housing 13 are folded relative to each other, the moving tracks of the first support plate 124 and the second support plate 125 are accurate. Therefore, display accommodating space can be formed by automatically avoiding in a closed state, and the display accommodating space is accurately controlled, so that a folding action performed by the housing apparatus 1 on the flexible display 2 is stable, and a squeezing force is small. This helps reduce a risk that the flexible display 2 is damaged due to excessive squeezing of the folding mechanism 12, and makes the flexible display 2 more reliable.

As shown in FIG. 33, when the first housing 11 and the second housing 13 are folded relative to each other to a closed state by using the folding mechanism 12, the first housing 11 and the second housing 13 can be totally closed, and there is no gap or a small gap between the first housing 11 and the second housing 13. In this way, the housing apparatus 1 implements self-shielding became of a complete appearance. The electronic device 100 to which the housing apparatus 1 is applied has a complete appearance, which helps improve product reliability and user experience, and also helps improve waterproof and chest-proof performance of the electronic device 100.

As shown in FIG. 32 and FIG. 33, a rotatable connection relationship between the first support plate 124 and the first fixing bracket 122 and the middle housing 121, and a rotatable connection relationship between the second support plate 125 and the second fixing bracket 123 and the middle housing 121 are both implemented by using a physical shaft. The connection relationship is reliable, processing precision is high, and an undesirable movement during rotation is small, so that a rotation action is accurate and stable. The folding mechanism 12 may be designed based on a structure and a si ae of the support plate, the middle housing 121, and the fixing bracket, so that a position of a physical shall (that is, the hinge, the rotatable connecting shaft, and the like) used to implement the rotatable connection relationship is appropriate, thereby avoiding an obvious increase in a thickness of the folding mechanism 12.

As shown in FIG. 32, when the first housing 11 and the second housing 13 are in the open state, the middle housing 121 is partially located in the first fastening groove 112, and is partially located in the second fastening groove 132. The first housing 11 and the second housing 13 cover the outer cover 1211. As shown in FIG. 33, when the first housing 11 and the second housing 13 are in the closed state, the middle housing 121 partially extends out from the first fastening groove 112 and the second fastening groove 132, and the outer cover 1211 is exposed relative to the first housing 11 and the second housing 13. In this embodiment, in a process of switching between the open state and the closed state of the housing apparatus 1, the middle housing 121 is gradually exposed or hidden relative to the first housing 11 and the second housing 13, and the three cooperate with each other to implement back-side self-shielding of the housing apparatus 1 and the electronic device 100. This improves appearance integrity and waterproof and dust-proof performance.

Figure 34:
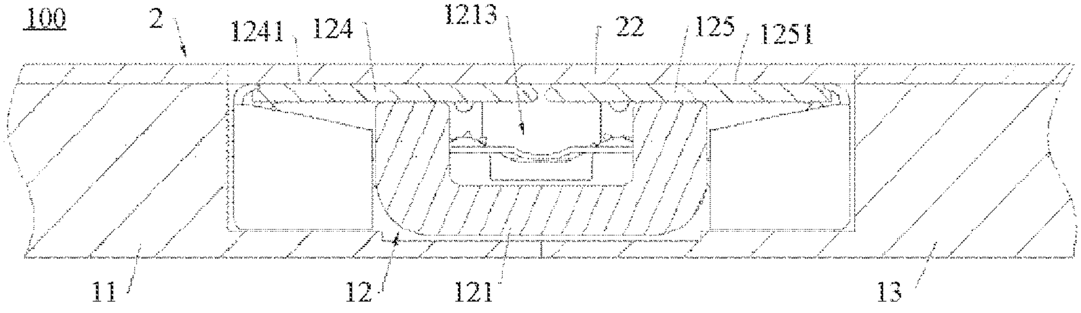
FIG. 34 is a schematic diagram of a structure of the electronic device shown in FIG. 1 when cut along G-G.

In some embodiments, FIG. 34 is a schematic diagram of a structure of the electronic device 100 shown in FIG. 1 when cut along G-G. The electronic device 100 shown in FIG. 34 is in an open state. When the first housing 11 and the second housing 13 are in the open state, the first support plate 124 covers a part of the inner space 1213 of the middle housing 121, and the second support plate 125 covers a part of the inner space 1213. In this case, the first support plate 124 and the second support plate 125 are close to each other, and a distance between the support surface 1241 of the first support plate 124 and the support surface 1251 of the second support plate 125 is small. The folding mechanism 12 may provide relatively complete planar support for the bending portion 22 of the flexible display 2 in the open state by using a two-plate structure. For example, when the housing apparatus 1 is in an open state, the first support plate 124 and the second support plate 125 are spliced, to better provide strong support for the flexible display 2.

Figure 35:
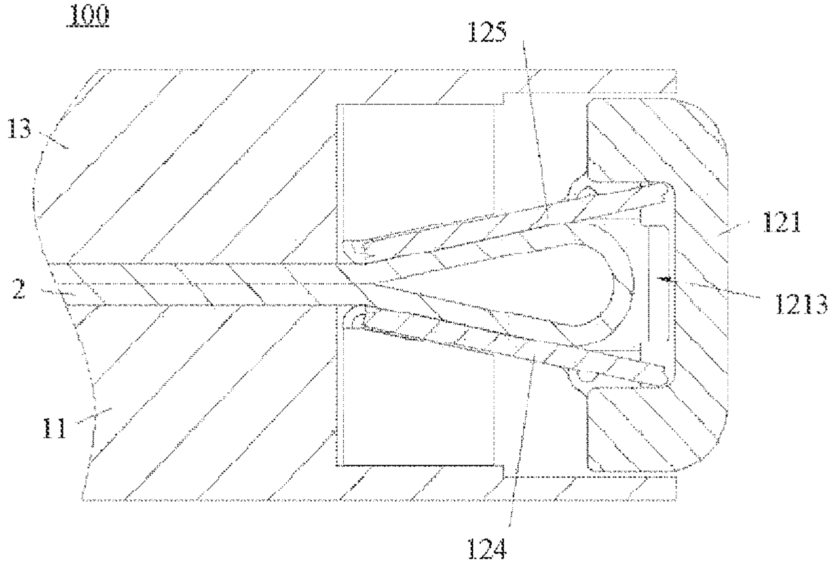
FIG. 35 is a schematic diagram of the structure shown in FIG. 34 in another use state.

In some embodiments, FIG. 3.5 is a schematic diagram of the structure shown in FIG. 34 in another use state. The electronic device 100 shown in FIG. 35 is in a closed state. When the first housing 11 and the second housing 13 are in a closed state, the first support plate 124 partially extends into the inner space 1213 of the middle housing 121, and the second support plate 125 partially extends into the inner space 1213. In this case, a part of the space between the first support plate 124 and the second support plate 125 in the inner space 1213 of the middle housing 121 is released, to fore display accommodating space, and the flexible display 2 may partially extend into the inter space 1213 of the noddle housing 121, thereby improving space utilization. In this way, components of the electronic device 100 are arranged more compactly, thereby facilitating miniaturization of the electronic device 100.

Figure 36:
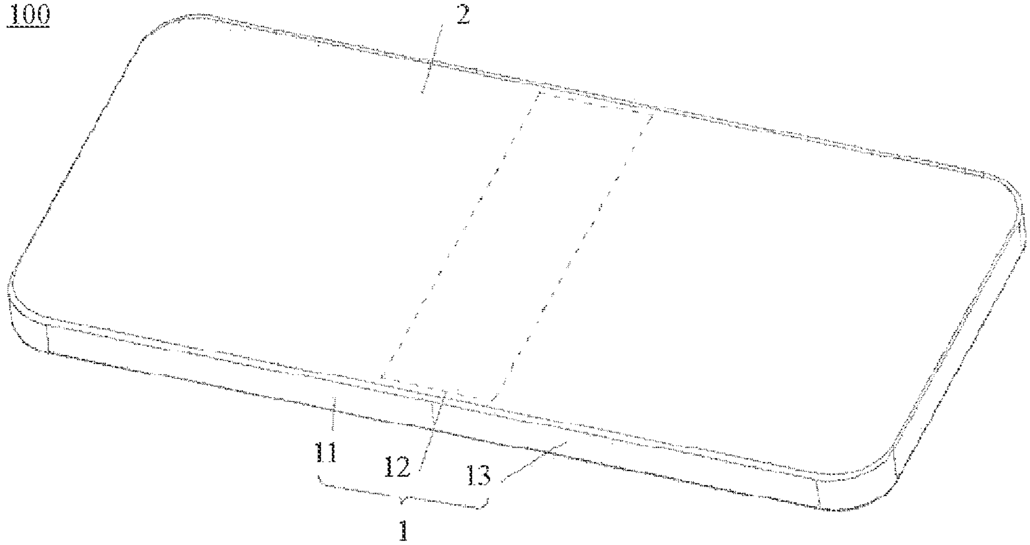
FIG. 36 is a schematic diagram of a structure of an electronic device in an open state in some other embodiments according to an embodiment of this application.
Figure 37:
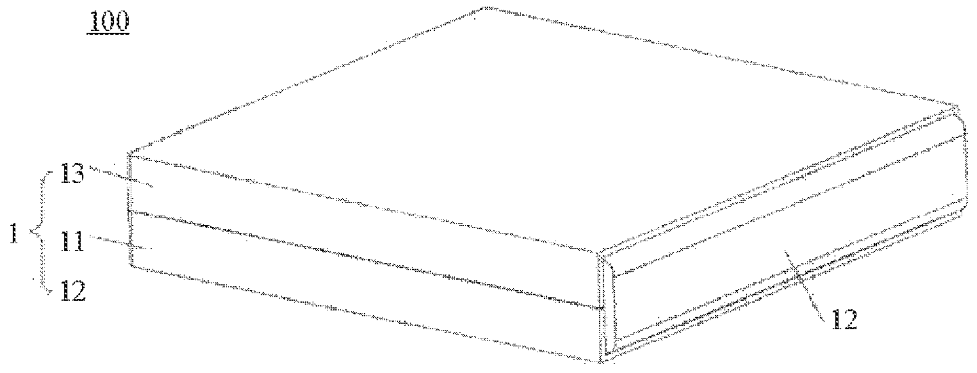
FIG. 37 is a schematic diagram of a structure of the electronic device shown in FIG. 36 in a closed state.
Figure 38:
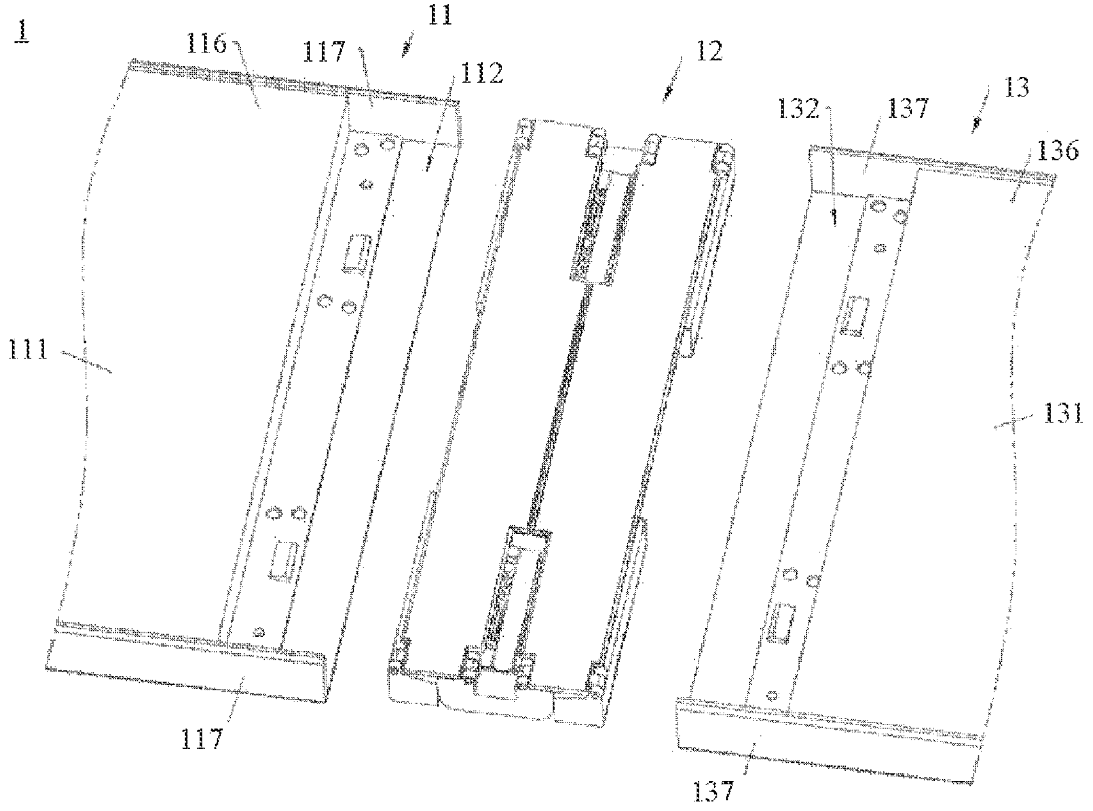
FIG. 38 is a schematic exploded view of a partial structure of a housing apparatus of the electronic device shown in FIG. 36.

FIG. 36 is a schematic diagram of a structure of the electronic device 100 in an open state in some other embodiments according to an embodiment of this application FIG. 37 is a schematic diagram of a structure of the electronic device 100 shown in FIG. 36 in a closed state. FIG. 38 is a schematic exploded view of a partial structure of a housing apparatus 1 of the electronic device 100 shown in FIG. 36. The electronic device 100 in this embodiment may include most technical features of the electronic device 100 in the foregoing embodiment. The following mainly describes a difference between the electronic device 100 and the electronic device 100 in the foregoing embodiment, most same technical content of the two is not described again.

In some embodiments, the electronic device 100 includes a housing apparatus 1 and a flexible display 2. The flexible display 2 is mounted on the housing apparatus 1. The flexible display 2 is configured to display an image, and the housing apparatus 1 is configured to chive the flexible display 2 to move. The housing apparatus 1 includes a first housing 11, a folding mechanism 12, and a second housing 13 that are sequentially connected. The folding mechanism 12 can deform, so that the first housing 11 and the second housing 13 are folded or unfolded relative to each other.

The first housing 11 may include a first body 116 and two first baffles 117, and the two first baffles 117 are separately fastened on two sides of the first body 116. The first body 116 includes the support surface 111 of the first housing 11 and the first fastening groove 112, and the two first battles 117 may form groove side walls of the first fastening groove 112. The second housing 13 includes a second body 136 and two second baffles 137, and the two second baffles 137 are separately fastened on two sides of the second body 136. The second body 136 includes the support surface 131 of the second housing 13 and the second fastening groove 132, and the two second baffles 137 may form groove side walls of the second fastening groove 132.

Refer to FIG. 36 and FIG. 38. When the first housing 11 and the second housing 13 are in an open state, an end part that is of the fast baffle 117 and that is close to the first fastening groove 112 is spliced with an end part that is of the second baffle 137 and that is close to the second fastening groove 132. The folding mechanism 12 is shielded by the first housing 11 and the second housing 13. The electronic device 100 can implement self shielding in the open state, thereby improving waterproof and dust-proof performance.

Refer to FIG. 37 and FIG. 38. When the fast housing 11 and the second housing 13 are in a closed state, a top that is of the first baffle 117 and that is close to the support surface 111 of the first housing 11 is spliced with a top that is of the second baffle 137 and that is close to the support surface 131 of the second housing 13, so that the first housing 11 and the second housing 13 are completely closed, and the outer cover 1211 of the folding mechanism 12 partially extends out. In this case, the electronic device 100 can implement appearance self-shielding in the closed state, thereby improving waterproof and dust-proof performance.

In this embodiment, the electronic device 100 implements appearance self-shielding in the open state and the closed state by using structural designs of the first housing 11 and the second housing 13, and an end cover component used to implement appearance shielding may be omitted. Therefore, a structural design of the electronic device 100 is simple, and costs are low.

A case in which the first baffle 117 and the second baffle 137 are spliced may include a case in which the first baffle 117 and the second baffle 137 we in contact with each other, or may include a case in which a small gap is formed between the first baffle 117 and the second baffle 137. This is not strictly limited in this application.

Figure 39:
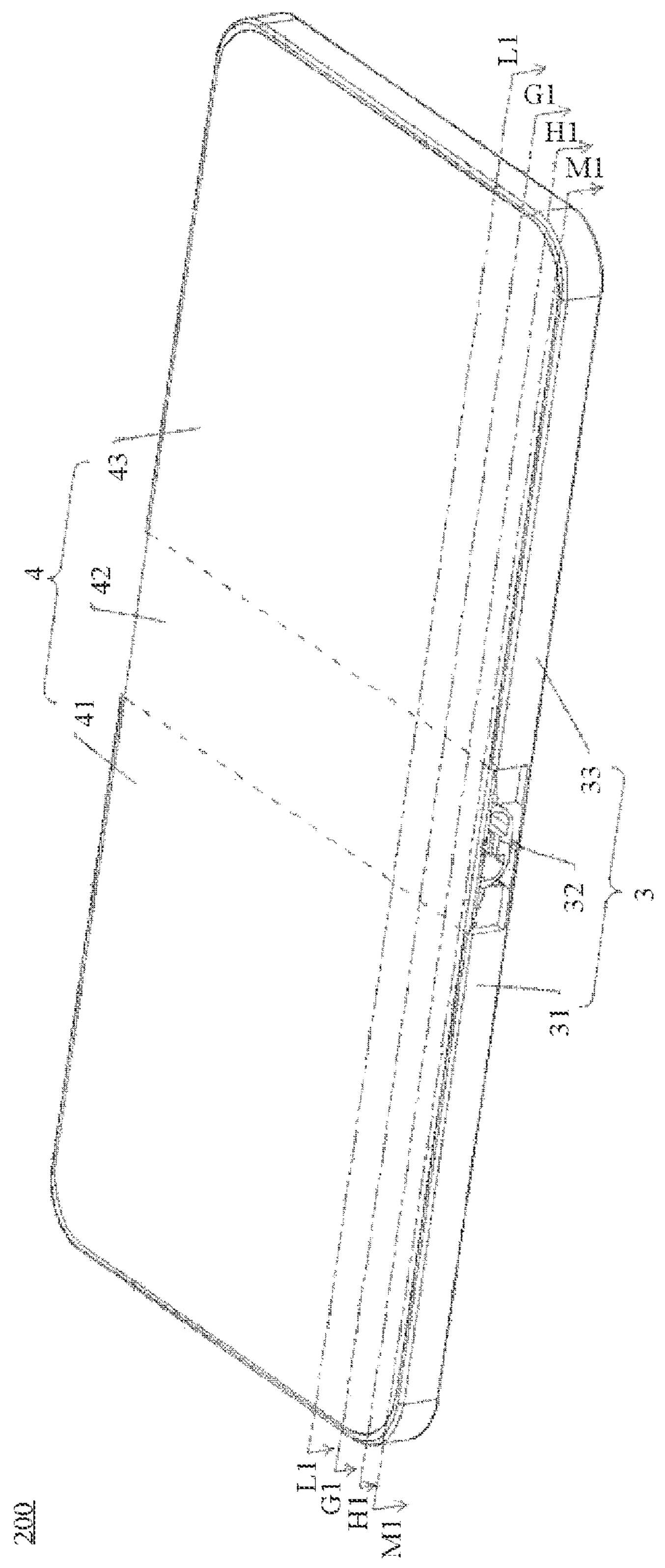
FIG. 39 is a schematic diagram of a structure of an electronic device in an open state in some embodiments according to an embodiment of this application.

In some embodiments, FIG. 39 is a schematic diagram of a structure of an electronic device 200 in an open state in some embodiments according to an embodiment of this application. FIG. 10 is a schematic diagram of a structure of the electronic device 200 shown in FIG. 39 in a closed state. The electronic device 200 in this embodiment may include partial technical features of the electronic device 100 in the foregoing embodiment. The following mainly describes a difference between the electronic device 200 and the electronic device 100 in the foregoing embodiment, most same technical content of the two is not described again.

The electronic device 200 includes a housing apparatus 3 and a flexible display 4. The flexible display 4 is mounted on the housing apparatus 3. The flexible display 4 is configured to display an image, and the housing apparatus 3 is configured to drive the flexible display 4 to move. The housing apparatus 3 includes a first housing 31, a folding mechanism 32, and a second housing 33 that are sequentially connected. The folding mechanism 32 is configured to enable the first housing 31 and the second housing 33 to be folded or unfolded relative to each other. In other words, the folding mechanism 32 can deform, so that the first housing 31 and the second housing 33 are folded or unfolded relative to each other.

As shown in FIG. 39, the first housing 31 and the second housing 33 may be unfolded relative to each other to an open state, so that the folding mechanism 32, the housing apparatus 3, and the electronic device 200 are all in an open state. The flexible display 4 is unfolded with the housing apparatus 3, so as to be in an unfolded state. For example, when the housing apparatus 3 is in the open state, an included angle between the first housing 31 and the second housing 33 may be approximately 180°. In some other embodiments, when the housing apparatus 3 is in the open state, an angle between the first housing 31 and the second housing 33 may have a slight deviation relative to 180°, for example, 165°, 177°, or 185°.

Figure 40:
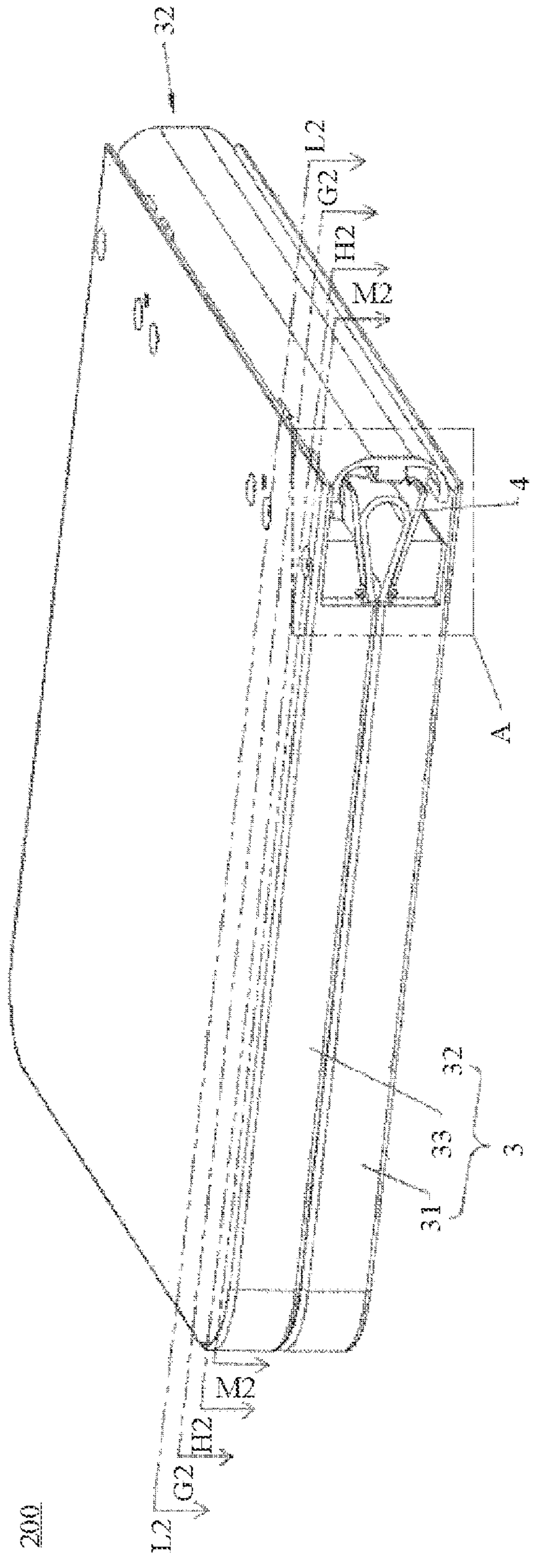
FIG. 40 is a schematic diagram of a structure of the electronic device shown in FIG. 39 in a closed state.

As shown in FIG. 40, the first housing 31 and the second housing 33 may be folded relative to each other to a closed state, so that the folding mechanism 32, the housing apparatus 3, and the electronic device 200 are all in a closed state. The flexible display 4 is folded with the housing apparatus 3, so as to be in a folded state. The flexible display 4 is located inside the housing apparatus 3, and is wrapped by the housing apparatus 3.

The first housing 31 and the second housing 33 may alternatively be unfolded or folded relative to each other to an intermediate state, so that the folding mechanism 32, the housing apparatus 3, and the electronic device 200 are in an intermediate state, and the intermediate state may be any state between an open state and a closed state. The flexible display 4 moves along with the housing apparatus 3.

In this embodiment, the flexible display 4 can be unfolded and folded with the housing apparatus 3. When the electronic device 200 is in an open state, the flexible display 4 is in an unfolded state, and arm display in full screen, so that the electronic device 200 has a lunge display area, to improve viewing experience and operation experience of a user. When the electronic device 200 is in a closed state, a planar size of the electronic device 200 is small (with a small width size), so that it is convenient for a user to cam and receive the electronic device 200.

For example, as shown in FIG. 39, when the housing apparatus 3 is in an open state, the first housing 31 may be spliced with the second housing 33. The splicing of the first housing 31 and the second housing 33 includes a case in which the first housing 31 and the second housing 33 abut against each other, or may include a case in which there is a small gap between the first housing 31 and the second housing 33. In this embodiment, the first housing 31 and the second housing 33 can be spliced to stop an unfolding action of the housing apparatus 3, so as to prevent the housing apparatus 3 from being over-folded during unfolding. This reduces a force exerted on the flexible display 4 and improves reliability of the flexible display 4 and the electronic device 200.

In addition, as shown in FIG. 10, when the housing apparatus 3 is in a closed state, the first housing 31 and the second housing 33 can be fully closed, and there is no big gap between the first housing 31 and the second housing 33, so that an appearance experience of the housing apparatus 3 and the electronic device 200 is good, and waterproof, dust-proof, and anti-foreign matter performance is good. A case in which the first housing 31 and the second housing 33 are fully closed includes a case in which the first housing 31 and the second housing 33 abut against each other, or may include a cage in which there is a small gap between the first housing 31 and the second housing 33. When there is a small gap between the first housing 31 and the second housing 33, some foreign matter (for example, a nail, a paper clip, or broken glass) outside the electronic device 200 does not enter between the first housing 31 and the second housing 33 through the gap, to avoid damage to the flexible display 4 by the foreign matter, so that reliability of the electronic device 200 is improved.

In some embodiments, the electronic device 200 may further include a plurality of modules (not shown in the figure), and the plurality of modules may be accommodated inside the housing apparatus 3. The plurality of modules of the electronic device 200 may include but are not limited to a mainboard, a processor, a memory, a battery; a camera module, an earpiece module, a speaker module, a microphone module, an antenna module, a sensor module, and the like. A quantity, types, locations, and the like of modules of the electronic device 200 are not specifically limited in this embodiment of this application.

It may be understood that, when a user holds the electronic device 200, a location of the earpiece module of the electronic device 200 may be defined as an upper edge of the electronic device 200, a location of the microphone module of the electronic device 200 may be defined as a lower edge of the electronic device 200, and two sides that are of the electronic device 200 and that are held by a left hand and a right hand of the user may be defined as left and right sides of the electronic device 200. In some embodiments, the electronic device 200 may be folded leftward or rightward. In some other embodiments, the electronic device 200 may be folded upwind or downward.

In some embodiments, as shown in FIG. 39, the flexible display 4 includes a first non-bending portion 41, a bending portion 42, and a second non-bending portion 43 that are sequentially arranged. The first non-bending portion 41 is fixedly connected to the first housing 31, and the second non-balding portion 43 is fixedly connected to the second housing 33. In a process in which the first housing 31 and the second housing 33 are folded or unfolded relative to each other, the bending portion 42 deforms. In the process in which the first housing 31 and the second housing 33 are folded or unfolded relative to each other, the first housing 31 drives the first non-bending portion 41 to move, and the second housing 33 drives the second non-bending portion 43 to move. The first non-bending portion 41 and the second non-bending portion 43 are folded or unfolded relative to each other.

In some embodiments, the flexible display 4 may be an organic light-emitting diode display, an active-matrix organic light emitting diode display, a mini organic light-emitting diode display, a micro light-emitting diode display, a micro organic light-emitting diode display, or a quantum dot light-emitting diode display.

Figure 41:
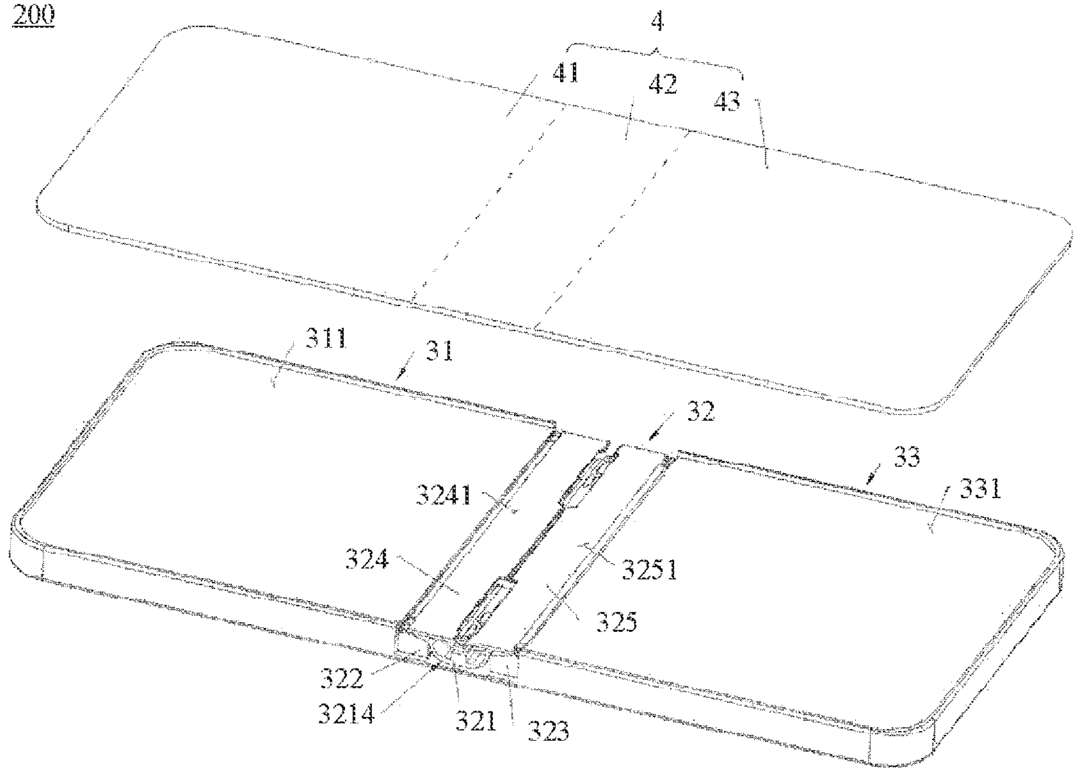
FIG. 41 is a schematic exploded view of a partial structure of the electronic device shown in FIG. 39.

In some embodiments, FIG. 41 is a schematic exploded view of a partial structure of the electronic device 200 shown in FIG. 39. The first housing 31 includes a support surface 311 configured to carry the flexible display 4, and the second housing 33 includes a support surface 331 configured to carry the flexible display 4. For example, the first non-bending portion 41 of the flexible display 4 may be fixedly connected to the support surface 311 of the first housing 31. For example, the first non-bending portion 41 may be bonded to the support surface 311 of the first housing 31 by using an adhesive layer. The second non-bending portion 43 is fixedly connected to the support surface 331 of the second housing 33. For example, the second non-bending portion 43 may be bonded to the support surface 331 of the second housing 33 by using an adhesive layer.

In this embodiment, because the first non-bending portion 41 is fixedly connected to the first housing 31, and the second non-bending portion 43 is fixedly connected to the second housing 33, when the first housing 31 and the second housing 33 are folded or unfolded relative to each other, relative folding and unfolding actions between the first non-bending portion 41 and the seared non-bending portion 43 can be accurately controlled, so that a deformation process and a movement form of the flexible display 4 are controllable, and reliability is high.

In some other embodiments, the first housing 31 may include a main body part and a sliding part. The main body part is connected to the folding mechanism 32, the sliding part is slidably connected to the main body part, the sliding part may slightly slide relative to the main body part, and the support surface 311 of the first housing 31 is formed on the sliding part. The second housing 33 may include a main body part and a sliding part. The main body part is connected to the folding mechanism 32, the sliding part is slidably connected to the main body part, the sliding part may slightly slide relative to the main body part, and the support surface 331 of the second housing 33 is formed in the sliding part. In this case, the first non-bending portion 41 and the second non-bending portion 43 of the flexible display 4 may slightly slide relative to the sliding parts and the main body parts in the first housing 31 and the second housing 33, to implement position fine adjustment in a process in which the first housing 31 and the second housing 33 are folded or unfolded relative to each other. This implements good switching between an unfolded state and a folded state, reduces a probability of damage to the flexible display 4, and improves reliability of the flexible display 4.

Figure 42:
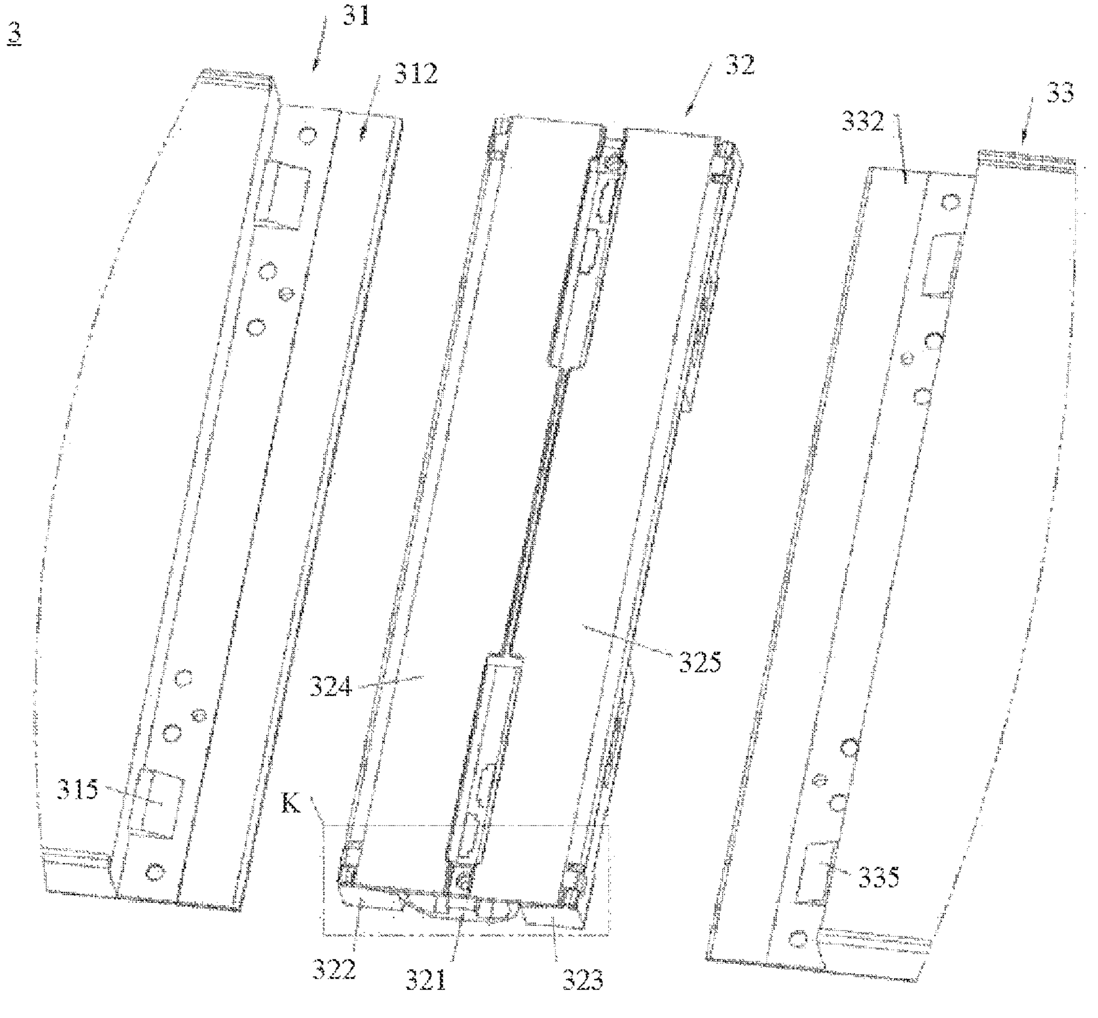
FIG. 42 is a schematic exploded view of a partial structure of a housing apparatus shown in FIG. 41.
Figure 43:
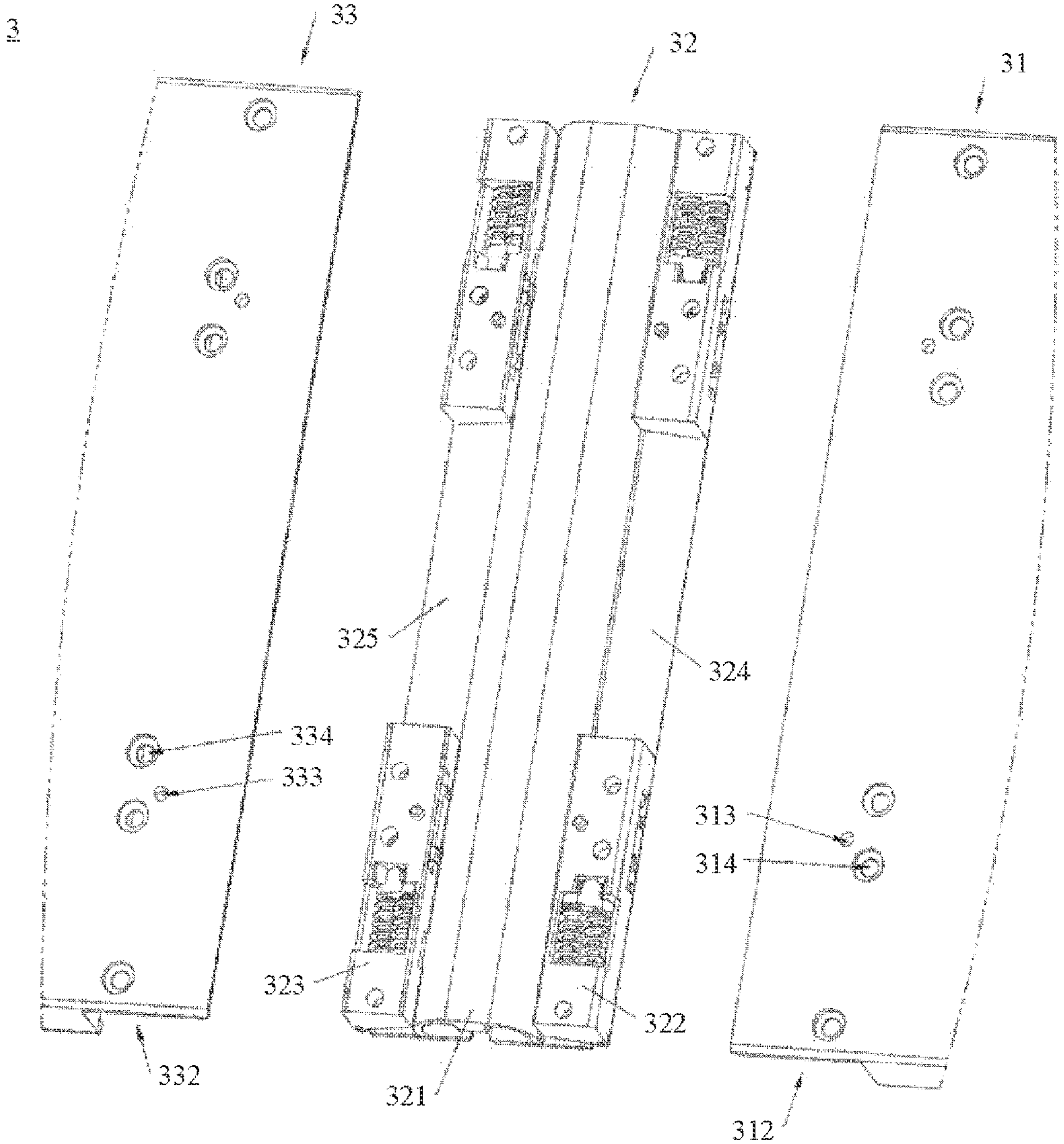
FIG. 43 is a schematic diagram of a structure of the housing apparatus shown in FIG. 42 from another angle.

In some embodiments, refer to FIG. 41 to FIG. 43. FIG. 42 is a schematic exploded view of a partial structure of the housing apparatus 3 shown in FIG. 41. FIG. 43 is a schematic diagram of a structure of the housing apparatus 3 shown in FIG. 42 from another angle. An angle of view of the housing apparatus 3 shown in FIG. 43 is reversed horizontally relative to an angle of view of the housing apparatus 3 shown in FIG. 42. The folding mechanism 32 includes a middle housing 321, a first fixing bracket 322, a second fixing bracket 323, a first support plate 324, and a second support plate 325.

The first fixing bracket 322 is configured to be fixedly connected to the first housing 31. For example, a first fastening groove 312 is provided on a side that is of the first housing 31 and that is close to the folding mechanism 32, and the first fixing bracket 322 is mounted in the first fastening groove 312, to fixedly connect to the first housing 31. The first fixing bracket 322 may be mounted in the first fastening groove 312 by using a fastener, welding, bonding, fastening, or the like, so as to implement that the first fixing bracket 322 is fastened to the first housing 31.

The second fixing bracket 323 is configured to be fixedly connected to the second housing 33. A second fastening groove 332 is provided on a side that is of the second housing 33 and that is close to the folding mechanism 32, and the second fixing bracket 323 is mounted in the second fastening groove 332, to fixedly connect to the second housing 33. The second fixing bracket 323 may be mounted in the second fastening groove 332 by using a fastener, welding, bonding, fastening, or the like, so as to implement that the second fixing bracket 323 is fastened to the second housing 33.

The riddle housing 321 is connected between the first housing 31 and the second housing 33. For example, the middle housing 321 is connected between the first fixing bracket 322 and the second fixing bracket 323. The first support plate 324 is rotatably connected to the first fixing bracket 322, and the second support plate 325 is rotatably to the second fixing bracket 323.

In some embodiments, as shown in FIG. 41, the first support plate 324 includes a support surface 3241 configured to c any the flexible display 4, and the second support plate 325 includes a support surface 3251 configured to carry the flexible display 4. The bending portion 42 of the flexible display 4 includes a first part close to the first non-bending portion 41, a second part close to the second non-bending portion 43, and a third part located between the first part and the second part. The first part may be fixedly connected to a part of a region of the support surface 3241 of the first support plate 324, for example, may be bonded and fastened by using a bonding layer. The second part may be fixedly connected to a part of a region of the support surface 3251 of the second support plate 325, for example, may be bonded and fastened by using a bonding layer. The third part corresponds to the other part of the region of the support surface 3241 of the first support plate 324 and the other part of the region of the support surface 3251 of the second support plate 325. The third part may move relative to the two parts.

An adhesive layer located between the first non-bending portion 41 and the support surface 311 of the first housing 31, an adhesive layer located between the bending portion 42 and the support surface 3241 of the first support plate 324, an adhesive layer located between the bending portion 42 and the support surface 3251 of the second support plate 325, and an adhesive layer located between the second non-bending portion 43 and the support surface 331 of the second housing 33 may be continuous entire adhesive layers, or may be dot-break adhesive layers, or may be adhesive layers having hollowed-out regions. A specific solution of the adhesive layer is not strictly limited in this embodiment of this application.

In some embodiments, as shown in FIG. 41, when the first housing 31 and the second housing 33 are in an open state, the folding mechanism 32 is in an open state, the first support plate 324 blocks a part of the middle housing 321, the second support plate 32 blocks a part of the middle housing 321, the first support plate 324 and the second support plate 325 are close to each other, and a distance between the support surface 3241 of the first support plate 324 and the support surface 3251 of the second support plate 325 is small. The folding mechanism 32 may provide relatively complete planar support for the bending portion 42 of the flexible display 4 in the open state by using a two-plate structure.

For example, when the first housing 31 and the second housing 33 are unfolded relative to each other to the open state, the folding mechanism 32 is in the open state, and the first support plate 324 is spliced with the second support plate 325. In this case, the support surface 3241 of the first support plate 324 and the support surface 3251 of the second support plate 325 may be spliced to form a bending region support surface. The folding mechanism 32 of the housing apparatus 3 can fully support the bending portion 42 of the flexible display 4 in the open state by using the bending region support surface, so that the flexible display 4 is not easily dented under pressing of the user, thereby improving a service life and reliability of the flexible display 4.

A case in which the first support plate 324 is spliced with the second support plate 325 may include but is not limited to the following scenario: One part of the first support plate 324 and one part of the second support plate 325 are connected to each other, without a gap between the two, and a notch or a gap may be formed between the other part of the first support plate 324 and the other part of the second support plate 325; or the first support plate 324 and the second support plate 325 are connected to each other, without a gap between the two; or one part of the first support plate 324 and one part of the second support plate 325 are close to each other, with a small gap between the parts close to each other, and a notch or a gap may be formed between the other part of the first support plate 324 and the other part of the second support plate 325; or the fast support plate 324 and the second support plate 325 are close to each other, with a small gap between the two. When there is a small gap between the first support plate 324 and the second support plate 325, or there is a small gap between a part of the first support plate 324 and a part of the second support plate 325, a user presses a region that is of the flexible display 4 and that corresponds to the gap, without forming an obvious dent in the corresponding region of the flexible display 4. The bending region support surface can provide strong support for the flexible display 4.

When there is a notch or a gap between the first support plate 324 and the second support plate 325, or there is a notch or a gap between a part of the first support plate 324 and a part of the second support plate 325, an area of the notch or the gap may be reduced as much as possible by optimizing a size and a shape of a component of the folding mechanism 32, so that a region that is of the flexible display 4 and that corresponds to the notch or the gap may be slightly indented under pressing of the user, instead of forming an obvious dent. In addition, in some embodiments, a support plate or a stiffening plate that can be bent and has specific structural strength may be disposed on a side that is of the flexible display 4 and that faces the housing apparatus 3, and the support plate or the stiffening plate covers at least the notch or the gap between the first support plate 324 and the second support plate 325, to improve anti-pressing strength of the flexible display 4.

The folding mechanism 32 may further include a bendable steel sheet. The bendable steel sheet may be located above the first support plate 324 and the second support plate 325, and cover the notch or the gap between the first support plate 324 and the second support plate 325, so as to provide a more flat and complete support environment for the flexible display 4, thereby improving user experience of pressing and using.

In some embodiments, as shown in FIG. 41, when the folding mechanism 32 is in an open state, the support surface 3241 of the first support plate 324 is flush with the support surface 3251 of the second support plate 325. In other words, when the fielding mechanism 32 is in the open state, the support surface 3241 of the first support plate 324 and the support surface 3251 of the second support plate 325 are configured to enable the flexible display 4 to be in an unfolded state. In this case, the first support plate 324 and the second support plate 325 can provide smooth and powerful support for the flexible display 4, so as to improve user experience such as a touch operation and image viewing.

When the flexible display is 4 mounted on the support surface 3241 of the first support plate 324 and the support surface 3251 of the second support plate 325, a flat form can be presented, that is, it is considered that the support surface 3241 of the first support plate 324 is flush with the support surface 3251 of the second support plate 325. For example, the case in which the support surface 3241 of the first support plate 324 is flush with the support surface 3251 of the second support plate 325 may include but is not limited to the following scenarios: The support surface 3241 of the first support plate 324 is flush with the support surface 3251 of the second support plate 325; or a bonding layer or steel sheet is disposed on the support surface 3241 of the first support plate 324, and a bonding layer or steel sheet is disposed on the support surface 3251 of the second support plate 325, so that heights of the two support surfaces (3241 and 3251) with the bonding layers or the steel sheets are equal; or a stiffening plate is disposed on the flexible display 4, so that heights of the two support surfaces (3241 and 3251) on which the stiffening plate is stacked are equal.

The case in which the support surface 3241 of the first support plate 324 is flush with the support surface 3251 of the second support plate 325 includes: The support surface 3241 of the first support plate 324 is a plane, the support surface 3251 of the second support plate 325 is a plane, and the two are flush with each other, or the support surface 3241 of the first support plate 324 includes a planar region used to support the flexible display 4, the support surface 3251 of the second support plate 325 includes a planar region used to support the flexible display 4, and the planar regions of the two are flush with each other. For example, a main region of the support surface 3241 of the first support plate 324 is a planar region used to implement support, and an inclined region used to implement rotation avoidance may be disposed on a periphery of the support surface 3241 of the first support plate 324, which is not strictly limited in this application. A main region of the support surface 3251 of the second support plate 325 is a planar region used to implement support, and an inclined region used to implement rotation avoidance may be disposed on a periphery of the support surface 3251 of the second support plate 325, which is not strictly limited in this application.

For example, when the housing apparatus 3 is in an open state, the support surface 3241 of the first support plate 324 is flush with the support surface 311 of the first housing 31, and the support surface 3251 of the second support plate 325 is flush with the support surface 331 of the second housing 33. In this case, the plurality of support surfaces that are of the housing apparatus 3 and that are used to provide support for the flexible display 4 are flush with each other, so that the flexible display 4 is unfolded and has a flat support environment. This can improve user experience such as a touch operation and image viewing.

For example, both the support surface 3241 of the first support plate 324 and the support surface 311 of the first housing 31 are planes, and are coplanar, to better support the flexible display 4. In this case, the adhesive layer between the flexible display 4 and the support surface 3241 of the first support plate 324 may be as flick as the adhesive layer between the flexible display 4 and the support surface 311 of the first housing 31.

It can be understood that when the support surface 3241 of the first support plate 324 and the support surface 311 of the first housing 31 are parallel to each other but are slightly misaligned, after the flexible display 4 is fastened to the support surface 124 of the first support plate 324 and the support surface 311 of the first housing 31 by a slight difference between a thickness of the adhesive layer between the flexible display 4 and the support surface 3241 of the first support plate 324 and a thickness of the adhesive layer between the flexible display 4 and the support surface 311 of the first housing 31, the corresponding region of the flexible display 4 is still a planar region. In this case, it is also considered that the support surface 3241 of the first support plate 324 is flush with the support surface 311 of the first housing 31.

In some other embodiments, there may be no fixed connection relationship between the bending portion 42 of the flexible display 4 and the support surface 3241 of the first support plate 324, that is, there is no connection adhesive layer between bending portion 42 of the flexible display 4 and the support surface 3241 of the first support plate 324, and the two may be in direct contact. In this case, the support surface 3241 of the first support plate 324 and the support surface 311 of the first housing 31 are parallel to each other, the support surface 3241 of the first support plate 324 slightly protrudes relative to the support surface 311 of the first housing 31, and the support surface 3241 of the first support plate 324 is flush with the support surface 311 of the first housing 31 after the adhesive layer is disposed, so that the flexible display 4 can still obtain planar support. In this case, it is also considered that the support surface 3241 of the first support plate 324 is flush with the support surface 311 of the first housing 31.

In some other embodiments, the support surface 311 of the first housing 31 may include a planar part close to the first support plate 324 and an arc surface part away from the first support plate 324, and the support surface 3241 of the first support plate 324 is a plane. The support surface 3241 of the first support plate 324 and the planar part of the support surface 311 of the first housing 31 are coplanar, or are parallel to each other but slightly misaligned. In this case, it is also considered that the support surface 3241 of the first support plate 324 is flush with the support surface 311 of the first housing 31. In this embodiment, the housing apparatus 3 may support the flexible display 4 to present a 3D display effect.

Related designs of the support surface 3251 of the second support plate 325, the support surface 331 of the second housing 33, a connection relationship between the two and the flexible display 4, and the like may be the same as technical solutions of the support surface 3241 of the first support plate 324, the support surface 311 of the first housing 31, a connection relationship between the two and the flexible display 4, and the like. Details are not described in this application.

Figure 44:
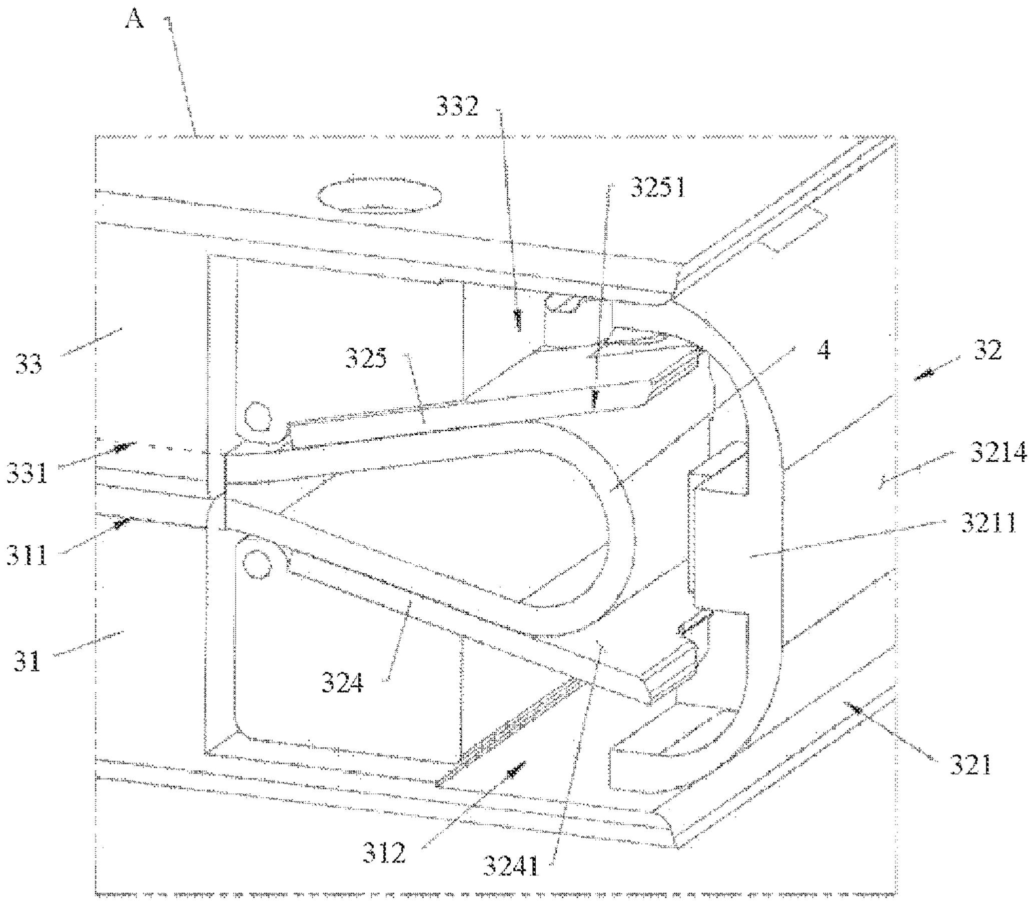
FIG. 44 is an enlarged schematic diagram of a structure at A of the electronic device shown in FIG. 40.

In some embodiments, FIG. 44 is an enlarged schematic diagram of a structure at A of the electronic device 200 shown in FIG. 40. When the folding mechanism 32 is in a closed state, the support surface 3241 of the first support plate 324 and the support surface 3251 of the second support plate 325 are disposed opposite to each other, and are away from each other in a direction close to the middle housing 321. The support surface 3241 of the first support plate 324 and the support surface 3251 of the second support plate 325 are disposed opposite to each other. That is, the support surface 3241 of the first support plate 324 and the support surface 3251 of the second support plate 325 are in a face-to-face position relationship, and the support surface 3241 of the first support plate 324 is disposed in an inclined manner relative to the support surface 3251 of the second support plate 325. That is, an included angle is formed between the support surface 3241 of the first support plate 324 and the support surface 3251 of the second support plate 325. The first support plate 324 and second support plate 325 are approximately V-shaped.

In this embodiment, the first support plate 324 and the second support plate 325 form display accommodating space through automatic avoidance for accommodating the flexible display 4, so that a folding action performed by the housing apparatus 3 on the flexible display 4 is stable, and a squeezing force is small. This helps reduce a risk that the flexible display 4 is damaged due to excessive squeezing of the folding mechanism 32, and makes the flexible display 4 more reliable.

For example, when the first housing 31 and the second housing 33 are folded relative to each other to a closed state, the support surface 3241 of the first support plate 324 is inclined relative to the support surface 311 of the first housing 31, the support surface 3251 of the second support plate 325 is inclined relative to the support surface 331 of the second housing 33, and the support surface 311 of the first housing 31 is parallel to the support surface 331 of the second housing 33. In this case, the first non-bending portion 41 and the second non-bending portion 43 of the flexible display 4 can approach each other to a closed state, and the bending portion 42 is bent into a water drop shape.

Figure 45:
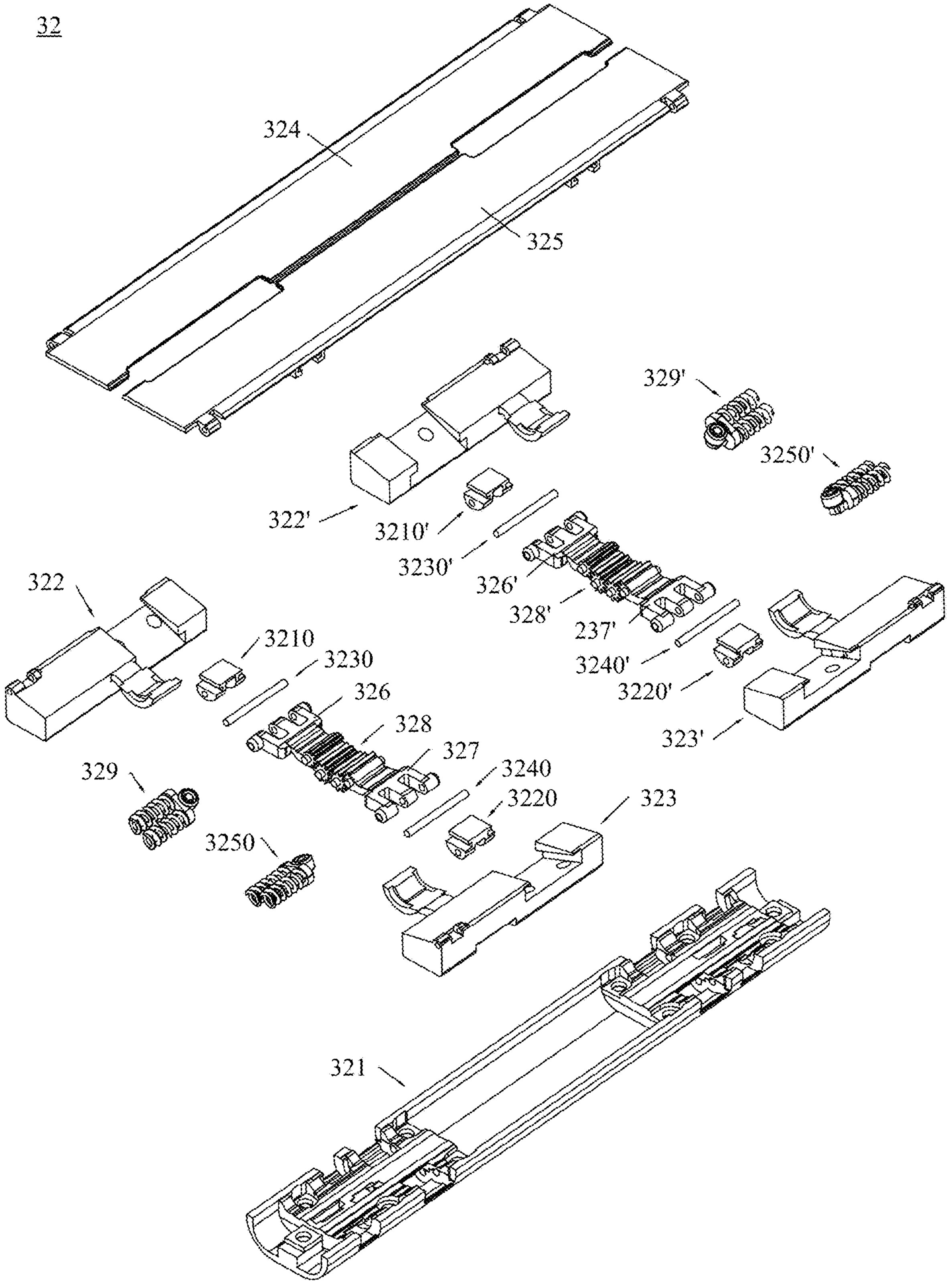
FIG. 45 is a schematic exploded view of a partial structure of a folding mechanism shown in FIG. 41.
Figure 46:
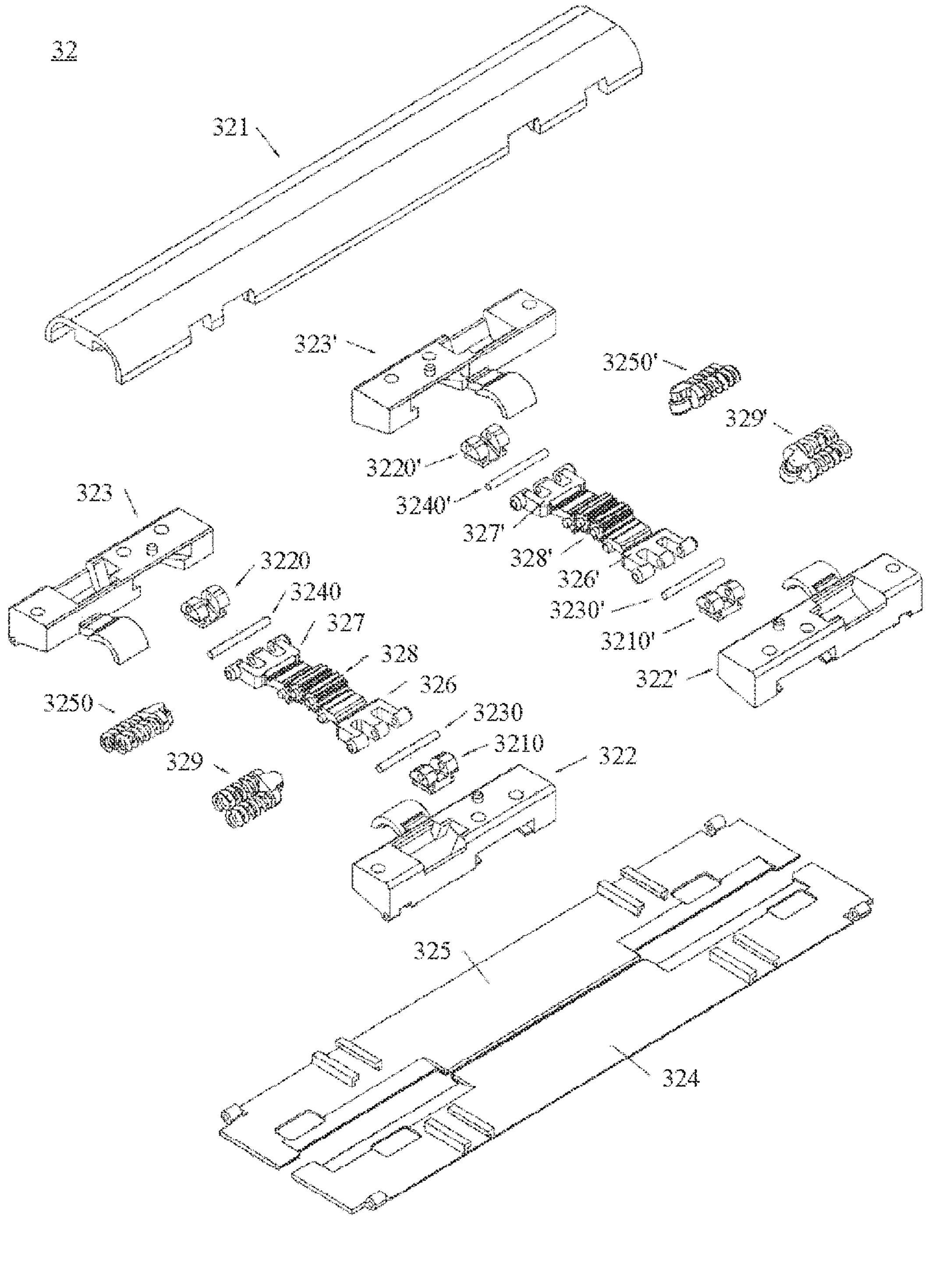
FIG. 46 is a schematic diagram of a structure of the folding mechanism shown in FIG. 45 from another angler.

In some embodiments, FIG. 45 is a schematic exploded view of a partial structure of the folding mechanism 32 shown in FIG. 41. FIG. 46 is a schematic diagram of a structure of the folding mechanism 32 shown in FIG. 45 from another angle. An angle of view of the folding mechanism 32 shown in FIG. 46 is horizontally reversed relative to an angle of view of the folding mechanism 32 shown in FIG. 45. The folding mechanism 32 includes a middle housing 321, a first fixing bracket 322, a second fixing bracket 323, a first support plate 324, a second support plate 325, a first swing arm 326, a second swing arm 327, a synchronisation assembly 328, a first stopper 329, a second stopper 3250, a first rotatable connecting member 3210, a second rotatable connecting member 3220, a first rotatable connecting shaft 3230, and a second rotatable connecting shaft 3240.

The first fixing bracket 322, the second fixing bracket 323, the first swing arm 326, the second swing arm 327, the synchronization assembly 328, the first stopper 329, the second stopper 3250, the two rotatable connecting members 3210, the feat rotatable connecting shaft 3230, and the second rotatable connecting shaft 3240 may jointly form a first rotation assembly. For example, the first rotation assembly may be used as a bottom rotation assembly of the folding mechanism 32. The folding mechanism 32 may further include a second rotation assembly; and the second rotation assembly may be used as a top rotation assembly of the folding mechanism 32. Both the first rotation assembly and the second rotation assembly are connected to the middle housing 321, the first support plate 324, and the second support plate 325.

The second rotation assembly and the first rotation assembly may have a same or similar structure, a symmetric or partially symmetric structure, or different structures. In some embodiments, the second rotation assembly and the first rotation assembly are centro-symmetric structures. For a basic design of a component structure of the second rotation assembly, a design of a connection relationship between components, and a design of a connection relationship between components and other structures except the components, refer to a related solution of the first rotation assembly. In addition, the second rotation assembly and the first rotation assembly are allowed to be slightly different in terms of a detailed structure or position arrangement of the components.

For example, the second rotation assembly may include a first fixing bracket 322', a second fixing bracket 323', a first swing arm 326', a second swing arm 327', a synchronization assembly 328', a first stopper 329, a second stopper 3250', a first rotatable connecting member 3210, a second rotatable connecting member 3220, a first rotatable connecting shaft 3230' and a second rotatable connecting shaft 3240'. For structures of components of the second rotation assembly, an interconnection relationship between components, and a connection relationship between each component and the middle housing 321, the first support plate 324, and the second support plate 325, refer to related descriptions of the first rotation assembly, and details are not described in this embodiment of this application.

The first fixing bracket 322 of the first rotation assembly and the first fixing bracket 322' of the second rotation assembly may be mechanical parts independent of each other, or may be two parts of an integrated mechanical part. The second fixing bracket 323 of the first rotation assembly and the second fixing bracket 323' of the second rotation assembly may be mechanical parts independent of each other, or may be two parts of an integrated mechanical part. In some other embodiments, the folding mechanism 32 may alternatively include a first rotation assembly and another rotation assembly A structure of the another rotation assembly may be the same as or different from a structure of the first rotation assembly. This is not strictly limited in this application.

In some embodiments, the first fixing bracket 322 may be rotatably connected to the middle housing 321, and the second fixing bracket 323 may be rotatably connected to the middle housing 321. In this embodiment, because the first fixing bracket 322 is fixedly connected to the first housing 31, and the second fixing bracket 323 is fixedly connected to the second housing 33 (refer to FIG. 41), when the first fixing bracket 322 rotates relative to the middle housing 321, and the second fixing bracket 323 rotates relative to the middle housing 323, the first housing 31 rotates relative to the second housing 33, that is, the first housing 31 and the second housing 33 are folded or unfolded relative to each other.

In this embodiment, a main moving mechanism of the folding mechanism 32 of the housing apparatus 3 is a single-stage rotatable connection between the first fixing bracket 322 and the second fixing bracket 323 and the middle housing 321. Because of a small quantity of parts, a simple part fitting relationship, a degree of freedom of 1, a short size chain, and a small accumulated error, the main moving mechanism of the folding mechanism 32 is high in control precision, thereby improving the rotation precision of the housing apparatus 3. This helps improve user experience of the electronic device 200 that applies the housing apparatus 3.

In some embodiments, the synchronization assembly 328 may be disposed in the middle housing 321. One end of the first swing arm 326 may be connected to the first fixing bracket 322, and the other end of the first swing arm 326 may be connected to the middle housing 321 and connected to the synchronization assembly 328. One end of the second swing arm 327 may be connected to the second fixing bracket 323, and the other end of the second swing arm 327 may be connected to the middle housing 321 and connected to the synchronization assembly 328. The synchronization assembly 328 is configured to enable the first swing arm 326 and the second swing arm 327 to rotate synchronously in a movement process of the housing apparatus 3, so as to improve mechanism operation experience of the housing apparatus 3 and the electronic device 200. The first stopper 329 may be mounted on the first fixing bracket 322, and the second stopper 3250 may be mounted on the second fixing bracket 323. When the housing apparatus 3 is in the open state, the first stopper 329 is configured to limit the first swing arm 326, and the second stopper 3250 is configured to limit the second swing arm 327, so that the housing apparatus 3 remains in the open state when no relatively large external force is applied, thereby improving use experience of the user. In addition, in some embodiments, fitting between the first stopper 329 and the first swing arm 326 and fitting between the second stopper 3250 and the second swing arm 327 can further provide resistance in a process in which the electronic device 200 is unfolded to enter the open state and in a process in which the electronic device 200 is folded to end the open state, so that the user can experience a better sense of operation of the mechanism.

In some other embodiments, there may be one stopper of the folding mechanism 32, and the stopper may be mounted on the first fixing bracket 322 and configured to limit the first swing arm 326, or may be mounted on the second fixing bracket 323 and configured to limit the second swing arm 327. In some other embodiments, the rotation assembly may not include a stopper. In some other embodiments, the synchronization assembly 328 may alternatively be in a non-direct connection relationship with the first swing arm 326 and the second swing arm 327. Two ends of the synchronization assembly 328 are respectively connected to the first fixing bracket 322 and the second fixing bracket 323, and are configured to keep the first fixing bracket 322 and the second fixing bracket 323 rotating synchronously in a movement process of the housing apparatus 3. A component composition of the rotation assembly and a specific component composition are not strictly limited in this embodiment of this application.

In some embodiments, the first rotatable connecting member 3210 may be connected to the first swing arm 326 by using the first rotatable connecting shaft 3230, and the first rotatable connecting member 3210 moves with the first swing arm 326 relative to the first fixing bracket 322. The second rotatable connecting member 3220 may be connected to the second swing arm 327 by using the second rotatable connecting shaft 3240, and the second rotatable connecting member 3220 moves with the second swing arm 327 relative to the second fixing bracket 323. The first support plate 324 may be connected to the first fixing bracket 322, and may also be connected to the first rotatable connecting member 3210. The first fixing bracket 322 and the first rotatable connecting member 3210 jointly limit a position of the first support plate 324. The second support plate 325 may be connected to the second fixing bracket 323, and may also be connected to the second rotatable connecting member 3220. The second fixing bracket 323 and the second rotatable connecting member 3220 jointly limit a position of the second support plate 325.

Figure 47:
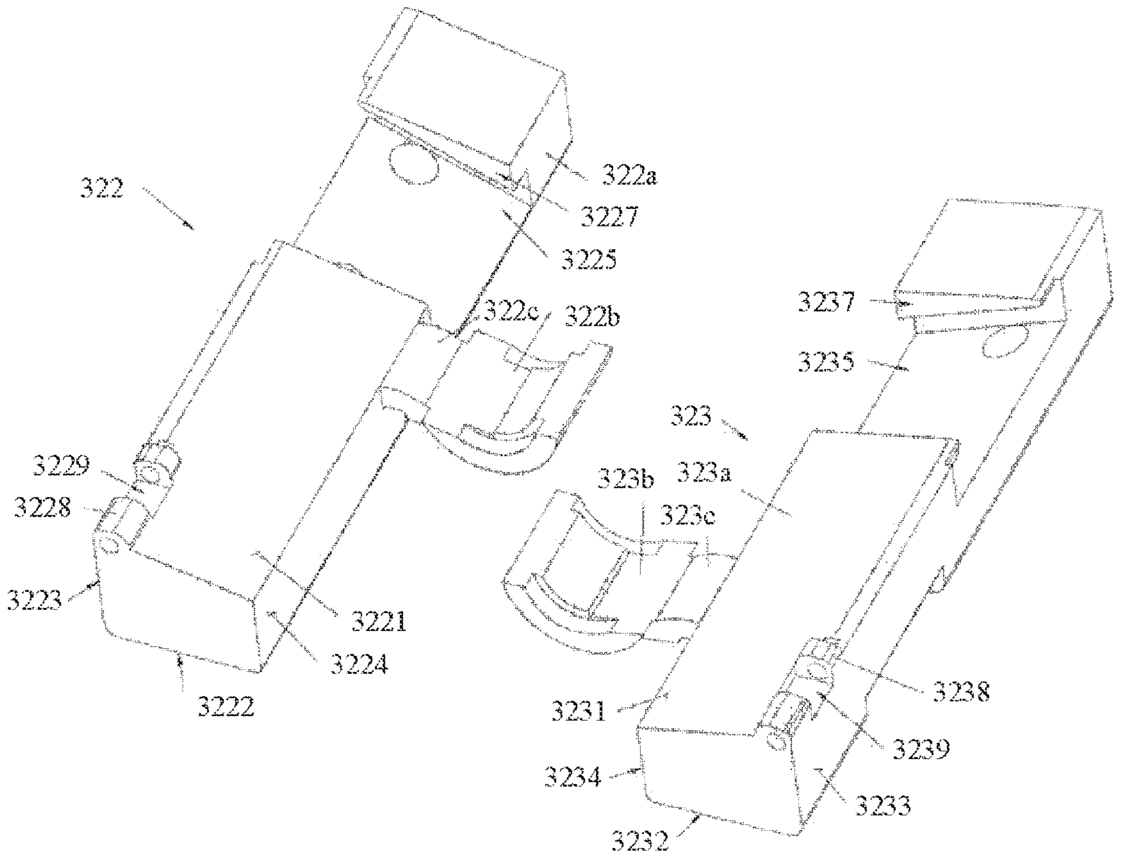
FIG. 47 is a schematic diagram of structures of a first fixing bracket and a second fixing bracket shown in FIG. 45.

In some embodiments, FIG. 47 is a schematic diagram of structures of the first fixing bracket 322 and the second fixing bracket 323 shown in FIG. 45. The first fixing bracket 322 includes a first fixed body 322*a*, a first arc-shaped arm 322*b*, and a first connection arm 322*c* connected between the first fixed body 322*a* and the first arc-shaped arm 322*b*. The first fixed body 322*a* includes a top surface 3221, a bottom surface 3222, a first side surface 3223, and a second side surface 3224. The top surface 3221 and the bottom surface 3222 are disposed back to each other, the first side surface 3223 and the second side surface 3224 are disposed back to each other, and the first side surface 3223 and the second side surface 3224 are located between the top surface 3221 and the bottom surface 3222. The top surface 3221 is disposed in an inclined manner relative to the bottom surface 3222, an included angle is formed between the top surface 3221 and the bottom surface 3222, and the top surface 3221 and the bottom surface 3222 are close to each other in a direction close to the second side surface 3224. The first arc-shaped arm 322*b* is located on a side that is of the second side surface 3224 and that is away from the first side surface 3223. For example, the first connection arm 322*c* connects the second side surface 3224 and the first arc-shaped arm 322*b*.

The second fixing bracket 323 includes a second fixed body 323*a*, a second arc-shaped arm 323*b*, and a second connection arm 322*c* connected between the second fixed body 323*a* and the second arc-shaped arm 323*b*. The second fixed body 323*a* includes a top surface 3231, a bottom surface 3232, a first side surf ace 3233, and a second side surface 3234. The top surface 3231 and the bottom surface 3232 are disposed back to each other, the first side surface 3233 and the second side surface 3234 are disposed back to each other, and the first side surface 3233 and the second side surface 3234 are located between the top surface 3231 and the bottom surface 3232. The top surface 3231 is disposed in an inclined manner relative to the bottom surface 3232, an included angle is formed between the top surface 3231 and the bottom surface 3232, and the top surface 3231 and the bottom surface 3232 are close to each other in a direction close to the second side surface 3234. The second arc-shaped arm 323*b* is located on a side that is of the second side surface 3234 and that is away from the first side surface 3233. For example, the second connection arm 322*c* connects the second side surface 3234 and the second arc-shaped arm 323*b*.

In some embodiments, as shown in FIG. 47, the first fixed body 322*a* may include a first connection bump 3228. The fast connection bump 3228 protrudes relative to the top surface 3221, and the first connection bump 3228 is provided with a hinge hole. The first fixed body 322*a* may be provided with a first sinking groove 3229, and the first sinking groove 3229 may divide the first connection bump 3228 into two parts.

The second fixed body 323*a* may include a second connection bump 3238. The second connection bump 3238 protrudes relative to the top surface 3231, and the second connection bump 3238 is provided with a hinge hole. The second fixed body 323*a* may be provided with a second sinking groove 3239, and the second sinking groove 3239 may divide the second connection bump 3238 into two parts.

Figure 48:
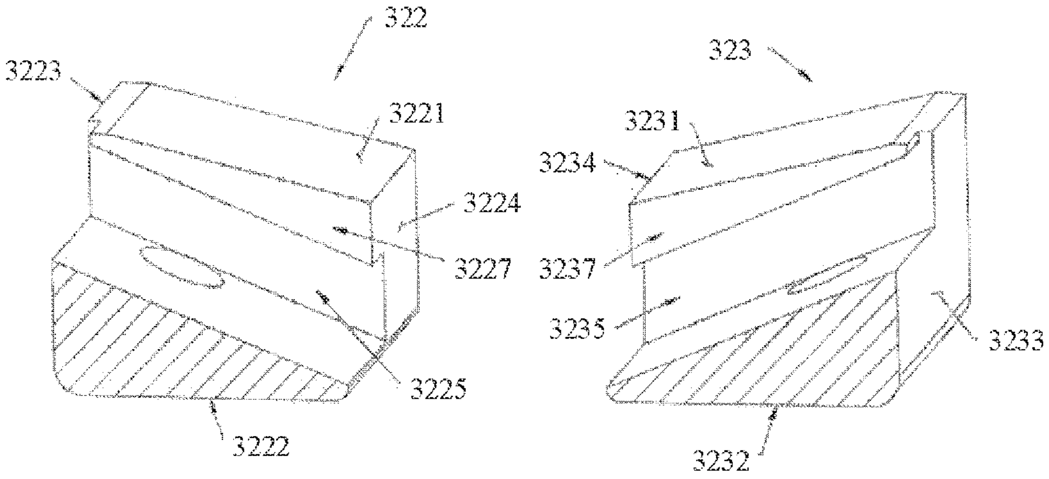
FIG. 48 is a schematic diagram of a partial structure of the first fixing bracket and the second fixing bracket shown in FIG. 47.

In some embodiments, FIG. 48 is a schematic diagram of structures of the first fixing bracket 322 and the second fixing bracket 323 shown in FIG. 47. In the first fixing bracket 322, the first fixed body 322*a* is provided with a first sliding slot 3225. For example, the first sliding slot 3225 may be disposed in an inclined manner relative to the bottom surface 3222, that is, an included angle is formed between an extension direction of the first sliding slot 3225 and the bottom surface 3222. The first sliding slot 3225 may alternatively be disposed in an inclined manner relative to the top surface 3221, that is, an included angle is formed between an extension direction of the first sliding slot 3225 and the top surface 3221. In a direction close to the second side surface 3224, the extension direction of the first sliding slot 3225 and the bottom surface 3222 are close to each other. The first sliding slot 3225 may form an opening on the second side surface 3224, or may form an opening on the first side surface 3223. For example, the first fixed body 322*a* may be further provided with a first avoidance notch 3227, and the first avoidance notch 3227 communicates with the first sliding slot 3225. The first avoidance notch 3227 may form an opening on the top surface 3221.

In the second fixing bracket 323, the second fixed body 323*a* is provided with a second sliding slot 3235. For example, the second sliding slot 3235 may be disposed in an inclined manner relative to the bottom surface 3232, that is, an included angle is formed between an extension direction of the second sliding slot 3235 and the bottom surface 3232. The second sliding slot 3235 may alternatively be disposed in an inclined manner relative to the top surface 3231, that is, an included angle is formed between an extension direction of the second sliding slot 3235 and the top surface 3231. In a direction close to the second side surface 3234, the extension direction of the second sliding slot 3235 and the bottom surface 3232 are close to each other. The second sliding slot 3235 may form an opening on the second side surface 3234, or may form an opening on the first side surface 3233. For example, the second fixed body 323*a* may be further provided with a second avoidance notch 3237, and the second avoidance notch 3237 communicates with the second sliding slot 3235. The second avoidance notch 3237 may penetrate through the top surface 3231, that is, the second avoidance notch 3237 forms an opening on the top surface 3231.

Figure 49:
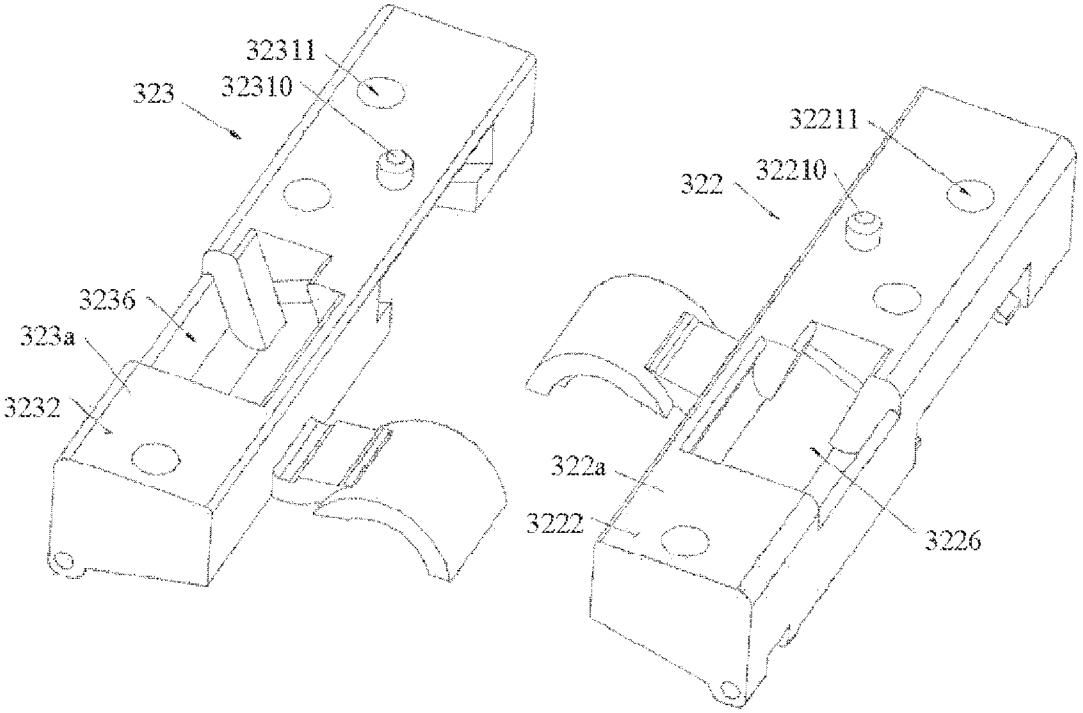
FIG. 49 is a schematic diagram of structures of the first fixing bracket and the second fixing bracket shown in FIG. 47 from another angle.
Figure 50:
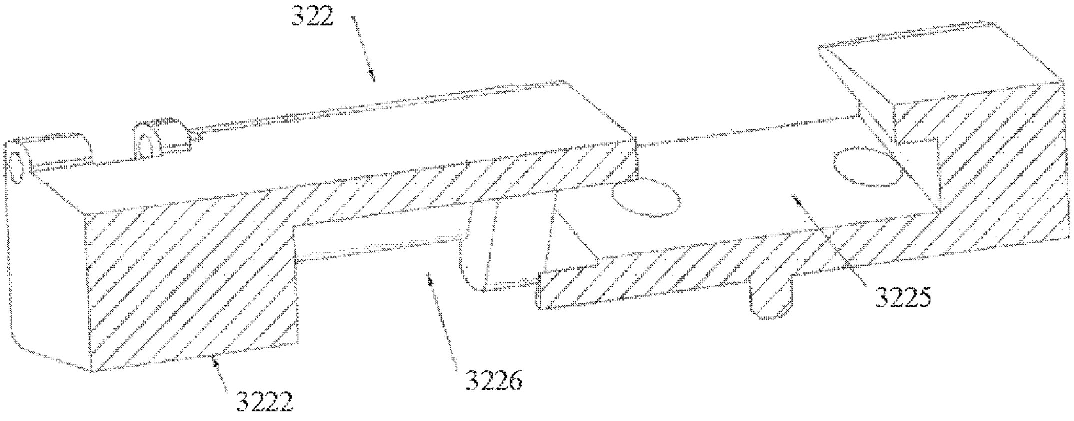
FIG. 50 is a schematic diagram of a partial structure of the first fixing bracket shown in FIG. 47.

FIG. 49 is a schematic diagram of structures of the first fixing bracket 322 and the second fixing bracket 323 shown in FIG. 47 from another angle. FIG. 50 is a schematic diagram of a partial structure of the first fixing bracket 322 shown in FIG. 47. A field of view shown in FIG. 48 is reversed horizontally relative to a field of view shown in FIG. 47.

In some embodiments, the first fixed body 322*a* of the first fixing bracket 322 is further provided with a first mounting groove 3226, and the first mounting groove 3226 forms an opening on the bottom surface 3222. The first mounting groove 3226 communicates with the first sliding slot 3225. In this case, a mechanical part mounted in the first mounting groove 3226 may partially extend into the first sliding slot 3225.

The second fixed body 323*a* of the second fixing bracket 323 is further provided with a second mounting groove 3236, and the second mounting groove 3236 firms an opening on the bottom surface 3232. The second mounting groove 3236 communicates with the second sliding slot 3235. In this case, a mechanical part mounted in the second mounting groove 3236 may partially extend into the second sliding slot 3235.

In some embodiments, as shown in FIG. 49, the first fixed body 322*a* of the first fixing bracket 322 may further include a first positioning post 32210 and a first fastening hole 32211. The first positioning post 32210 protrudes relative to the bottom surface 3222, and an opening of the first fastening hole 32211 is located at the bottom surface 3222. There may be one or more first positioning posts 32210, and there may be one or more first fastening holes 32211. The second fixed body 323*a* of the second fixing bracket 323 may further include a second positioning post 32310 and a second fastening hole 32311. The second positioning post 32310 protrudes relative to the bottom surface 3232, and an opening of the second fastening hole 32311 is located at the bottom surface 3232. There may be one or more second positioning posts 32310, and there may be one or more second fastening holes 32311.

As shown in FIG. 43, the first housing 31 is provided with a positioning hole 313 and a fastening hole 314. When the first fixing bracket 322 is connected to the first housing 31, the first positioning post 32210 may extend into the positioning hole 313 of the first housing 31, and the first fastening hole 32211 may be disposed opposite to the fastening hole 314 of the first housing 31 to lock by using a fastener (not shown in the figure). The second housing 33 is provided with a positioning hole 333 and a fastening hole 334. When the second fixing bracket 323 is connected to the second housing 33, the second positioning post 32310 may extend into the positioning hole 333 of the second housing 33, and the second fastening hole 32311 may be disposed opposite to the fastening hole 334 of the second housing 33 to lock by using a fastener (not shown in the figure).

Figure 51:
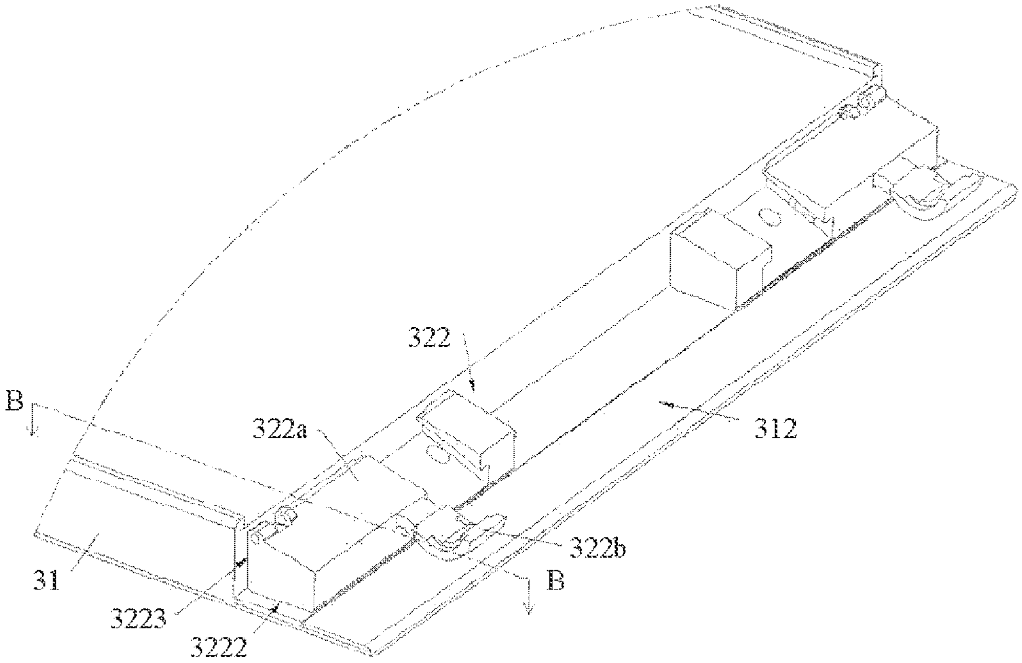
FIG. 51 is a schematic diagram of a structure of a connection between a first housing and a first fixing bracket shown in FIG. 41.
Figure 52:
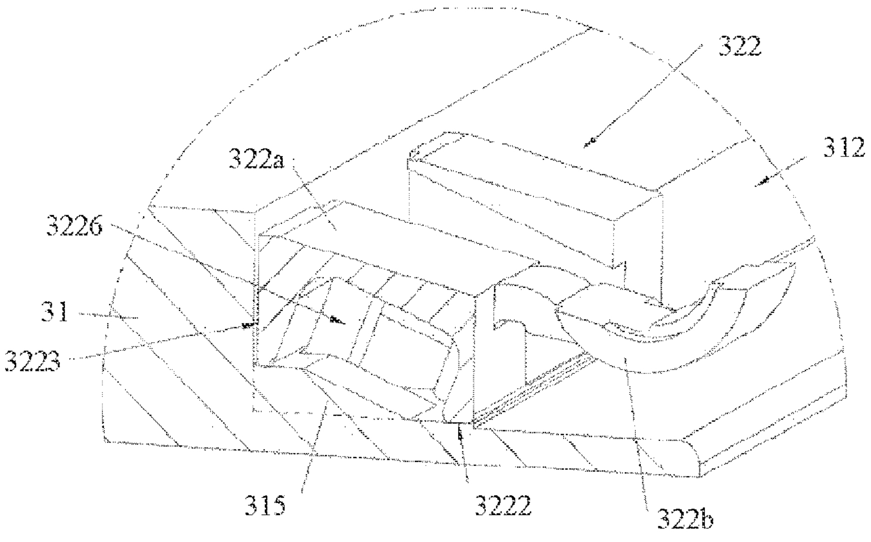
FIG. 52 is a schematic diagram of a cross section of a partial structure of the structure shown in FIG. 51 when cut along B-B.

In some embodiments, as shown in FIG. 42, the first housing 31 is provided with a bump 315, and the bump 315 is located in the first fastening groove 312. The second housing 33 is provided with a bump 335, and the bump 335 is located in the second fastening groove 332. FIG. 51 is a schematic diagram of a structure of a connection between the first housing 31 and the first fixing bracket 322 shown in FIG. 41. FIG. 52 is a schematic diagram of a cross section of a partial structure of the structure shown in FIG. 51 when cut along B-B. When the fast fixing bracket 322 is fixedly connected to the first housing 31, the first fixing bracket 322 is mounted in the first fastening groove 312, the first fixed body 322*a* of the first fixing bracket 322 is fixedly connected to a groove wall of the first fastening groove 312, and the first arc-shaped arm 322*b* is suspended in the first fastening groove 312. The first side surface 3223 of the first fixed body 322*a* faces the side wall of the first fastening groove 312, and the bottom surface 3222 faces a bottom wall of the first fastening groove 312. As shown in FIG. 52, the bump 315 is clamped into the first mounting groove 3226 of the first fixing bracket 322. In this case, the first fixing bracket 322 and the first housing 31 can be positioned with each other through fitting between the first positioning post 32210 and the positioning hole 313 of the first housing 31 (as shown in FIG. 43), and can alternatively be positioned with each other through fitting between the bump 315 of the first housing 31 and the first mounting groove 3226. Therefore, stability of a connection structure between the first fixing bracket 322 and the first housing 31 is high. In addition, the bump 315 of the first housing 31 and the groove wall of the first mounting groove 3226 may jointly enclose an accommodating space with an appropriate capacity; to accommodate another component. In addition, a position of the accommodating space can be flexibly adjusted by controlling a height of the bump 315 and a depth of the first mounting groove 3226, so as to better meet an assembly requirement between a plurality of components.

Similarly, when the second fixing bracket 323 is fixedly connected to the second housing 33, the second fixing bracket 323 is mounted in the second fastening groove 332, the second fixed body 323*a* of the second fixing bracket 323 is fixedly connected to a groove wall of the second fastening groove 332, and the second arc-shaped arm 323*b* is suspended in the second fastening groove 332. The first side surface 3233 of the second fixed body 323*a* faces a side wall of the second fastening groove 332, the bottom surface 3232 faces a bottom wall of the second fastening groove 332, and the bump 315 may be clamped into the second mounting groove 3236 of the second fixing bracket 323.

Figure 53:
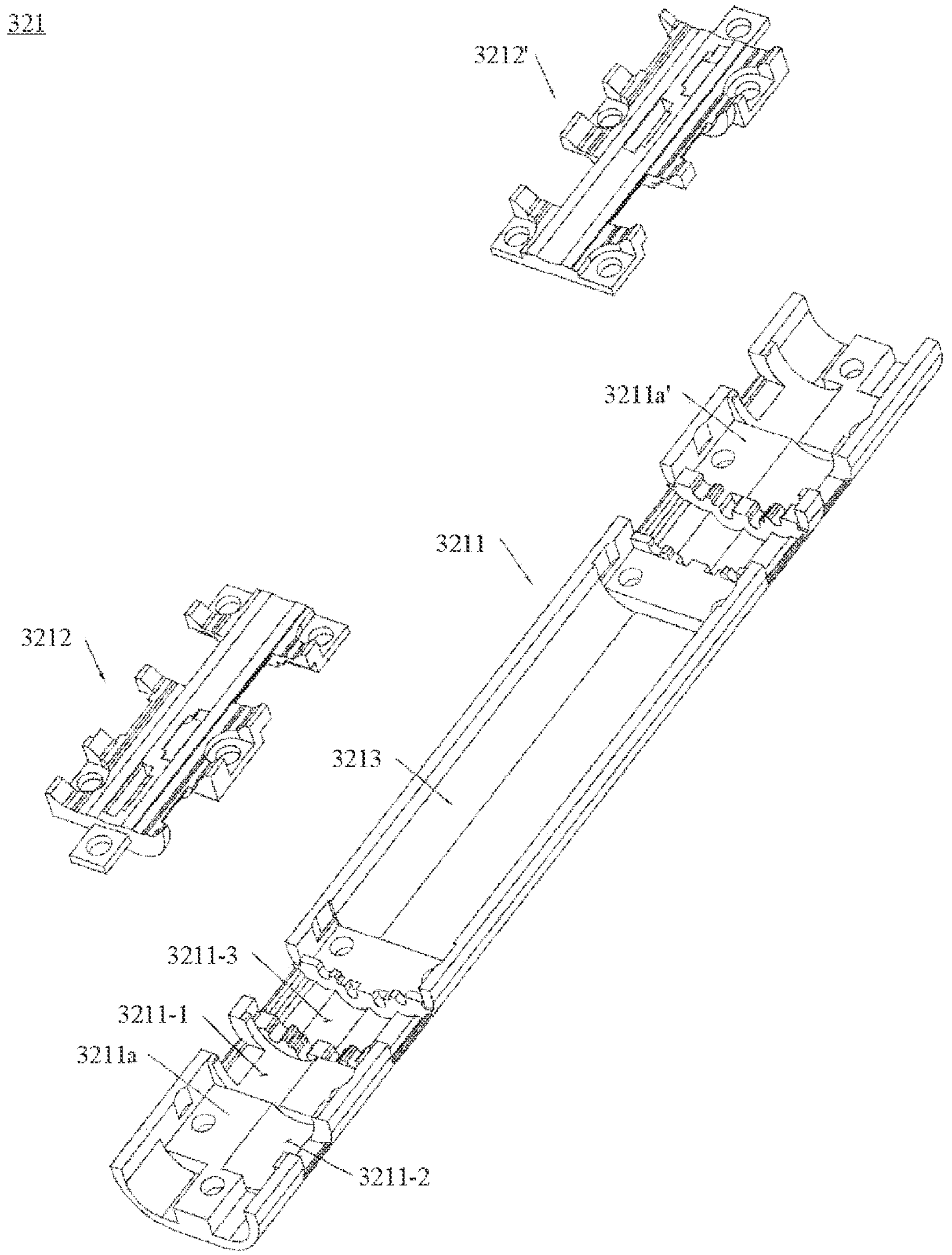
FIG. 53 is a schematic exploded view of a structure of a middle housing shown in FIG. 45.
Figure 54:
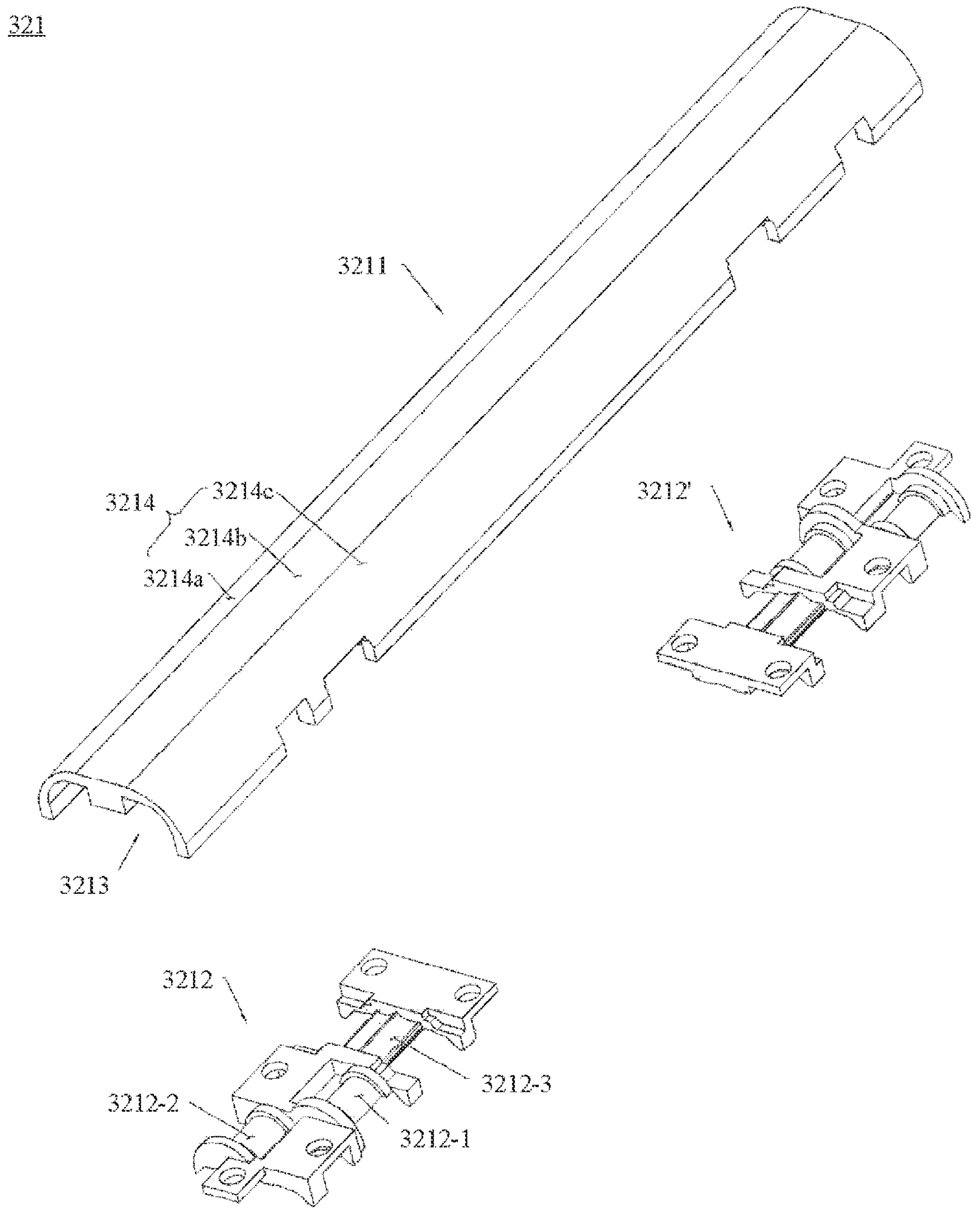
FIG. 54 is a schematic diagram of a structure of the middle housing shown in FIG. 53 from another angle.

In some embodiments, FIG. 53 is a schematic exploded view of a structure of the middle housing 321 shown in FIG. 45. FIG. 54 is a schematic diagram of a structure of the middle housing 321 shown in FIG. 53 from another angle. A field of view shown in FIG. 54 is reversed horizontally relative to a field of view shown in FIG. 53. The noddle housing 321 includes an outer cover 3211 and a fastener 3212. For example, the outer cover 3211 is bent to form an inner space 3213 of the middle housing 321, and the inner space 3213 is located inside the outer cover 3211. The outer cover 3211 includes a mounting part 3211*a*, and the mounting part 3211*a* is disposed close to the inner space 3213. The mounting part 3211*a* may form a plurality of groove structures and bump structures. These structures enable the mounting part 3211*a* to form a plurality of fitting surfaces, for example, a concave arc surface 3111-1, a concave arc surface 3211-2, and an overall concave curved surface 3211-3. The curved surface 3211-3 may include a plurality of concave small curved surfaces.

The fastener 3212 may be accommodated in the inner space 3213, and is fixedly connected to the mounting part 3211*a*. For example, the fastener 3212 may be fastened to the mounting part 3211*a* by using a plurality of fasteners (not shown in the figure). In some other embodiments, the fastener 3212 and the mounting part 3211*a* may alternatively be fastened to each other by bonding, welding, or the like. The fastener 3212 may form a plurality of groove structures Lures and a plurality of bump structures. These structures enable the fastener 3212 to form a plurality of fitting surfaces, for example, a convex arc surface 3212-1, a convex arc surface 3212-2, and an overall convex curved surface 3212-3. The curved surface 3212-3 may include a plurality of concave small curved surfaces. The fitting surface of the fastener 3212 and the fitting surface of the mounting part 3211*a* cooperate with each other, so as to jointly form a plurality of connection structures of the middle housing 321 for connecting to another part of the folding mechanism 32.

The outer cover 3211 may further include another mounting part 3211*a*'. The mounting part 3211*a*' is disposed close to the inner space 3213, and the mounting part 3211*a*' and the mounting part 3211*a* are disposed in a mutually spaced manner. The outer cover 3211 may be an integrally formed mechanical part, or may be assembled to form an integral structure. The middle housing 321 may further include another fastener 3212'. The fastener 3212' may be accommodated in the inner space 3213, and is fixedly connected to the mounting part 3211*a*' of the outer cover 3211. A plurality of connection structures are formed between the fastener 3212' and the mounting part 3211*a*', and these connection structures may be the same as or similar to, symmetric to, partially symmetric to, or different from the connection structures formed between the fastener 3212 and the mounting part 3211*a*. For example, the connection structure between the fastener 3212' and the mounting part 3211*a*' and the connection structure between the fastener 3212 and the mounting part 3211*a* are in a centro-symmetric relationship. The mounting part 3211*a*' and the mounting part 3211*a* may be centro-symmetric structures, and the fastener 3212' and the fastener 3212 may be Centro-symmetric structures.

In some embodiments, as shown in FIG. 54, the outer cover 3211 of the middle housing 321 includes an appearance surface 3214 disposed back to the inner space 3213, and the appearance surface 3214 is an outer side surface of the outer cover 3211. For example, the appearance surface 3214 of the outer cover 3211 may include a first arc surface part 3214*a*, a planar part 3214*b*, and a second arc surface part 3214*c*. The first arc surface part 3214*a* and the second arc surface part 3214*c* are respectively connected to two sides of the planar part 3214*b* In some other embodiments, the appearance surface 3214 may alternatively be an arm surface or another smooth curved surface.

Refer to FIG. 41 and FIG. 42 again. When the first housing 31 and the second housing 33 are unfolded relative to each other to an open state, one part of the middle housing 321 is located in the first fastening groove 312, the other part of the middle housing 321 is located in the second fastening groove 332, and the first housing 31 and the second housing 33 cover an appearance surface 3214 of the middle housing 321. In this embodiment, the first housing 31 and the second housing 33 can shield the middle housing 321 from a back side (tamely a side back to the flexible display 4) of the housing apparatus 3 in the open state. In this case, the first housing 31 and the second housing 33 can also shield other components of the folding mechanism 32 from the back side of the housing apparatus 3, so that the housing apparatus 3 implements self-shielding on the back side, thereby protecting the folding mechanism 32. In addition, appearances of the housing apparatus 3 and the electronic device 200 are complete, so that appearance experience is good, and waterproof and dust-proof performance is good.

Refer to FIG. 44 again. When the first housing 31 and the second housing 33 are folded relative to each other to a closed state, the middle housing 321 partially extends out from the first fastening groove 312 and the second fastening groove 332, and the appearance surface 3214 of the middle housing 321 is exposed relative to the first housing 31 and the second housing 33. In this embodiment, the first housing 31, the second housing 33, and the outer cover 3211 jointly form appearance parts of the housing apparatus 3 and the electronic device 200. Therefore, the housing apparatus 3 and the electronic device 200 can implement back-side self-shielding in the closed state, which helps improve appearance integrity, and implements good waterproof and dust-proof performance.

The appearance surface 3214 of the outer cover 3211 forms a shape similar to an arc surface or of an arc surface, which helps improve appearance experience and holding experience of the electronic device 200 in the closed state. In addition, the middle part of the appearance surface 3214 is the planar part 3214*b*, so that a thickness (a size in a direction perpendicular to the planar part 3214*b*) of the outer cover 3211 is small, an overall thickness of the housing apparatus 3 in an open state is small, and an overall width of the housing apparatus 3 in a closed state is small, which facilitates miniaturization and thinning of the electronic device 200.

In some embodiments, the housing apparatus 3 may further include a top side end cover (not shown in the figure) and a bottom side end coves (not shown in the figure). The top side end cover is located on a top side of the folding mechanism 32, and the bottom side end cover is located on a bottom side of the folding mechanism 32. When the housing apparatus 3 is in an open state, the top side end cover shields the middle housing 321 from a top side of the housing apparatus 3, and the bottom side end cover shields the middle housing 32*l* front a bottom side of the housing apparatus 3. When the housing apparatus 3 is in a closed state, a pint that is of the middle housing 321 and that does not extend out from the first fastening groove 312 and the second fastening groove 332 is shielded by the top side end cover from the top side of the housing apparatus 3, and is shielded by the bottom side end cover from the bottom side of the housing apparatus 3. For example, when the housing apparatus 3 is in an open state or a closed state, another component of the folding mechanism 32 may be shielded by the top side end cover from the top side of the housing apparatus 3, or may be shielded by the bottom side and cover from the bottom side of the housing apparatus 3, or may be shielded by the first housing 31 and the second housing 33 from the top side and the bottom side of the housing apparatus 3. Therefore, the housing apparatus 3 can perform all-round shielding on the folding mechanism 32 in the open state and the closed state, so that the housing apparatus 3 can better implement self-shielding.

The top side and cover and the bottom side end cover may be a part of the middle housing 321, or may be a component that is independent of the middle housing 321 and connected to the folding mechanism 32, or may be a component that is independent of the middle housing 321 and connects the first housing 31 and the second housing 33. Specific structures and mounting manners of the top side end cover and the bottom side end cover are not strictly limited in this application.

Figure 55:
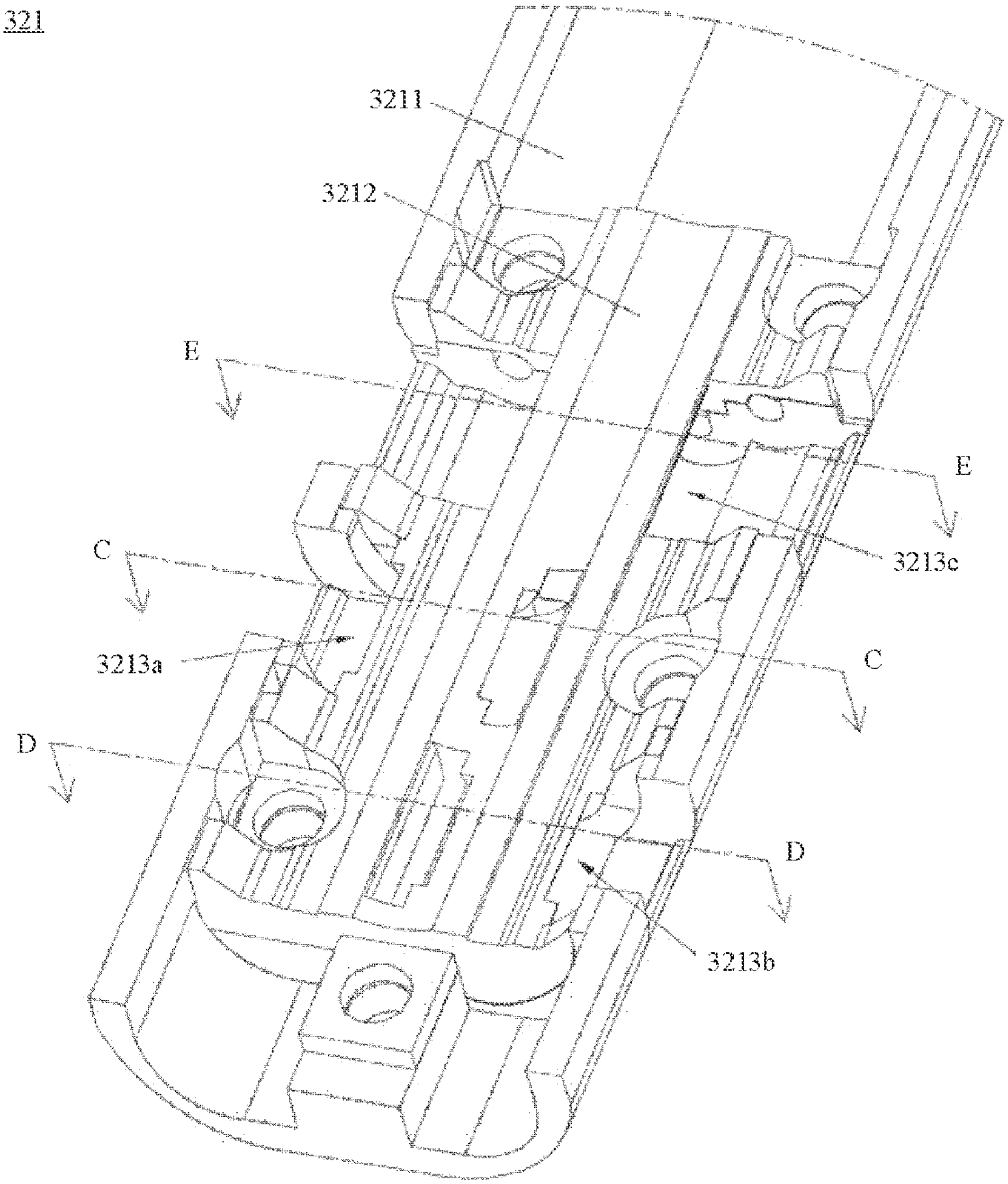
FIG. 55 is a schematic diagram of a partial structure of a middle housing shown in FIG. 45.
Figure 56:
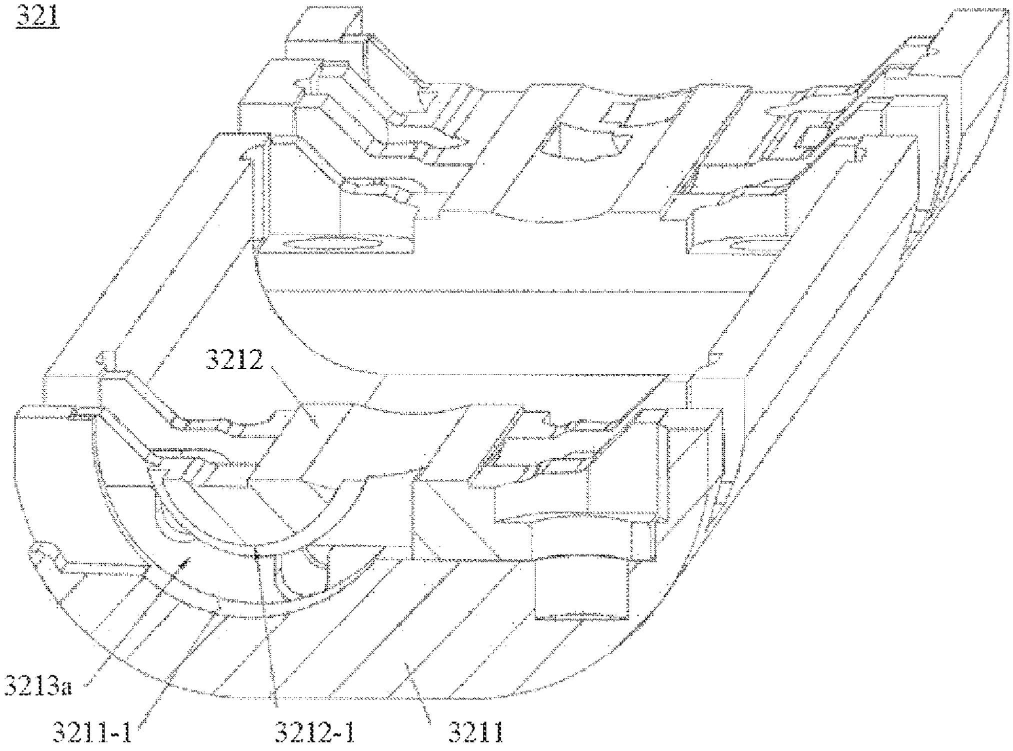
FIG. 56 is a schematic diagram of a cross section of the middle housing shown in FIG. 55 when cut along C-C.
Figure 57:
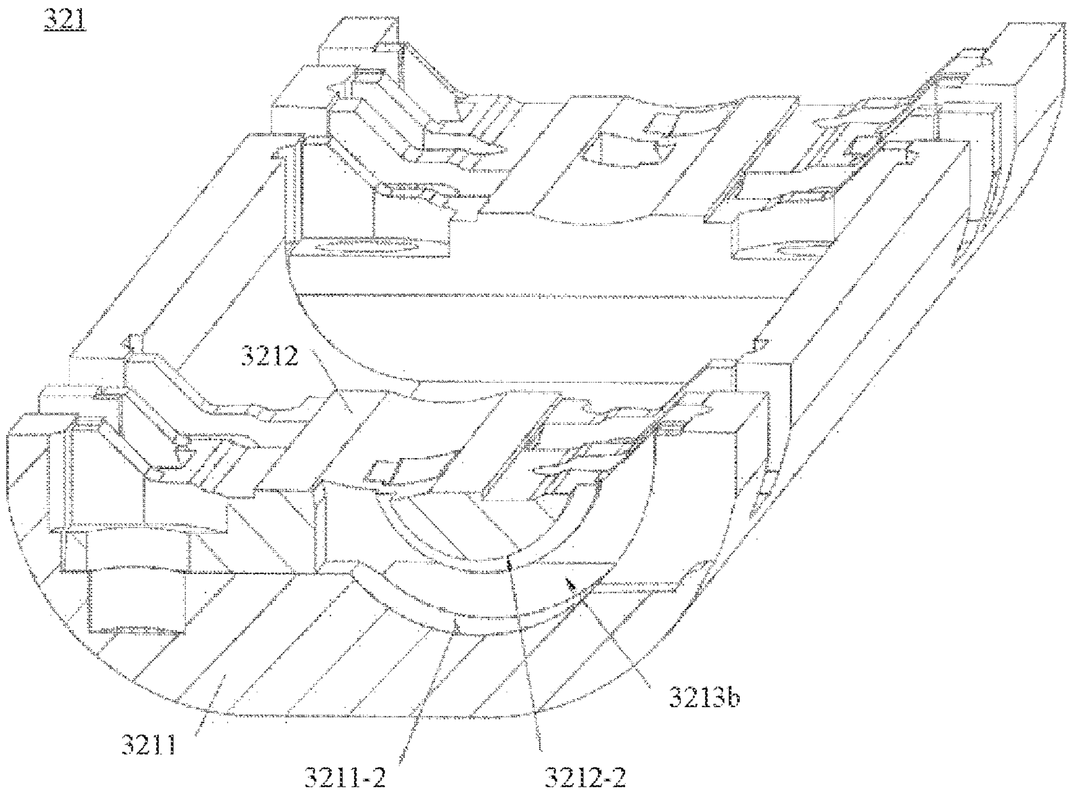
FIG. 57 is a schematic diagram of a cross section of the middle housing shown in FIG. 55 when cut along D-D.
Figure 58:
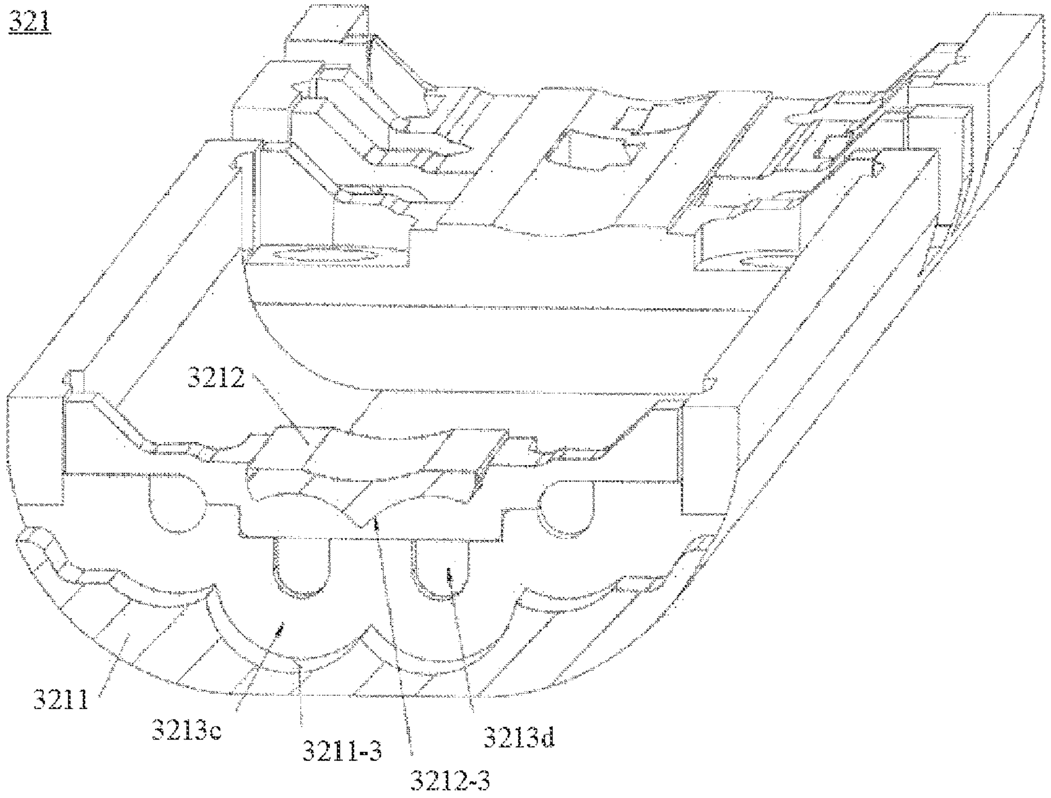
FIG. 58 is a schematic diagram of a cross section of the middle housing shown in FIG. 55 when cut along E-E.

In some embodiments, FIG. 55 is a schematic diagram of a partial structure of the middle housing 321 shown in FIG. 45. FIG. 56 is a schematic diagram of a cross section of the middle housing 321 shown in FIG. 55 when cut along C-C. FIG. 57 is a schematic diagram of a cross section of the middle housing 321 shown in FIG. 55 when cut along D-D. FIG. 58 is a schematic diagram of a cross section of the middle housing 321 shown in FIG. 55 when cut along E-E.

As shown in FIG. 55, the fastener 3212 is fixedly connected to the outer cover 3211, and a plurality of spaces are jointly enclosed by the fastener 3212 and the outer cover 3211, and these spaces are a part of the inner space 3213. For example, as shown in FIG. 55 and FIG. 56, the middle housing 321 is provided with a first arc-shaped groove 3213*a*, and one end of the first arc-shaped groove 3213*a* communicates with an outer space of the middle housing 321. A center of circle of the first arc-shaped groove 3213*a* is away from the outer cover 3211 and close to the fastener 3212. An arc surface 3211-1 of the outer cover 3211 and an arc surface 3212-1 of the fastener 3212 are jointly enclosed to form the first arc-shaped groove 3213*a*.

As shown in FIG. 55 and FIG. 57, the noddle housing 321 is further provided with a second arc-shaped groove 3213*b*, and one end of the second arc-shaped groove 3213*b* communicates with an outer space of the middle housing 321. A center of circle of the first arc-shaped groove 3213*b* is away from the outer cover 3211 and close to the fastener 3212. An arc surface 3211-2 of the outer cover 3211 and an arc surface 3212-2 of the fastener 3212 are jointly enclosed to form the second arc-shaped groove 3213*b*.

As shown in FIG. 55 and FIG. 58, movable space 3213*c* is further provided in the middle housing 321, and both ends of the movable space 3213*c* communicate with the outer space of the housing 321. A curved surface 3211-3 of the outer cover 3211 and a curved surface 3212-3 of the fastener 3212 are jointly enclosed to form the movable space 3213*c*. A plurality of hinge grooves 3213*d* are provided at an end part of the movable space 3213*c*, and the plurality of hinge grooves 3213*d* are disposed in a mutually spaced manner.

Figure 59:
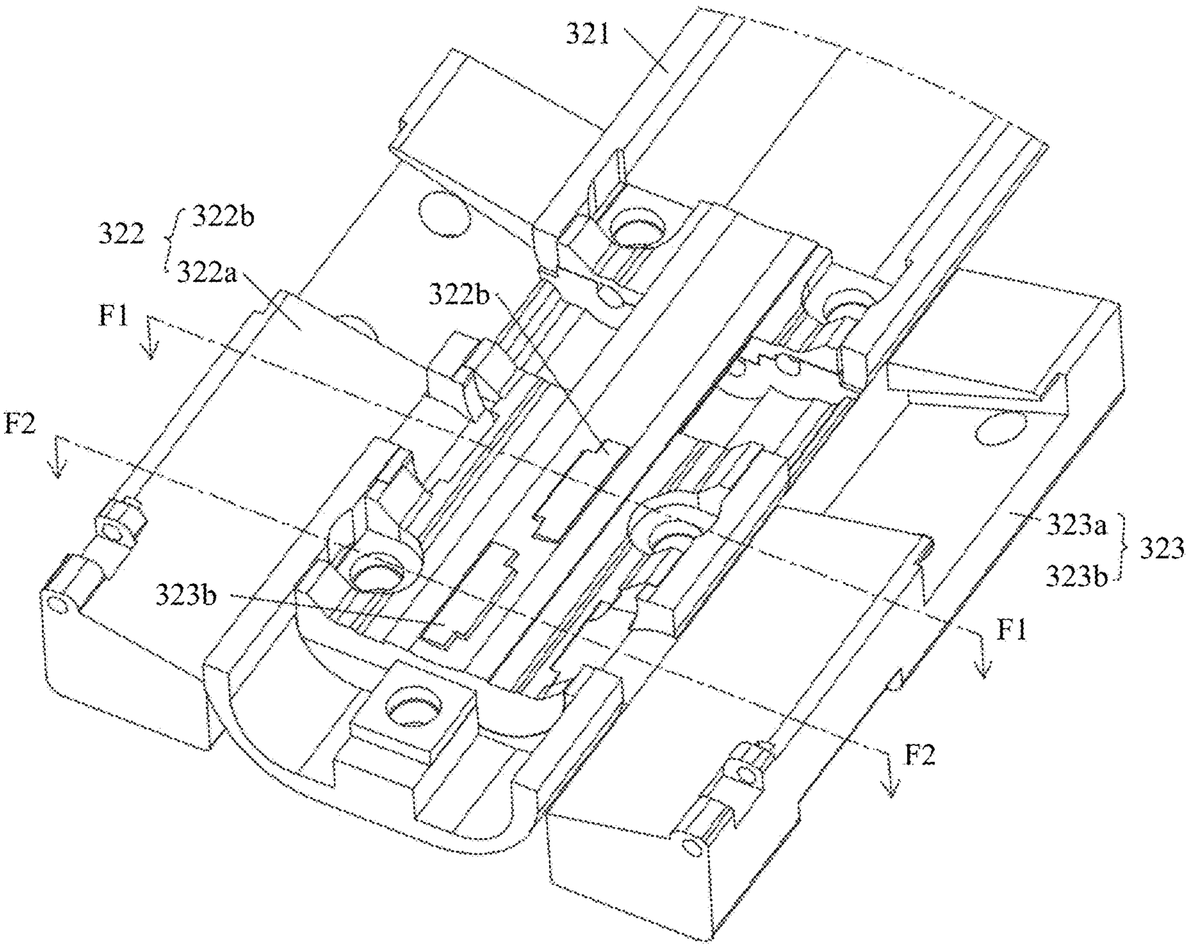
FIG. 59 is a schematic diagram of a partial structure of a folding mechanism shown in FIG. 42.

In some embodiments, FIG. 59 is a schematic diagram of a partial structure of the folding mechanism 32 shown in FIG. 42. FIG. 59 shows a fitting structure of the first fixing bracket 322 and the second fixing bracket 323 of the folding mechanism 32 and the middle housing 321. The first fixing bracket 322 is connected to the middle housing 321, the first arc-shaped arm 322*b* of the first fixing bracket 322 may be mounted on the middle housing 321, and the first fixed body 322*a* of the first fixing bracket 322 may be located in the outer space of the middle housing 321. The second fixing bracket 323 is connected to the middle housing 321, the second arc-shaped arm 323*b* of the second fixing bracket 323 may be mounted on the middle housing 321, and the second fixed body 323*a* of the second fixing bracket 323 may be located in the outer space of the middle housing 321.

Figure 60:
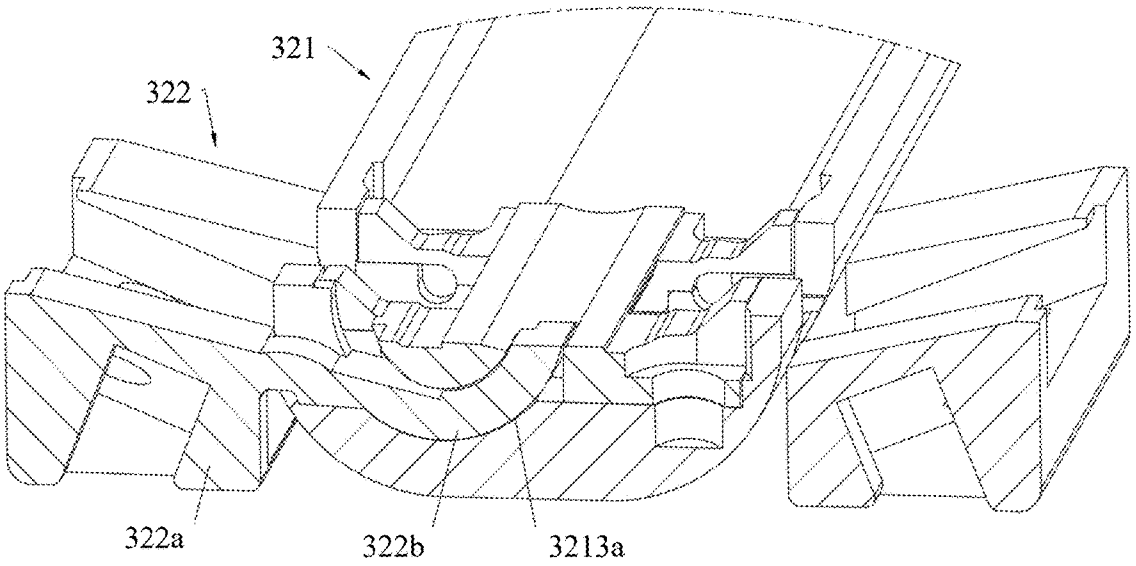
FIG. 60 is a schematic diagram of the structure shown in FIG. 59 when cut along F1-F1.
Figure 61:
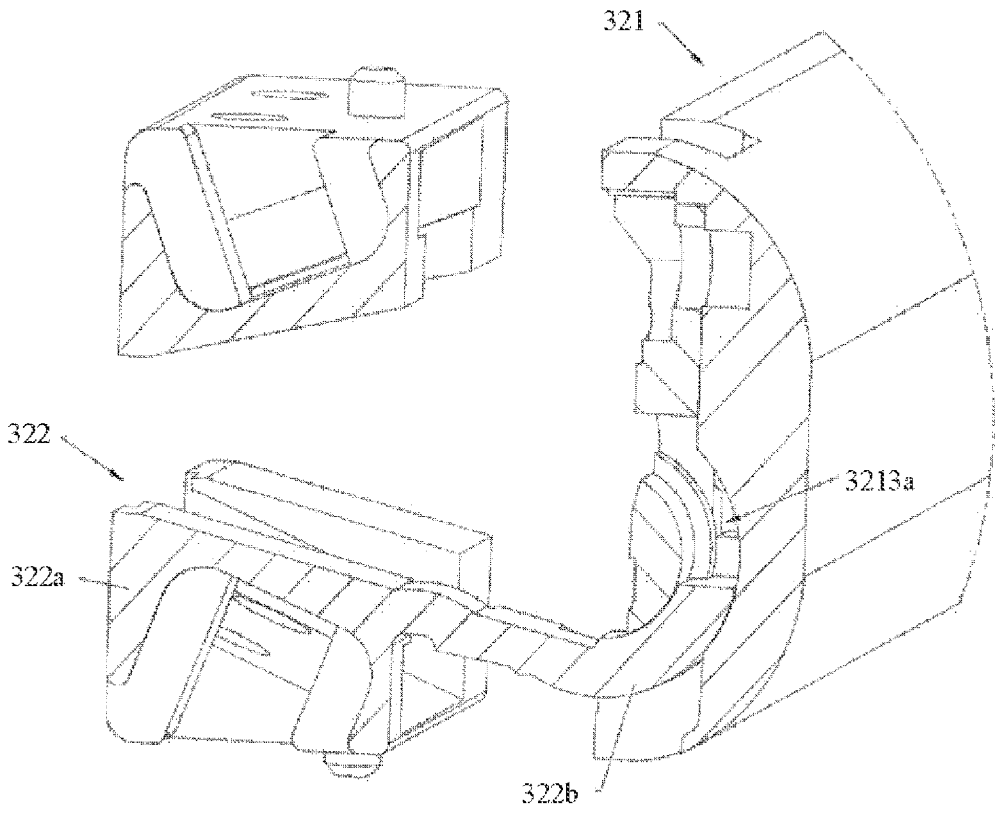
FIG. 61 is a schematic diagram of the structure shown in FIG. 60 in another use state.

For example. FIG. 60 is a schematic diagram of the structure shown in FIG. 59 when cut along F1-F1. FIG. 61 is a schematic diagram of the structure shown in FIG. 60 in another use state. The first am-shaped arm 322*h* of the first fixing bracket 322 may be mounted in the first arc-shaped groove 3213*a* of the middle housing 321, to rotatably connect the middle housing 321. When the structure shown in FIG. 60 is in an open state, the first arc-shaped arm 322*b* rotates into the first arc-shaped groove 3213*a*. When the structure shown in FIG. 61 is in a closed state, the first arc-shaped arm 322*b* partially rotates out from the first arc-shaped groove 3213*a*.

In this embodiment, the first arc-shaped arm 322*b* and the first arc-shaped groove 3213*a* cooperate with each other to form a rotatable connection structure using a virtual shaft. The first thong bracket 322 and the middle housing 321 are rotatably connected by using a virtual shaft, which can reduce design difficulty of the folding mechanism 32, have a low requirement on a size of the folding mechanism 32, and facilitate lightness and thinning of the folding mechanism 32 and the housing apparatus 3. In some other embodiments, the first fixing bracket 322 and the middle housing 321 may alternatively be rotatably connected by using a physical shaft. This is not strictly limited in this embodiment of this application.

Figure 62:
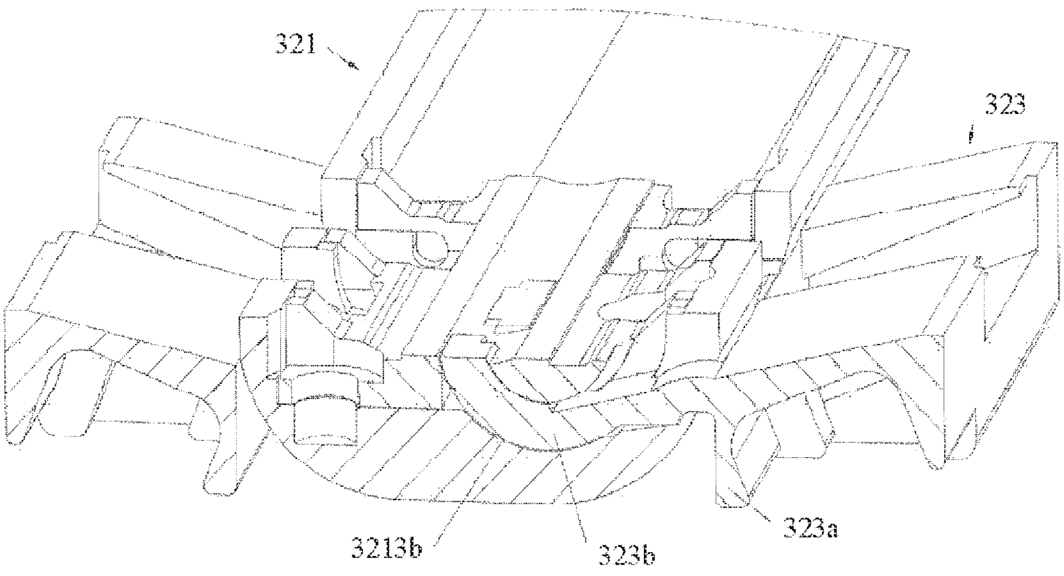
FIG. 62 is a schematic diagram of the structure shown in FIG. 59 when cut along F2-F2.
Figure 63:
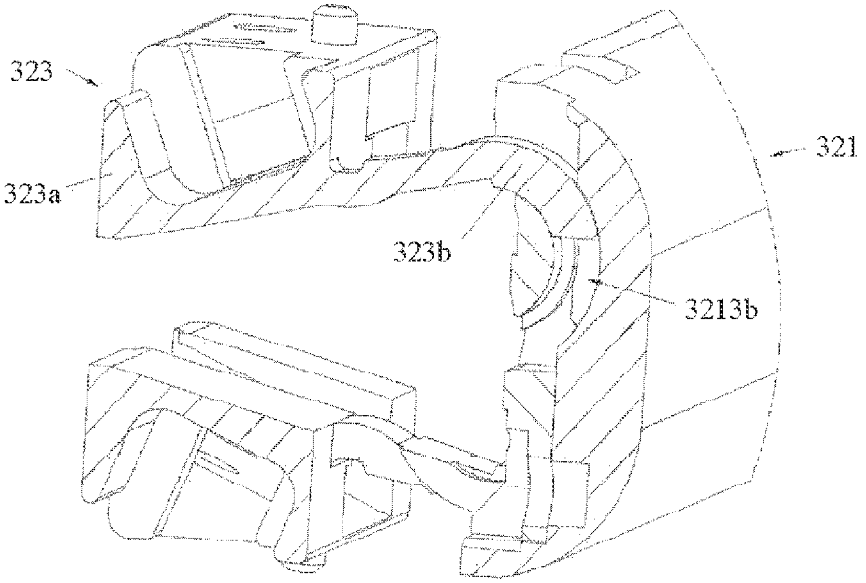
FIG. 63 is a schematic diagram of the structure shown in FIG. 62 in another use state.

For example, FIG. 62 is a schematic diagram of the structure shown in FIG. 59 when cut along F2-F2 FIG. 63 is a schematic diagram of the structure shown in FIG. 62 in another use state. The second arc-shaped arm 323*b* of the second fixing bracket 323 may be mounted in the second arc-shaped groove 3213*b* of the middle housing 321, to rotatably connect the middle housing 321. When the structure shown in FIG. 62 is in an open state, the second arc-shaped arm 323*b* rotates into the second arc-shaped groove 3213*b*. When the structure shown in FIG. 63 is in a closed state, the second arc-shaped arm 323*b* partially rotates out from the second am-shaped groove 3213*b*.

In this embodiment, the second arc-shaped arm 323*b* and the second arc-shaped groove 3213*b* cooperate with each other to form a rotatable connection structure using a virtual shaft. The second fixing bracket 323 and the middle housing 321 are rotatably connected by using a virtual shaft, which can reduce design difficulty of the folding mechanism 32, have a low requirement on a size of the folding mechanism 32, and facilitate lightness and thinning of the folding mechanism 32 and the housing apparatus 3. In some other embodiments, the second fixing bracket 323 and the middle housing 321 may alternatively be rotatably connected by using a physical shaft. This is not strictly limited in this embodiment of this application.

Figure 64:
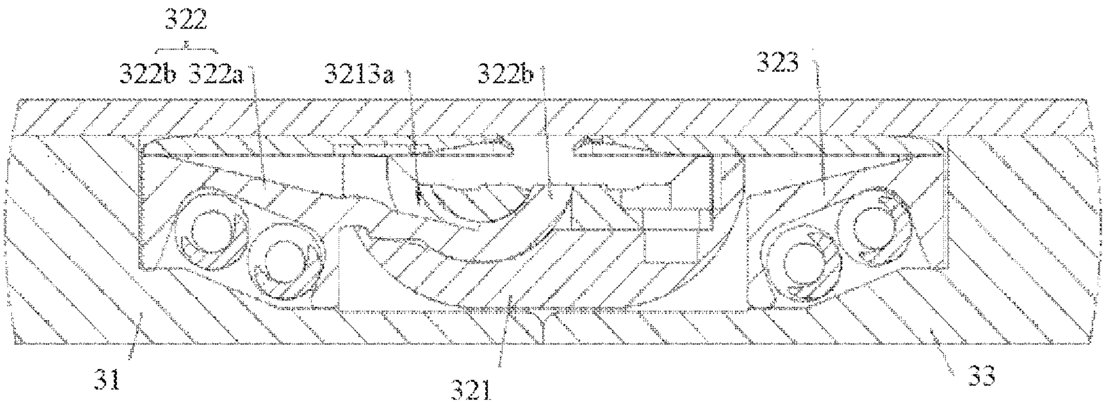
FIG. 64 is a schematic diagram of a structure of a cross section of the electronic device shown in FIG. 39 when cut along G1-G1.
Figure 65:
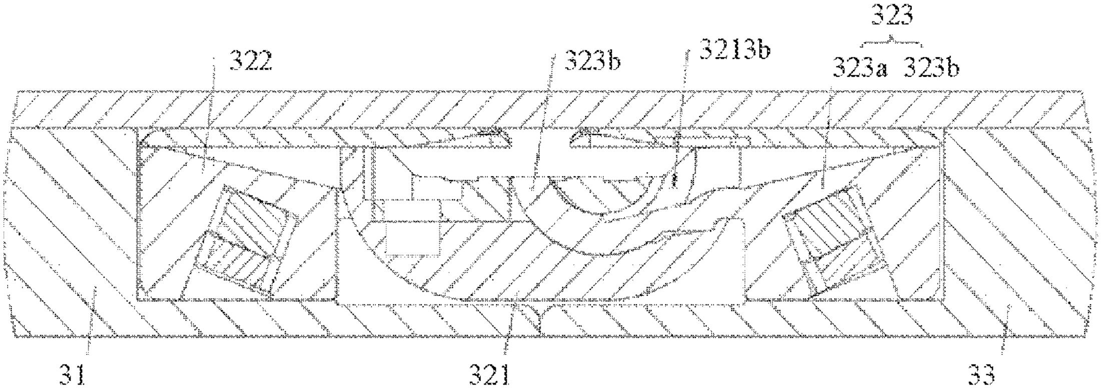
FIG. 65 is a schematic diagram of a structure of a cross section of the electronic device shown in FIG. 39 when cut along H1-H1.
Figure 66:
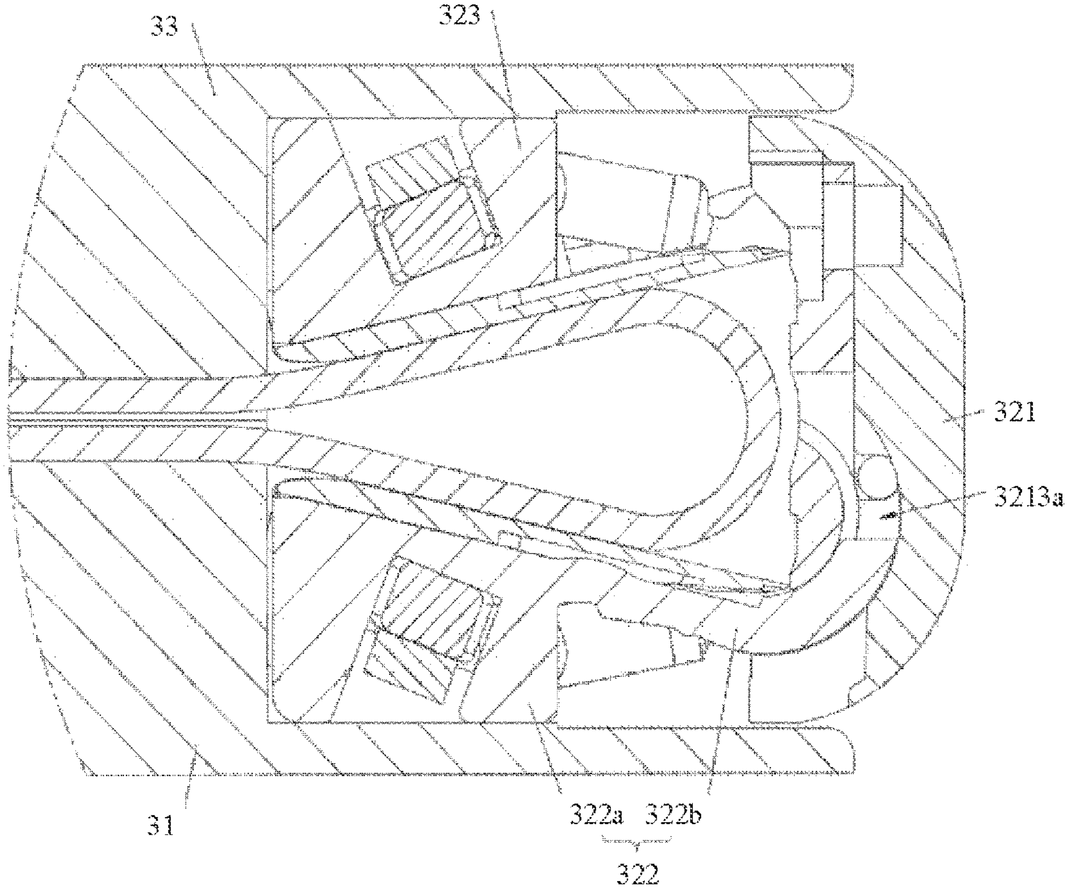
FIG. 66 is a schematic diagram of a structure of a cross section of the electronic device shown in FIG. 40 when cut along G2-G2.
Figure 67:
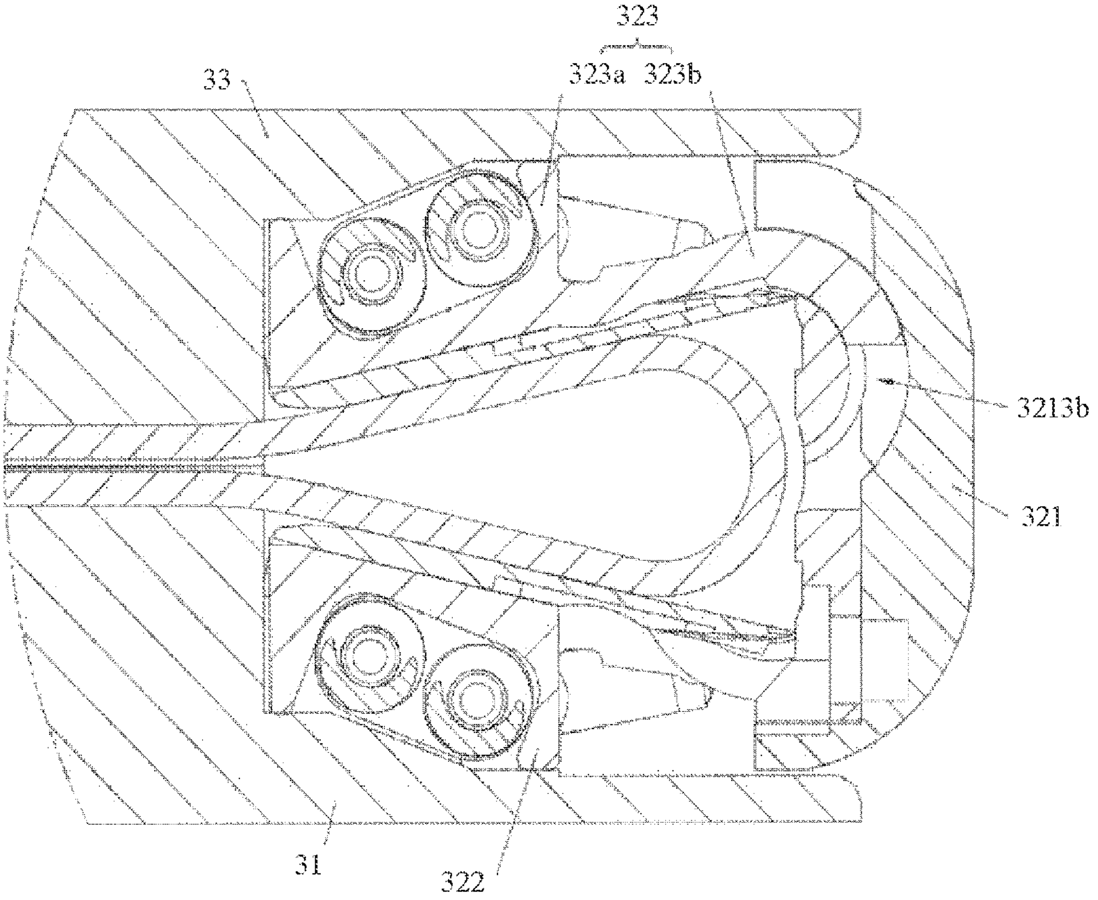
FIG. 67 is a schematic diagram of a structure of a cross section of the electronic device shown in FIG. 40 when cut along H2-H2.

FIG. 64 is a schematic diagram of a structure of a cross section of the electronic device 200 shown in FIG. 39 when cut along G1-G1. FIG. 65 is a schematic diagram of a structure of a cross section of the electronic device 200 shown in FIG. 39 when cut along H1-H1. FIG. 66 is a schematic diagram of a structure of a cross section of the electronic device 200 shown in FIG. 40 when cut along G2-G2. FIG. 67 is a schematic diagram of a structure of a cross section of the electronic device 200 shown in FIG. 40 when cut along H2-H2. The electronic device 200 shown in FIG. 64 and FIG. 65 is in an open state, and the electronic device 200 shown in FIG. 66 and FIG. 67 is in a closed state. G1-G1 and G2-G2 are at a same position, and H1-H1 and H2-H2 are at a same position.

The first fixing bracket 322 is fixedly connected to the first housing 31 and is rotatably connected to the middle housing 321, and the second fixing bracket 323 is fixedly connected to the second housing 33 and is rotatably connected to the middle housing 321. The first fixed body 322*a* of the first fixing bracket 322 is fixedly connected to the first housing 31, the first am-shaped arm 322*b* of the first fixing bracket 322 is mounted in the first arc-shaped groove 3213*a* of the middle housing 321, and the first fixing bracket 322 is rotatably connected to the middle housing 321 by using a virtual shaft. The second fixed body 323*a* of the second fixing bracket 323 is fixedly connected to the second housing 33, the second arc-shaped arm 323*b* of the second fixing bracket 323 is mounted in the second arc-shaped groove 3213*b* of the middle housing 321, and the second fixing bracket 323 is rotatably connected to the middle housing 321 by using a virtual shaft.

In this embodiment, a main moving mechanism of the folding mechanism 32 of the housing apparatus 3 is a single-stage rotatable connection between the first fixing bracket 322 and the second fixing bracket 323 and the middle housing 321. Because of a small quantity of parts, a simple part fitting relationship, a degree of freedom of 1, a short size (lain, and a small accumulated error, the main moving mechanism of the folding mechanism 32 is high in control precision. Because the first housing 31 is fixedly connected to the rust fixing bracket 322, the second housing 33 is fixedly connected to the second fixing bracket 323, and control precision of the main moving mechanism of the folding mechanism 32 is high, rotation precision is high when the first housing 31 and the second housing 32 rotate relative to the middle housing 321. This helps improve user experience of the electronic device 200 that applies the housing apparatus 3.

Figure 68:
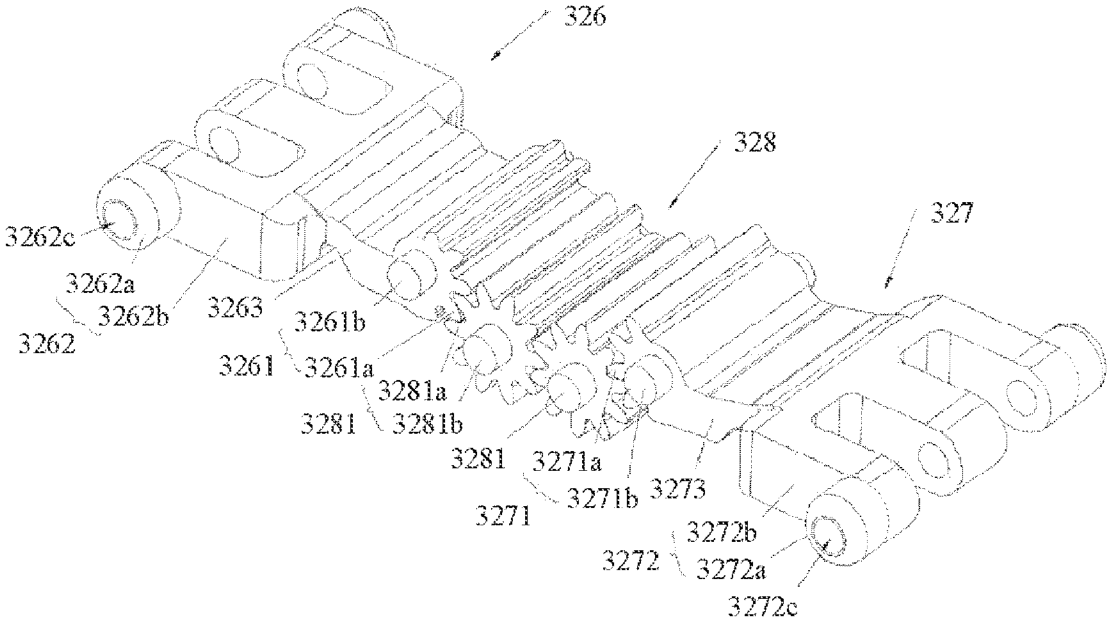
FIG. 68 is a schematic diagram of a fitting structure of a first swing arm, a second swing arm, and a synchronization assembly shown in FIG. 45.
Figure 69:
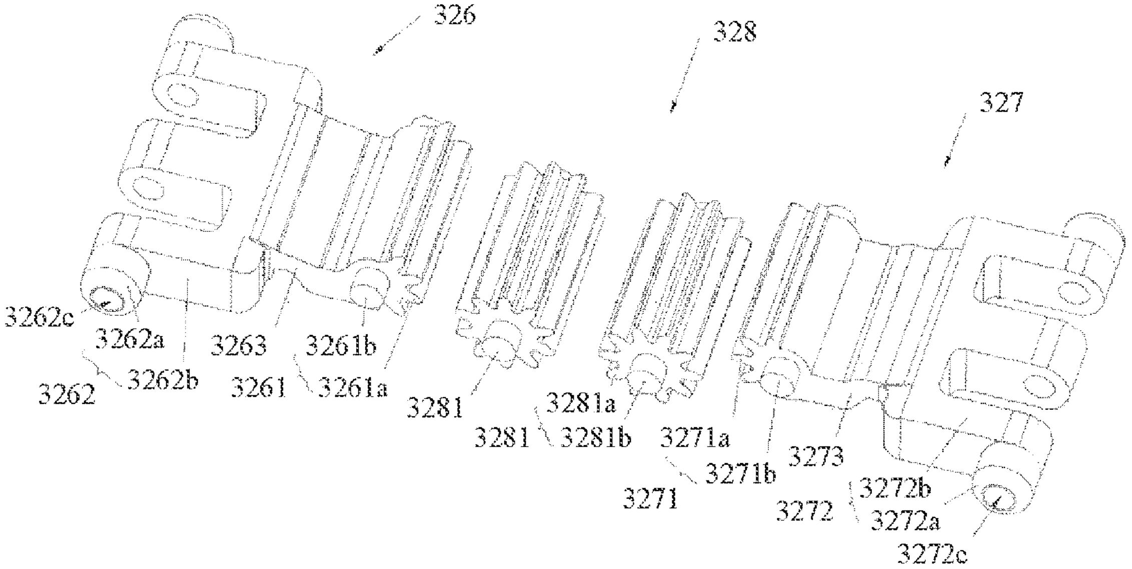
FIG. 69 is a schematic exploded view of the structure shown in FIG. 68.

In some embodiments, FIG. 68 is a schematic diagram of a fitting structure of the first swing arm 326, the second swing arm 327, and the synchronization assembly 328 shown in FIG. 45. FIG. 69 is a schematic exploded view of the structure shown in FIG. 68. The first swing arm 326 includes a rotation end 3261 and a movable end 3262. The first swing arm 326 may further include a connection segment 3263 that connects the rotation end 3261 and the movable end 3262. The first swing arm 326 may be an integrally formed mechanical part, so as to have high structural strength.

The rotation end 3261 of the first swing arm 326 includes a gear part 3261*a* and a hinge portion 3261*b*. A gear of the gear part 3261*a* is located on a peripheral side of the gear part 3261*a*, and the hinge portion 3261*b* may include two parts, which are respectively fastened to two ends of the gear part 3261*a*. The movable end 3262 of the first swing arm 326 may be in a claw shape. The movable end 3262 of the first swing arm 326 includes a first hinge 3262*a* and a plurality of first claw teeth 3262*b* that are spaced from each other. The first hinge 3262*a* includes two parts. The two parts of the first hinge 3262*a* are respectively located on two sides of the plurality of first claw teeth 3262*b*, and are connected to different first claw teeth 3262*h*. The first claw tooth 3262*b* has a connection end part that is away from the rotation end 3261 of the first swing arm 326, and the first hinge 3262*a* may be connected to the connection end part of the first claw tooth 3262*b*.

For example, the movable end 3262 of the first swing arm 326 may have a first rotation hole 3262*c*, and the first rotation hole 3262*c* penetrates through the first hinge 3262*a* and the plurality of first claw teeth 3262*b*. A rotation center of the first rotation hole 3262*c* may coincide with a rotation center of the first hinge 3262*a*. The rotation center of the first rotation hole 3262*c* is a center line of a hole wall of the first rotation hole 3262*c*, and the rotation center of the first hinge 3262*a* is a center line of an outer side surface of the first hinge 3262*a*.

In some embodiments, as shown in FIG. 68 and FIG. 69, the second swing anti 327 includes a rotation end 3271 and a movable aid 3272. The second swing arm 327 may further include a connection segment 3273 that connects s the rotation end 3271 and the movable end 3272. The second swing arm 327 may be an integrally formed mechanical part, so as to have high structural strength.

The rotation end 3271 of the second swing arm 327 includes a gear part 3271*a* and a hinge portion 3271*b*. A gear of the gear part 3271*a* is located on a peripheral side of the gear part 3271*a*, and the hinge portion 3271*b* may include two parts, which are respectively fastened to two ends of the gear part 3271*a*. The movable end 3272 of the second swing arm 327 may be in a claw shape. The movable end 3272 of the second swing arm 327 includes a second hinge 3272*a* and a plurality of second claw teeth 3272*b* that are spaced from each other. The second hinge 3272*a* includes two parts. The two parts of the second hinge 3272*a* are respectively located on two sides of the plurality of second claw teeth 3272*b*, and an, connected to different second claw teeth 3272*b*. In other words, two parts of the second hinge 3272*a* are respectively connected to two second claw teeth 3272*b* on two sides of the plurality of second claw teeth 3272*b*. For example, when the movable end 3272 of the second swing arm 327 includes three second claw teeth 3272*b*, two parts of the second lunge 3272*a* are respectively connected to the 1' second claw tooth 3272*b* and the 3' second claw tooth 3272*b*. The second hinge 3272*a* may be connected to an and part that is of the second claw tooth 3272*b* and that is away from the rotation end 3271 of the second swing arm 327.

For example, the movable and 3272 of the second swing arm 327 may have a second rotation hole 3272*c*, and the second rotation hole 3272*c* penetrates through the second hinge 3272*a* and the plurality of second claw teeth 3272*b*. A rotation center of the second rotation hole 3272*c* may coincide with a rotation center of the second hinge 3272*a* The rotation center of the second rotation hole 3272*c* is a center line of a hole wall of the second rotation hole 3272*c*, and the rotation center of the second hinge 3272*a* is a center line of an outer side surface of the second hinge 3272*a*.

In some embodiments, as shown in FIG. 68 and FIG. 69, the synchronization assembly 328 may include a plurality of synchronous gears 3281, two adjacent synchronous gears 3281 of the plurality of synchronous gears 3281 are engaged with each other, and the rotation end 3261 of the first swing arm 326 is engaged with the rotation end 3271 of the second swing arm 327 by using the plurality of synchronous gears 3281. For example, the plurality of synchronous gears 3281 may be arranged into a string, two adjacent synchronous gears 3281 are engaged with each other, and the two synchronous gears 3281 located at the end parts are respectively engaged with the rotation end 3261 of the first swing arm 326 and the rotation end 3271 of the second swing arm 327. The synchronous gear 3281 may include a gear part 3281*a* and a hinge portion 3281*h*. A gear of the gear part 3281*a* is located on a peripheral side of the gear part 3281*a*, and the hinge portion 3281*b* may include two parts that are respectively fastened to two ends of the gear part 3281*a* The synchronous gear 3281 may be an integrally formed mechanical part, so as to have high structural strength.

It may be understood that a quantity, sizes, and the like of synchronous gears 3281 of the synchronization assembly 328 may be designed based on a specific model such as a product form and a size. This is not strictly limited in this application. The larger quantity of synchronous gears 3281, the smaller size of the synchronous gear 3281, so that more space is released. The smaller quantity of synchronous gears 3281, the larger size of the synchronous gear 3281, and the smaller accumulated transmission error of the synchronous gear 3281, which helps improve movement accuracy.

Figure 70:
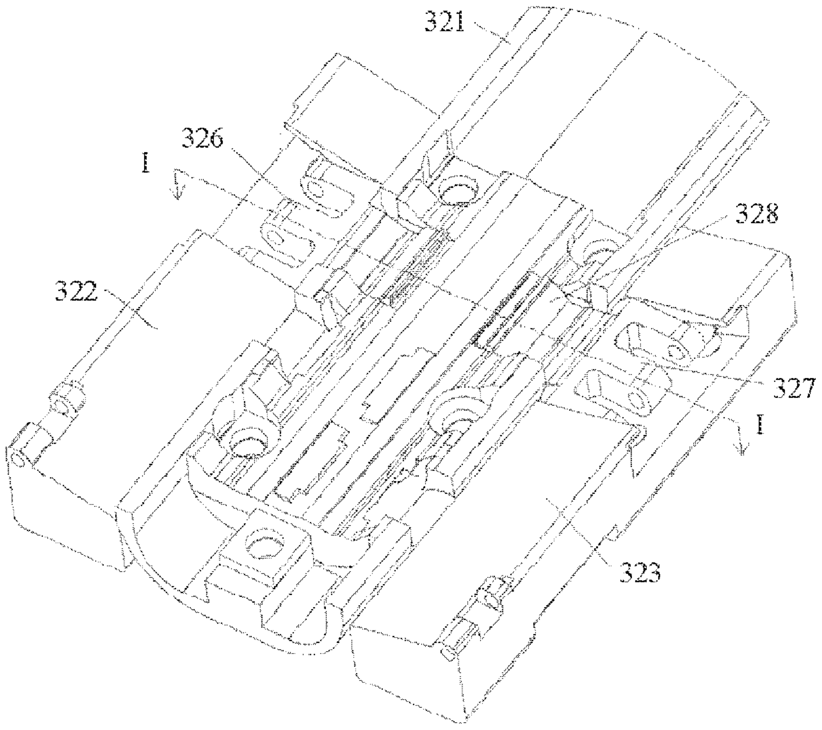
FIG. 70 is a schematic diagram of another partial structure of a folding mechanism shown in FIG. 42.

In some embodiments, FIG. 70 is a schematic diagram of another partial structure of the folding mechanism 32 shown in FIG. 42. FIG. 70 shows a fitting structure of the middle housing 321, the first fixing bracket 322, the second fixing bracket 323, the first swing tam 326, the second swing arm 327, and the synchronization assembly 328 of the folding mechanism 32. One and of the first swing arm 326 is connected to the first fixing bracket 322, and the other end of the first swing arm 326 is connected to the middle housing 321. One end of the second swing arm 327 is connected to the second fixing bracket 323, and the other end of the second swing arm 327 is connected to the middle housing 321.

Figure 71:
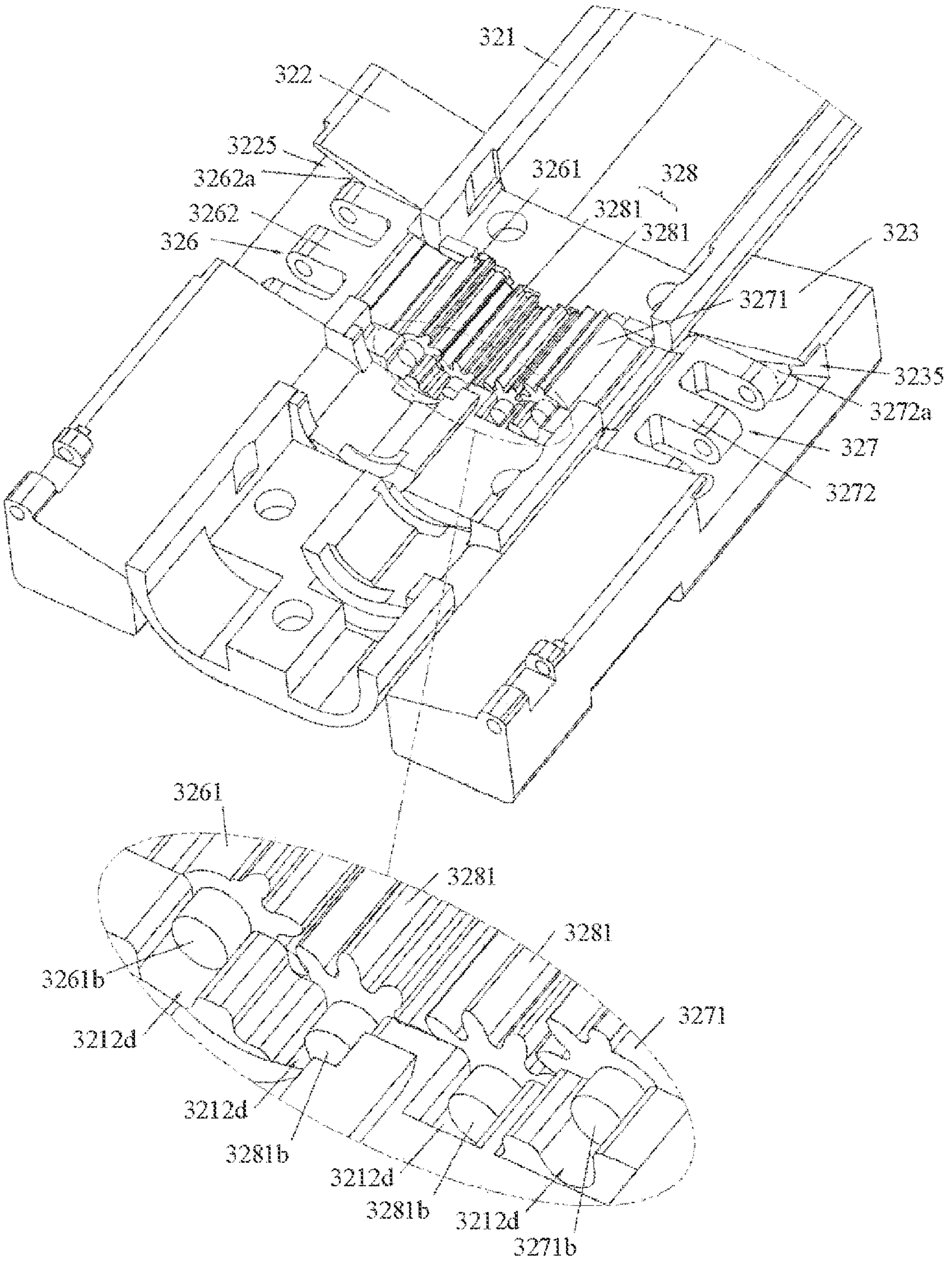
FIG. 71 is a schematic diagram of a partial structure of the structure shown in FIG. 70.
Figure 72:
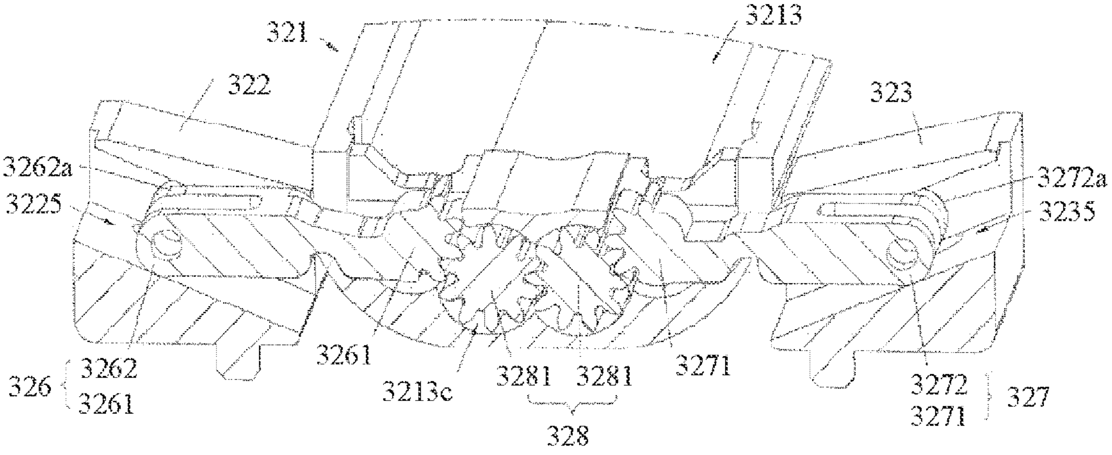
FIG. 72 is a schematic diagram of the structure shown in FIG. 70 when cut along I-I.
Figure 73:
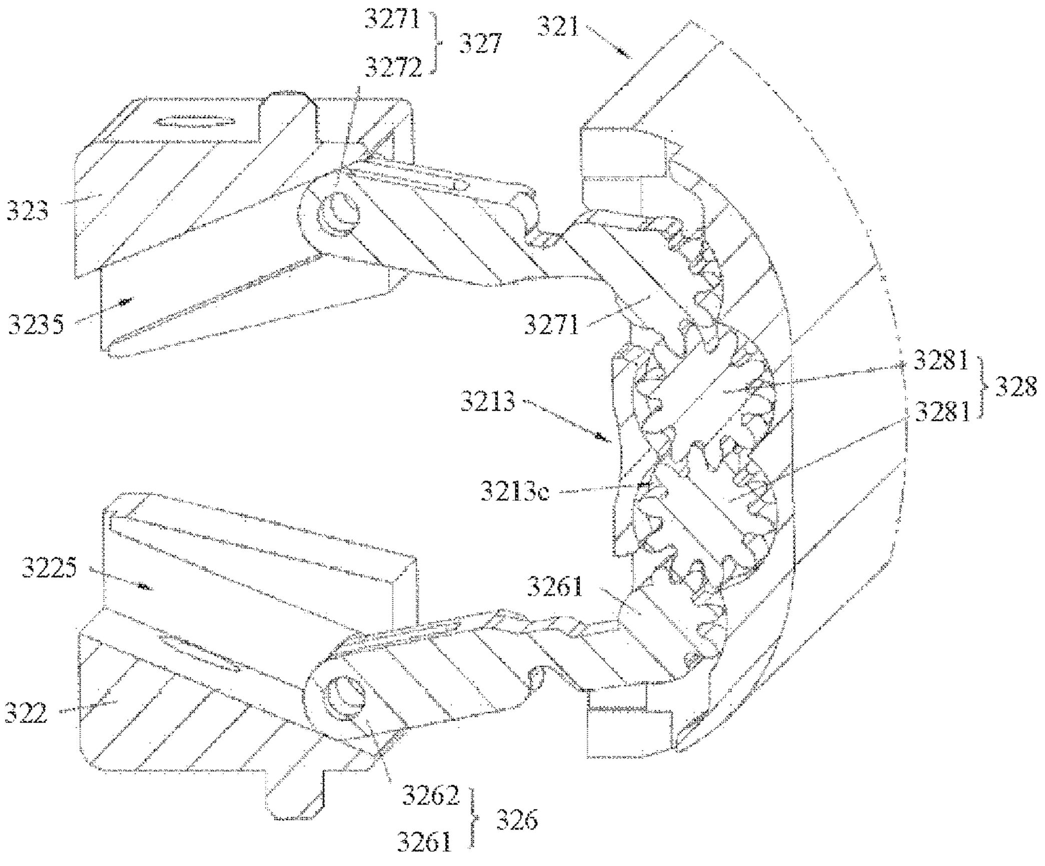
FIG. 73 is a schematic diagram of the structure shown in FIG. 72 in another use state.

In some embodiments, FIG. 71 is a schematic diagram of a partial structure of the structure show n in FIG. 70 FIG. 72 is a schematic diagram of the structure shown in FIG. 70 when cut along I-I. FIG. 73 is a schematic diagram of the structure shown in FIG. 72 in another use state. A partial structure of the middle housing 321 is omitted in FIG. 71. The structure shown in FIG. 72 is in an open state, and the structure shown in FIG. 73 is in a closed state.

The natation end 3261 of the first swing arm 326, the synchronization assembly 328, and the rotation end 3271 of the second swing arm 327 are mounted in the middle housing 321, for example, may be mounted in the movable space 3213*c* of the middle housing 321. The hinge portion 3271*b* of the rotation end 3261 of the first swing arm 326 may be mounted in one of the hinge grooves 3213*d* of the movable space 3213*c*, so that the rotation end 3261 of the first swing arm 326 is rotatably connected to the middle housing 321. The hinge portion 3271*h* of the rotation end 3271 of the second swing arm 327 may be mounted in another hinge groove 3213*d* of the movable space 3213*c*, so that the rotation aid 3271 of the second swing arm 327 is rotatably connected to the middle housing. The hinge portions 3281*b* of the two synchronous gears 3281 of the synchronization assembly 328 may be respectively mounted in another two hinge grooves 3213*d* of the movable space 3213*c*, so that the synchronous gears 3281 of the synchronization assembly 328 are all rotatably connected to the middle housing 321.

In an axial direction of the middle housing 321, a wall surface of the movable space 3213*c* of the middle housing 321 limits the rotation end 3261 of the first swing arm 326, the synchronous gear 3281, and the rotation aid 3271 of the second swing arm 327, so that a fitting relationship between the rotation end 3261 of the first swing arm 326, the synchronization assembly 328, and the rotation end 3271 of the second swing arm 327 and the middle housing 321 is more stable, and the folding mechanism 32 is more reliable.

The first hinge 3262*a* of the first swing arm 326 is mounted in the first sliding slot 3225 of the first fixing bracket 322, and can slide and rotate in the first sliding slot 3225, so that the movable end 3262 of the first swing arm 326 is slidably and rotatably connected to the first fixing bracket 322. The second hinge 3272*a* of the second swing arm 327 is mounted in the second sliding slot 3235 of the second fixing bracket 323, and the second hinge 3272*a* can slide and rotate in the second sliding slot 3235, so that the movable end 3272 of the second swing arm 327 is slidably and rotatably connected to the second fixing bracket 323.

As shown in FIG. 72 and FIG. 73, in a process of switching between the open state and the closed state, the first swing win 326 rotates relative to the middle housing 321, the first swing arm 326 slides relative to the first fixing bracket 322 and rotates relative to the first fixing bracket 322. The second swing arm 327 rotates relative to the middle housing 321, and the second swing arm 327 slides relative to the second fixing bracket 323, and rotates relative to the second fixing bracket 323.

In this embodiment, the rotation end 3261 of the first swing arm 326 is connected to the rotation end 3271 of the second swing arm 327 by using the plurality of synchronous gears 3281, so that a rotation angle of the rotation end 3261 of the first swing arm 326 and a rotation angle of the rotation end 3271 of the second swing arm 327 are the same in size and opposite in direction. In this case, rotation actions of the first swing arm 326 and the second swing arm 327 relative to the middle housing 321 are synchronous, that is, the first swing arm 326 and the second swing arm 327 are synchronously close to each other or away from each other.

In addition, because the movable end 3262 of the first swing arm 326 is slidably and rotatably connected to the first fixing bracket 322, and the movable end 3272 of the second swing arm 327 is slidably and rotatably connected to the second bang bracket 323, in a process in which the first fixing bracket 322 and the second fixing bracket 323 rotate relative to the middle housing 321, the first swing arm 326 affects a rotation angle of the first fixing bracket 322, and the second swing arm 327 affects a rotation angle of the second fixing bracket 323, so that rotation actions of the first fixing bracket 322 and the second fixing bracket 323 relative to the middle housing 321 are synchronous, that is, the fast fixing bracket 322 and the second fixing bracket 323 are synchronously close to or away from each other.

In some embodiments, as shown in FIG. 72 and FIG. 73, the rotation aid 3261 of the first swing arm 326, the plurality of synchronous gears 3281, and the rotation end 3271 of the second swing arm 327 are arranged in an arc shape. That is, a rotation center of the rotation end 3261 of the first swing arm 326, rotation centers of the plurality of synchronous gears 3281, and a rotation center of the rotation end 3271 of the second swing arm 327 are arranged in an arc shape. In this case, the rotation end 3261 of the first swing arm 326, the plurality of synchronous gears 3281, and the rotation end 3271 of the second swing arm 327 can fully we the inner space 3213 of the middle housing 321, so that the inner space 3213 of the middle housing 321 can be released more to form display accommodating space for accommodating a part of the flexible display 4 when the electronic device 200 is closed. This helps improve complications of component arrangement of the electronic device 200 and reduce a size of the electronic device 200.

Figure 74:
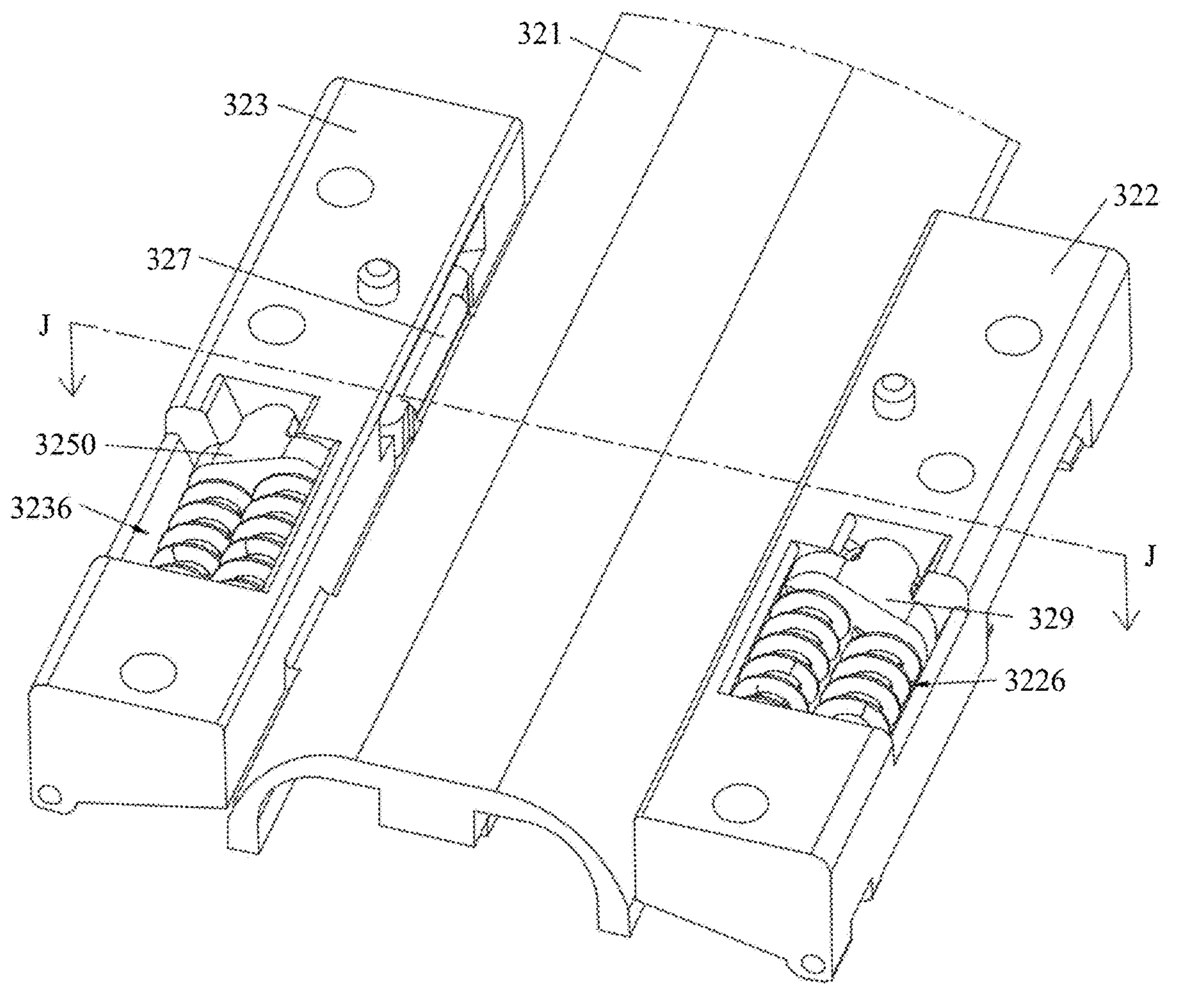
FIG. 74 is a schematic diagram of a partial structure of a folding mechanism shown in FIG. 43.
Figure 75:
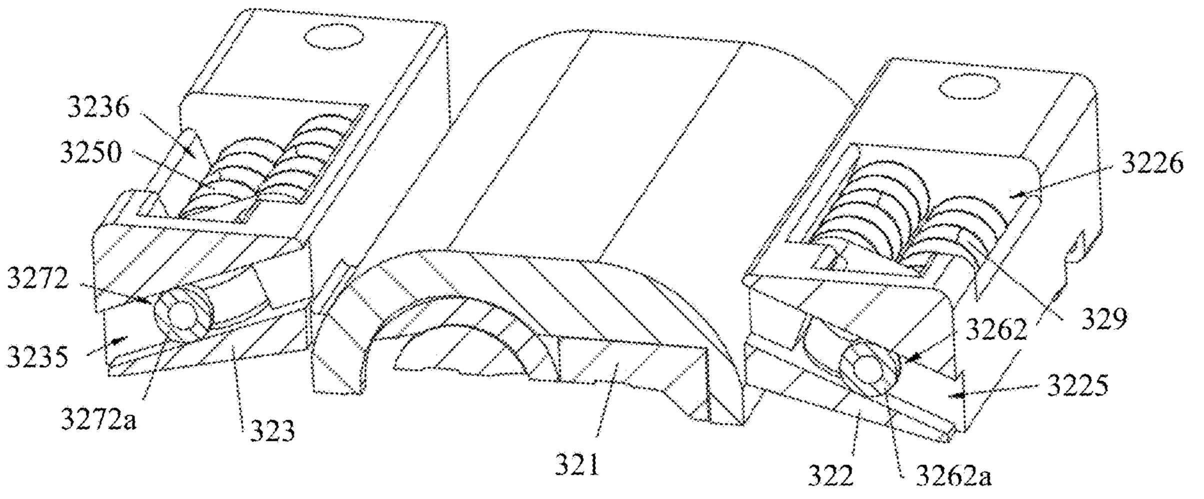
FIG. 75 is a schematic diagram of a cross section of the structure shown in FIG. 74 when cut along J-J.

In some embodiments, FIG. 74 is a schematic diagram of a partial structure of the folding mechanism 32 shown in FIG. 43. FIG. 75 is a schematic diagram of a cross section of the structure shown in FIG. 74 when art along J-J. FIG. 74 shows the middle horning 321, the first fixing bracket 322, the second fixing bracket 323, the second swing arm 327, the first stopper 329, and the second stopper 3250 of the folding mechanism 32 FIG. 75 shows a part of the middle housing 321, a part of the first fixing bracket 322, a part of the second fixing bracket 323, a part of the first swing arm 326, a part of the second swing arm 327, the first stopper 329, and the second stopper 3250 of the folding mechanism 32.

The first stopper 329 is mounted in the first mounting groove 3226 of the first fixing bracket 322, and the second stopper 3250 is mounted in the second mounting groove 3236 of the second fixing bracket 323. The first mounting groove 3226 of the first fixing bracket 322 communicates with the first sliding slot 3225, and the first stopper 329 partially extends in to the first sliding slot 3225. The second mounting groove 3236 of the second fixing bracket 323 communicates with the second sliding slot 3235, and the second stopper 3250 partially extends into the second sliding slot 3235. When the folding mechanism 32 is in an open state, that is, when the first housing 31 and the second housing 33 are in an open state, the first stopper 329 abuts against the movable end 3262 of the first swing arm 326, and the second stopper 3250 abuts against the movable end 3272 of the second swing arm 327. For example, the first stopper 329 abuts the first hinge 3262*a* of the first swing arm 326, and the second stopper 3250 abuts the second hinge 3272*a* of the second swing arm 327.

When the housing apparatus 3 is in an open state, the first stopper 329 abuts against a side that is of the first hinge 3262*a* and that is close to the middle housing 321, to prevent the first swing arm 326 from moving in a direction close to the middle housing 321, and the second stopper 3250 abuts against a side that is of the second hinge 3272*a* and that is close to the middle housing 321, to prevent the second swing arm 327 from moving in a direction close to the middle housing 321. In this case, the positions of the first swing arm 326 and the second swing arm 327 are stable, so that the housing apparatus 3 can keep in the open state. In short, the first stop per 329 limits the first swing arm 326 and the second stopper 3250 limits the second swing arm 327, so that the housing apparatus 3 remains in the open state when no relatively large external force is applied, thereby improving user experience.

In addition, in a process in which the user unfolds the electronic device 200 and enables the electronic device 200 to enter the open state, the first swing arm 326 needs to more from a side that is of the first stopper 329 and that is close to the middle housing 321 to a side that is away from the middle housing 321. In this case, the first swing arm 326 needs to overcome limiting resistance of the first stopper 329 when passing through the first stopper 329, and the second swing arm 327 needs to move from a side that is of the second stopper 3250 and that is close to the middle housing 321 to a side that is away from the middle housing 321. The second swing arm 327 needs to overcome limiting resistance of the second stopper 3250 when passing through the second stopper 3250. Similarly; in a process in which the user folds the electronic device 200 and ends the open state, the first swing arm 326 needs to move from a side that is of the first stopper 329 and that is away from the middle housing 321 to a side that is close to the middle housing 321. In this case, the first swing arm 326 needs to overcome limiting resistance of the first stopper 329 when passing through the first stopper 329, and the second swing arm 327 needs to move from a side that is of the second stopper 3250 and that is away from the middle housing 321 to a side that is close to the middle housing 321. The second swing arm 327 rinds to overcome limiting resistance of the second stopper 3250 when passing through the second stopper 3250. Therefore, the test stopper 329 and the second stopper 3250 can provide limiting resistance in a process in which the electronic device 200 is unfolded to enter the open state and in a process in which the electronic device 200 is folded to end the open state, so that the user can experience a better sense of operation of the mechanism.

Figure 76:
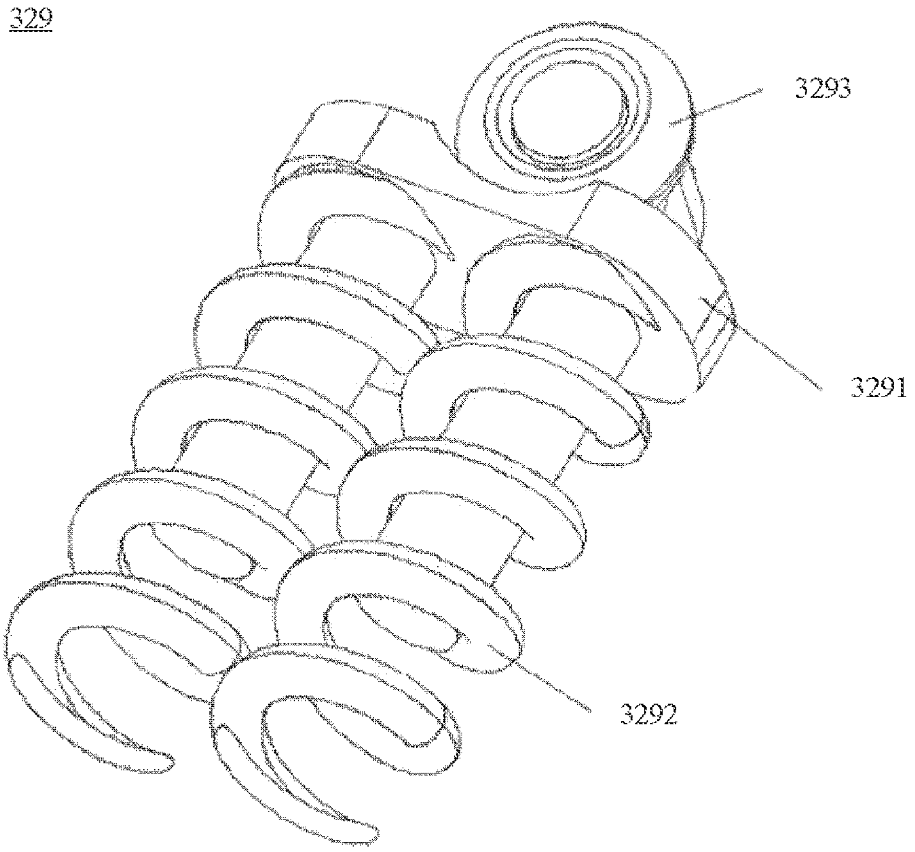
FIG. 76 is a schematic diagram of a structure of a first stopper shown in FIG. 45.
Figure 77:
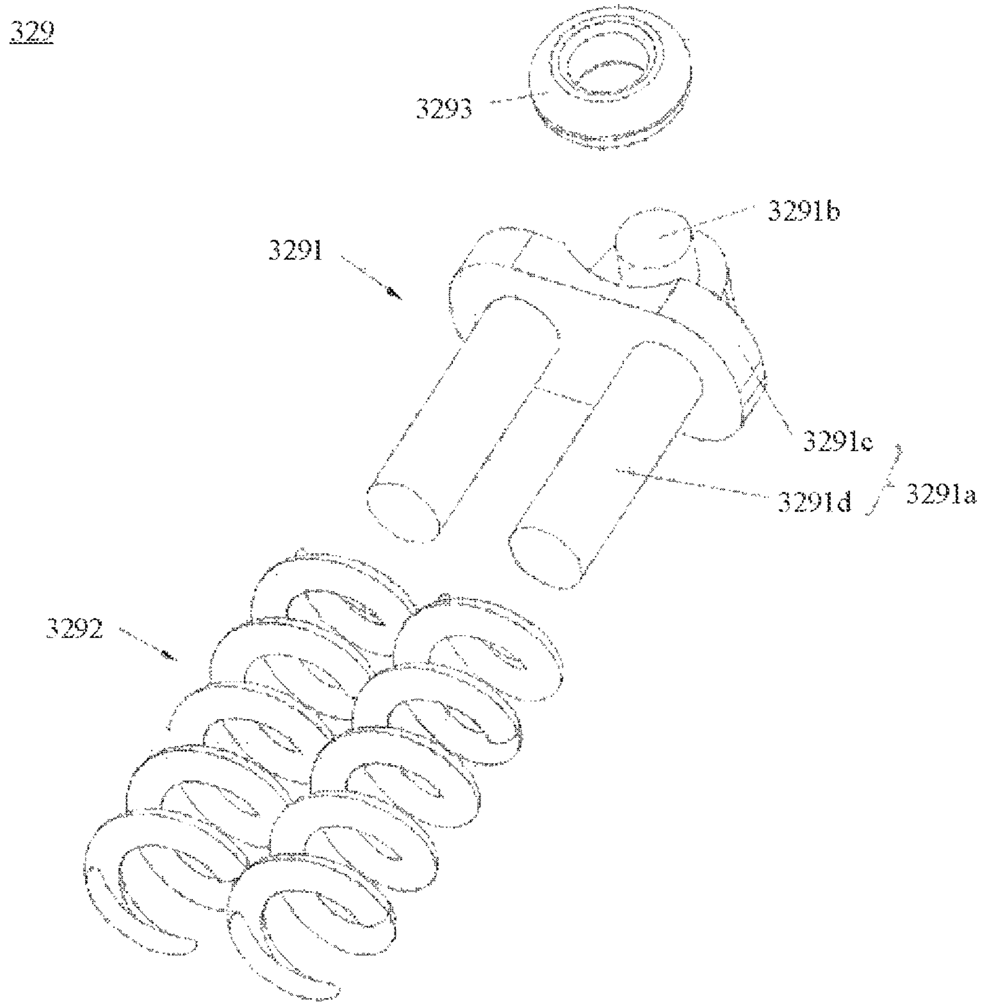
FIG. 77 is a schematic exploded view of a structure of the first stopper shown in FIG. 76.

In some embodiments, FIG. 76 is a schematic diagram of a structure of the first stopper 329 shown in FIG. 45. FIG. 77 is a schematic exploded view of a structure of the first stopper 329 shown in FIG. 76. The first stopper 329 includes a holder 3291 and an elastic part 3292. The holder 3291 is of a rigid structure, and is not prone to deformation under an external force. The elastic part 3292 is of an elastic structure, and is prone to deformation under an external force. The holder 3291 includes a control part 3291*a* and a pressing part 3291*b*. One end of the elastic part 3292 is mounted on the control part 3291*a* of the holder 3291, and the other end of the elastic part 3292 is configured to abut against a groove wall of the first mounting groove 3226 (as shown in FIG. 74). For example, the control part 3291*a* may include a plate body 3291*c* and a guide post 3291*d* fastened on one side of the plate body 3291*c* the pressing part 3291*b* is fastened on the other side of the plate body 3291*c*, and there may be one or more guide posts 3291*d*. The elastic part 3292 may be a spring, a quantity of springs corresponds to a quantity of guide posts 3291*d*, and the spring may be sleeved on the guide post 3291*d*. When the first housing 31 and the second housing 33 are in an open state, the pressing part 3291*b* of the holder 3291 abuts against the movable end 3262 of the first swing arm 326.

In this embodiment, the elastic pan 3292 of the stopper 329 can deform under an external force, so that the stopper 329 can move relative to the movable end 3262 of the first swing arm 326, thereby improving reliability of limiting between the stopper 329 and the movable end 3262 of the first swing arm 326.

The stopper 329 may further include a buffer 3293, and the buffer 3293 is mounted on the pressing part 3291*b* of the holder 3291. The butter 3293 may be made of a material (for example, rubber) with small stiffness, so that when being subjected to an external force, the buffer 3293 can absorb an impact force through deformation, thereby implementing buffering. Because the buffer 3293 is sleeved on the pressing part 3291*b* of the holder 3291, the stopper 329 abuts against the movable aid 3262 of the first swing arm 326 by using the buffer 3293 having a buffer function. This helps reduce a risk of wear of the holder 3291 of the stopper 329 and the movable end 3262 of the first swing arm 326 in a long-time relative movement process, improve limiting reliability of the stopper 329, and improve reliability of the folding mechanism 32.

A structure of the second stopper 3250 may be the same as a structure of the first stopper 329, so as to simplify, material types of the housing apparatus 3 and reduce costs. A specific structure of the second stopper 3250 is not described in detail in this embodiment.

It may be understood that the foregoing embodiment shows an implementation structure of the stopper by using an example. The stopper in this embodiment of this application may also have another structure, for example, an elastic rubber block. This is not strictly limited in this application.

Figure 78:
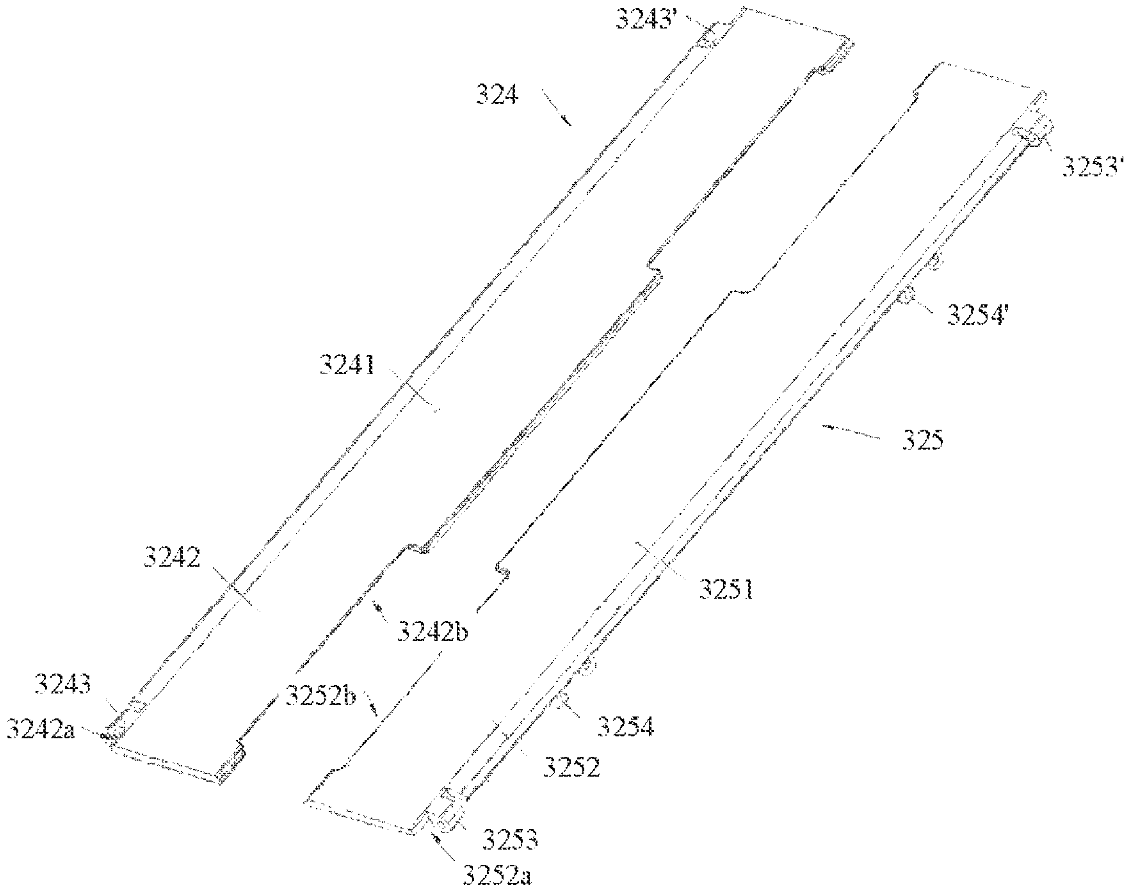
FIG. 78 is a schematic diagram of structures of a first support plate and a second support plate shown in FIG. 45.
Figure 79:
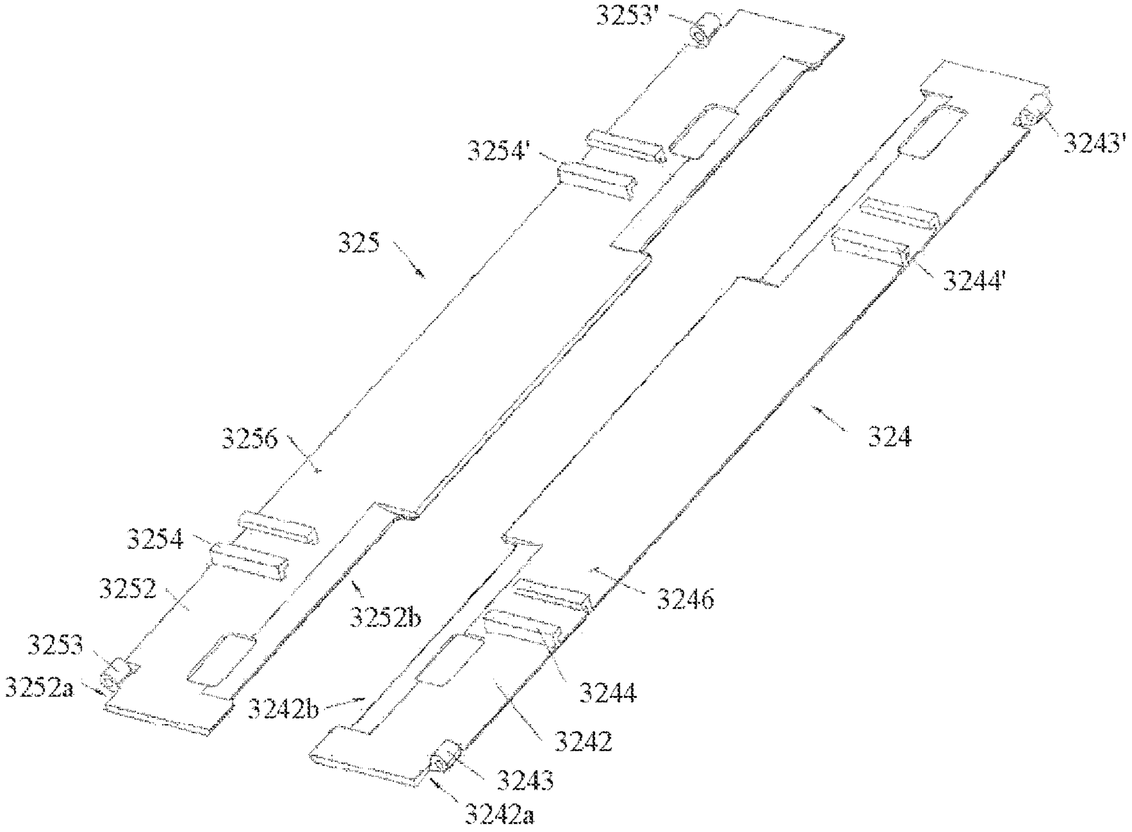
FIG. 79 is a schematic diagram of structures of the first support plate and the second support plate shown in FIG. 78 from another angle.

In some embodiments, FIG. 78 is a schematic diagram of structures of the first support plate 324 and the second support plate 325 shown in FIG. 45. FIG. 79 is a schematic diagram of structures of the first support plate 324 and the second support plate 325 shown in FIG. 78 from another angle. A field of view shown in FIG. 79 is reversed horizontally relative to a field of view shown in FIG. 78.

The first support plate 324 may include a first plate body 3242, and a first rotation part 3243 and a first sliding rail 3244 that are fastened on the first plate body 3242. The first support plate 324 may be an integrally formed structure, so as to obtain high structural strength. The support surface 3241 of the first support plate 324 is formed on the first plate body 3242. The first plate body 3242 includes a fixing surface 3246, and the fixing surface 3246 is disposed back to the support surface 3241 of the first support plate 324. The first sliding rail 3244 is fastened on the fixing surface 3246. In other words, the first plate body 3242 may include a top surface and a bottom surface that are disposed back to each other, the top surface of the first plate body 3242 forms the support surface 3241 of the first support plate 324, and the first sliding rail 3244 is fastened on the bottom surface of the first plate body 3242. A first notch 3242*a* may be disposed on one side of the first plate body 3242, and the first rotation part 3243 is located in the first notch 3242*a* A first avoidance notch 3242*b* may be further disposed on the other side of the first plate body 3242, and the first avoidance notch 3242*b* is disposed back to the first notch 3242*a*. The first avoidance notch 3242*b* is configured to avoid other components of the folding mechanism 32 in a rotation process of the first support plate 324.

The second support plate 325 includes a second plate body 3252, and a second rotation part 3253 and a second sliding rail 3254 that are fastened on the second plate body 3252. The second support plate 325 may be an integrally formed structure, so as to obtain high structural strength. The support surface 3251 of the second support plate 325 is formed on the second plate body 3252. The second plate body 3252 includes a fixing surface 3256, and the fixing surface 3256 is disposed back to the support surface 3251 of the second support plate 325. The second sliding rail 3254 is fastened on the fixing surface 3256. In other words, the second plate body 3252 may include a top surface and a bottom surface that are disposed back to each other, the top surface of the second plate body 3252 forms the support surface 3251 of the second support plate 325, and the second sliding rail 3254 is fastened on the bottom surface of the second plate body 3252. A second notch 3252*a* may be disposed on one side of the second plate body 3252, and the second rotation part 3253 is located in the second notch 3252*a*. A second avoidance notch 3252*b* may be further disposed on the other side of the second plate body 3252, and the second avoidance notch 3252*b* is disposed back to the second notch 3252*a*. The second avoidance notch 3252*b* and the first avoidance notch 3242*b* are disposed opposite to each other. The second avoidance notch 3252*b* is configured to avoid other components of the folding mechanism 32 in a rotation process of the second support plate 325.

It may be understood that the first plate body 3242 of the first support plate 324 may be of a mirror symmetric structure. The first support plate 324 may further include another first rotation part 3243' and another first sliding rail 3244'. The first rotation part 3243' and the first rotation part 3243 may be of a mirror symmetric structure, and the first sliding rail 3244' and the first sliding rail 3244 may be of a mirror symmetric structure. A specific structure of the first support plate 324 is not strictly limited in this embodiment of this application.

The second plate body 3252 of the second support plate 325 may be of a mirror symmetric structure. The second support plate 325 may thither include another second rotation part 3253' and another second sliding rail 3254'. The second rotation part 3253' and the second rotation part 3253 may be of a mirror symmetric structure, and the second sliding rail 3254' and the second sliding rail 3254 may be of a mirror symmetric structure. A specific structure of the second support plate 325 is not strictly limited in this embodiment of this application.

Figure 80:
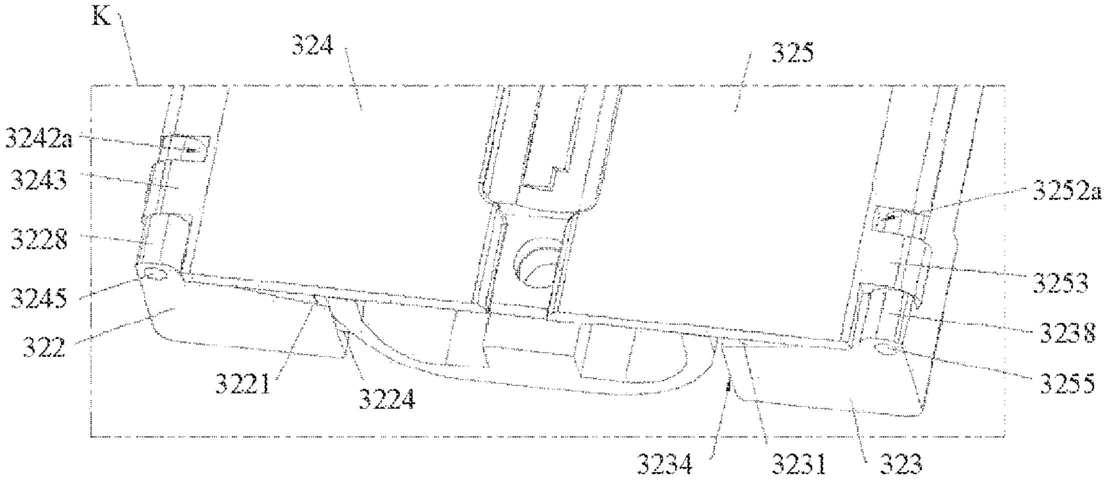
FIG. 80 is an enlarged schematic diagram of a structure at K of a folding mechanism shown in FIG. 42.

In some embodiments, FIG. 80 is an enlarged schematic diagram of a structure at K of the folding mechanism 32 shown in FIG. 42. The first support plate 324 is rotatably connected to the first fixing bracket 322. The first rotation part 3243 of the first support plate 324 may be rotatably connected to the first connection bump 3228 of the first fixing bracket 322 by using the hinge 3245. For example, the first connection bump 3228 is at least partially located in the first notch 3242*a* of the first support plate 324, so as to be embedded into the first support plate 324. The second support plate 325 is rotatably connected to the second fixing bracket 323. The second rotation part 3253 of the second support plate 325 may be rotatably connected to the second connection bump 3238 of the second fixing bracket 323 by using the hinge 3255. For example, the second connection bump 3238 is at least partially located in the second notch 3252*a* of the second support plate 325, so as to be embedded into the second support plate 325.

In this embodiment, the first support plate 324 is rotatably connected to the first fixing bracket 322 by using a physical shaft, and the second support plate 325 is rotatably connected to the second fixing bracket 323 by using a physical shaft. The connection relationship is reliable, and an undesirable movement during rotation is small, so that a rotation action is accurate and stable.

In addition, based on an embedding relationship between the first connection bump 3228 and the first support plate 324, and an embedding relationship between the second connection bump 3238 and the second support plate 325, the first support plate 324 and the first fixing bracket 322 can limit each other in a direction parallel to a rotation center, and the second support plate 325 and the second fixing bracket 323 can limit each other in a direction parallel to the rotation center. This improves reliability of a rotatable connection structure of the folding mechanism 32.

In some other embodiments, the first support plate 324 may alternatively be rotatably connected to the first fixing bracket 322 by using a virtual shaft, and the second support plate 325 may alternatively be rotatably connected to the second fixing bracket 323 by using a virtual shaft. The rotatable connection using the virtual shaft can reduce the design difficulty of the connection structure, so that the overall thickness of the connection structure is small.

In some other embodiments, in the rotatable connection structures between the first support plate 324 and the first fixing bracket 322, and between the second support plate 325 and the second fixing bracket 323, the rotatable connection structures may all be connected by using a physical shaft, or may all be connected by using a virtual shaft, or may be connected by using both a physical shaft and a virtual shaft. This is not strictly limited in this application.

In some embodiments, as shown in FIG. 80, the top surface 3221 of the first fixing bracket 322 faces the first support plate 324, and the second side surface 3224 faces the middle housing 321. The top surface 3231 of the second fixing bracket 323 faces the second support plate 325, and the second side surface 3234 faces the middle housing 321.

Figure 81:
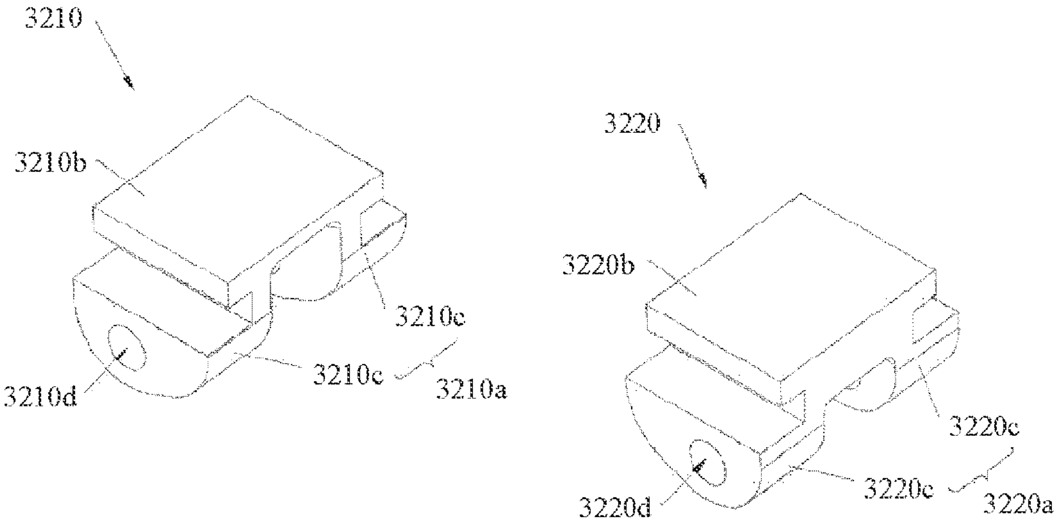
FIG. 81 is a schematic diagram of structures of a first rotatable connecting member and a second rotatable connecting member shown in FIG. 45.

In some embodiments, FIG. 81 is a schematic diagram of structures of the first rotatable connecting member 3210 and the second rotatable connecting member 3220 shown in FIG. 45. The first rotatable connecting member 3210 includes a rotation part 3210*a* and a sliding part 3210*b*. For example the rotation part 3210*a* of the first rotatable connecting member 3210 is claw-shaped, and the rotation part 3210*a* of the first rotatable connecting member 3210 may include a plurality of third claw teeth 3210*c* that are spaced from each other. The rotation part 3210*a* of the first rotatable connecting member 3210 is provided with a third rotation hole 3210*d*, and the third rotation hole 3210*d* penetrates through the plurality of third claw teeth 3210*c*.

The second rotatable connecting member 3220 includes a rotation pert 3220*a* and a sliding part 3220*b*. For example, the rotation part 3220*a* of the second rotatable connecting member 3220 is claw-shaped, and the rotation part 3220*a* of the second rotatable connecting member 3220 may include a plurality of fourth claw teeth 3220*c* that are spaced from each other. The rotation part 3220*a* of the second rotatable connecting member 3220 is provided with a fourth rotation hole 3220*d*, and the fourth rotation hole 3220*d* penetrates through the plurality fourth claw teeth 3220*c*.

Figure 82:
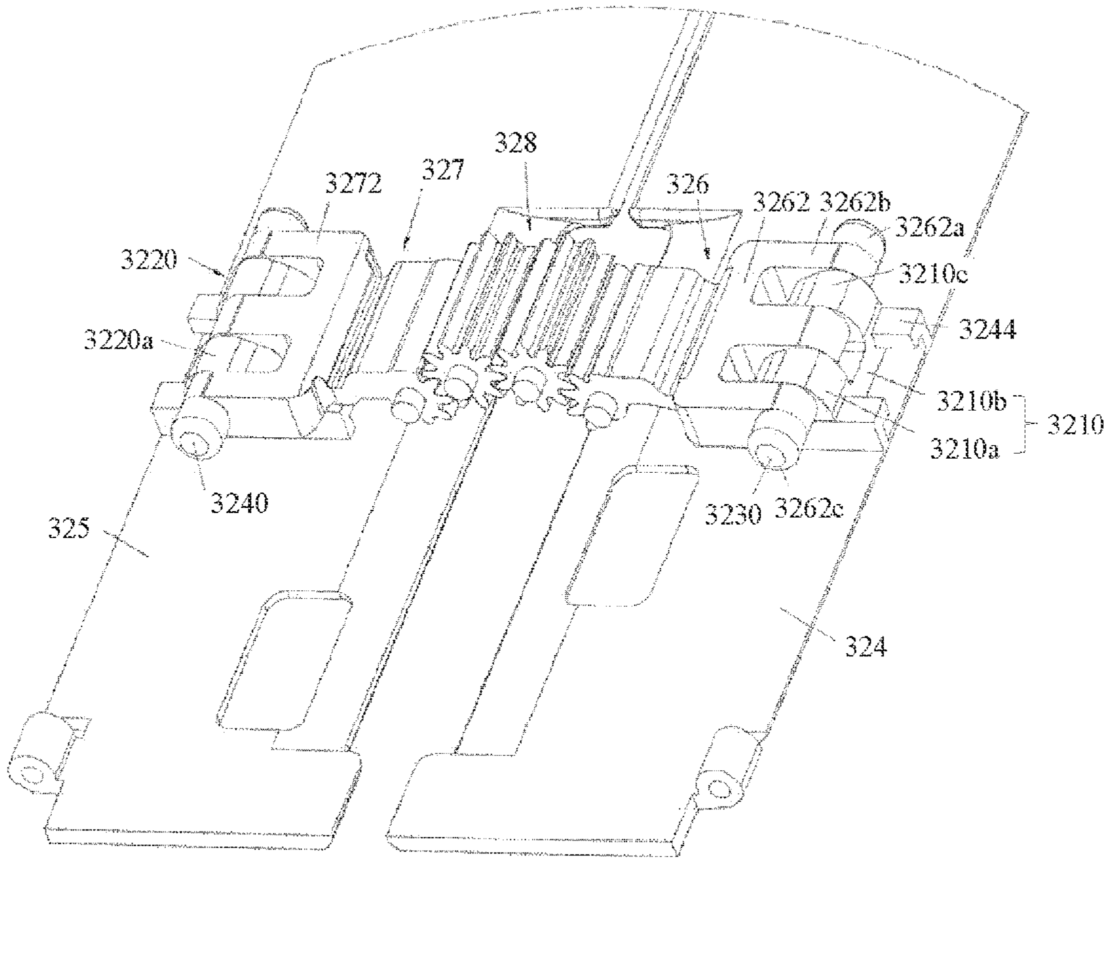
FIG. 82 is a schematic diagram of a partial structure of a folding mechanism shown in FIG. 43.
Figure 83:
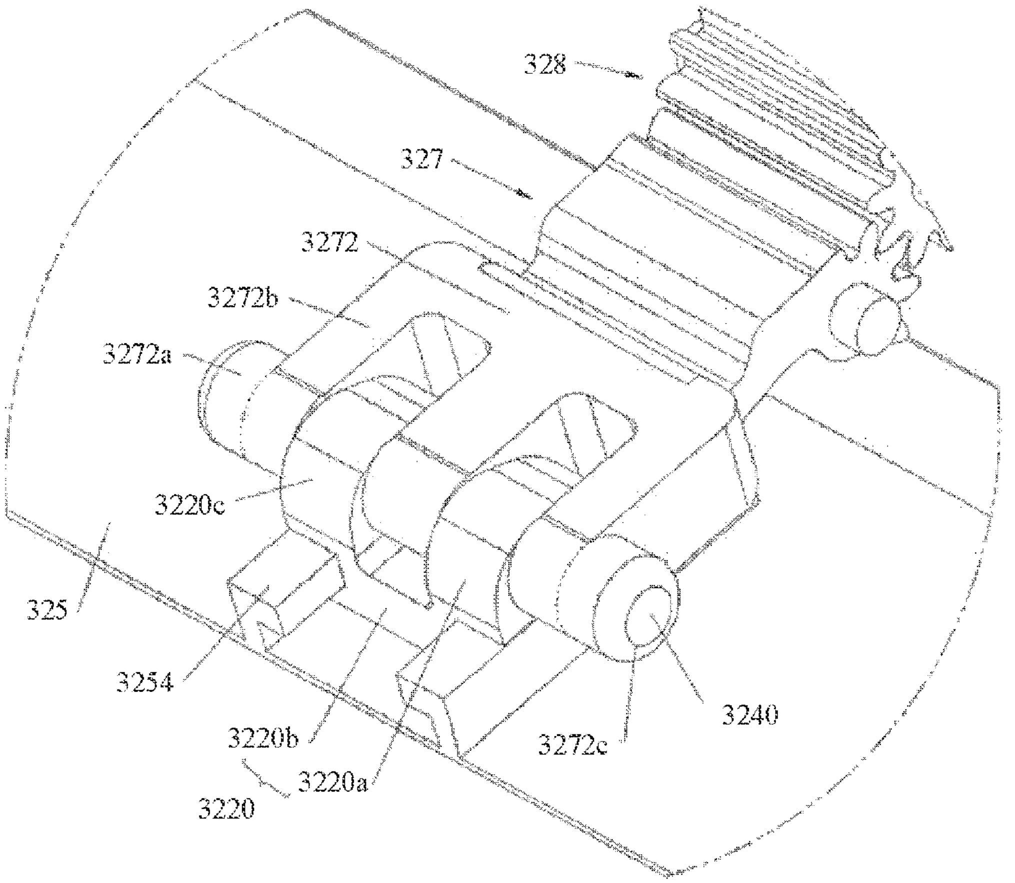
FIG. 83 is a schematic diagram of a partial structure of the structure shown in FIG. 82.

In some embodiments, FIG. 82 is a schematic diagram of a partial structure of the folding mechanism 32 shown in FIG. 43. FIG. 83 is a schematic diagram of a partial structure of the structure shown in FIG. 82. FIG. 82 shows a part of the first support plate 324, a part of the second support plate 325, the first swing arm 326, the second swing arm 327, the synchronization assembly 328, the first rotatable connecting member 3210, the second rotatable connecting member 3220, the first rotatable connecting shaft 3230, and the second rotatable connecting shaft 3240 of the folding mechanism 32. FIG. 83 shows a part of the second support plate 325, the second swing arm 327, a part of the synchronization assembly 328, the second rotatable connecting member 3220, and the second rotatable connecting shaft 3240 of the folding mechanism 32.

As shown in FIG. 82, the rotation part 3210*a* of the first rotatable connecting member 3210 is rotatably connected to the movable end 3262 of the first swing arm 326, and the sliding part 3210*b* of the first rotatable connecting member 3210 is slidably connected to the first support plate 324. In this case, the first support plate 324 is slidably and rotatably connected to the movable end 3262 of the first swing arm 326.

For example, the rotation part 3210*a* of the first rotatable connecting member 3210 is embedded between the plurality of first claw teeth 3262*h* of the first swing arm 326. The first rotatable connecting shaft 3230 is inserted into the first hinge 3262*a* of the first swing arm 326, the plurality of first claw teeth 3262*b*, and the rotation part 3210*a* of the first rotatable connecting member 3210. The first rotatable connecting shaft 3230 may be inserted into the first rotation hole 3262*c* of the first swing arm 326, or may be inserted into the third rotation hole 3210*d* of the first rotatable connecting member 3210 (refer to FIG. 81). The plurality of third claw teeth 3210*c* of the rotation part 3210*a* of the first rotatable connecting member 3210 may alternately be connected to the plurality of first law teeth 3262*b* of the first swing arm 326. The sliding part 3210*b* of the first rotatable connecting member 3210 may be slidably connected to the first sliding rail 3244 of the first support plate 324.

As shown in FIG. 82 and FIG. 83, the rotation part 3220*a* of the second rotatable connecting member 3220 is rotatably connected to the movable end 3272 of the second swing arm 327, and the sliding part 3220*b* of the second rotatable connecting member 3220 is slidably connected to the second support plate 325. In this case, the second support plate 325 is slidably and rotatably connected to the movable end 3272 of the second swing arm 327.

For example, the rotation part 3220*a* of the second rotatable connecting member 3220 is embedded between the plurality of second law teeth 3272*b* of the second swing arm 327. The second rotatable connecting shaft 3240 is inserted into the second hinge 3272*a* of the second swing arm 327, the plurality of second claw teeth 3272*b*, and the rotation part 3220*a* of the second rotatable connecting member 3220. The second rotatable connecting shaft 3240 may be inserted into the second rotation hole 3272*c* of the second swing arm 327, or may be inserted into the fourth rotation hole 3220*d* of the second rotatable connecting member 3220. The plurality of fourth claw teeth 3220*c* of the rotation part 3220*a* of the second rotatable connecting member 3220 may alternately be connected to the plurality of second claw teeth 3272*b* of the second swing arm 327. The sliding part 3220*b* of the second rotatable connecting member 3220 may be slidably connected to the second sliding rail 3254 of the second support plate 325.

In some other embodiments, the rotation part 3210*a* of the first rotatable connecting member 3210 and the rotation part 3220*a* of the second rotatable connecting member 3220 may also be presented as a bump with a rotation hole. Specific shapes of the first rotatable connecting member 3210 and the second rotatable connecting member 3220 are not strictly limited in this embodiment of this application. In some other embodiments, a connection relationship between the first support plate 324 and the movable end 3262 of the first swing arm 326, and a connection relationship between the first support plate 324 and the movable end 3262 of the first swing arm 326 may alternatively be implemented by using other structures. This is not strictly limited in this application.

Figure 84:
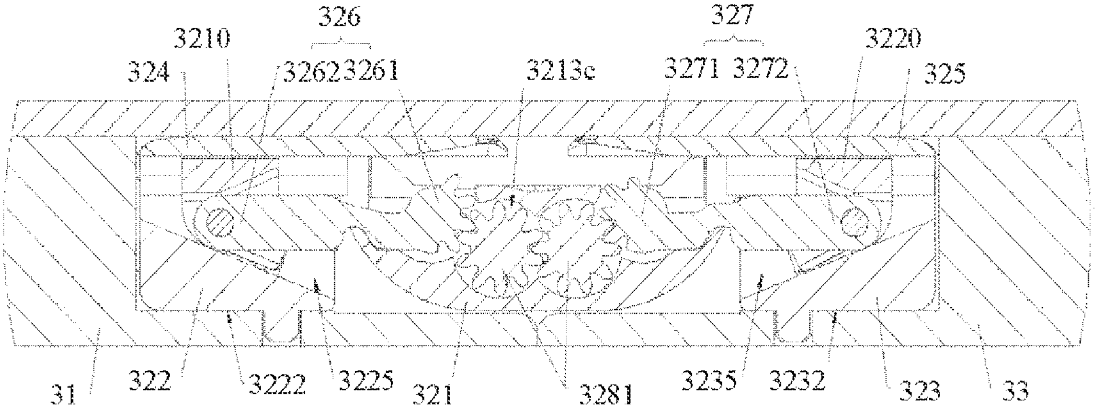
FIG. 84 is a schematic diagram of a structure of a loss sermon of the electronic device shown in FIG. 39 when cut along L1-L1.
Figure 85:
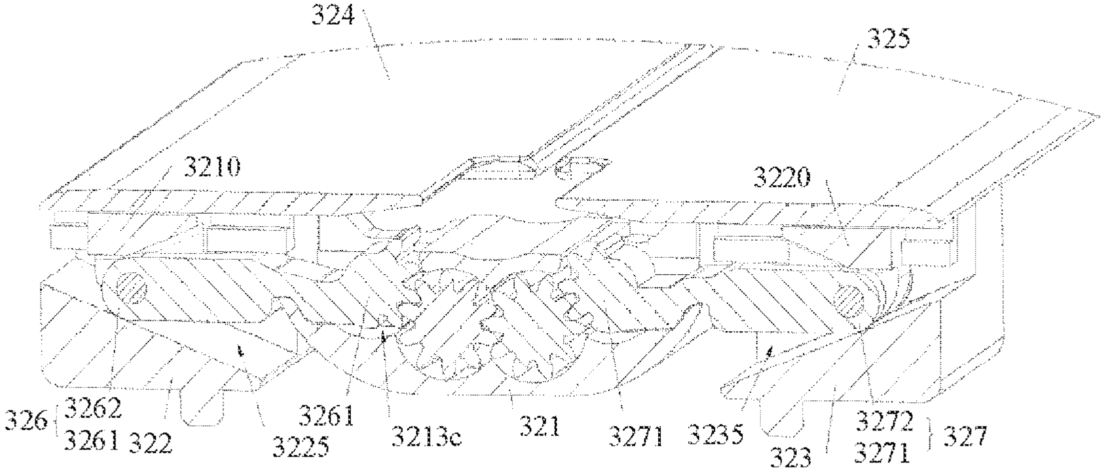
FIG. 85 is a schematic diagram of a partial structure of the structure shown in FIG. 84 from another angle.
Figure 86:
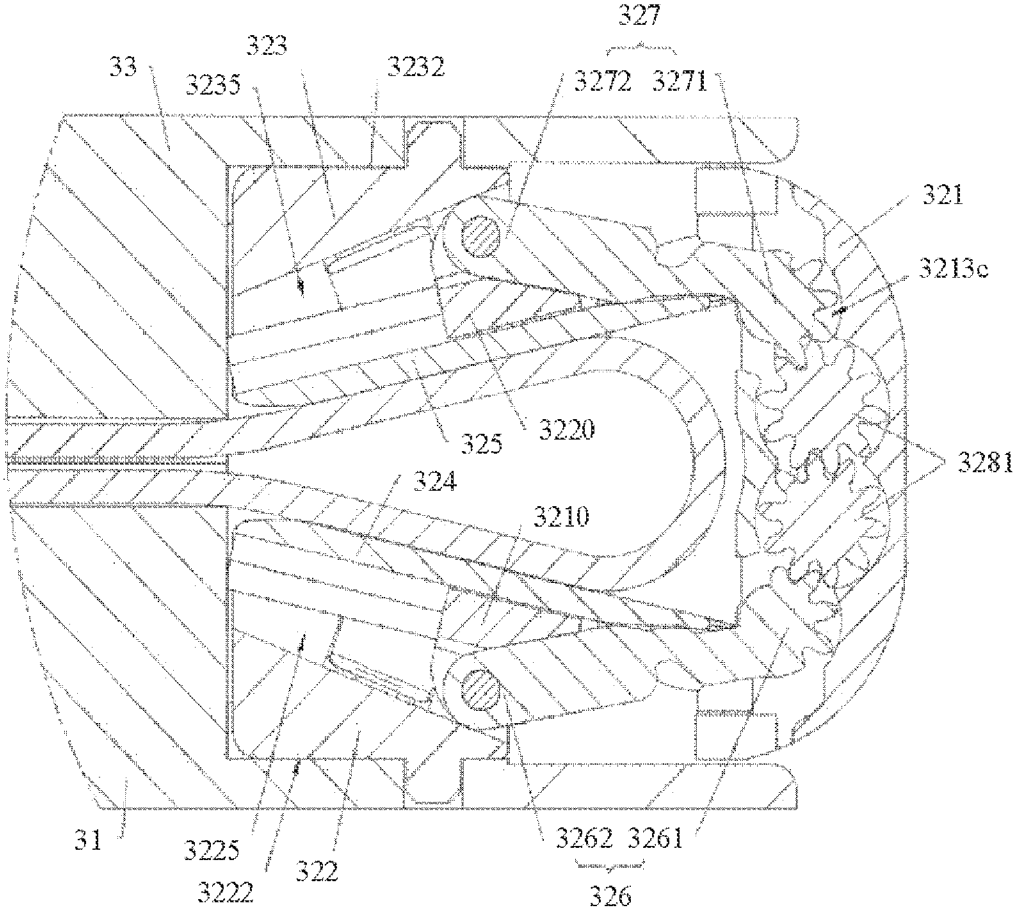
FIG. 86 is a schematic diagram of a structure of a cross section of the electronic device shown in FIG. 40 when cut along L2-L2.
Figure 87:
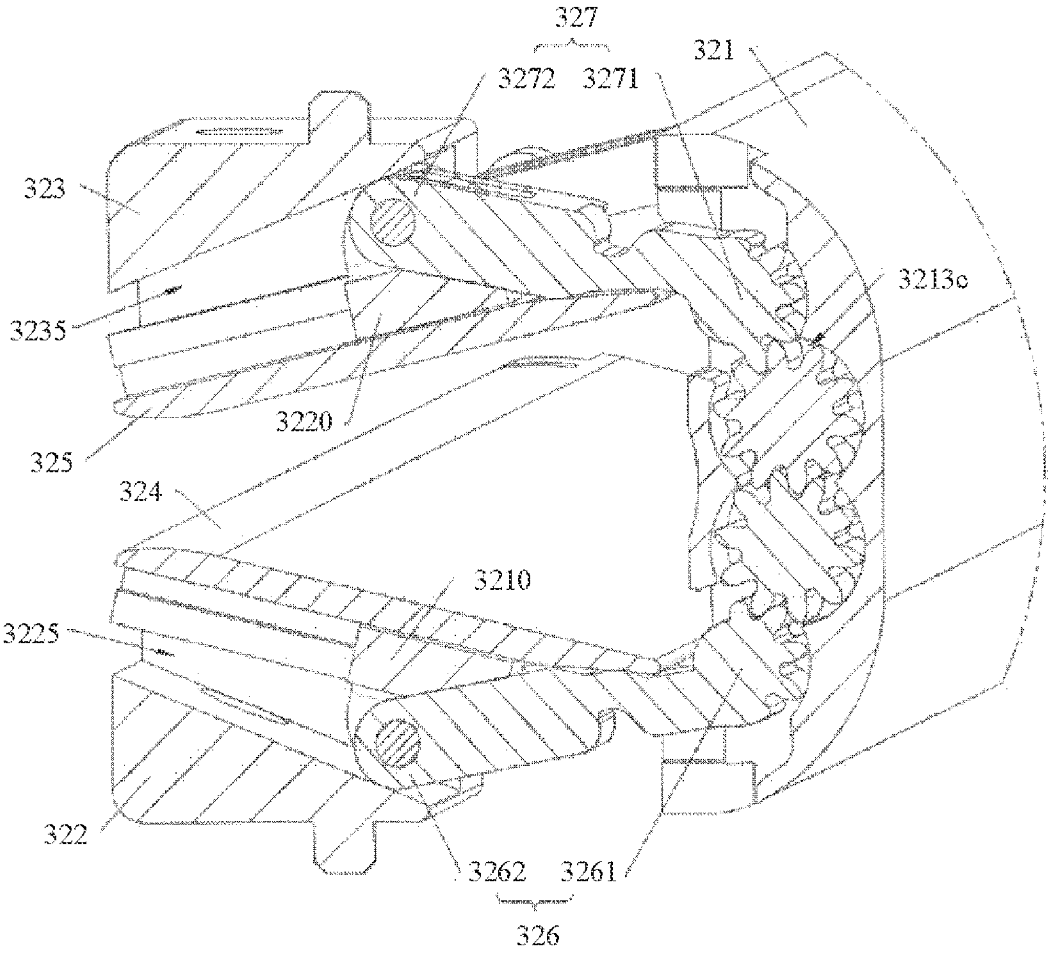
FIG. 87 is a schematic diagram of a partial structure of the structure shown in FIG. 86 from another angle.
Figure 88:
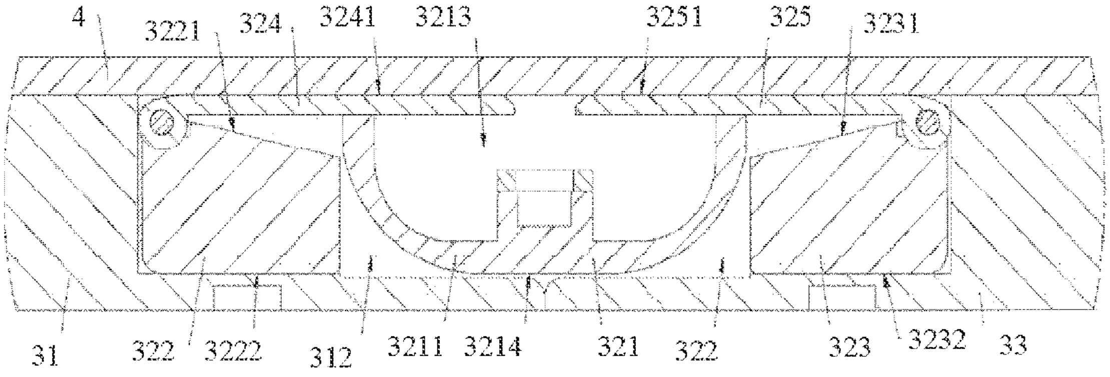
FIG. 88 is a schematic diagram of a structure of a cross section of the electronic device shown in FIG. 39 when cut along M1-M1.
Figure 89:
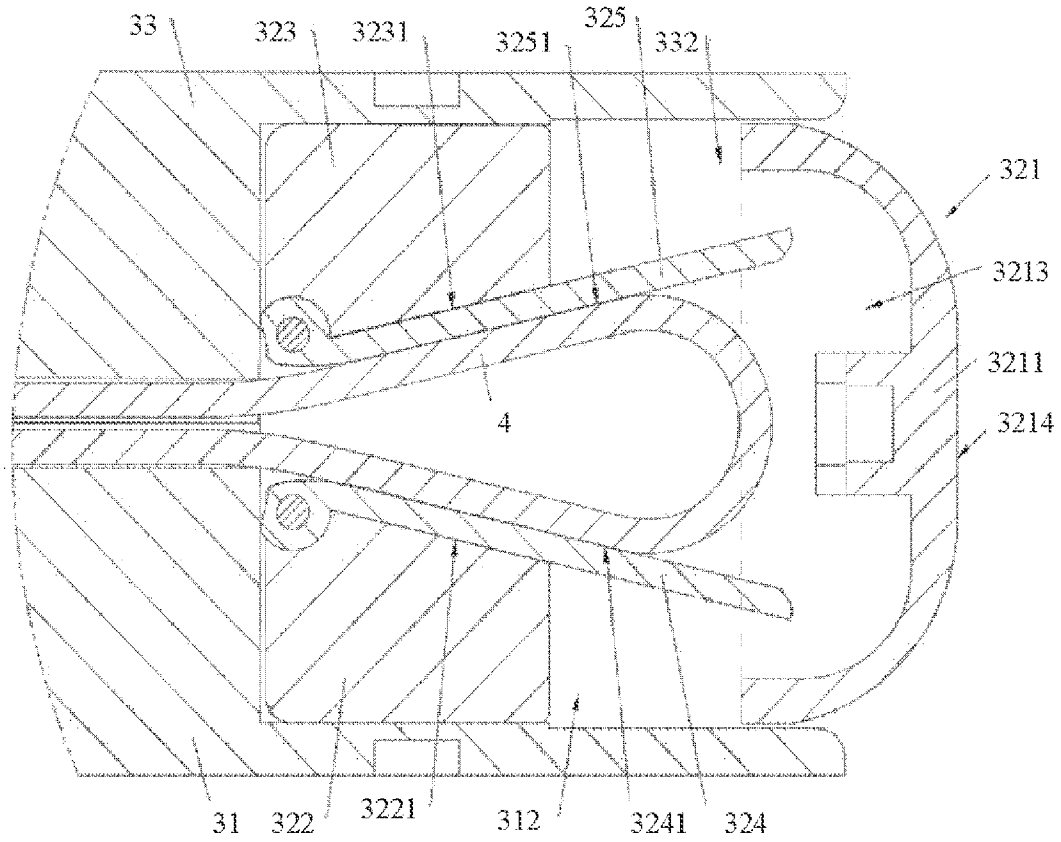
FIG. 89 is a schematic diagram of a structure of a cross section of the electronic device shown in FIG. 40 when cut along M2-M2.

FIG. 84 is a schematic diagram of a structure of a cross section of the electronic device 200 shown in FIG. 39 when cut along L1-L1. FIG. 85 is a schematic diagram of a partial structure of the structure shown in FIG. 81 from another angle. FIG. 86 is a schematic diagram of a structure of a cross section of the electronic device 200 shown in FIG. 40 when cut along L2-L2. FIG. 87 is a schematic diagram of a partial structure of the structure shown in FIG. 86 from another angle. FIG. 88 is a schematic diagram of a structure of a cross section of the electronic device 200 shown in FIG. 39 when cut along M1-M1. FIG. 89 is a schematic diagram of a structure of a cross section of the electronic device 200 shown in FIG. 40 when cut along M2-M2. The electronic device 200 shown in FIG. 84 and FIG. 85 is in an open state, and the electronic device 200 shown in FIG. 86 and FIG. 87 is in a closed state. L1-L1 and L2-L2 are at a same position, and M1-M1 and M2-M2 are at a same position.

As shown in FIG. 84 to FIG. 87, the first fixing bracket 322 is fixedly connected to the first housing 31. The rotation end 3261 of the first swing arm 326 is rotatably connected to the middle housing 321, and the movable end 3262 of the first swing arm 326 is slidably and rotatably connected to the first fixing bracket 322. For example, the rotation end 3261 of the first swing arm 326 may be mounted in the movable space 3213*c* of the middle housing 321, and the movable end 3262 of the first swing arm 326 may be mounted in the first sliding slot 3225 of the first fixing bracket 322. The movable end 3262 of the first swing arm 326 is slidably and rotatably connected to the first support plate 324. For example, the movable end 3262 of the first swing arm 326 is rotatably connected to the first rotatable connecting member 3210, and the first rotatable connecting member 3210 is slidably connected to the first support plate 324.

The second fixing bracket 323 is fixedly connected to the second housing 33. The rotation end 3271 of the second swing arm 327 is rotatably connected to the middle housing 321, and the movable end 3272 of the second swing arm 327 is slidably and rotatably connected to the second fixing bracket 323. For example, the rotation end 3271 of the second swing arm 327 may be mounted in the movable space 3213*c* of the middle housing 321, and the movable end 3272 of second swing arm 327 may be mounted in the second sliding slot 3235 of the second fixing bracket 323. The movable end 3272 of the second swing arm 327 is slidably and rotatably connected to the second support plate 325. For example, the movable end 3272 of the second swing arm 327 is rotatably connected to the second rotatable connecting member 3220, and the second rotatable connecting member 3220 is slidably connected to the second support plate 325.

As shown in FIG. 86 and FIG. 87, when the first housing 31 and the second housing 33 are in a closed state, in a direction close to the middle housing 321, an extension direction of the second sliding slot 3235 and an extension direction of the first sliding slot 3225 are away from each other. In other words, in a direction close to the middle housing 321, an extension direction of the second sliding slot 3235 and an extension direction of the first sliding slot 3225 show an opening trend.

As shown in FIG. 88, FIG. 89 and FIG. 80, the first support plate 324 is rotatably connected to the first fixing bracket 322, and the second support plate 325 is rotatably to the second fixing bracket 323. The first housing 31, the first support plate 324, the second support plate 325, and the second housing 33 jointly carry the flexible display 4. As shown in FIG. 88, when the first housing 31 and the second housing 33 are unfolded relative to each other to an open state, the support surface 3241 of the first support plate 324 is flush with the support surface 3251 of the second support plate 325, so that the flexible display 4 is in an unfolded state. As shown in FIG. 89, when the first housing 31 and the second housing 33 are folded relative to each other to a closed state, the support surface 3241 of the first support plate 324 and the support surface 3251 of the second support plate 325 are disposed opposite to each other, and are away from each other in a direction close to the middle housing 321. The flexible display 4 is in a folded state, and a bending portion of the flexible display 4 is in a water drop shape.

As shown in FIG. 88 and FIG. 89, one end (a rotation end for short) that is of the first support plate 324 and that is away from the middle housing 321 is rotatably connected to the first fixing bracket 322, and one end (a rotation end for short) that is of the second support plate 325 and that is away from the middle housing 321 is rotatably connected to the second fixing bracket 323. Therefore, in a process in which the first housing 31 and the second housing 33 are switched from an open state to a closed state, a position of the rotation end of the first support plate 324 relative to the first housing 31 remains unchanged, and a position of the rotation end of the second support plate 325 relative to the second housing 33 remains unchanged. As shown in FIG. 84 and FIG. 86, because the first support plate 324 is slidably connected to the first rotatable connecting member 3210, the first rotatable connecting member 3210 is rotatably connected to the movable end 3262 of the first swing arm 326, the movable end 3262 of the first swing arm 326 is slidably and rotatably connected to the first fixing bracket 322 by using the first sliding slot 3225, the second support plate 325 is slidably connected to the second rotatable connecting member 3220, and the second rotatable connecting member 3220 is rotatably connected to the movable end 3272 of the second swing arm 327, the movable end 3272 of the second swing arm 327 is slidably and rotatably connected to the second fixing bracket 323 by using the second sliding slot 3235. When the first housing 31 and the second housing 33 are in a closed state, in a direction close to the middle housing 321, an extension direction of the second sliding slot 3235 and an extension direction of the first sliding slot 3225 are away from each other. Therefore, in a process in which the first housing 31 and the second housing 33 are switched from an open state to a closed state, both the movable end 3262 of the first swing arm 326 and the movable end 3272 of the second swing arm 327 are close to the middle housing 321 and are away from each other. The movable end 3262 of the first swing arm 326 drives the first rotatable connecting member 3210 to be close to one end (a movable end for short) that is of the first support plate 324 and that is close to the middle housing 321, and drives the movable end of the first support plate 324 to be away from the second support plate 325 by using the first rotatable connecting member 3210. The movable end 3272 of the second swing arm 327 drives the second rotatable connecting member 3220 to slide close to one end (a movable end for short) that is of the second support plate 325 and that is close to the middle housing 321, and drives the movable end of the second support plate 325 to be away from the first support plate 324 by using the second rotatable connecting member 3220. Therefore, when the first housing 31 and the second housing 33 are folded relative to each other to a closed state, a distance between the rotation end of the first support plate 324 and the rotation end of the second support plate 325 is less than a distance between the movable end of the first support plate 324 and the movable end of the second support plate 325, the first support plate 324 and the second support plate 325 are V-shaped, and the support surface 3241 of the first support plate 324 and the support surface 3251 of the second support plate 325 are disposed opposite to each other and are away from each other in a direction close to the middle housing 321.

In this embodiment, the electronic device 200 uses the housing apparatus 3 to implement screen inward folding, and the electronic device 200 may be bent. The first support plate 324 is rotatably connected to the first fixing bracket 322, the first fixing bracket 322 is rotatably connected to the middle housing 321, the first support plate 324 is slidably and rotatably connected to the movable end 3262 of the first swing arm 326, the movable end 3262 of the first swing arm 326 is slidably and rotatably connected to the first fixing bracket 322, and the rotation end 3261 of the first swing arm 326 is rotatably connected to the middle housing 321, therefore, a moving track of the first support plate 324 relative to the middle housing 321 is jointly limited by the first fixing bracket 322 and the first swing arm 326, and the moving track of the first support plate 324 is accurate. The second support plate 325 is rotatably connected to the second fixing bracket 323, the second fixing bracket 323 is rotatably connected to the middle housing 321, the second support plate 325 is slidably and rotatably connected to the movable end 3272 of the second swing arm 327, the movable end 3272 of the second swing ism 327 is slidably and rotatably connected to the second fixing bracket 323, and the rotation end 3271 of the second swing arm 327 is rotatably connected to the middle housing 321, therefore, a moving track of the second support plate 325 relative to the middle housing 321 is jointly limited by the second fixing bracket 323 and the second swing arm 327, and the moving track of the second support plate 325 is accurate. Therefore, moving tracks of the first support plate 324 and the second support plate 325 are restricted by other components of the folding mechanism 32. In a process in which the first housing 31 rotates relative to the second housing 33, the moving tracks of the first support plate 324 and the second support plate 325 are accurate. Therefore, the first support plate 324 and the second support plate 325 can be unfolded in an open state to provide a flat and strong support for the flexible display 4, and automatically avoid in a closed state to form display accommodating space. The display accommodating space is controlled accurately, so that a folding action performed by the housing apparatus 3 on the flexible display 4 is stable, and a squeezing force is small. This helps reduce a risk that the flexible display 4 is damaged due to excessive squeezing of the folding mechanism 32, and makes the flexible display 4 more reliable.

As shown in FIG. 84 and FIG. 86, the plurality of synchronous gears 3281 are mounted in the movable space 3213*c* of the middle housing 321, each synchronous gear 3281 is rotatably connected to the middle housing 321, and two adjacent synchronous gears 3281 are engaged with each other. The rotation end 3261 of the first swing arm 326 is engaged with the rotation end 3271 of the second swing and 327 by using the plurality of synchronous gears 3281. In this embodiment, the plurality of synchronous gears 3281 are disposed, so that rotation actions of the first swing arm 326 and the second swing arm 327 are kept synchronous, that is, the first swing arm 326 and the second swing arm 327 are synchronously close to or away from each other. The first swing arm 326 is associated with the first fixing bracket 322 that is fixedly connected to the first housing 31, and the second swing arm 327 is associated with the second fixing bracket 323 that is fixedly connected to the second housing 33. Therefore, rotation actions of the first housing 31 and the second housing 33 relative to the middle housing 321 are good in synchronization, and mechanism operation experience of the housing apparatus 3 and the electronic device 200 is improved.

As shown in FIG. 84 and FIG. 86, the rotation end 3261 of the first swing arm 326, the plurality of synchronous gears 3281, and the rotation end 3271 of the second swing arm 327 are arranged in an arc shape. Because the rotation end 3261 of the first swing arm 326, the plurality of synchronous gears 3281, the rotation end 3261 of the second synchronous swing arm are arranged in an arc shape, so that a bottom space of the inner space 3213 of the middle housing 321 is fully used, and a top space of the inner space 3213 of the middle housing 321 is released to form display accommodating space. When the flexible display 4 is in a closed state, a part of the flexible display 4 can be accommodated in the inner space 3213 of the middle housing 321*e*. This helps improve compactness of component arrangement of the electronic device 200, and reduce a size of the electronic device 200.

As shown in FIG. 84 and FIG. 86, the first sliding slot 3225 of the first fixing bracket 322 is disposed in an inclined manner relative to the bottom surface 3222 of the first fixing bracket 322, and the first sliding slot 3225 and the bottom surface 3222 of the first fixing bracket 322 are close to each other in a direction close to the middle housing 321. The second sliding slot 3235 of the second fixing bracket 323 is disposed in an inclined manner relative to the bottom surface 3232 of the second fixing bracket 323, and the second sliding slot 3235 and the bottom surface 3232 of the second fixing bracket 323 are close to each other in a direction close to the middle housing 321. The inclined design of the first sliding slot 3225 and the second sliding slot 3235 helps reduce a thickness of the folding mechanism 32 and optimize the structure of the mechanism. In some other embodiments, the first sliding slot 3225 may be parallel to the bottom surface 3222 of the first fixing bracket 322, and the second sliding slot 3235 may be parallel to the bottom surface 3232 of the second fixing bracket 323. This is not strictly limited in this application.

As shown in FIG. 87, the top surface 3221 of the fast fixing bracket 322 faces the fast support plate 324, and the top surface 3221 of the first fixing bracket 322 and the bottom surface 3222 of the first fixing bracket 322 are close to each other in a direction close to the middle housing 321. The top surface 3231 of the second fixing bracket 323 faces the second support plate 325, and the top surface 3231 of the second fixing bracket 323 and the bottom surface 3232 of the second fixing bracket 323 arm close to each other in a direction close to the middle housing 321. When the first housing 31 and the second housing 33 are in an open state, a gap is formed between the top surface 3221 of the first fixing bracket 322 and the first support plate 324, and a gap is formed between the top surface 3231 of the second fixing bracket 323 and the second support plate 325. For example, as shown in FIG. 88, when the first housing 31 and the second housing 3 are in a closed state, the top surface 3221 of the first fixing bracket 322 may support the first support plate 324, and the top surface 3231 of the second fixing bracket 323 may support the second support plate 325.

As shown in FIG. 88, when the first housing 31 and the second housing 33 are in the open state, the middle housing 321 is partially located in the first fastening groove 312, and is partially loaned in the second fastening groove 332. The first housing 31 and the second housing 33 cover the appearance surface 3214 of the outer cover 3211. As shown in FIG. 80, when the first housing 31 and the second housing 33 are in the closed state, the middle housing 321 partially extends out from the first fastening groove 312 and the second fastening groove 332, and the appearance surface 3214 of the outer cover 3211 is exposed relative to the first housing 31 and the second housing 33. In this embodiment, in a process of switching between the open state and the closed state of the housing apparatus 3, the middle housing 321 is gradually exposed or hidden relative to the first housing 31 and the second housing 33, and the three cooperate with each other to implement back-side self-shielding of the housing apparatus 3 and the electronic device 200. This improves appearance integrity and waterproof and dust-proof performance.

As shown in FIG. 89, when the first housing 31 and the second housing 33 are folded relative to each other to a closed state by using the folding mechanism 32, the first housing 31 and the second housing 33 can be totally closed, and there is no gap or a small gap between the first housing 31 and the second housing 33. In this way, the housing apparatus 3 has a complete appearance, and the electronic device 200 to which the housing apparatus 3 is applied has a complete appearance, which helps improve product reliability and user experience, and also helps improve waterproof and dust-proof performance of the electronic device 200.

As shown in FIG. 88, when the first housing 31 and the second housing 33 are in an open state, the first support plate 324 covets a part of the inner space 3213 of the middle housing 321, and the second support plate 325 covers a part of the inner space 3213. In this case, the first support plate 324 and the second support plate 325 are close to each other, and a distance between the support surface 3241 of the first support plate 324 and the support surface 3251 of the second support plate 325 is small. The folding mechanism 32 may provide relatively complete planar support for the bending portion 42 of the flexible display 4 in the open state by using a two-plate structure. For example, as shown in FIG. 42, when the housing apparatus 3 is in an open state, the first support plate 324 and the second support plate 325 may be spliced, to better provide strong support for the flexible display 4.

As shown in FIG. 89, when the first housing 31 and the second housing 33 are in a closed state, the first support plate 324 partially extends into the inner space 3213 of the middle housing 321, and the second support plate 325 partially extends into the inner space 3213. In this case, a part of the space between the first support plate 324 and the second support plate 325 in the inner space 3213 of the middle housing 321 is released, to form display accommodating space, and the flexible display 4 may partially extend into the inner space 3213 of the middle housing 321, thereby improving space utilization. In this way, components of the electronic device 200 are arranged more compactly, thereby facilitating miniaturization of the electronic device 200.

Figure 90:
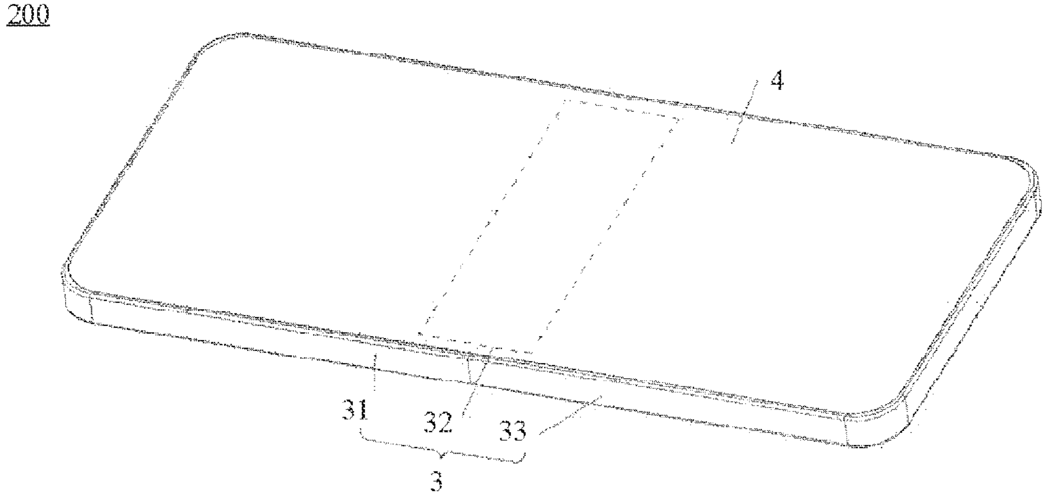
FIG. 90 is a schematic diagram of a structure of an electronic device in an open state in some other embodiments according to an embodiment of this application.
Figure 91:
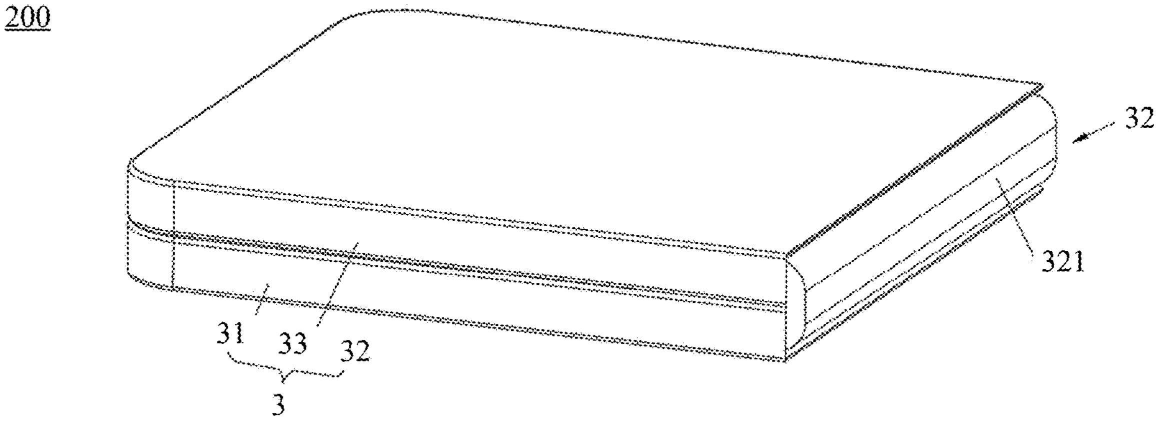
FIG. 91 is a schematic diagram of a structure of the electronic device shown in FIG. 90 in a closed state.
Figure 92:
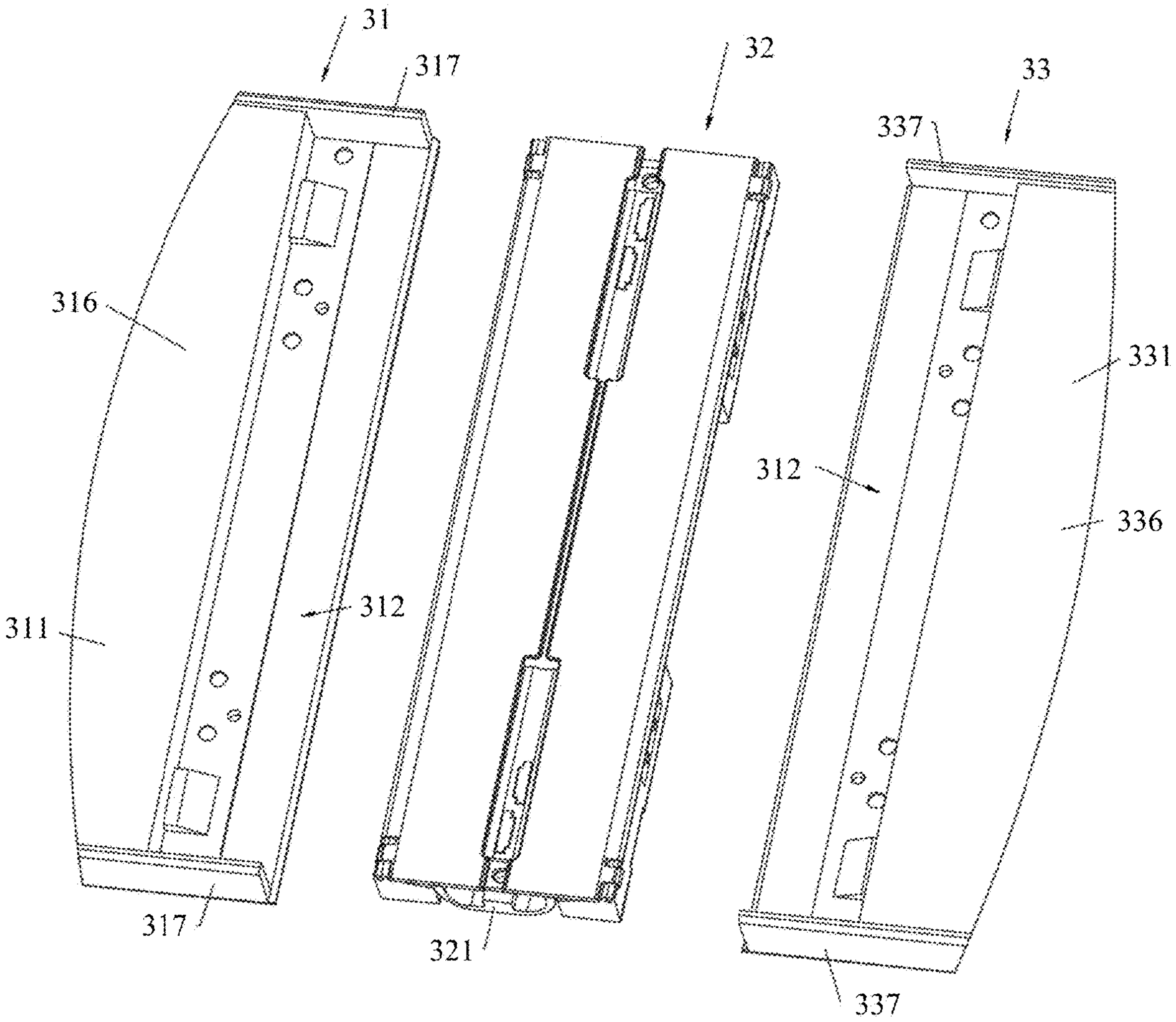
FIG. 92 is a schematic exploded view of a partial structure of a housing apparatus of the electronic device shown in FIG. 90.

FIG. 90 is a schematic diagram of a structure of the electronic device 200 in an open state in some embodiments according to an embodiment of this application. FIG. 91 is a schematic diagram of a structure of the electronic device 200 shown in FIG. 90 in a closed state FIG. 92 is a schematic exploded view of a partial structure of a housing apparatus 3 of the electronic device 200 shown in FIG. 90. The electronic device 200 in this embodiment may include most technical features of the electronic device 200 in the foregoing embodiment. The following mainly describes a difference between the electronic device 200 and the electronic device 200 in the foregoing embodiment, most same technical content of the two is not described again.

In some embodiments, the electronic device 200 includes a housing apparatus 3 and a flexible display 4. The flexible display 4 is mounted on the housing apparatus 3. The flexible display 4 is configured to display an image, and the housing apparatus 3 is configured to drive the flexible display 4 to move. The housing apparatus 3 includes a first housing 31, a folding mechanism 32, and a second housing 33 that are sequentially connected. The folding mechanism 32 can deform, so that the first housing 31 and the second housing 33 are folded or unfolded relative to each other.

The first housing 31 may include a first body 316 and two first bates 317, and the two first baffles 317 are separately fastened on two sides of the first body 316. The first body 316 includes the support surface 311 of the first housing 31 and the first fastening groove 312, and the two first baffles 317 may form groove side walls of the first fastening groove 312. The second housing 33 includes a second body 336 and two second baffles 337, and the two second baffles 337 are separately fastened on two sides of the second body 336. The second body 336 includes the support surface 331 of the second housing 33 and the second fastening groove 332, and the two second baffles 337 may form groove side walls of the second fastening groove 332.

Refer to FIG. 90 and FIG. 92. When the first housing 31 and the second housing 33 are in an open state, an end part that is of the first baffle 317 and that is close to the first fastening groove 312 is spliced with an end part that is of the second baffle 337 and that is close to the second fastening groove 332. The folding mechanism 32 is shielded by the first housing 31 and the second housing 33. The electronic device 200 can implement self-shielding in the open state, thereby improving waterproof and dust-proof performance.

Refer to FIG. 91 and FIG. 92. When the first housing 31 and the second housing 33 are in a closed state, a top that is of the first baffle 317 and that is close to the support surface 311 of the first housing 31 is spliced with a top that is of the second baffle 337 and that is close to the support surface 331 of the second housing 33, so that the first housing 31 and the second housing 33 are completely closed, and the middle housing 321 of the folding mechanism 32 is partially exposed. In this case, the electronic device 200 can implement appearance self-shielding in the closed state, thereby improving waterproof and dust-proof performance.

In this embodiment, the electronic device 200 implements appearance self-shielding in the open state and the closed state by using structural designs of the first housing 31 and the second housing 33, and an end cover component used to implement appearance shielding may be omitted Therefore, a structural design of the electronic device 200 is simple, and costs are low.

A case in which the first baffle 317 and the second baffle 337 are spliced may include a case in which the first baffle 317 and the second baffle 337 are in contact with each other, or may include a case in which a small gap is formed between the first baffle 317 and the second baffle 337. This is not strictly limited in this application.

In some embodiments, FIG. 93 is a schematic diagram of a structure of an electronic device 300 in an open state in some embodiments according to an embodiment of this application. FIG. 94 is a schematic diagram of a structure of the electronic device 300 shown in FIG. 93 in a closed state. The electronic device 300 in this embodiment may include partial technical features of the electronic devices (100 and 200) in the foregoing embodiments. The following mainly describes a difference between the electronic device 300 and the electronic devices (100 and 200) in the foregoing embodiment, most same technical content of the two is not described again.

The electronic device 300 includes a housing apparatus 5 and a flexible display 6. The flexible display 6 is mounted on the housing apparatus 5. The flexible display 6 is configured to display an image, and the housing apparatus 5 is configured to drive the flexible display 6 to move. The housing apparatus 5 includes a first housing 51, a folding mechanism 52, and a second housing 53. The folding mechanism 52 connects the first housing 51 and the second housing 53, and the folding mechanism 52 is configured to enable the first housing 51 and the second housing 53 to be folded or unfolded relative to each other. In other words, the first housing 51, the folding mechanism 52, and the second housing 53 are sequentially connected, and the first housing 51 and the second housing 53 can be folded relative to each other by deformation of the folding mechanism 52, or can be unfolded relative to each other by deformation of the folding mechanism 52.

As shown in FIG. 93, the first housing 51 and the second housing 53 may be unfolded relative to each other to an open state, that is, the housing apparatus 5 is in an open state, so that the electronic device 300 is in an open state. In this case, the flexible display 6 is unfolded with the housing apparatus 5, so as to be in an unfolded state. For example, when the rust housing 51 and the second housing 53 are in the open state, an included angle between the first housing 51 and the second housing 53 may be approximately 180°. In some other embodiments, when the first housing 51 and the second housing 53 are in the open state, an angle between the first housing 51 and the second housing 53 may have a slight deviation relative to 180°, for example, 165°, 177°, or 185°.

As shown in FIG. 94, the first housing 51 and the second housing 53 may be folded relative to each other to a closed state, that is, the housing apparatus 5 is in a closed state, so that the electronic device 300 is in a closed state. In this case, the flexible display 6 is folded with the housing apparatus 5, so as to be in a folded state. The flexible display 6 is located inside the housing apparatus 5.

The first housing 51 and the second housing 53 may alternatively be unfolded or folded relative to each other to an intermediate state, that is, the housing apparatus 5 is in an intermediate state, so that the electronic device 300 is in an intermediate state. The intermediate state may be any state between an open state and a closed state. The flexible display 6 moves along with the housing apparatus 5.

In this embodiment, the flexible display 6 can be unfolded and folded with the housing apparatus 5. When the electronic device 300 is in an open state, the flexible display 6 is in an unfolded state, and can display in full screen, so that the electronic device 300 has a large display area, to improve viewing experience and operation experience of a user. When the electronic device 300 is in a closed state, a planar size of the electronic device 300 is small (with a small width size), so that it is convenient for a user to carry and move the electronic device 300.

For example, when the first housing 51 and the second housing 53 are in an open state, the first housing 51 may be spliced with the second housing 53. The splicing of the first housing 51 and the second housing 53 includes a casein which the first housing 51 and the second housing 53 abut against each other, or may include a case in which there is a small gap between the first housing 51 and the second housing 53. In this embodiment, the first housing 51 and the second housing 53 can be spliced to stop an unfolding action of the housing apparatus 5, so as to prevent the housing apparatus 5 from being over-folded during unfolding. This reduces a force exerted on the flexible display 6 and improves reliability of the flexible display 6 and the electronic device 300.

In addition, when the first housing 51 and the second housing 53 are in a closed state, the first housing 51 and the second housing 53 can be fully closed, and there is no big gap between the first housing 51 and the second housing 53, so that an appearance experience of the housing apparatus 5 and the electronic device 300 is good, and waterproof, dust-proof, and anti-foreign matter performance is good. In addition, when the first housing 51 and the second housing 53 are completely closed, some foreign matter (for example, a nail, a paper clip, or broken glass) outside the electronic device 300 can be prevented from entering between the first housing 51 and the second housing 53, to avoid damage to the flexible display 6 by the foreign matter, so that reliability of the electronic device 300 is improved.

In some embodiments, the electronic device 300 may further include a plurality of modules (not shown in the figure), and the plurality of modules may be accommodated inside the housing apparatus 5. The plurality of modules of the electronic device 300 may include but are not limited to a mainboard, a processor, a memos; a battery, a camera module, an earpiece module, a speaker module, a microphone module, an antenna module, a sensor module, and the like. A quantity, types, locations, and the like of modules of the electronic device 300 are not specifically limited in this embodiment of this application.

It may be understood that, when a user holds the electronic device 300, a location of the earpiece module of the electronic device 300 may be defined as an upper edge of the electronic device 300, a location of the microphone module of the electronic device 300 may be defined as a lower edge of the electronic device 300, and two sides that are of the electronic device 300 and that are held by a left hand and a tight hand of the user may be defined as left and right sides of the electronic device 300. In some embodiments, the electronic device 300 may be folded leftward or rightward. In some other embodiments, the electronic device 300 may be folded upward or downward.

In some embodiments, as shown in FIG. 93, the flexible display 6 includes a tint non-bending portion 61, a bending portion 62, and a second non-bending portion 63 that are sequentially arranged. The first non-bending portion 61 is fixedly connected to the first housing 51, and the second non-bending portion 63 is fixedly connected to the second housing 53. In a process in which the first housing 51 and the second housing 53 are folded or unfolded relative to each other, the bending portion 62 deforms. In the process in which the first housing 51 and the second housing 53 are folded or unfolded relative to each other, the first housing 51 drives the first non-bending portion 61 to move, and the second housing 53 drives the second non-bending portion 63 to move. The first non-bending portion 61 and the second non-bending portion 63 are folded or unfolded relative to each other. In this application, that the two are fixedly connected means that the two are connected to each other, and a relative position relationship between the two remains unchanged after the connection.

In some embodiments, the flexible display 6 may be an organic light-emitting diode display, an active-matrix organic light emitting diode display, a mini organic light-emitting diode display, a micro light-emitting diode display a micro organic light-emitting diode display, or a quantum dot light-emitting diode display.

Figure 95:
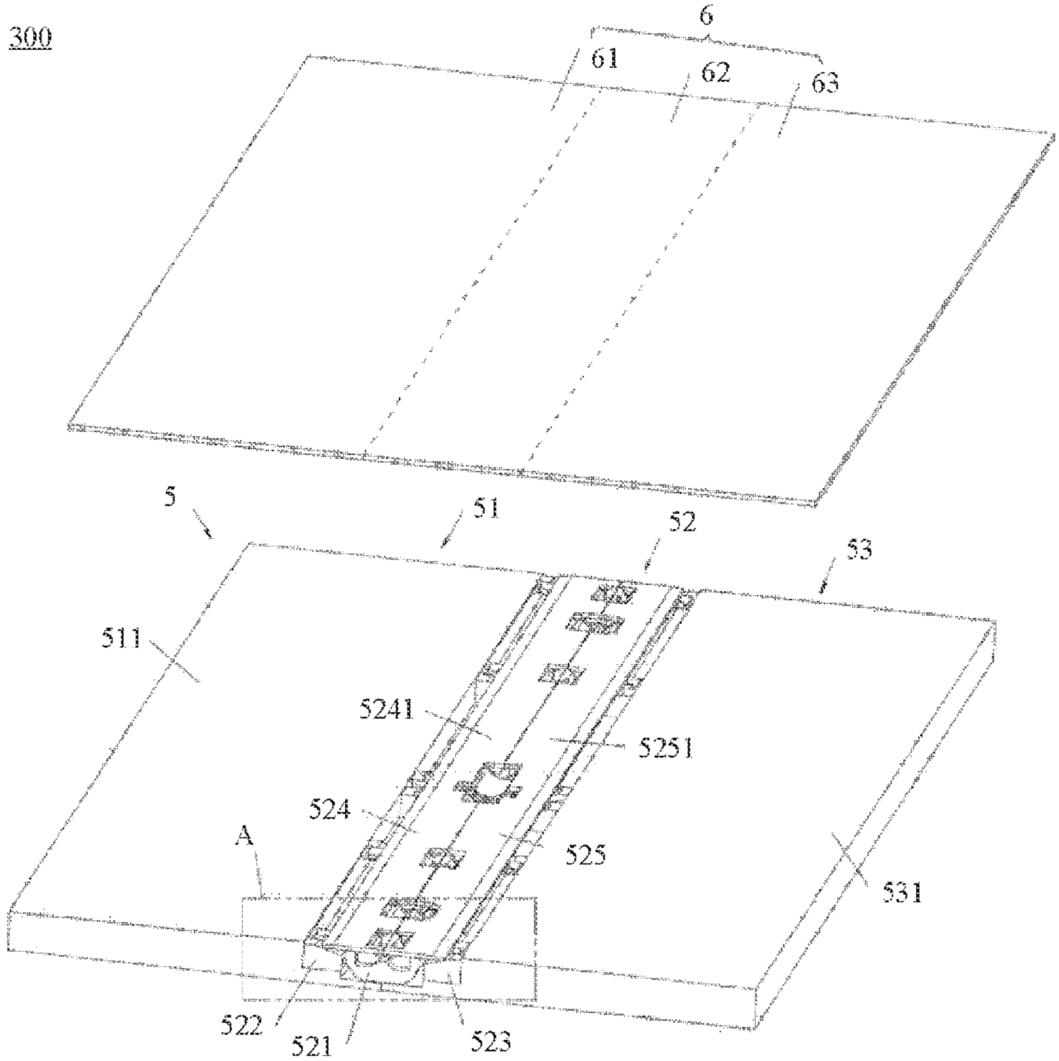
FIG. 95 is a schematic exploded view of a partial structure of the electronic device shown in FIG. 93.

In some embodiments, FIG. 95 is a schematic exploded view of a partial structure of the electronic device 300 shown in FIG. 93. The first housing 51 includes a support surface 511 configured to carry the flexible display 6, and the second housing 53 includes a support surface 531 configured to corm the flexible display 6. For example, the first non-bending portion 61 of the flexible display 6 may be fixedly connected to the support surface 511 of the first housing 51. For example, the first non-bending portion 61 may be bonded to the support surface 511 of the first housing 51 by using an adhesive layer. The second non-bending portion 63 is fixedly connected to the support surface 531 of the second housing 53. For example, the second non-bending portion 63 may be bonded to the support surface 531 of the second housing 53 by using an adhesive layer.

In this embodiment, because the first non-bending portion 61 is fixedly connected to the fast housing 51, and the second non-bending portion 63 is fixedly connected to the second housing 53, when the first housing 51 and the second housing 53 are folded or unfolded relative to each other, relative folding and unfolding actions between the first non-bending portion 61 and the second non-bending portion 63 can be accurately controlled, so that a deformation process and a movement form of the flexible display 6 are annullable, and reliability is high.

In some other embodiments, the first housing 51 may include a main body part and a sliding part. The main body part is connected to the folding mechanism 52, the sliding part is slidably connected to the main body part, the sliding part may slightly slide relative to the main body part, and the support surface 511 of the first housing 51 is formed on the sliding part. The second housing 53 may include a main body part and a sliding part. The main body part is connected to the folding mechanism 52, the sliding part is slidably connected to the main body part, the sliding part may slightly slide relative to the main body part, and the support surface 531 of the second housing 53 is formed in the sliding part. In this case, the first non-bending portion 61 and the second non-bending portion 63 of the flexible display 6 may slightly slide relative to the sliding parts and the main body parts in the first housing 51 and the second housing 53, to implement position fine adjustment in a process in which the first housing 51 and the second housing 53 are folded or unfolded relative to each other. This implements good switching between an unfolded state and a folded state, reduces a probability of damage to the flexible display 6, and improves reliability of the flexible display 6.

Figure 97:
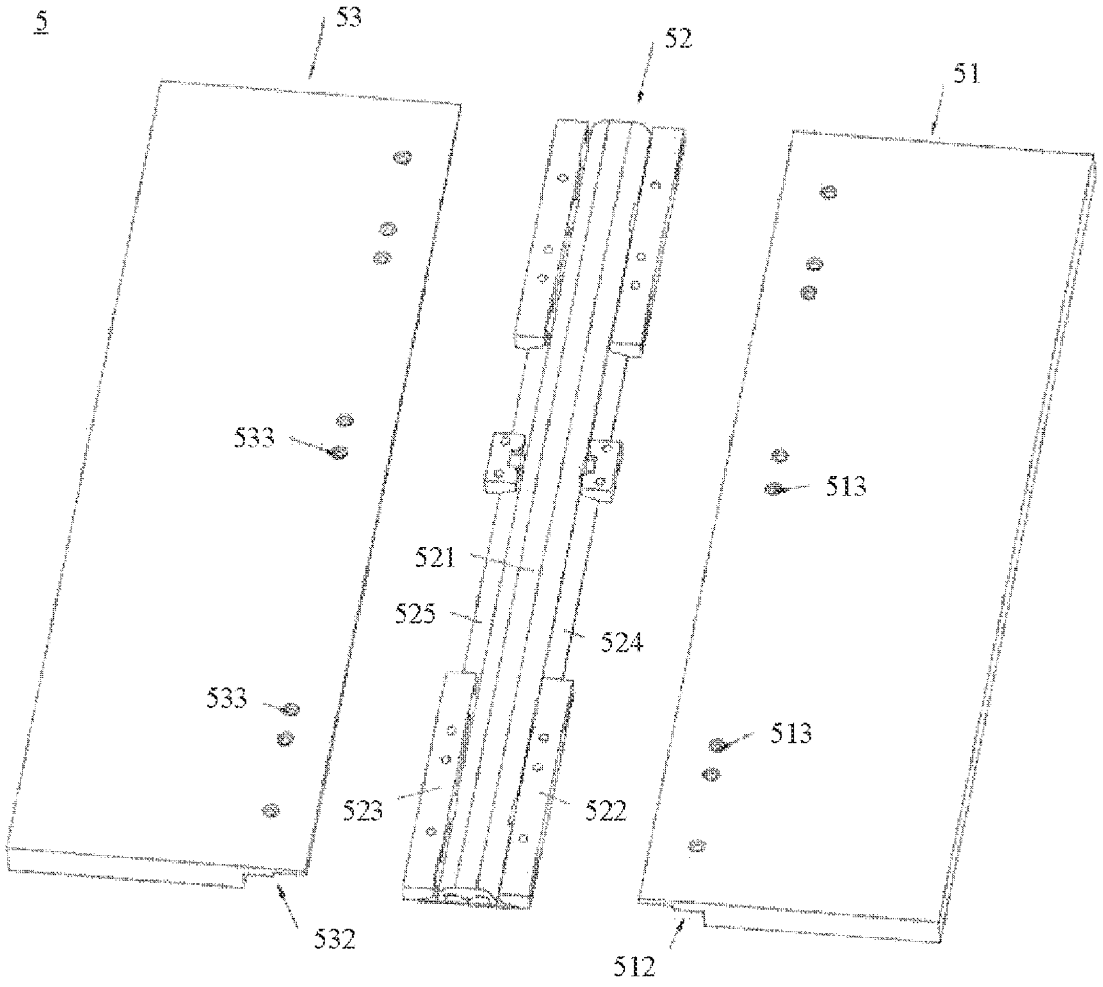
FIG. 97 is a schematic diagram of a structure of the housing apparatus shown in FIG. 96 from another angle.

In some embodiments, refer to FIG. 95 to FIG. 97. FIG. 96 is a schematic exploded view of a partial structure of the housing apparatus. 5 shown in FIG. 95. FIG. 97 is a schematic diagram of a structure of the housing apparatus 5 shown in FIG. 96 from another angle. An angle of view of the housing apparatus 5 shown in FIG. 97 is reversed horizontally relative to an angle of view of the housing apparatus 5 shown in FIG. 96.

The folding mechanism 52 includes a middle housing 521, a first fixing bracket 522, a second fixing bracket 523, a first support plate 524, and a second support plate 525. The first fixing bracket 522 is fixedly connected to the first housing 51. For example, a first fastening groove 512 is provided on a side that is of the first housing 51 and that is close to the folding mechanism 52, and the first fixing bracket 522 is mounted in the first fastening groove 512, to fixedly connect to the first housing 51. The first fixing bracket 522 may be mounted in the first fastening groove 512 by using a fastener, welding, bonding, fastening, or the like, so as to implement that the first fixing bracket 522 is fastened to the first housing 51.

The second fixing bracket 523 is fixedly connected to the second housing 53. A second fastening groove 532 is provided on a side that is of the second housing 53 and that is close to the folding mechanism 52, and the second fixing bracket 523 is mounted in the second fastening groove 532, to fixedly connect to the second housing 53. The second fixing bracket 523 may be mounted in the second fastening groove 532 by using a fastener, welding, bonding, fastening, or the like, so as to implement that the second fixing bracket 523 is fastened to the second housing 53.

Both the first fixing bracket 522 and the second fixing bracket 523 are connected to the middle housing, so that the first housing 51 and the second housing 53 are connected to the middle housing 521. The first support plate 524 is connected to the first fixing bracket 522 and the middle housing 521, and the second support plate 525 is connected to the second fixing bracket 523 and the middle housing 521. That is, the first support plate 524 is connected between the first housing 51 and the middle housing 521, and the second support plate 525 is connected between the middle housing 521 and the second housing 53.

In some embodiments, as shown in FIG. 95 and FIG. 96, the first support plate 524 includes a support surface 5241 configured to carry the flexible display 6, and the second support plate 525 includes a support surface 5251 configured to carry the flexible display 6. The bending portion 62 of the flexible display 6 includes a first part close to the first non-bending portion 61, a second part close to the second non-bending portion 63, and a third part located between the first part and the second part. The first part may be fixedly connected d to a part of a region of the support surface 5241 of the first support plate 524, for example, may be bonded and fastened by using a bowling layer. The second part may be fixedly connected to a part of a region of the support surface 5251 of the second support plate 525, for example, may be bonded and fastened by using a bonding layer. The third part corresponds to the other part of the region of the support surface 5241 of the first support plate 524 and the other part of the region of the support surface 5251 of the second support plate 525. The third part may move relative to the two parts.

An adhesive layer located between the first non-bending portion 61 and the support surface 511 of the first housing Si, an adhesive layer located between the bending portion 62 and the support surface 5241 of the first support plate 524, an adhesive layer located between the bending portion 62 and the support surface 5251 of the second support plate 525, and an adhesive layer located between the second non-bending portion 63 and the support surface 531 of the second housing 53 may be continuous entire adhesive layers, or may be dot-break adhesive layers, or may be adhesive layers having hollowed-out regions. A specific solution of the adhesive layer is not strictly limited in this embodiment of this application.

Figure 98:
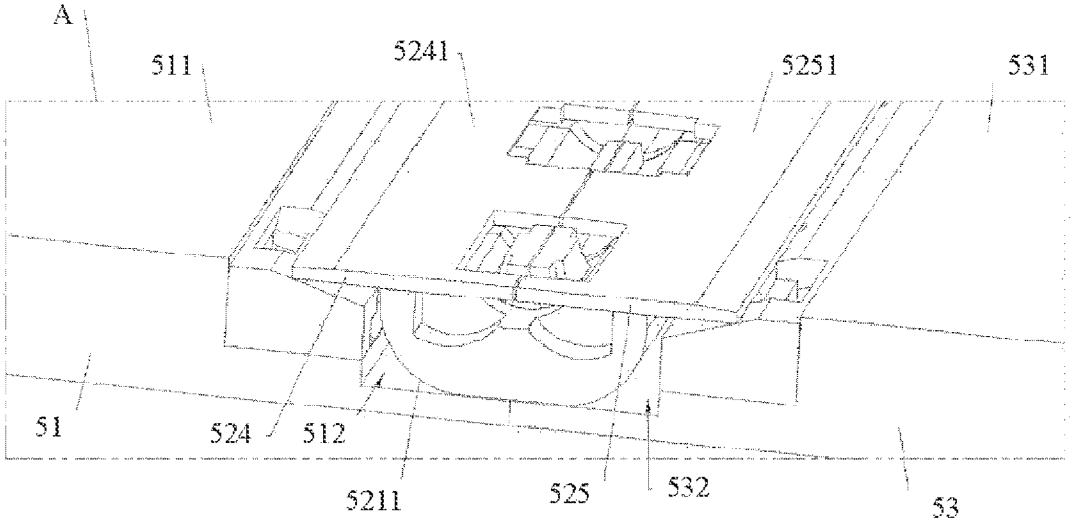
FIG. 98 is an enlarged schematic diagram of a structure at A of the housing apparatus shown in FIG. 95.

In some embodiments, FIG. 98 is an enlarged schematic du yarn of a structure at A of the housing apparatus 5 shown in FIG. 95. When the first housing 51 and the second housing 53 are unfolded relative to each other to an open state, the support surface 5241 of the first support plate 524 is flush with the support surface 5251 of the second support plate 525. In other words, when the folding mechanism 52 is in an open state, the support surface 5241 of the first support plate 521 and the support surface 5251 of the second support plate 525 are configured to enable the flexible display 6 to be in an unfolded state. In this case, the first support plate 524 and the second support plate 525 can provide smooth and powerful support for the flexible display 6, so as to improve user experience such as a touch operation and image viewing.

When the flexible display is 4 mounted on the support surface 3241 of the first support plate 324 and the support surface 3251 of the second support plate 325, a flat form can be presented, that is, it is considered that the support surface 3241 of the first support plate 324 is flush with the support surface 3251 of the second support plate 325. For example, the case in which the support surface 3241 of the first support plate 324 is flush with the support surface 3251 of the second support plate 325 may include but is not limited to the following scenarios: The support surface 3241 of the first support plate 324 is flush with the support surface 3251 of the second support plate 325; or a bonding layer or steel sheet is disposed on the support surface 3241 of the first support plate 324, and a bonding layer or steel sheet is disposed on the support surface 3251 of the second support plate 325, so that heights of the two support surfaces (3241 and 3251) with the bonding layers or the steel sheets are equal; or a stiffening plate is disposed on the flexible display 4, so that heights of the two support surfaces (3241 and 3251) on which the stiffening plate is stacked are equal.

The cage in which the support surface 5241 of the first support plate 524 is flush with the support surface 5251 of the second support plate 525 includes: The support surface 5241 of the first support plate 524 is a plane, the support surface 5251 of the second support plate 525 is a plane, and the two are flush with each other, or the support surface 5241 of the first support plate 524 includes a planar region used to support the flexible display 6, the support surface 5251 of the second support plate 525 includes a planar region used to support the flexible display 6, and the planar regions of the two are flush with each other. For example, a main region of the support surface 5241 of the first support plate 524 is a planar region used to implement support, and an inclined region used to implement rotation avoidance may be disposed on a periphery of the support surface 5241 of the first support plate 524, which is not strictly limited in this application. A main region of the support surface 5251 of the second support plate 525 is a planar region used to implement support, and an inclined region used to implement rotation avoidance may be disposed on a periphery of the support surface 5251 of the second support plate 525, which is not strictly limited in this application.

In some embodiments, refer to FIG. 95 and FIG. 98. When the first housing 51 and the second housing 53 are unfolded relative to each other to an open state, the support surface 5241 (or a planar region used to implement support) of the first support plate 524 is flush with the support surface 511 of the first housing 51, and the support surface 5251 (or a planar region used to implement support) of the second support plate 525 is flush with the support surface 531 of the second housing 53. In this case, the plurality of support surfaces that are of the housing apparatus 5 and that are used to provide support for the flexible display 6 are flush with each other, so that the flexible display 6 is unfolded and has a flat support environment. This can improve user experience such as a touch operation and image viewing.

For example, both the support surface 5241 of the first support plate 524 and the support surface 511 of the first housing 51 are planes, and are coplanar, to better support the flexible display 6. In this case, the adhesive layer between the flexible display 6 and the support surface 5241 of the first support plate 524 may be as thick as the adhesive layer between the flexible display 6 and the support surface 511 of the first housing 51.

It can be understood that when the support surface 5241 of the first support plate 524 and the support surface 511 of the that housing 51 are parallel to each other but are slightly misaligned, after the flexible display 6 is fastened to the support surface 124 of the first support plate 524 and the support surface 511 of the first housing 51 by a slight difference between a thickness of the adhesive layer between the flexible display 6 and the support surface 5241 of the first support plate 524 and a thickness of the adhesive layer between the flexible display 6 and the support surface 511 of the first housing Si, the corresponding region of the flexible display 6 is still a planar region. In this case, it is also considered that the support surface 5241 of the first support plate 524 is flush with the support surface 511 of the first housing 51.

In some other embodiments, there may be no fixed connection relationship between the bending portion 62 of the flexible display 6 and the support surface 5241 of the first support plate 524, that is, there is no connection adhesive layer between bending portion 62 of the flexible display 6 and the support surface 5241 of the first support plate 524, and the two may be in direct contact. In this case, the support surface 5241 of the first support plate 524 and the support surface 511 of the first housing 51 are parallel to each other, the support surface 5241 of the first support plate 524 slightly protrude relative to the support surface 511 of the first housing 51, and the support surface 5241 of the first support plate 524 is flush with the support surface 511 of the first housing 51 after the adhesive layer is disposed, so that the flexible display 6 can still obtain planar support. In this case, it is also considered that the support surface 5241 of the first support plate 524 is flush with the support surface 511 of the first housing 51.

In some other embodiments, the support surface 511 of the first housing 51 may include a planar part close to the first support plate 524 and an arc surface part away from the find support plate 524, and the support surface 5241 of the first support plate 524 is a plane. The support surface 5241 of the first support plate 524 and the planar part of the support surface 511 of the first housing 51 are coplanar, or are parallel to each other but slightly misaligned. In this case, it is also considered that the support surface 5241 of the first support plate 524 is flush with the support surface 511 of the first housing 51. In this embodiment, the housing apparatus 5 may support the flexible display 6 to present a 3D display effect.

Related designs of the support surface 5251 of the second support plate 525, the support surface 531 of the second housing 53, a connection relationship between the two and the flexible display 6, and the like may be the same as technical solutions of the support surface 5241 of the first support plate 524, the support surface 511 of the first housing 51, a connection relationship between the two and the flexible display 6, and the like. Details are not described in this application.

Figure 99:
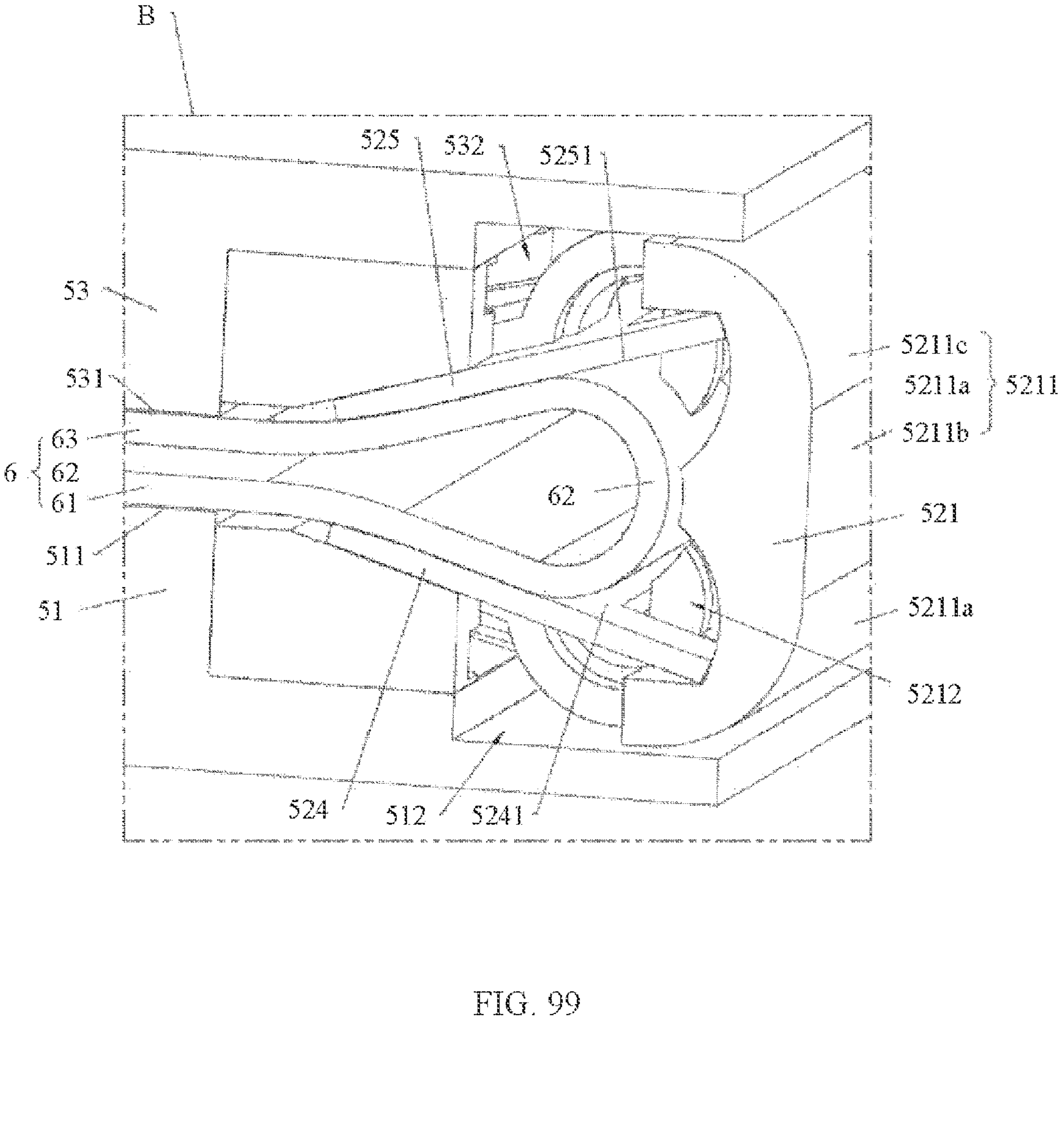
FIG. 99 is an enlarged schematic diagram of a structure at B of the electronic device shown in FIG. 94.

In some embodiments. FIG. 99 is an enlarged schematic diagram of a structure at B of the electronic device 300 shown in FIG. 94. When the first housing 51 and the second housing 53 are folded relative to each other to a closed state, the support surface 5241 of the first support plate 524 and the support surface 5251 of the second support plate 525 are disposed opposite to each other, and are away from each other in a direction close to the middle housing 521. The support surface 5241 of the first support plate 524 and the support surface 5251 of the second support plate 525 are disposed opposite to each other. That is, the support surface 5241 of the first support plate 524 and the support surface 5251 of the second support plate 525 are in a face-to-face position relationship, and the support surface 5241 of the first support plate 524 is disposed in an inclined manner relative to the support surface 5251 of the second support plate 525.

In this embodiment, the first support plate 524 and the second support plate 525 form display accommodating space through automatic avoidance for accommodating the flexible display 6, so that a folding action performed by the housing apparatus 5 on the flexible display 6 is stable, and a squeezing force is small. This helps reduce a risk that the flexible display 6 is damaged due to excessive squeezing of the folding mechanism 52, and makes the flexible display 6 more reliable.

For example, when the first housing 51 and the second housing 53 are folded relative to each other to a closed state, the support surface 5241 of the first support plate 524 is inclined relative to the support surface 511 of the first housing 51, the support surface 5251 of the second support plate 525 is inclined relative to the support surface 531 of the second housing 53, and the support surface 511 of the first housing 51 is parallel to the support surface 531 of the second housing 53. In this case, the first non-bending portion 61 and the second non-bending portion 63 of the flexible display 6 can approach each other to a closed state, and the bending portion 62 is bent into a water drop shape.

In some embodiments, refer to FIG. 98 and FIG. 99. The middle housing 521 has an appearance surface 5211, the appearance surface 5211 is disposed back to the first support plate 524 and the second support plate 525, and the appearance surface 5211 is also an outer side surface of the middle housing 521. As shown in FIG. 98, when the first housing 51 and the second housing 53 are in an open state, the middle housing 521 is located in the first fastening groove 512 and the second fastening groove 532. The first housing 51 and the second housing 53 cover the appearance surface 5211 of the middle housing 521. As shown in FIG. 99, when the first housing 51 and the second housing 53 are in a closed state, the middle housing 521 partially extends out from the first fastening groove 512 and the second fastening groove 532, and the appearance surface 5211 of the middle housing 521 is exposed relative to the first housing 51 and the second housing 53.

In this embodiment, the first housing 51 and the second housing 53 can shield the middle housing 521 from a back side inanely a side back to the flexible display 61 of the housing apparatus 5 in the open state. In this case, the first housing 51 and the second housing 53 can also shield other components of the folding mechanism 52 from the back side of the housing apparatus 5, so that the housing apparatus 5 implements self-shielding on the back side, thereby protecting the folding mechanism 52. In addition, appearances of the housing apparatus 5 and the electronic device 300 are complete, so that appearance experience is good, and waterproof and dust-proof performance is good. When the first housing 51 and the second housing 53 are in a closed state, the first housing 51, the second housing 53, and the middle housing 521 jointly form appearance parts of the housing apparatus 5 and the electronic device 300. Therefore: the housing apparatus 5 and the electronic device 300 can implement bad-side self-shielding in the closed state, which helps improve appearance integrity, and implements good waterproof and dust-proof performance.

In some embodiments, as shown in FIG. 99, the appearance surface 5211 of the middle housing 521 includes a first arc surface part 5211*a*, a planar part 5211*b*, and a second arc surface part 5211*c*, and the first arc surface part 5211*a* and the second arc surface part 5211*c* are respectively connected to two sides of the planar part 5211*b*. In this embodiment, the appearance surface 5211 forms a shape similar to an arc surface, which helps improve appearance experience and holding experience of the electronic device 300 in a closed state. In addition, the middle part of the appearance surface 5211 is the planar part 5211*b*, so that a thickness (a size in a direction perpendicular to the planar part 3211*b*) of the middle housing 521 is small, an overall thickness of the housing apparatus 5 in an open state is small, and an overall width of the housing apparatus 5 in a closed state is small, which facilitates miniaturization and thinning of the electronic device 300. In some other embodiments, the appearance surface 5211 may alternatively be an arc surface or another smooth curved surface.

In some embodiments, the housing apparatus 5 may further include a top side end cover (not shown in the figure) and a bottom side end cover (not shown in the figure). The top side end cover is located on a top side of the folding mechanism 52, and the bottom side end cover is located on a bottom side of the folding mechanism 52. When the first housing 51 and the second housing 53 are in an open state, the top side end cover shields the middle housing 521 from a top side of the housing apparatus 5, and the bottom side end cover shields the middle housing 521 from a bottom side of the housing apparatus 5. When the first housing 51 and the second housing 53 are in a closed state, a part that is of the middle housing 521 and that does not extend out from the first fastening groove 512 and the second fastening groove 532 is shielded by the top side end cover from the top side of the housing apparatus 5, and is shielded by the bottom side end cover from the bottom side of the housing apparatus 5. For example, when the first housing 51 and the second housing 53 are in an open state or a closed state, another component of the folding mechanism 52 may be shielded by the top side end cover from the top side of the housing apparatus 5, or may be shielded by the bottom side end cover from the bottom side of the housing apparatus 5, or may be shielded by the first housing 51 and the second housing 53 from the top side and the bottom side of the housing apparatus 5. Therefore, the housing apparatus 5 can perform all-round shielding on the folding mechanism 52 in the open state and the closed state, so that the housing apparatus 5 can better implement self-shielding.

The top side end cover and the bottom side end cover may be a part of the middle housing 521, or may be a component that is independent of the middle housing 521 and connected to the folding mechanism 52, or may be a component that is independent of the middle housing 521 and connects the first housing 51 and the second housing 53. Specific structures and mounting manners of the top side end cover and the bottom side end cover are not strictly limited in this application.

Figure 100:
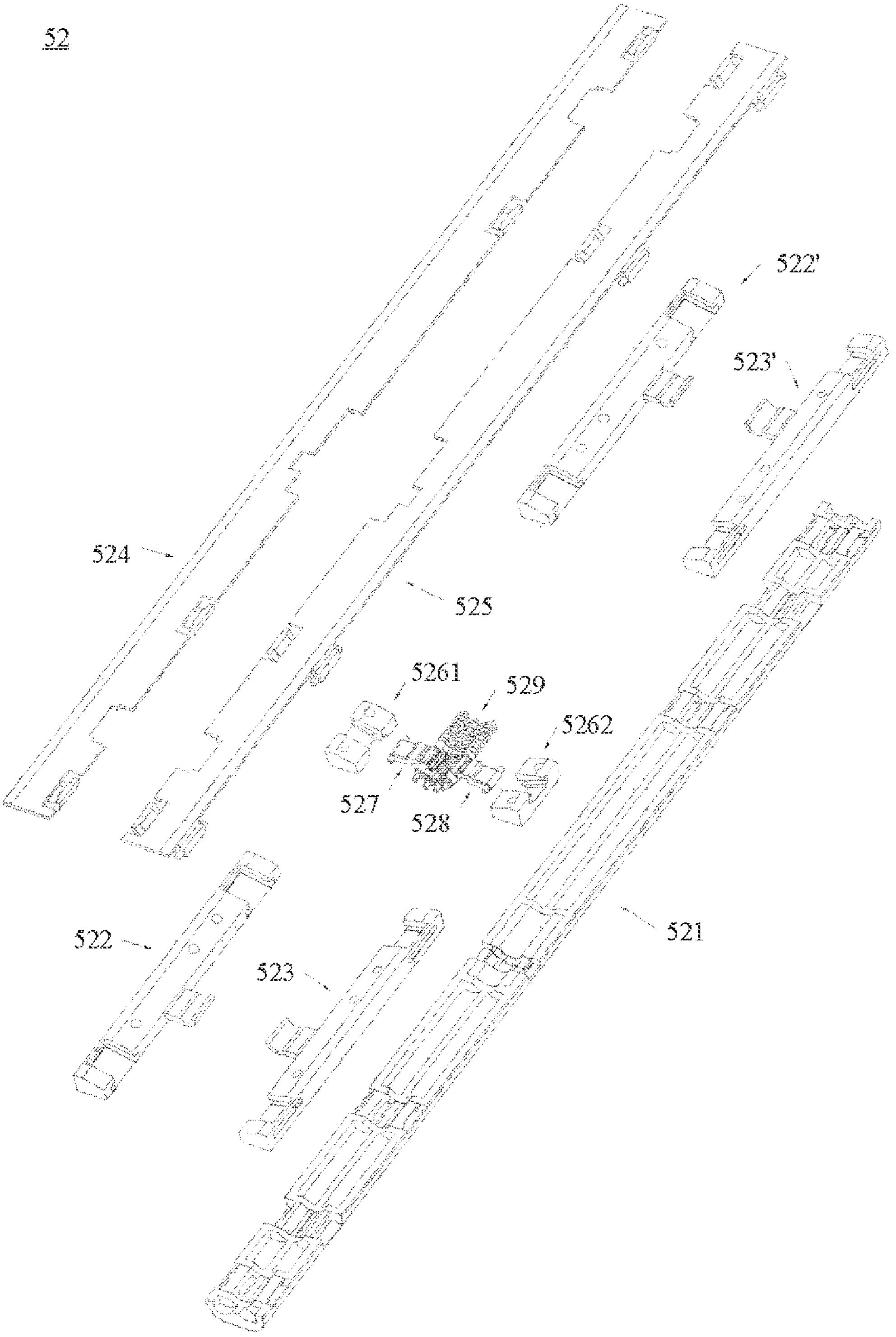
FIG. 100 is a schematic exploded view of a partial structure of a folding mechanism shown in FIG. 95.
Figure 101:
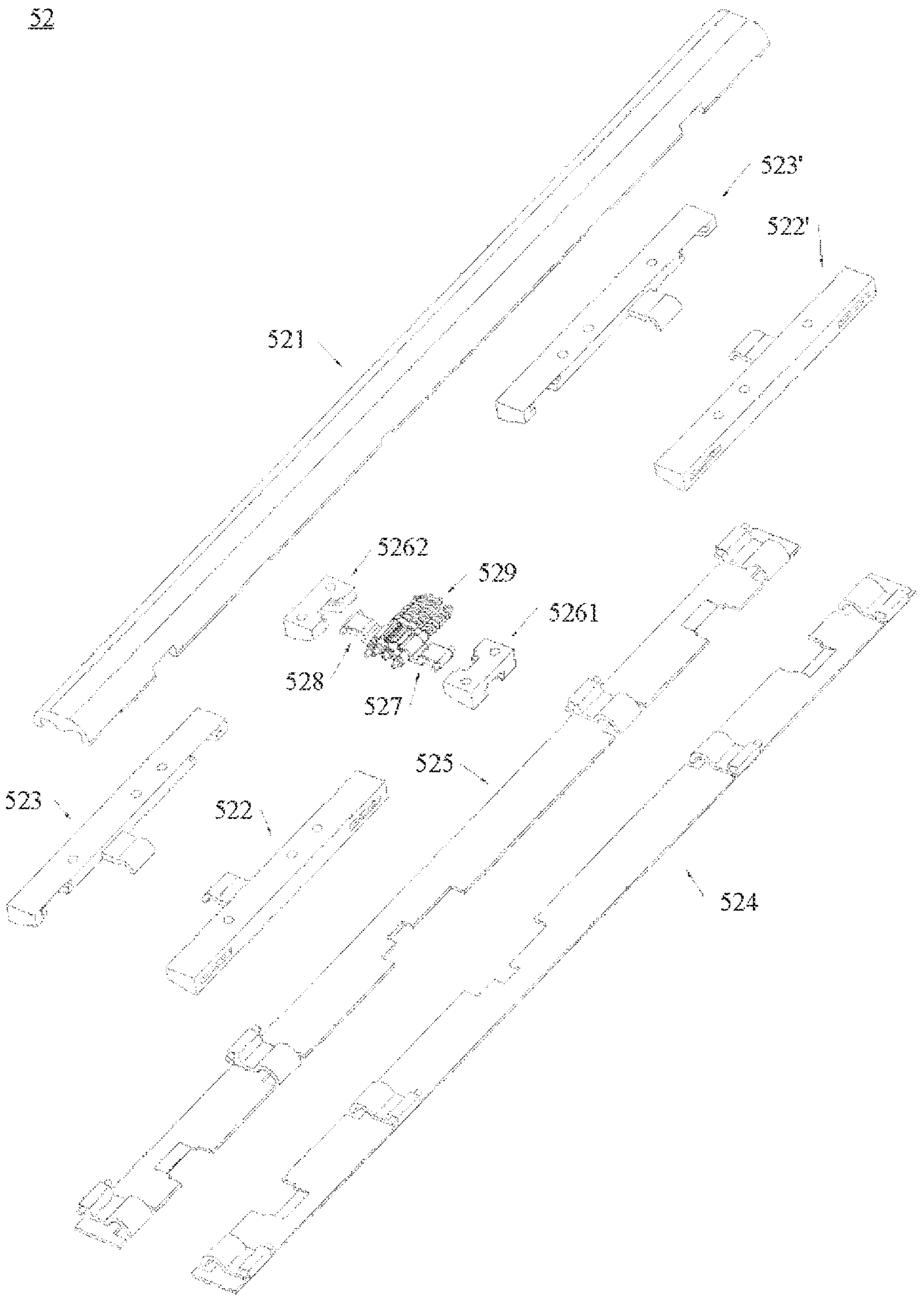
FIG. 101 is a schematic diagram of a structure of the folding mechanism shown in FIG. 100 from another angle.

In some embodiments, FIG. 100 is a schematic exploded view of a partial structure of the folding mechanism 52 shown in FIG. 95. FIG. 101 is a schematic diagram of a structure of the folding mechanism 52 shown in FIG. 100 from another angle. An angle of view of the folding mechanism 52 shown in FIG. 101 is horizontally reversed relative to an angle of view of the folding mechanism 52 shown in FIG. 100. The folding mechanism 52 includes a middle housing 521, a first fixing bracket 522, a second fixing bracket 523, a first support plate 524, a second support plate 525, a third fixing bracket 5261, a fourth fixing bracket 5262, a first swing arm 527, a second swing arm 528, and a synchronization assembly 529.

The first fixing bracket 522 and the second fixing bracket 523 may jointly form a first connection frame assembly. For example, the first connection frame assembly may be used as a bottom connection assembly of the folding mechanism 52. The folding mechanism 52 may further include a second connection frame assembly, and the second connection frame assembly may be used as a top connection assembly of the folding mechanism 52. Both the first connection frame assembly and the second connection frame assembly connect the middle housing 521, the first support plate 524, and the second support plate 525. The second connection frame assembly and the first connection frame assembly may be of a mirror symmetric structure. For example, the second connection frame assembly may include a first fixing bracket 522' and a second fixing bracket 523'. For component structures of the second connection frame assembly and connection relationships between the components and the middle housing 521, the first support plate 524, and the second support plate 525, correspondingly refer to a related description of the first connection frame assembly. Details are not described in this embodiment of this application again. In some other embodiments, the folding mechanism 52 may alternatively include a first connection frame assembly and another connection frame assembly. A structure of the another connection frame assembly may be the same as or different from a structure of the first connection frame assembly. This is not strictly limited in this application.

The third fixing bracket 5261, the fourth fixing bracket 5262, the first swing arm 527, the second swing arm 528, and the synchronisation assembly 529 may form a synchronization connection assembly. For example, the synchronization connection assembly is located between the first connection frame assembly and the second connection frame assembly, and the synchronization connection assembly connects the middle housing 521, the first support plate 524, and the second support plate 525. There may be one or more groups of synchronous connection assemblies. This is not strictly limited in this application.

The first fixing bracket 522 of the first connection frame assembly, the third fixing bracket 5261 of the synchronous connection assembly, and the first fixing bracket 522' of the second connection frame assembly may be mechanical parts independent of each other, or may be a plurality of parts of an integrated mechanical part. The second fixing bracket 523 of the first connection frame assembly, the fourth fixing bracket 5262 of the synchronous connection assembly, and the second fixing bracket 523' of the second connection frame assembly may be mechanical parts independent of each other, or may be a plurality of parts of an integrated mechanical part.

Figure 102:
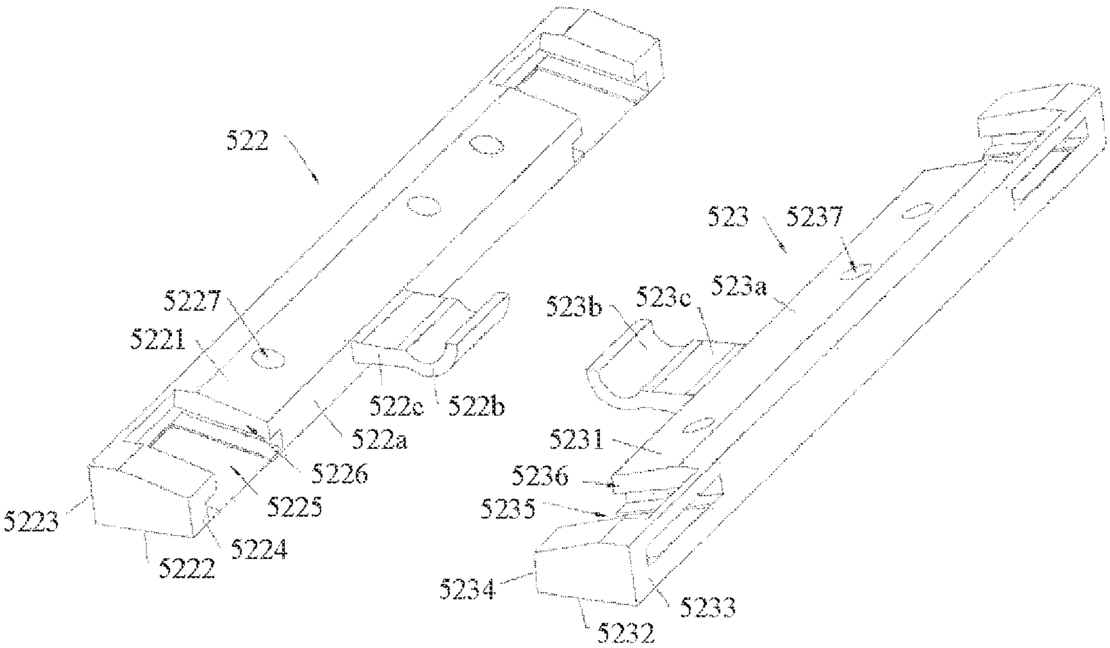
FIG. 102 is a schematic diagram of structures of a first fixing bracket and a second fixing bracket shown in FIG. 100.

In some embodiments, FIG. 102 is a schematic diagram of structures of the first fixing bracket 522 and the second fixing bracket 523 shown in FIG. 100. The first fixing bracket 522 includes a first fixed body **522*a*, a first arc-shaped arm 522*b*, and a first connection arm 522*c* connected between the first fixed body 522*a* and the first arc-shaped arm 522*b*. The first fixed body 522*a* includes a top surface 5221, a bottom surface 5222, a first side surface 5223, and a second side surface 5224. The top surface 5221 and the bottom surface 5222 are disposed back to each other, the first side surface 5223 and the second side surface 5224 are disposed back to each other, and the first side surface 5223 and the second side surface 5224 are located between the top surface 5221 and the bottom surface 5222. The top surface 5221 includes an inclined region that is inclined relative to the bottom surface 5222, and the inclined region of the top surface 5221 and the bottom surface 5222 are close to each other in a direction close to the second side surface 5224. The first arc-shaped arm 522*b* is located on a side that is of the second side surface 5221 and that is away from the first side surface 5223. For example, the first connection arm 522*c* connects the second side surface 5224 and the first arc-shaped arm 522*b* A position of a circle center of the first arc-shaped arm 522*b* is located at a top side of the first arc-shaped arm 522*b***.

The first fixed body **522*a* is provided with a first sliding slot 5225. The first sliding slot 5225 forms an opening on the second side surface 5224. For example, an extension direction of the first sliding slot 5225 may be set in an inclined manner relative to the bottom surface 5222, and an included angle is formed between the extension direction of the first sliding slot 5225 and the bottom surface 5222. In a direction close to the second side surface 5224, the extension direction of the first sliding slot 5225 and the bottom surface 5222 are close to each other. For example, the first fixed body 522*a* may be further provided with a first movable notch 5226, and the first movable notch 5226 communicates with the first sliding slot 5225 and forms an opening on the top surface 5221. The first fixed body 522*a* may be further provided with one or more fast fastening holes 5227**.

In some embodiments, as shown in FIG. 102, the second fixing bracket 523 includes a second fixed body **523*a*, a second arc-shaped arm 523*b*, and a second connection arm 322*c* connected between the second fixed body 523*a* and the second arc-shaped arm 523*b*. The second fixed body 523*a* includes a top surface 5231, a bottom surface 5232, a first side surface 5233, and a second side surface 5234. The top surface 5231 and the bottom surface 5232 arm disposed back to each other, the first side surface 5233 and the second side surface 5234 are disposed back to each other, and the first side surface 5233 and the second side surface 5234 are located between the top surface 5231 and the bottom surface 5232. The top surface 5231 includes an inclined region that is inclined relative to the bottom surface 5232, and the inclined region of the top surface 5231 and the bottom surface 5232 we close to each other in a direction close to the second side surface 5234. The second arc-shaped arm 523***b* is located on a side that is of the second side surface 5234 and that is away from the first side surface 5233. For example, the second connection arm 322*c* connects the second side surface 5234 and the second arc-shaped arm 523*b*. A position of a circle center of the second arc-shaped arm 523*b* is located on a top side of the second arc-shaped arm 523*b*.

The second fixed body 523*a* is provided with a second sliding slot 5235. The second sliding slot 5235 forms an opening on the second side surface 5234. For example, an extension direction of the second sliding slot 5235 may be set in an inclined manner relative to the bottom surface 5232, and an included angle is formed between the extension direction of the second sliding slot 5235 and the bottom surface 5232. In a direction close to the second side surface 5234, the extension direction of the second sliding slot 5235 and the bottom surface 5232 are close to each other. For example, the second fixed body 523*a* may be further provided with a second movable notch 5236, and the second movable notch 5236 communicates with the second sliding slot 5235 and forms an opening on the top surface 5231. The second fixed body 523*a* may be further provided with one or more second fastening holes 5237.

The first fixing bracket 522 and the second fixing bracket 523 may be of a same structure, a mirror symmetric structure, a partial mirror symmetric structure, a centro-symmetric structure, a partial centro-symmetric structure, or different structures. This is not strictly limited in this application. In this application, that the two structures are a partial mirror symmetric structure mains that some regions of the two structures are mirror-symmetric, and the other regions are not limited That the two structures are a partial centro-symmetric structure means that some regions of the two structures are centro-symmetric, and the other regions are not limited.

Figure 103:
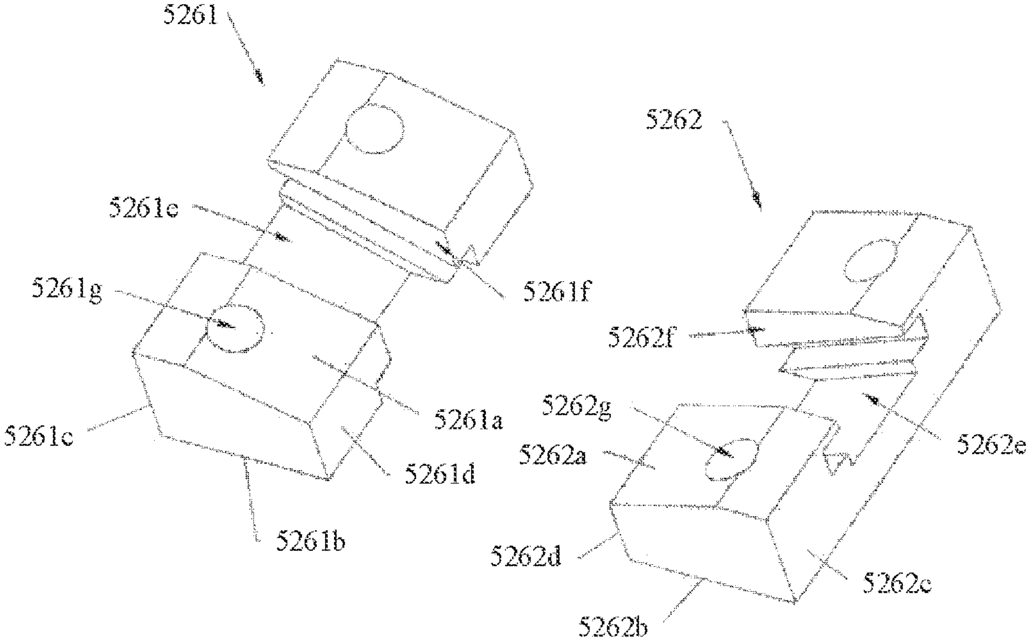
FIG. 103 is a schematic diagram of structures of a third fixing bracket and a fourth fixing bracket shown in FIG. 100.

In some embodiments. FIG. 103 is a schematic diagram of structures of the thud fixing bracket 5261 and the fourth fixing bracket 5262 shown in FIG. 100. The third fixing bracket 5261 includes a top surface 5261*a*, a bottom surface 5261*b*, a first side surface 5261*c*, and a se and side surface 5261*d*. The top surface 5261*a* and the bottom surface 5261*b* are disposed back to each other, the first side surface 5261*c* and the second side surface 5261*d* are disposed back to each other, and the first side surface 5261*c* and the second side surface 5261*d* are located between the top surface 5261*a* and the bottom surfaces 5261*b*. The top surface 5261*a* includes an inclined region that is inclined relative to the bottom surface 5261*b*, and the inclined region of the top surface 5261*a* and the bottom surface 5261*b* are close to each other in a direction close to the second side surface 5261*d*.

The third fixing bracket 5261 is provided with a third sliding slot 5261*e*. The third sliding slot 5261*e* may form an opening on the second side surface 5261*d*. For example, an extension direction of the third sliding slot 5261*e* may be disposed in an inclined manner relative to the bottom surface 5261*b*, and an included angle is formed between the extension direction of the third sliding slot 5261*e* and the bottom surface 5261*b*. In a direction close to the second side surface 5261*d*, the extension direction of the third sliding slot 5261*e* and the bottom surface 5261*b* are close to each other. For example, the third fixing bracket 5261 may be further provided with a third movable notch 5261*f*, and the third movable notch 5261*f* communicates with the third sliding slot 5261*e* and forms an opening on the top surface 5261*a* The third fixing bracket 5261 may be further provided with one or more third fastening holes 5261*g*.

In some embodiments, as shown in FIG. 103, the fourth fixing bracket 5262 includes a top surface 5262*a*, a bottom surface 5262*b*, a first side surface 5262*c*, and a second side surface 5262*d*. The top surface 5262*a* and the bottom surface 5262*b* are disposed back to each other, the first side surface 5262*c* and the second side surface 5262*d* are disposed back to each other, and the first side surface 5262*c* and the second side surface 5262*d* are located between the top surface 5262*a* and the bottom surface 5262*b*. The top surface 5262*a* includes an inclined region that is inclined relative to the bottom surface 5262*b*, and the inclined region of the top surface 5262*a* and the bottom surface 5262*b* are close to each other in a direction close to the second side surface 5262*d*.

The fourth fixing bracket 5262 is provided with a fourth sliding slot 5262*e*. The fourth sliding slot 5262*e* may form an opening on the second side surface 5262*d*. For example, an extension direction of the fourth sliding slot 5262*e* may be disposed in an inclined manner relative to the bottom surface 5262*b*, and an included angle is formed between the extension direction of the fourth sliding slot 52620 and the bottom surface 5262*b*. In a direction close to the second side surface 5262*d*, the extension direction of the fourth sliding slot 5262*e* and the bottom surface 5262*b* are close to each other. For example, the fourth fixing bracket 5262 may be further provided a fourth movable notch 5262*f*, and the fourth movable notch 5262*f* communicates with the fourth sliding slot 5262*e* and forms an opening on the top surface 5262*a*. The fourth fixing bracket 5262 may be further provided with one or more fourth fastening holes 5262*g*.

In this application, the third fixing bracket 5261 and the fourth fixing bracket 5262 may be of a same structure, a mirror symmetric structure, a partial mirror symmetric structure, a centre-symmetric structure, a partial centro-symmetric structure, or different structures. This is not strictly limited in this application.

Figure 104:
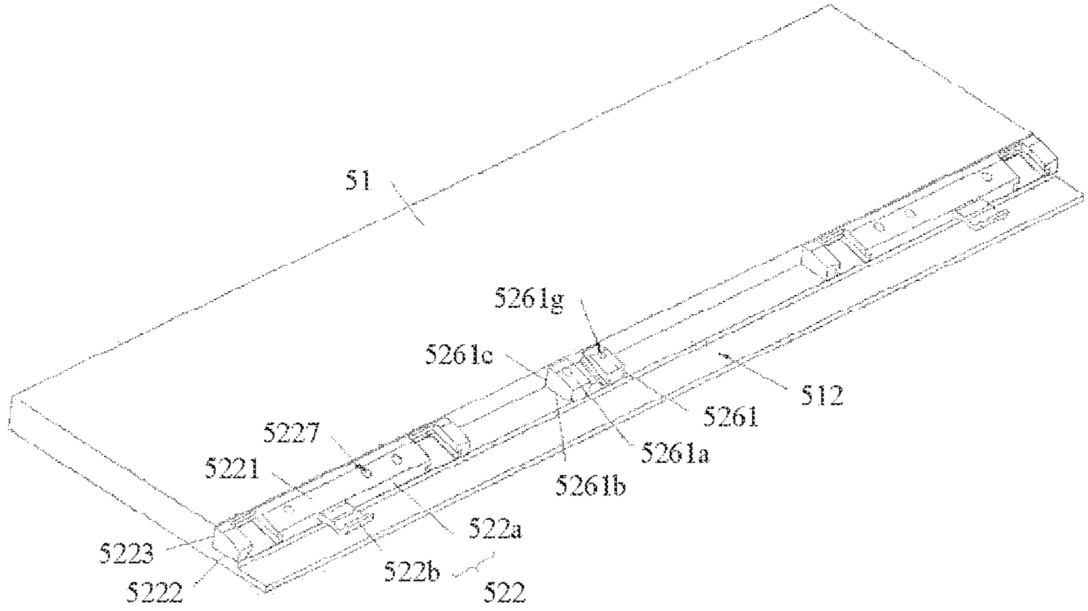
FIG. 104 is a schematic diagram of a partial structure of a folding mechanism shown in FIG. 95.

As shown in FIG. 97, the first housing 51 is provided with a plurality of fastening holes 513. Refer to FIG. 97 and FIG. 104. FIG. 104 is a schematic diagram of a partial structure of the folding mechanism 52 shown in FIG. 95. When the first fixing bracket 522 and the third fixing bracket 5261 are fastened to the first housing 51, the first fixing bracket 522 and the third fixing bracket 5261 are mounted in the first fastening groove 512. The first fixed body 522*a* of the first fixing bracket 522 is fixedly connected to the first housing 51, the first arc-shaped arm 522*b* is disposed in a suspended manner, and the first side surface 5223 and the bottom surface 5222 of the first fixing bracket 522 face a groove wall of the first fastening groove 512. The first side surface 5261*c* and the bottom surface 5261*b* of the third fixing bracket 5261 face a groove wall of the first fastening groove 512. The first fastening groove 5227 may be opposite to the fastening hole 513 of one part of the first housing 51, and the third fastening hole 5261g may be opposite to the fastening hole 513 of the other part of the first housing 51 to lock by using a fastener (not shown in the figure). For example, an inclined region of the top surface 5261*a* of the third fixing bracket 5261 may be flush with an inclined region of the top surface 5221 of the first fixing bracket 522.

A fitting structure of a positioning post and a positioning hole may be disposed between the first fixing bracket 522 and the first housing 51, and/or between the third fixing bracket 5261 and the first housing 51, so as to improve connection stability between each other. A connection structure between the fixing bracket and the housing is not strictly limited in this application.

It may be understood that a connection relationship and a relative position relationship between the second fixing bracket 523 and the second housing 53 are the same as a connection relationship and a relative position relationship between the first fixing bracket 522 and the first housing 51. Details are not described again in this embodiment of this application. A connection relationship and a relative position relationship between the fourth fixing bracket 5262 and the second housing 53 are the same as a connection relationship and a relative position relationship between the third fixing bracket 5261 and the first housing 51. Details are not described again in this embodiment of this application.

Figure 105:
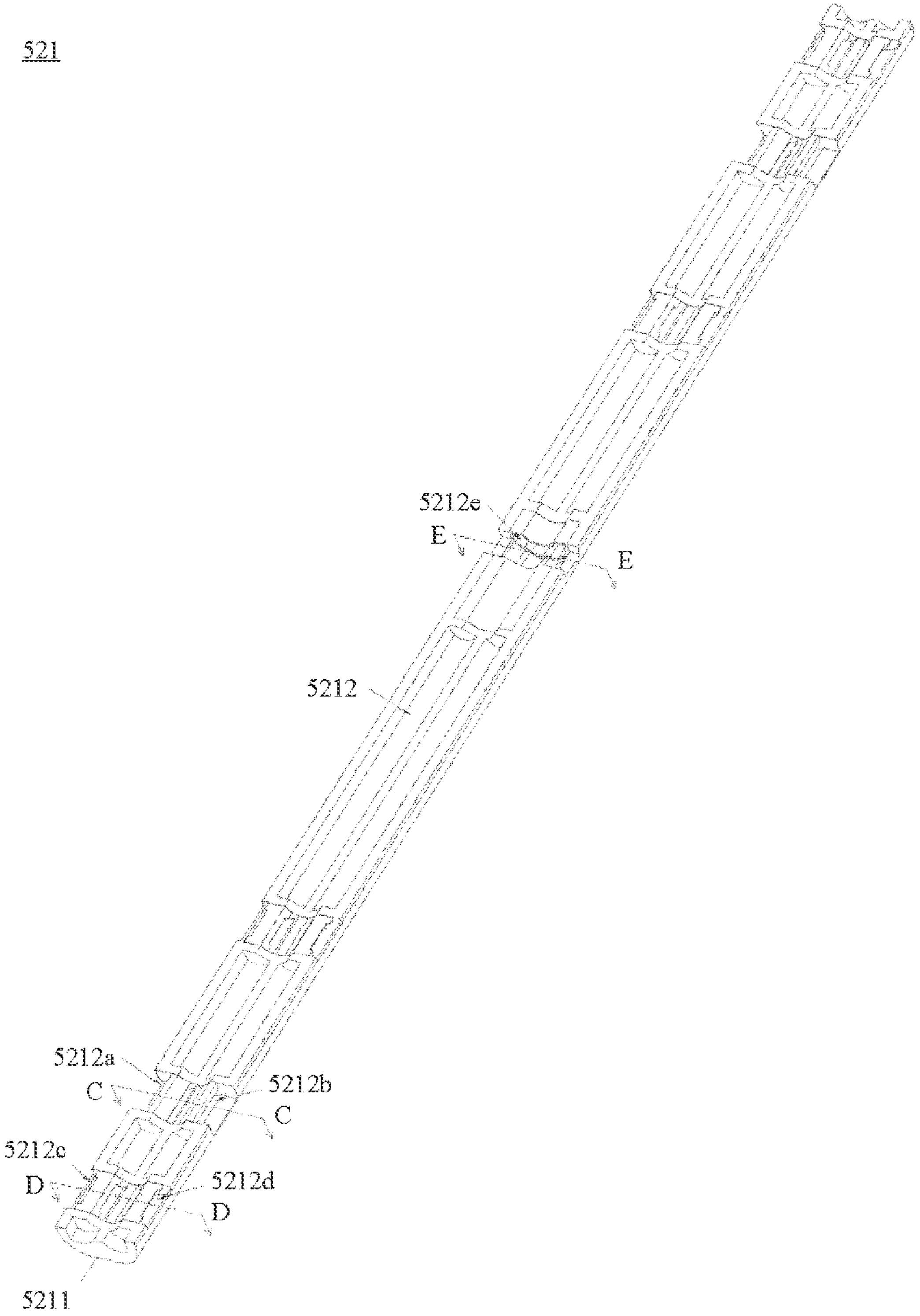
FIG. 105 is a schematic diagram of a structure of a middle housing shown in FIG. 100.

In some embodiments, FIG. 105 is a schematic diagram of a structure of the middle housing 521 shown in FIG. 100. The riddle housing 521 is prodded with inner space 5212, and the appearance surface 5211 of the middle housing 521 is disposed back to the inner space 5212. For example, the inner space 5212 may include a plurality of movable spaces and a plurality of avoidance spaces. The movable space is used to mount mechanical parts that are of the folding mechanism 52 and that are connected to the middle housing 521, and allow these mechanical parts to move. The avoidance space is used to avoid another mechanical part of the folding mechanism 52 in a moving process of the folding mechanism 52. For example, the middle housing 521 may include a main body part and a plurality of fitting parts, and the plurality of fitting parts cooperate with the main body part to form the movable spaces and avoidance spaces of the inner space 5212. An outer side surface of the main body pail may form the appearance surface 5211 of the middle housing 521, and the plurality of fitting parts may be located inside the main body part and fixedly connected to the main body part. A component structure, a connection structure, a connection manner, and the like of the main body part and the fitting part are not strictly limited in this embodiment of this application.

Figure 106:
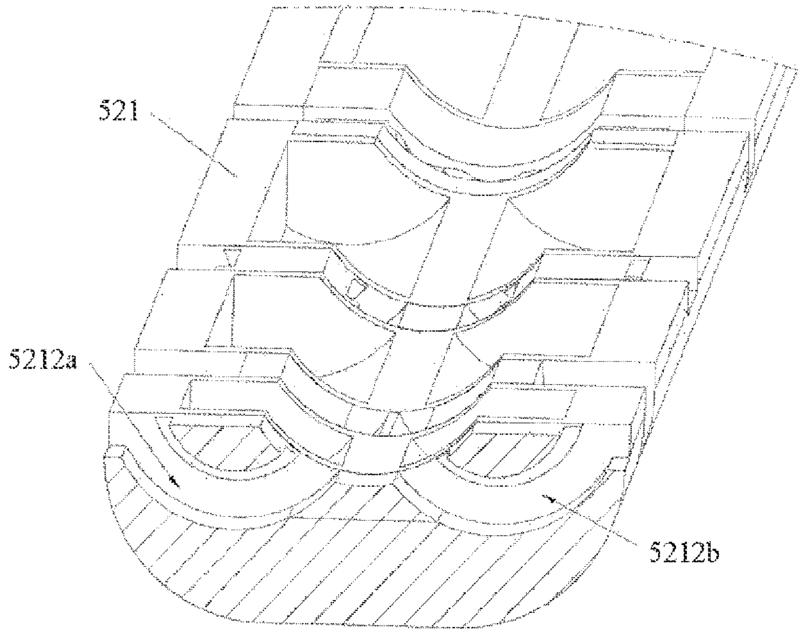
FIG. 106 is a schematic diagram of a cross section of the middle housing shown in FIG. 105 when art along C-C.

In some embodiments, refer to FIG. 105 and FIG. 106. FIG. 106 is a schematic diagram of a cross section of the middle housing 521 shown in FIG. 105 when cut along C-C. The middle housing 521 is provided with a first arc-shaped groove 5212*a* and a second arc-shaped groove 5212*b*. The first arc-shaped groove 5212*a* and the second arc-shaped groove 5212*b* are a part of the inner space 5212. The first arc-shaped groove 5212*a* communicates with an outer space on one side of the middle housing 521, and the second arc-shaped groove 5212*b* communicates with an outer space on the other side of the middle housing 521. The first arc-shaped groove 5212*a* and the second arc-shaped groove 5212*b* may be disposed side by side, or may be disposed in a staggered manner. There may be one or more first arc-shaped grooves 5212*a*. There may be one or more second arc-shaped grooves 5212*b*.

Figure 107:
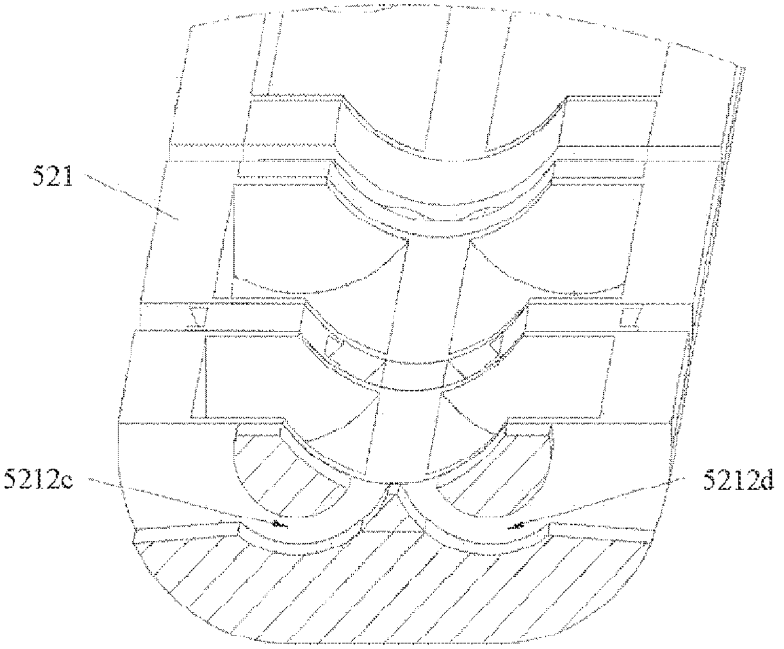
FIG. 107 is a schematic diagram of a cross section of the middle housing shown in FIG. 105 when cut along D-D.

In some embodiments, refer to FIG. 105 and FIG. 107. FIG. 107 is a schematic diagram of a cross section of the middle housing 521 shown in FIG. 105 when cut along D-D. The middle housing 521 is provided with a third arc-shaped groove 5212*c* and a fourth arc-shaped groove 5212*d*. The third arc-shaped groove 5212*c* and the fourth arc-shaped groove 5212*d* are a part of the inner space 5212. The third arc-shaped groove 5212*c* communicates with an outer space on one side the middle housing 521, and the fourth arc-shaped groove 5212*d* communicates with an outer space on the other side of the middle housing 521. The third arc-shaped groove 5212*c* and the fourth arc-shaped groove 5212*d* may be disposed side by side, or may be disposed in a staggered manner. There may be one or more third arc-shaped grooves 5212*c*. There may be one or more fourth arc-shaped grooves 5212*d*.

Figure 108:
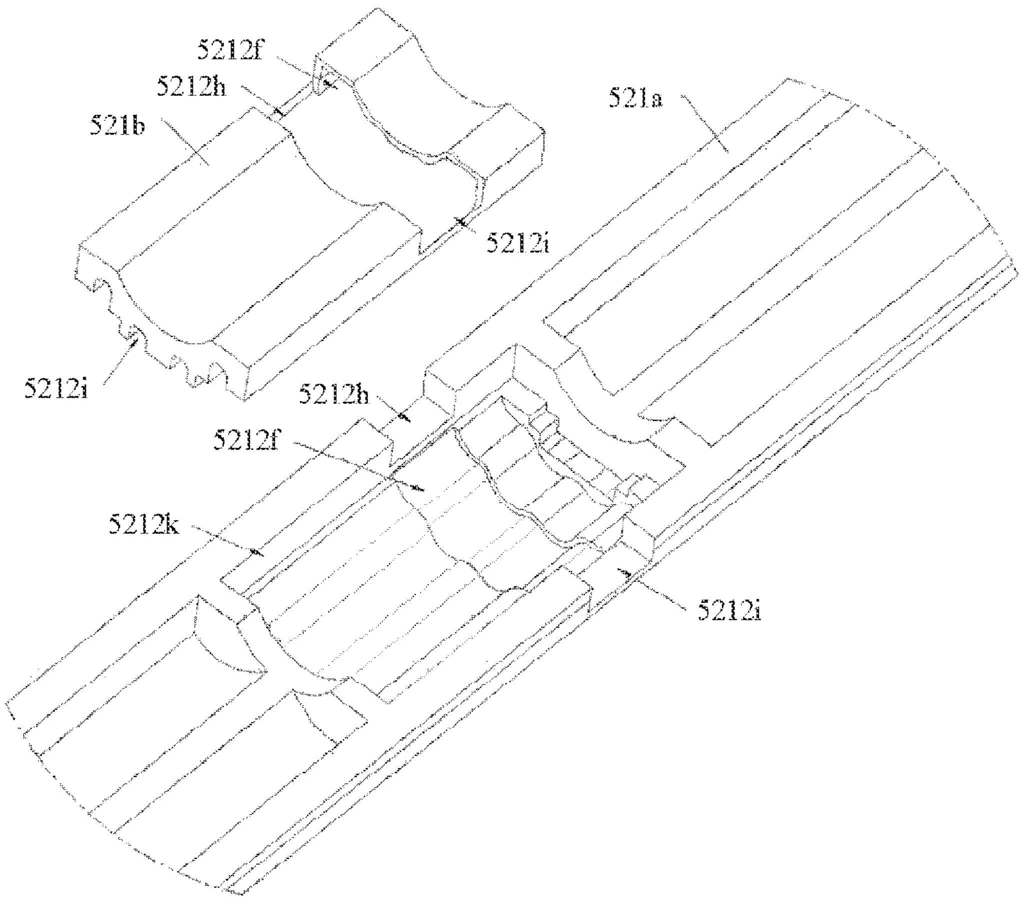
FIG. 108 is a schematic exploded view of a partial structure of the middle housing shown in FIG. 105.
Figure 109:
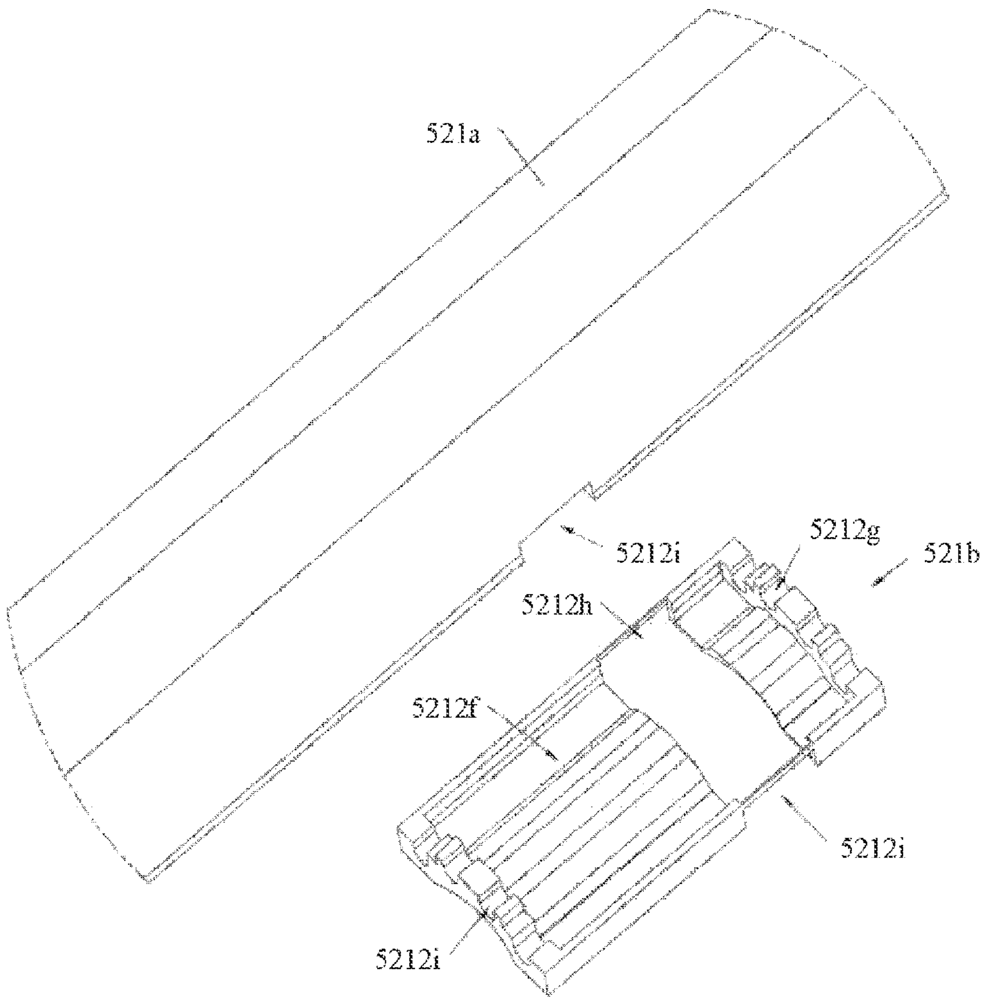
FIG. 109 is a schematic diagram of the structure shown in FIG. 108 from another angle.

In some embodiments, refer to FIG. 105. FIG. 108, and FIG. 109. FIG. 108 is a schematic exploded view of a partial structure of the middle housing 521 shown in FIG. 105 FIG. 109 is a schematic diagram of the structure shown in FIG. 108 from another angle. A field of view shown in FIG. 109 is reversed horizontally relative to a field of view shown in FIG. 108. The middle housing 521 is provided with a mounting space 5212*e*. The mounting space 5212*e* is a part of the inner space 5212. The middle housing 521 may include a first part 521*a* and a second part 521*b*, and the second part 521*b* is fastened to the first part 521*a* to form the mounting space 5212*e*. For example, the first part 521*a* of the middle housing 521 may be a body part, and the second part 521*b* is a fitting part. For example, the first part 521*a* forms a groove 5212*k*, the second part 521*h* is mounted in the groove 5212*k*, and covers the groove 5212*k*, and the mounting space 5212*e* is jointly enclosed by a surface that is of the second part 521*b* and that faces the groove and a wall surface of the groove 5212*k*. It may be understood that, in some other embodiments, the mounting space 5212*e* of the middle housing 521 may alternatively be formed. This is not strictly limited in this application.

Figure 110:
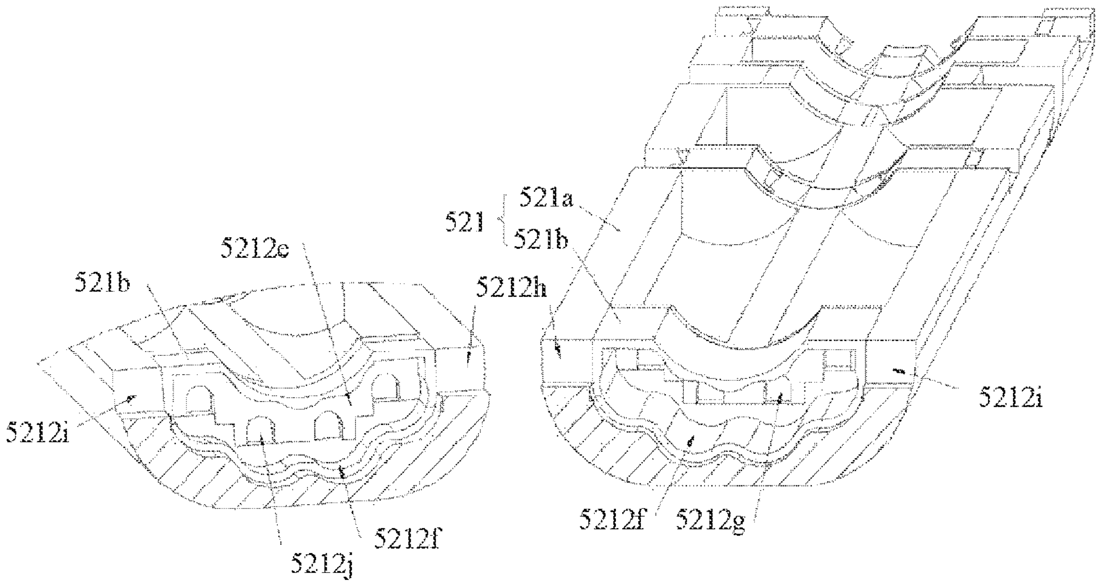
FIG. 110 is a schematic diagram of a structure of the middle housing shown in FIG. 105 when cut along E-E.

For example, refer to FIG. 108 to FIG. 110. FIG. 110 is a schematic diagram of a structure of the middle housing 521 shown in FIG. 105 when cut along E-E. FIG. 110 is a schematic diagram of structures of the two parts divided by the middle housing 521 along E-E For example, the mounting space 5212*e* may include a main body space 5212*f*; a plurality of first hinge grooves 5212*g*, a plurality of second hinge grooves 5212*j*, and two avoidance notches (5212*h* and 5212*i*). The plurality of first hinge grooves 5212*g* are located at one end of the main body space 5212*f* anti communicate with the main body space 5212*f*, and the plurality of second hinge grooves 5212*j* are located at the other end of the main body space 5212*f* and communicate with the main body space 5212*f*. Each of the plurality of first hinge grooves 5212*g* is disposed in pairs with one second hinge groove 5212*j*. In other words, the plurality of first hinge grooves 5212*g* are disposed in a one-to-one correspondence with the plurality of second hinge grooves 5212*j*. The two avoidance notches (5212*h* and 5212*i*) are respectively located on two sides of the main body space 5212*f* and communicate with the main body space 5212*f*; and the two avoidance notches (5212*h* and 5212*i*) respectively connect the main body space 5212*f* to the outer spaces on the two sides of the middle housing 521. There may be one or more mounting spaces 5212*e*.

It may be understood that the main body space 5212*f*, the plurality of first hinge grooves 5212*g*, the plurality of second hinge grooves 5212*j*, and the two avoidance notches (5212*h* and 5212*i*) are all formed by the first part 521*a* and the second part 521*b* of the middle housing 521. However, a main shape of each space may be formed by one of the first part 521*a* and the second part 521*b*, and the remaining shape is formed by the other one. For example, main shapes of the plurality of first hinge grooves 5212*g* and the plurality of second hinge grooves 5212*j* may be formed by the second part 521*b* of the middle housing 521. A part of the shape of the main body space 5212*f* is formed by the first part 521*a*, and another part of the shape is formed by the second part 521*b*. The main shapes of the two avoidance notches (5212*h* and 5212*i*) may be formed by the first part 521*a* of the middle housing 521.

Figure 111:
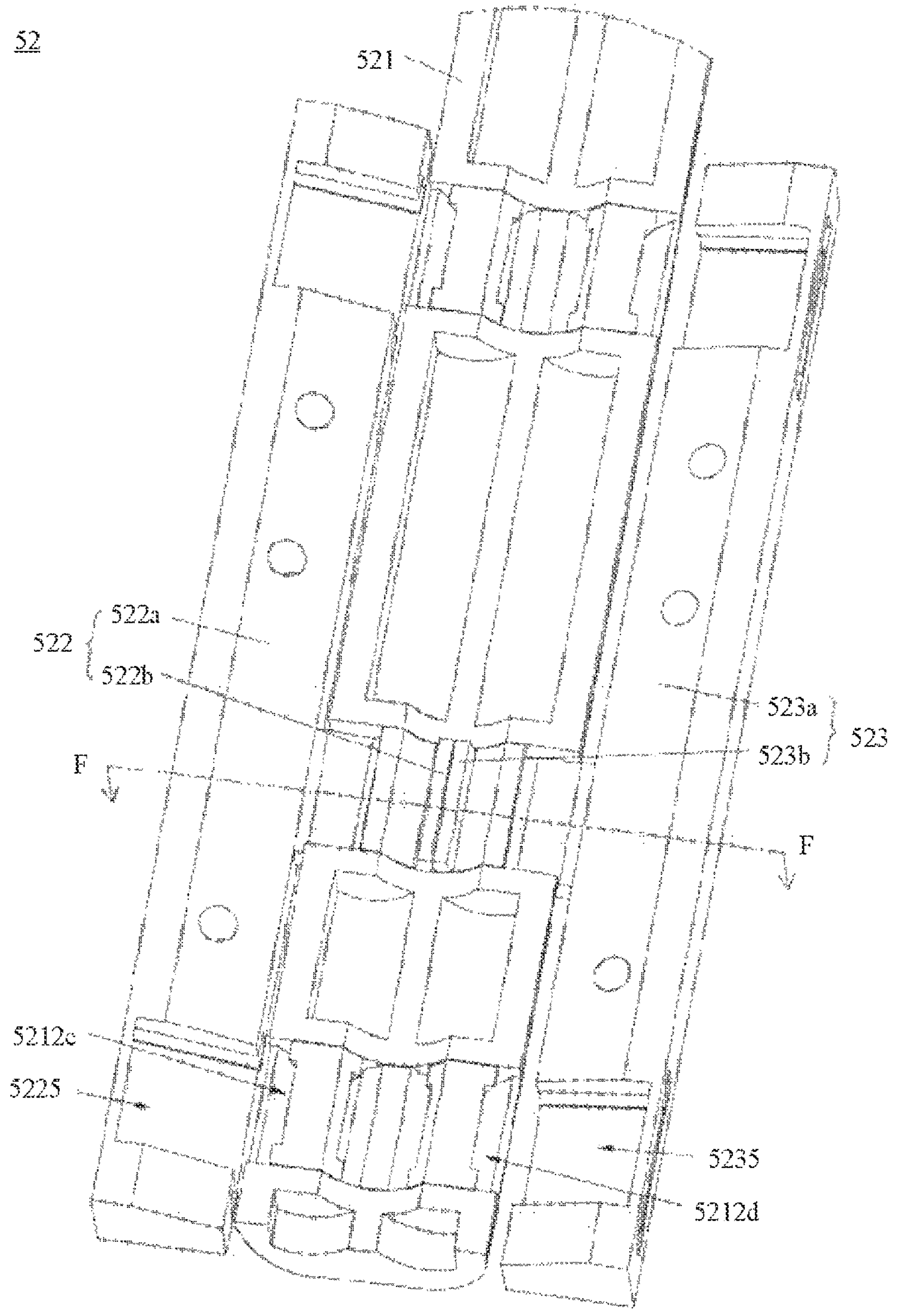
FIG. 111 is a schematic diagram of a partial structure of a folding mechanism shown in FIG. 96.

In some embodiments, refer to FIG. 105 and FIG. 111. FIG. 111 is a schematic diagram of a partial structure of the folding mechanism 52 shown in FIG. 96. FIG. 111 shows a part of the middle housing 521, the first fixing bracket 522, and the second fixing bracket 523 of the folding mechanism 52. The structure shown in FIG. 111 is in an open state. It may be understood that, in this embodiment of this application, the folding mechanism 52 is in an open state, or a part of a structure of the folding mechanism 52 is in an open state, which corresponds to that the first housing 51 and the second housing 53 are in an open state.

The first arc shaped arm 522*b* of the first fixing bracket 522 is mounted in the first arc-shaped groove 5212*a* of the middle housing 521, to rotatably connect the first fixing bracket 522 to the middle housing 521. The first fixed body 522*a* of the first fixing bracket 522 is located outside the middle housing 521. The second arc-shaped arm 523*b* of the second fixing bracket 523 is mounted in the second arc-shaped groove 5212*b* of the middle housing 521, to rotatably connect the second fixing bracket 523 to the middle housing 521. The second fixed body 523*a* of the second fixing bracket 523 is located outside the middle housing 521.

Figure 112:
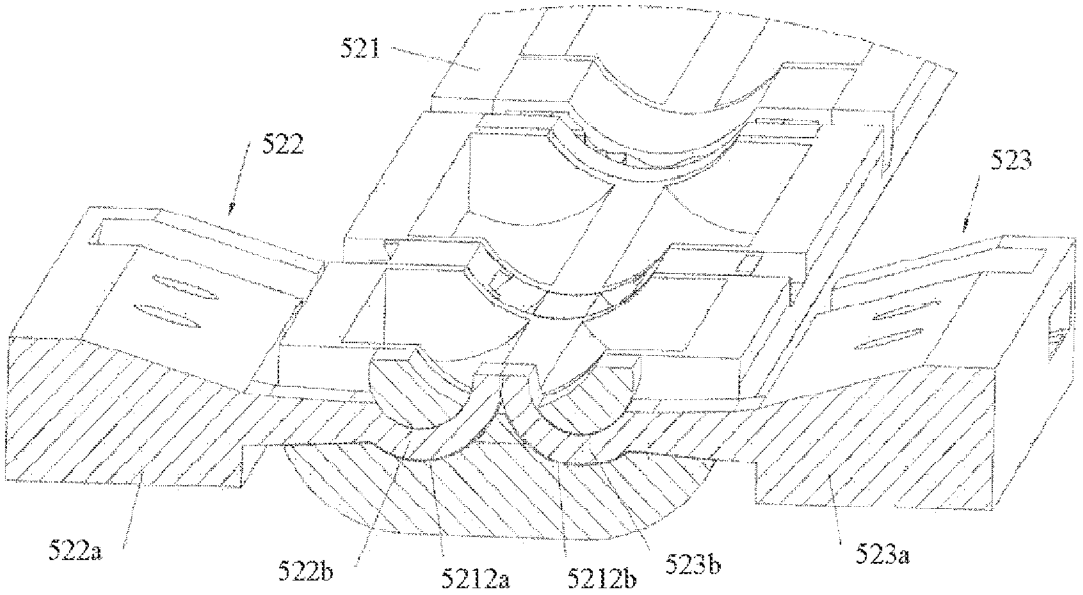
FIG. 112 is a schematic diagram of the structure shown in FIG. 111 when cut along F-F.
Figure 113:
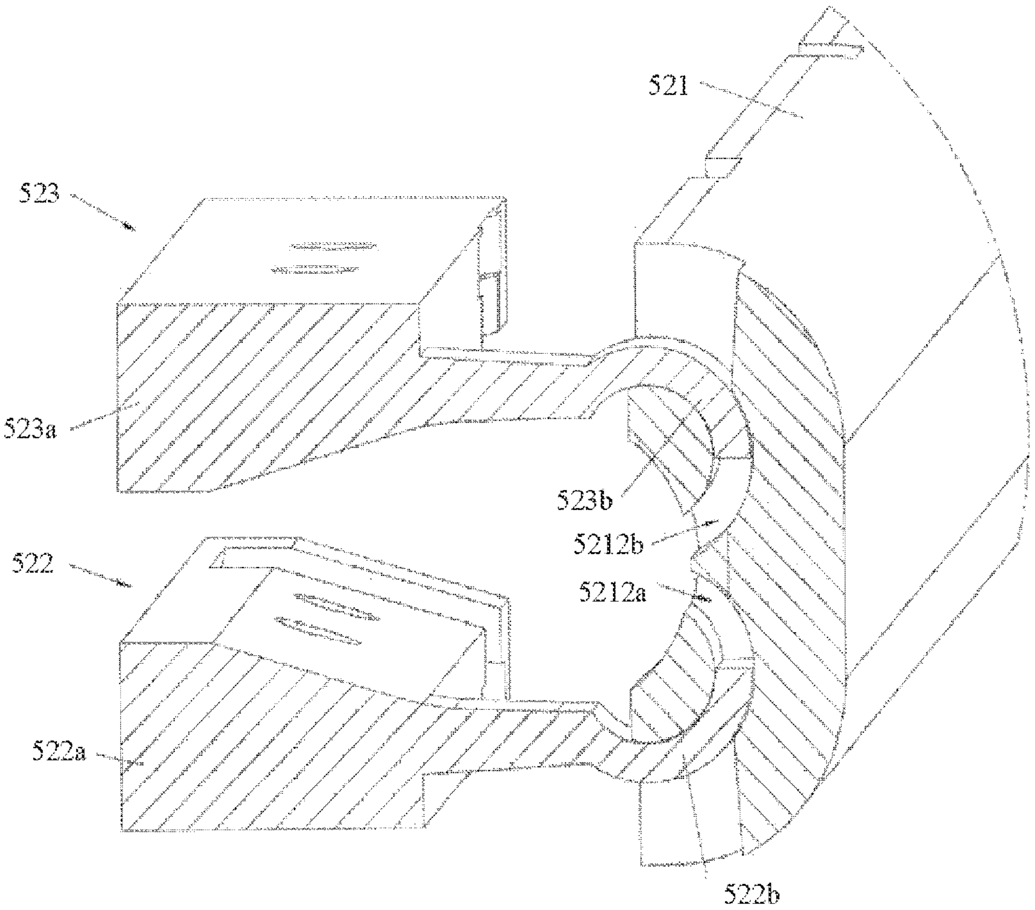
FIG. 113 is a schematic diagram of a structure of the structure shown in FIG. 112 in a closed state.

FIG. 112 is a schematic diagram of the structure shown in FIG. 111 when cut along F-F. FIG. 113 is a schematic diagram of a structure of the structure shown in FIG. 112 in a closed state. It may be understood that, in this embodiment of this application, the folding mechanism 52 or a part of a structure (for example, a structure shown un FIG. 113) of the folding mechanism 52 is in a closed state, which corresponds to that the first housing 51 and the second housing 53 are in a closed state.

The first arc-shaped arm 522*b* is mounted in the first arc-shaped groove 5212*a*, and is rotatably connected to the middle housing 521. The second arc-shaped arm 523*b* is mounted in the second arc-shaped groove 5212*b*, and is rotatably connected to the middle housing 521. As shown in FIG. 112, in an open state, the first arc-shaped arm 522*b* may totally rotate into the first arc-shaped groove 5212*a*, and the second arc-shaped arm 523*b* may totally rotate into the second arc-shaped groove 5212*b*, so that the first fixed body 522*a* and the second fixed body 523*a* are respectively located on two sides of the middle housing 521, and the first fixing bracket 522 and the second fixing bracket 523 are in open positions. As shown in FIG. 113, in a closed state, the first arc-shaped arm 522*b* partially rotates out from the first arc-shaped groove 5212*a*, and the second arc-shaped arm 523*b* partially rotates out from the second arc-shaped groove 5212*b*, so that the first fixed body 522*a* and the second fixed body 523*a* are close to each other and are both located on a same side of the middle housing 521, and the first fixing bracket 522 and the second fixing bracket 523 are in closed positions.

Figure 114:
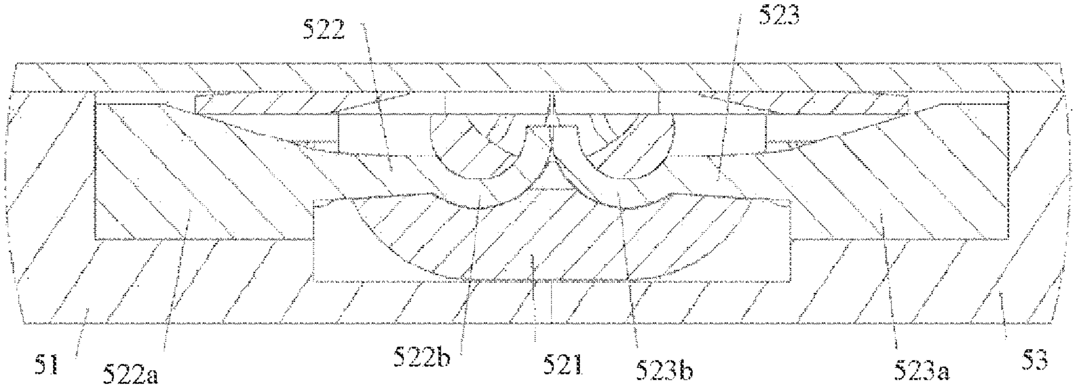
FIG. 114 is a schematic diagram of a structure of a cross section of the electronic device shown in FIG. 93 when cut along H-H.
Figure 115:
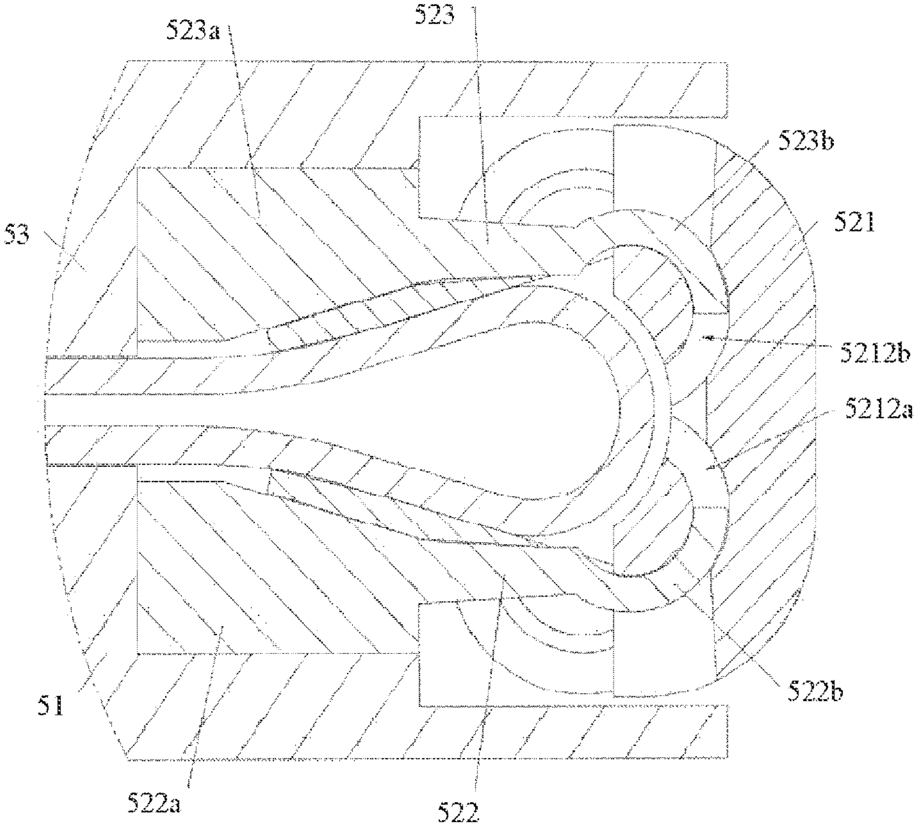
FIG. 115 is a schematic diagram of a structure of a cross section of the electronic device shown in FIG. 94 when cut along I-I.

FIG. 114 is a schematic diagram of a structure of a cross section of the electronic device 300 shown in FIG. 93 when cut along H-H. FIG. 115 is a schematic diagram of a structure of a cross section of the electronic device 300 shown in FIG. 94 when cut along I-I.

The first fixing bracket 522 is fixedly connected to the first housing 51 and is rotatably connected to the middle housing 521, and the second fixing bracket 523 is fixedly connected to the second housing 53 and is rotatably connected to the middle housing 521. The first fixed body 522*a* of the first fixing bracket 522 is fixedly connected to the first housing 51, the first arc-shaped arm 522*b* of the first fixing bracket 522 is mounted in the first arc-shaped groove 5212*a* of the middle housing 521, and the first fixing bracket 522 is rotatably connected to the middle housing 521 by using a virtual shaft. The second fixed body 523*a* of the second fixing bracket 523 is fixedly connected to the second housing 33, the second arc-shaped arm 523*b* of the second fixing bracket 523 is mounted in the second am-shaped groove 5212*b* of the middle housing 521, and the second fixing bracket 523 is rotatably connected to the middle housing 521 by using a virtual shaft.

In this embodiment, a main moving mechanism of the folding mechanism 52 of the housing apparatus 5 is a single-stage rotatable connection between the first fixing bracket 522 and the second fixing bracket 523 and the middle housing 521. Because of a small quantity of parts, a simple pant fitting relationship, a degree of freedom of 1, a short size (lain, and a small accumulated errs, the main moving mechanism of the folding mechanism 52 is high in control precision. Because the first housing 51 is fixedly connected to the first fixing bracket 522, the second housing 33 is fixedly connected to the second fixing bracket 523, and control precision of the main moving mechanism of the folding mechanism 52 is high, rotation precision is high when the first housing 51 and the second housing 32 rotate relative to the middle housing 521. This helps improve user experience of the electronic device 300 that applies the housing apparatus 5.

Figure 116:
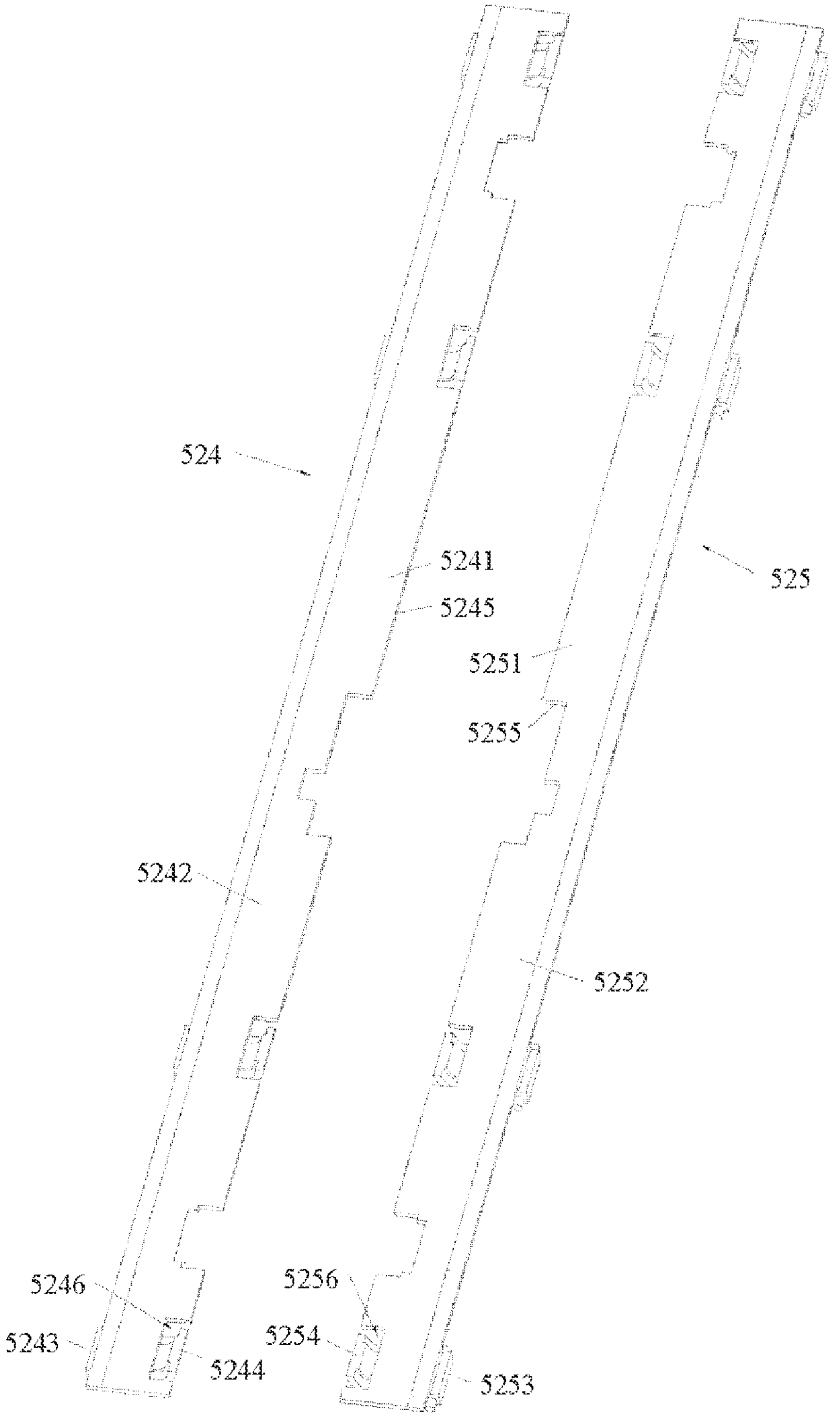
FIG. 116 is a schematic diagram of structures of a first support plate and a second support plate shown in FIG. 100.
Figure 117:
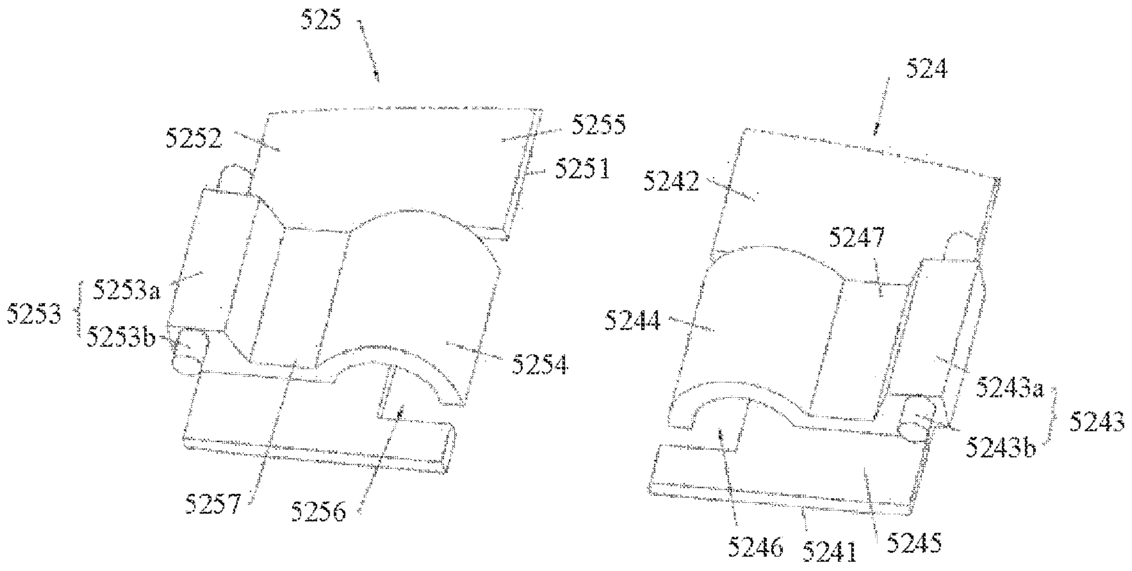
FIG. 117 is a schematic diagram of structures of the first support plate and the second support plate shown in FIG. 116 from another angle.

In some embodiments, FIG. 116 is a schematic diagram of structures of the first support plate 524 and the second support plate 525 shown in FIG. 100. FIG. 117 is a schematic diagram of structures of the first support plate 524 and the second support plate 525 shown in FIG. 116 from another angle. The first support plate 524 includes a first plate body 5242, a first movable part 5243, and a first rotation part 5244. A support surface 5241 of the first support plate 524 is formed on the first plate body 5242, and the first movable part 5243 and the first rotation part 5244 are fastened on the first plate body 5242. The first plate body 5242 is provided with a fixing surface 5245, and the fixing surface 5245 of the first plate body 5242 is disposed back to the support surface 5241 of the first support plate 524. In other words, the first plate body 5242 includes two plate surfaces that are disposed back to each other One plate surface forms the support surface 5241 of the first support plate 524, and the other plate surface forms the fixing surface 5245.

For example, as shown in FIG. 117, the first plate body 5242 is provided with a first avoidance notch 5246, and the first avoidance notch 5246 penetrates through the first plate body 5242. The first rotation part 5244 is an arc-shaped arm, one end of the first rotation part 5244 is fastened on the fixing surface 5245 of the first plate body 5242, and the other end of the first rotation part 5244 is located at the first avoidance notch 5246. In this case, the first avoidance notch 5246 is not only used to accommodate a part of the first rotation part 5244, but also used to avoid another structure. In some other embodiments, the other end of the first rotation part 5244 may not extend into the first avoidance notch 5246, but be located near the first avoidance notch 5246.

For example, as shown in FIG. 117, the first movable part 5243 is fastened on the fixing surface 5245 of the first plate body 5242. The first movable part 5243 may include a base 5243*a* and a hinge 5243*b*. The base 5243*a* is fastened on the fixing surface 5245, the tinge 5243*b* includes two parts, and the two parts of the hinge 5243*b* are respectively fastened on two sides of the base 5243*a*. The first support plate 524 may further include a first strengthening part 5247. The first strengthening part 5247 is fastened on the fixing surface 5245, and two ends of the first strengthening part 5247 are respectively connected to the base 5243*a* and the first rotation part 5244, so as to improve connection strength between the first movable part 5243 and the first rotation part 5244 and the first plate body 5242. In this way, structural strength orate first support plate 524 is high.

The first movable part 5243, the first rotation part 5244, and the first strengthening part 5247 of the first support plate 524 jointly form a connection structure. For example, as shown in FIG. 116, the first support plate 524 may include a plurality of connection structures that are spaced from each other. A quantity of first avoidance notches 5246 of the first plate body 5242 is the same as a quantity of a plurality of connection structures, and the first avoidance notches and the connection structures are disposed in a one-to-one correspondence. The first plate body 5242 of the first support plate 524 may further have a plurality of avoidance notches that are spaced from the first avoidance notch 5246, so as to avoid another structure.

In some embodiments, as shown in FIG. 116 and FIG. 117, the second support plate 525 includes a second plate body 5252, a second movable part 5253, and a second rotation part 5254. A support surface 5251 of the second support plate 525 is formed on the second plate body 5252, and the second movable part 5253 and the second rotation part 5254 are fastened on the second plate body 5252. The second plate body 5252 is provided with a fixing surface 5255, and the fixing surface 5255 of the second plate body 5252 is disposed back to the support surface 5251 of the second support plate 525. In other words, the second plate body 5252 includes two plate surfaces that are disposed back to each other. One plate surface forms the support surface 5251 of the second support plate 525, and the other plate surface forms the fixing surface 5255.

For example, as shown in FIG. 117, the second plate body 5252 is provided with a second avoidance notch 5256, and the second avoidance notch 5256 penetrates through the second plate body 5252. The second rotation part 5254 is an arc-shaped arm, one end of the second rotation part 5254 is fastened on the fixing surface 5255 of the second plate body 5252, and the other end of the second rotation part is located at the second avoidance notch 5256. In this case, the second avoidance notch 5256 is not only used to accommodate a part of the second rotation part 5254, but also used to avoid another structure. In some other embodiments, the other end of the second rotation part 5254 may not extend into the second avoidance notch 5256, but be located near the second avoidance notch 5256.

For example, as shown in FIG. 117, the second movable part 5253 is fastened on the fixing surface 5255 of the second plate body 5252. The second movable part 5253 may include a base 5253*a* and a hinge 5253*b*. The base 5253*a* is fastened on the fixing surface 5255, the hinge 5253*b* includes two parts, and the two parts of the hinge 5253*b* are respectively fastened on two sides of the base 5253*a*. The second support plate 525 may further include a second strengthening part 5257, the second strengthening part 5257 is fastened on the fixing surface 5255, and two ends of the second strengthening part 5257 are respectively connected to the base 5253*a* and the second rotation part 5254, so as to improve connection strength between the second movable part 5253 and the second rotation part 5254 and the second plate body 5252. In this way, structural strength of the second support plate 525 is high.

The second movable part 5253, the second rotation part 5254, and the second strengthening part 5257 of the second support plate 525 jointly form a connection structure. For example, as shown in FIG. 116, the second support plate 525 may include a plurality of connection structures that are spaced from each other. A quantity of second avoidance notches 5256 of the second plate body 5252 is the same as a quantity of a plurality of connection structures, and the second avoidance notches and the connection structures are disposed in a one-to-one correspondence. The second plate body 5252 of the second support plate 525 may further have a plurality of avoidance notches that are spaced from the second avoidance notch 5256, so as to avoid another structure.

Figure 118:
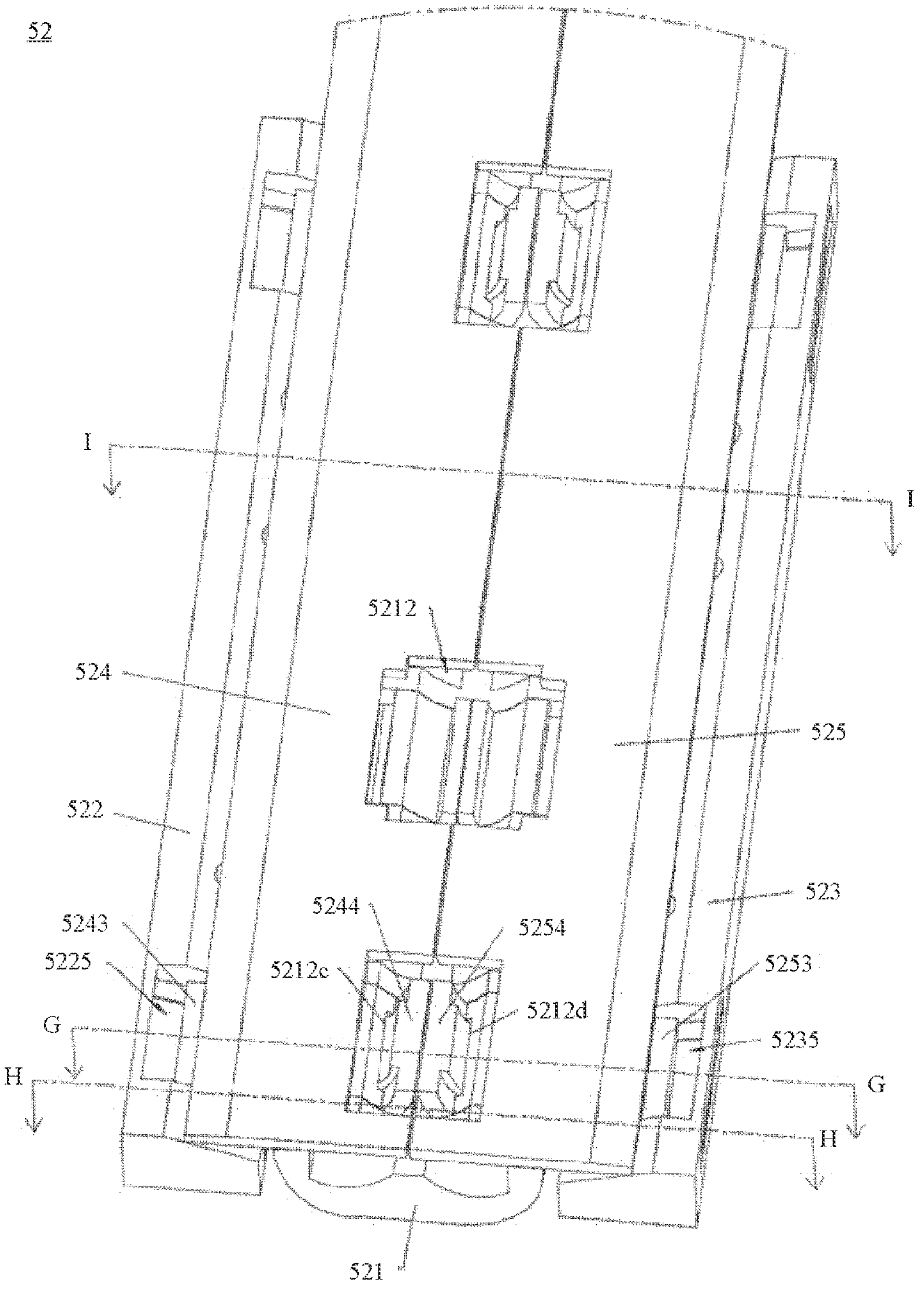
FIG. 118 is a schematic diagram of a partial structure of a folding mechanism shown in FIG. 96.

In some embodiments, refer to FIG. 111, FIG. 117, and FIG. 118. FIG. 118 is a schematic diagram of a partial structure of the folding mechanism 52 shown in FIG. 96. FIG. 118 shows a part of the middle housing 521, the first fixing bracket 522, the second fixing bracket 523, the first support plate 524, and the second support plate 525 of the folding mechanism 52. A structure shown in FIG. 10 is in an open state.

The first rotation part 5244 of the first support plate 524 is mounted in the third arc-shaped groove 5212*c* of the middle housing 521, and the first rotation part 5244 in an arc-shaped arm can move in the third arc-shaped groove 5212*c*, so as to form a rotatable connection relationship using a virtual shaft between the arc-shaped arm and the arc-shaped groove. In this way, the first rotation part 5244 of the first support plate 524 is rotatably connected to the middle housing 521. The first movable part 5243 of the first support plate 524 is mounted in the first sliding slot 5225 of the first fixing bracket 522, and the first movable part 5243 of the first support plate 524 is slidably and rotatably connected to the first fixing bracket 522.

The second rotation part 5254 of the second support plate 525 is mounted in the fourth arc-shaped groove 5212*d* of the middle housing 521, and the second rotation part 5254 in an arc-shaped arm can move in the fourth arc-shaped groove 5212*d*, so as to form a rotatable connection relationship using a virtual shaft between the arc-shaped arm and the arc-shaped groove. In this way, the second rotation part 5254 of the second support plate 525 is rotatably connected to the middle housing 521. The second movable part 5253 of the second support plate 525 is mounted in the second sliding slot 5235 of the second fixing bracket 523, and the second movable part 5253 of the second support plate 525 is slidably and rotatably connected to the second fixing bracket 523.

Figure 119:
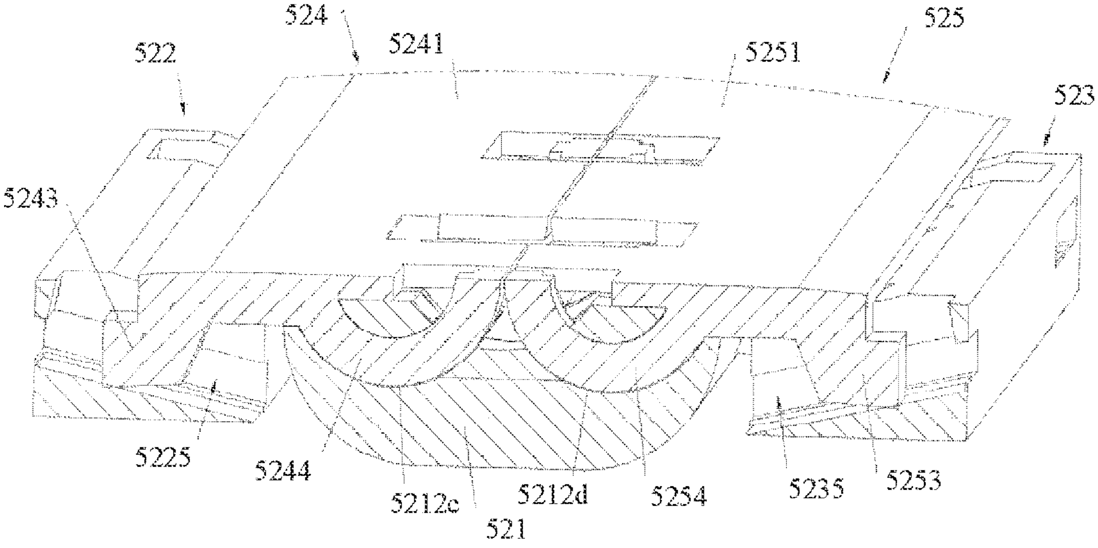
FIG. 119 is a schematic diagram of the structure shown in FIG. 118 when cut along G-G.
Figure 120:
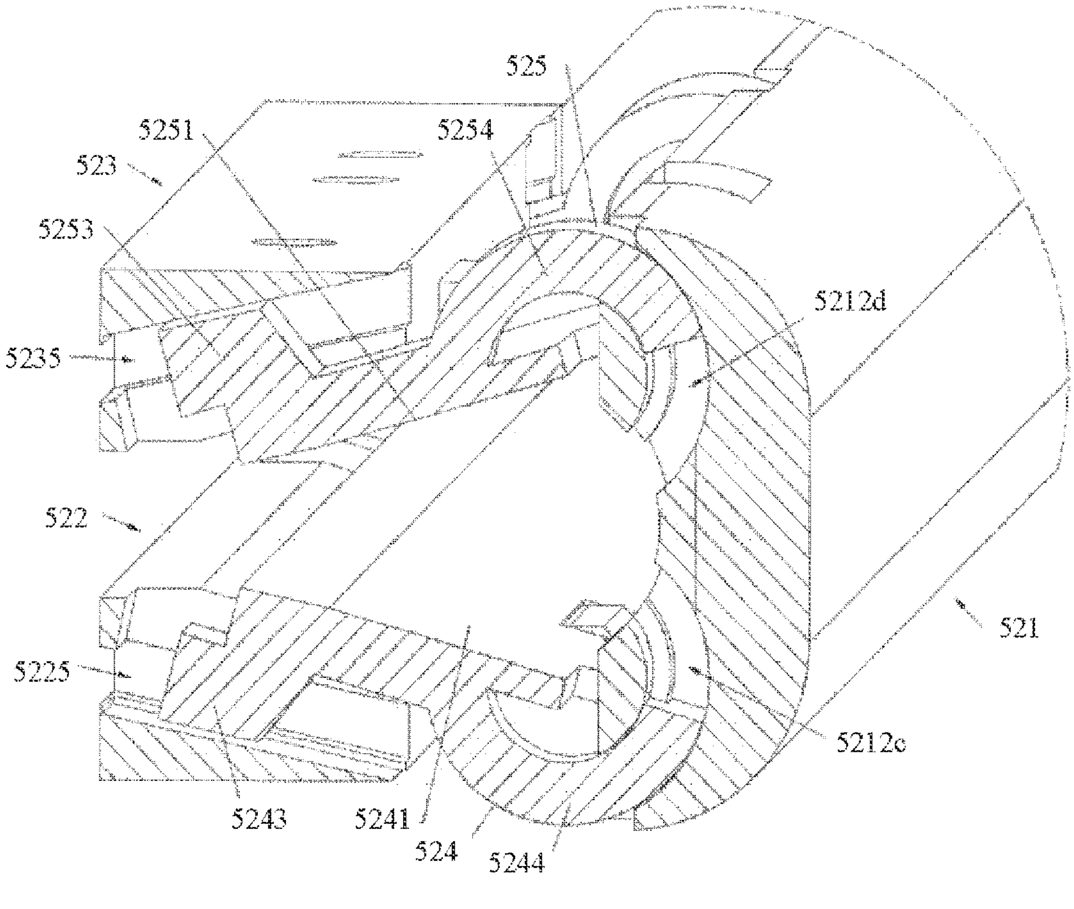

Specifically, FIG. 119 is a schematic diagram of the structure shown in FIG. 118 when cut along G-G. FIG. 120 is a schematic diagram of the structure shown in FIG. 119 in another use state. FIG. 119 corresponds to an open state, and FIG. 120 corresponds to a closed state. The first rotation part 5244 of the first support plate 524 is mounted in the third arc-shaped groove 5212*c*, and is rotatably connected to the middle housing 521. The first movable part 5243 is mounted in the first sliding slot 5225, and is slidably and rotatably connected to the first fixing bracket 522. The second rotation part 5254 of the second support plate 525 is mounted in the fourth arc-shaped groove 5212*d*, and is rotatably connected to the middle housing 521. The second movable part 5253 is mounted in the second sliding slot 5235, and is slidably and rotatably connected to the second fixing bracket 523.

As shown in FIG. 119, in the open state, the first fixing bracket 522 and the second fixing bracket 523 are in open positions relative to the middle housing 521, and the first fixing bracket 522 and the second fixing bracket 523 are away from each other. The first fixing bracket 522 drives the first movable part 5243 to move to the open position, and the first rotation part 5244 in the arc-shaped arm structure may totally rotate into the third arc-shaped groove 5212*c*. The second fixing bracket 523 drives the second movable part 5253 to move to the open position, and the second rotation part 5254 in the arc-shaped arm structure may totally rotate into the fourth arc-shaped groove 5212*d*. In this case, the first support plate 524 and the second support plate 525 are unfolded relative to each other and are in open positions, and the support surface 5241 of the first support plate 524 is flush with the support surface 5251 of the second support plate 525.

As shown in FIG. 120, in a closed state, the first fixing bracket 522 and the second fixing bracket 523 are in closed positions relative to the middle housing 521, and the first fixing bracket 522 and the second fixing bracket 523 are close to each other. The first fixing bracket 522 drives the first movable part 5243 to move to the closed position, and the first rotation part 5244 in the arc-shaped arm stricture may partially rotate out from the third shaped groove 5212*c*. The second fixing bracket 523 drives the second movable part 5253 to move to the closed position, and the second rotation part 5254 in the arc-shaped arm structure may partially rotate out from the fourth arc-shaped groove 5212*d*. In this case, the first support plate 524 and the second support plate 525 are folded relative to each other and are in closed positions. The support surface 5241 of the first support plate 524 and the support surface 5251 of the second support plate 525 are disposed opposite to each other, and are away from each other in a direction close to the middle housing 521.

Refer to FIG. 119 and FIG. 120. In a process of switching from the open state to the closed state, the first fixing bracket 522 drives the first movable part 5243 to move relative to the middle housing 521, the second fixing bracket 523 drives the second movable part 5253 to move relative to the middle housing 521, the first movable part 5243 and the second movable part 5253 are close to each other, and the first rotation part 5244 and the second rotation part 5254 are away from each other, so that the first support plate 524 and the second support plate 525 are approximately arranged in a V shape, and the support surface 5241 of the first support plate 524 and the support surface 5251 of the second support plate 525 are disposed opposite to each other, and are away from each other in a direction close to the middle housing 521. In this case, a large display accommodating space is formed between the support surface 5241 of the first support plate 524 and the support surface 5251 of the second support plate 525.

In addition, the first rotation part 5244 is rotatably connected to the middle housing 521 by using a virtual shaft, and the second rotation part 5254 is rotatably connected to the middle housing 521 by using a virtual shaft, which helps reduce design difficulty of a rotatable connection structure.

In addition, when the first fixing bracket 522 drives the first movable part 5243 to move relative to the middle housing 521, the first movable pint 5243 slides and rotates relative to the first fixing bracket 522. When the second fixing bracket 523 drives the second movable part 5253 to move relative to the middle housing 521, the second movable part 5253 slides and rotates relative to the second fixing bracket 523.

Figure 121:
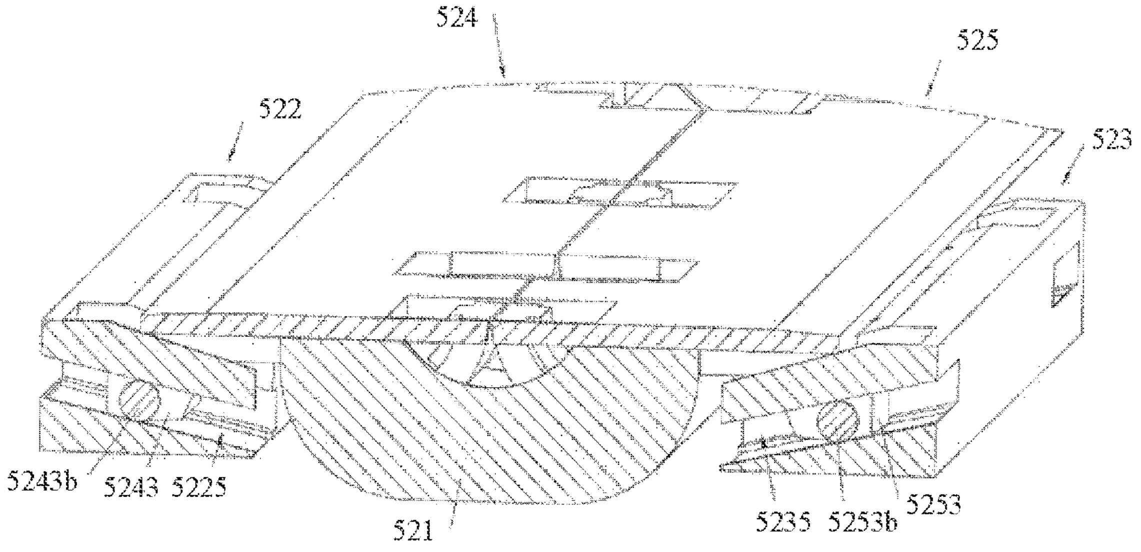

For example, FIG. 121 is a schematic diagram of the structure shown in FIG. 118 when cut along H-H. The hinge 5243*b* of the first movable part 5243 is mounted in the first sliding slot 5225 of the first fixing bracket 522. When the first fixing bracket 522 drives the first movable part 5243 to move relative to the middle housing 521, the hinge 5243*b* slides and rotates in the first sliding slot 5225, so that the first movable part 5243 slides and rotates relative to the first fixing bracket 522. In other words, the first movable part 5243 is slidably and rotatably connected to the first fixing bracket 522. The hinge 5253*b* of the second movable part 5253 is mounted in the second sliding slot 5235 of the second fixing bracket 523. When the second fixing bracket 523 drives the second movable part 5253 to move relative to the middle housing 521, the hinge 5253*b* slides and rotates in the second sliding slot 5235, so that the second movable part 5253 slides and rotates relative to the second fixing bracket 523. In other words, the second movable part 5253 is slidably and rotatably connected to the second fixing bracket 523.

For example, as shown in FIG. 120, when the folding mechanism 52 is in a closed state, in a direction close to the middle housing 521, an extension direction of the first sliding slot 5225 and an extension direction of the second sliding slot 5235 are away from each other. In this case, a relative position relationship between the first sliding slot 5225 and the second sliding slot 5235 helps reduce design difficulty of the folding mechanism 52, and improve implementability.

Figure 122:
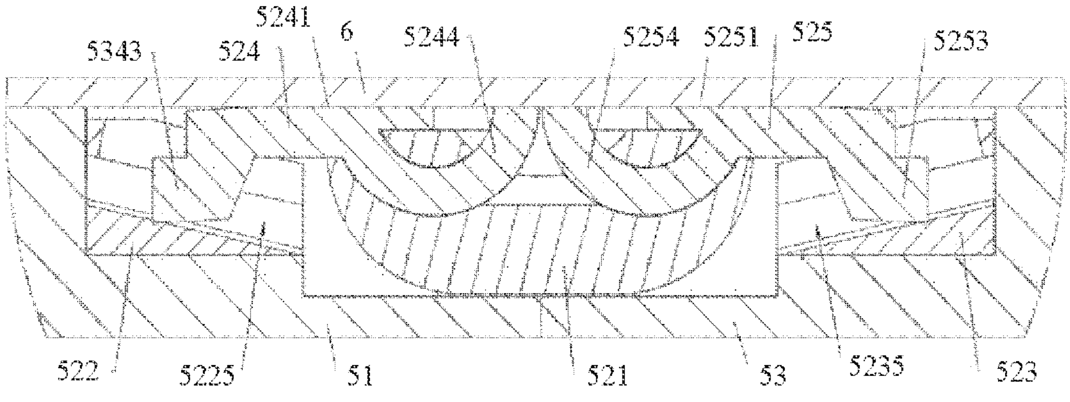
Figure 123:
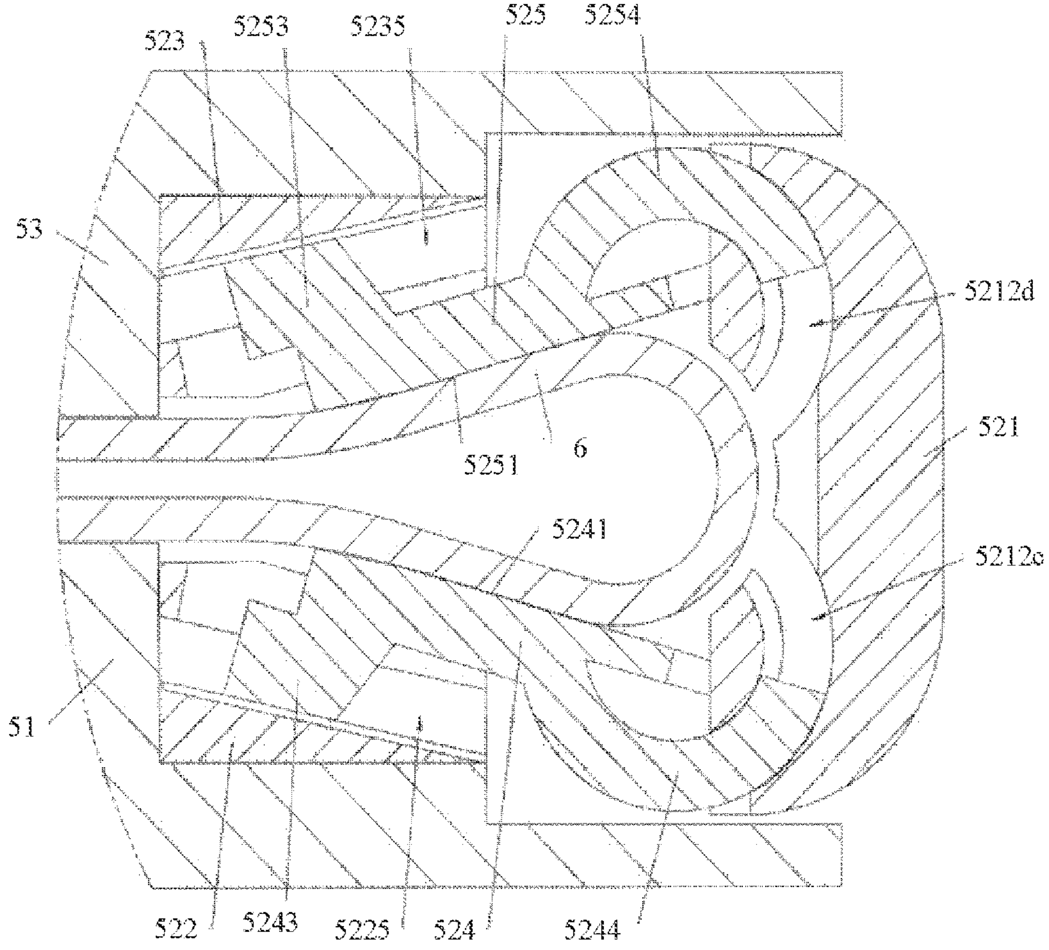

FIG. 122 is a schematic diagram of a structure of a cross section of the electronic device 300 shown in FIG. 93 when cut along J-J. FIG. 123 is a schematic diagram of a structure of a cross section of the electronic device 300 shown in FIG. 94 when cut along K-K.

The first support plate 524 is slidably and rotatably connected to the first fixing bracket 522, and is rotatably connected to the middle housing 521, and the second support plate 525 is slidably and rotatably connected to the second fixing bracket 523, and is rotatably connected to the middle housing 521. The first movable part 5243 of the first support plate 524 is mounted in the first sliding slot 5225 of the first fixing bracket 522, and the first rotation part 5244 is mounted in the third arc-shaped groove 5212*c* of the middle housing 521. The second movable part 5253 of the second support plate 525 is mounted in the second sliding slot 5235 of the second fixing bracket 523, and the second rotation part 5254 is mounted in the fourth arc-shaped groove 5212*d* of the middle homing 521.

In this embodiment, two ends of the first support plate 524 are respectively connected to the first fixing bracket 522 and the middle housing 521, and two ends of the second support plate 525 are respectively connected to the second fixing bracket 523 and the middle housing 521. Therefore, a moving track of the first support plate 524 is restricted by relative positions of the first fixing bracket 522 and the middle housing 521, and a moving track of the second support plate 525 is restricted by relative positions of the second fixing bracket 523 and the middle housing 521. In addition, because control precision of relative movement between the first fixing bracket 522 and the second fixing bracket 523 and the middle housing 521 is high, in a process in which the first housing 51 and the second housing 53 are folded relative to each ether; moving tracks of the first support plate 524 and the second support plate 525 are accurate, and the mechanism reliability is high.

As shown in FIG. 122 and FIG. 117, the first housing 51, the first support plate 524, the second support plate 525, and the second housing 53 jointly carry the flexible display 6. As shown in FIG. 122, when the first housing 51 and the second housing 53 are unfolded relative to each other to an open state, the support surface 5241 of the first support plate 524 is flush with the support surface 5251 of the second support plate 525. The flexible display 6 is in an unfolded state. As shown in FIG. 123, when the first housing 51 and the second housing 53 are folded relative to each other to a closed state, the support surface 5241 of the first support plate 524 and the support surface 5251 of the second support plate 525 are disposed opposite to each other, and are away from each other in a direction close to the middle housing 521. The flexible display 6 is in a folded state, and a bending portion of the flexible display 6 is in a water drop shape.

In this embodiment, the electronic device 300 uses the housing apparatus 5 to implement screen inward folding, and the electronic device 300 may be bent. A main moving mechanism of the folding mechanism 52 of the housing apparatus 5 is high in control precision, and has a few constituent parts with a simple fitting relationship and simple fitting locations. The constituent components are easy to manufacture and assemble, thereby facilitating mass production. The first support plate 524 and the second support plate 525 have accurate moving tracks in a process of unfolding or folding the housing apparatus 5, and can automatically avoid in a closed state, to form display accommodating space. In addition, the display accommodating space is accurately controlled, so that a folding action performed by the housing apparatus 5 on the flexible display 6 is stable and a squeezing force is small. This helps reduce a risk of damage to the flexible display 6 due to excessive squeezing of the folding mechanism 52, and makes the flexible display 6 more reliable.

In addition, when the first housing 51 and the second housing 53 are folded relative to each other to a closed state by using the folding mechanism 52, the first housing 51 and the second housing 53 can be totally closed, and there is no gap or a small gap between the first housing 51 and the second housing 53. In this way, the housing apparatus 5 implements self-shielding because of a complete appearance. The electronic device 300 to which the housing apparatus 5 is applied has a complete appearance which hops improve waterproof and dust-proof performance of the electronic device 300.

Figure 124:
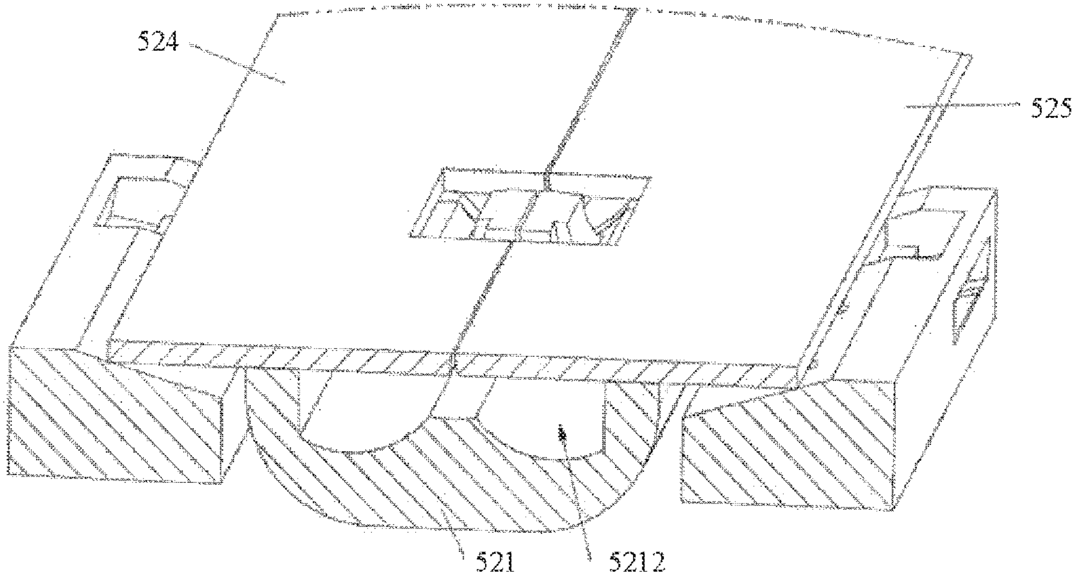
Figure 125:
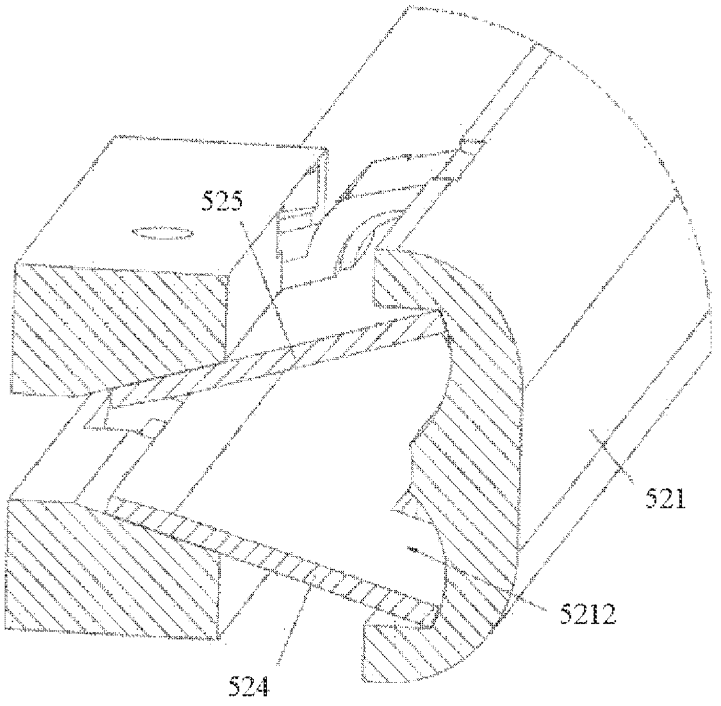

In some embodiments. FIG. 124 is a schematic diagram of the structure Lure shown in FIG. 118 when cut along I-I FIG. 125 is a schematic diagram of a structure of the structure shown in FIG. 124 in a closed state. As shown in FIG. 124, in an open state, the first support plate 524 blocks a part of the inner space 5212 of the middle housing 521, and the second support plate 525 blocks a part of the inner space 5212 of the middle housing 521. In this case, the first support plate 524 and the second support plate 525 arm close to each other, and a distance between the support surface 5241 of the first support plate 524 and the support surface 5251 of the second support plate 525 is small. The folding mechanism 52 may provide relatively complete planar support for the bending portion 62 (refer to FIG. 95) of the flexible display 6 in the open state by using a two-plate structure.

For example, in the open state, the first support plate 524 is spliced with the second support plate 525. In this case, the support surface 5241 of the first support plate 524 and the support surface 5251 of the second support plate 525 may be spliced to form a bending region support surface. The folding mechanism 52 of the housing apparatus can fully support the bending portion 62 of the flexible display 6 in the open state by using the bending region support surface (refer to FIG. 95), so that the flexible display 6 is not easily dented under praising of the user, thereby improving a service life and reliability of the flexible display 6.

A case in which the first support plate 524 is spliced with the second support plate 525 may include but is not limited to the following scenario: One part of the first support plate 524 and one part of the second support plate 525 are connected to each other, without a gap between the two, and a notch or a gap may be formed between the other part of the first support plate 524 and the other part of the second support plate 525; or the first support plate 524 and the second support plate 525 are connected to each other, without a gap between the two; or one part of the first support plate 524 and one part of the second support plate 525 are close to each other, with a small gap between the parts close to each other, and a notch or a gap may be formed between the other part of the first support plate 524 and the other part of the second support plate 525; or the first support plate 524 and the second support plate 525 are close to each other, with a small gap between the two. When there is a small gap between the first support plate 524 and the second support plate 525, or there is a small gap between a part of the first support plate 524 and a part of the second support plate 525, a user presses a region that is of the flexible display 6 and that corresponds to the gap, without forming an obvious dent in the corresponding region of the flexible display 6. The bending region support surface can provide strong support for the flexible display 6.

When there is a notch or a gap between the first support plate 524 and the second support plate 525, or there is a notch or a gap between a part of the first support plate 524 and a part of the second support plate 525, an area of the notch ox the gap may be reduced as much as possible by optimizing a size and a shape of a component of the folding mechanism 52, so that a region that is of the flexible display 6 and that corresponds to the notch or the gap may be slightly indented under pressing of the user, instead of forming an obvious dent. In addition, in some embodiments, a support plate or a stiffening plate that can be bent and has specific structural strength may be disposed on a side that is of the flexible display 6 and that faces the housing apparatus 3, and the support plate or the stiffening plate covers at least the notch or the gap between the first support plate 524 and the second support plate 525, to improve anti-pressing strength of the flexible display 6.

The notch on the first support plate 524 and the second support plate 525 may include an avoidance notch, which is used to avoid interference between the first support plate 524 and the second support plate 525 and the middle housing 521 or another structure dining relative rotation, that is, to implement avoidance, thereby improving reliability of movement between the folding mechanism 52 and the housing apparatus 5. In this embodiment, when the first housing 51 and the second housing 53 are in the open state, the avoidance notch of the first support plate 524 and the avoidance notch of the second support plate 525 are combined, and the bending region support surface is a special-shaped surface.

The folding mechanism 52 may further include a bendable steel sheet. The bendable steel sheet may be located above the first support plate 524 and the second support plate 525, and cover the notch or the gap between the first support plate 524 and the second support plate 525, so as to provide a more flat and complete support environment for the flexible display 6, thereby improving user experience of pressing and using.

As shown in FIG. 125, in a closed state, the first support plate 524 partially extends into the inner space 5212 of the middle housing 521, and the second support plate 525 partially extends into the inner space 5212 of the middle housing 521. In this case, the first support plate 524 and the second support plate 525 form display accommodating space through automatic avoidance. The display accommodating space gradually increases in a direction close to the middle housing 521.

In this embodiment, a part of the space between the first support plate 524 and the second support plate 525 in the inner space 5212 of the middle housing 521 is released, to form a part of display accommodating space, and the flexible display 6 (refer to FIG. 99) may partially extend into the inner space 5212 of the middle housing 521, thereby improving space utilization. In this way, components of the electronic device 300 are arranged more compactly, thereby facilitating miniaturization of the electronic device 300.

Figure 126:
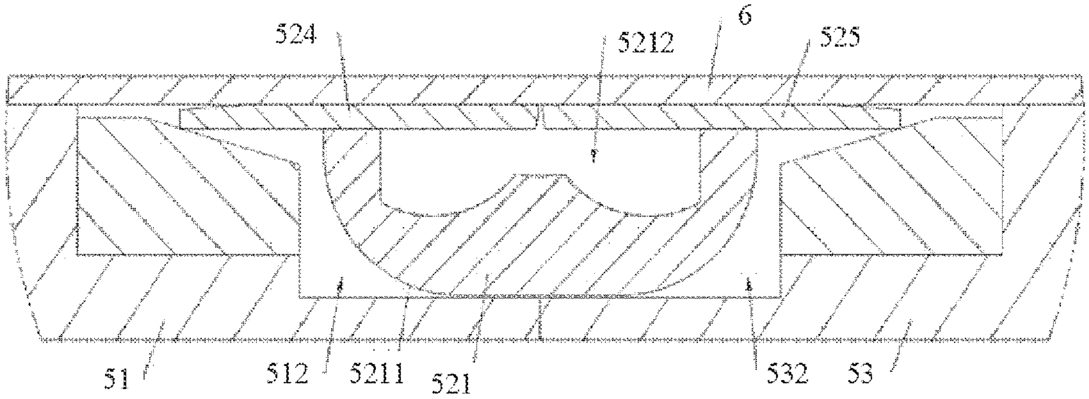
Figure 127:
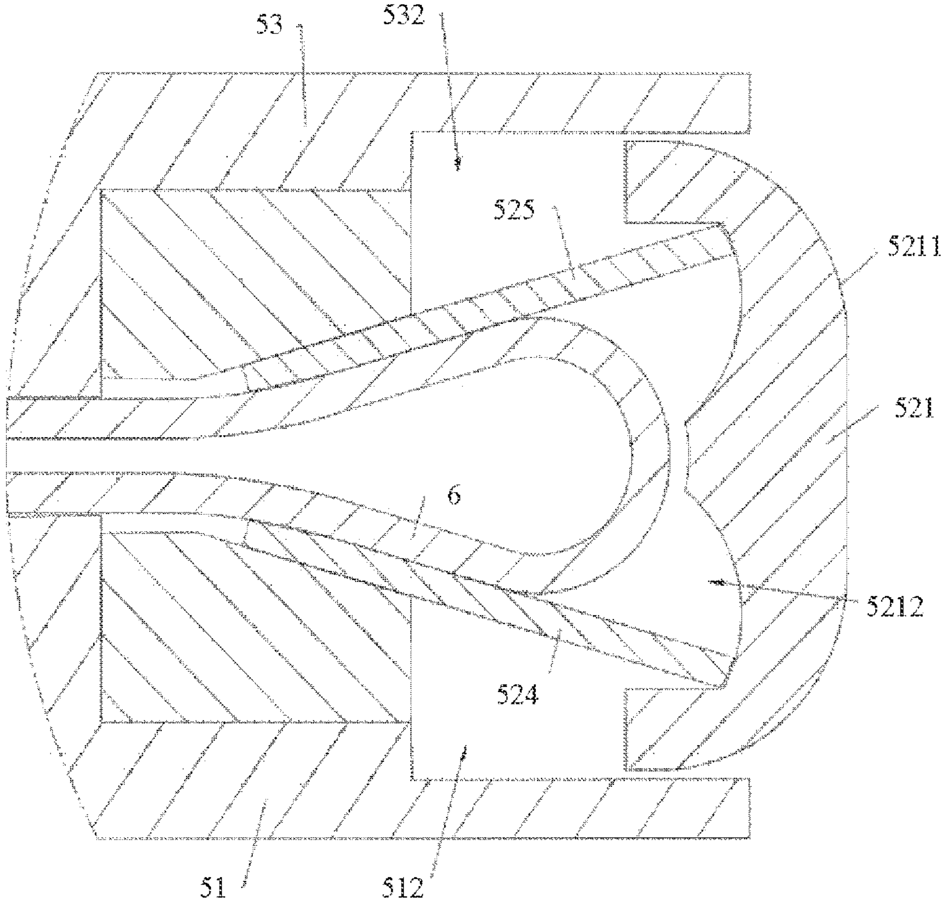

FIG. 126 is a schematic diagram of a structure of a cross section of the electronic device 300 shown in FIG. 93 when cut along N-N. FIG. 127 is a schematic diagram of a stricture of a cross section of the electronic device 300 shown in FIG. 94 when cut along O-O.

As shown in FIG. 126, when the first housing 51 and the second housing 53 are in an open state, one part of the middle housing 521 is located in the first fastening groove 512, and the other part of the middle housing 521 is located in the second fastening groove 532. The first housing 51 and the second housing 53 cover the appearance surface 5211 of the middle housing 521. As shown in FIG. 127, when the first housing 51 and the second housing 53 are in a closed state, the middle housing 521 partially extends out from the first fastening groove 512 and the second fastening groove 532, and the appearance surface 5211 of the middle housing 521 is exposed relative to the first housing 51 and the second housing 53.

In this embodiment, in a process of switching between the open state and the closed state of the housing apparatus 5, the middle housing 521 is gradually exposed or hidden relative to the first housing 51 and the second housing 53, and the three cooperate with each other to implement bade-side self-shielding of the housing apparatus 5 and the electronic device 300. This improves appearance integrity and waterproof and dust-proof performance.

As shown in FIG. 126, when the first housing 51 and the second housing 53 are in an open state, the first support plate 524 covers a part of the inner space 5212 of the middle housing 521, and the second support plate 525 covers a part of the inner space 5212. In this case, the first support plate 524 and the second support plate 525 are close to each other, and a distance between the support surface 5241 of the first support plate 524 and the support surface 5251 of the second support plate 525 is small. The folding mechanism 52 may provide relatively complete planar support for the bending portion 62 of the flexible display 6 in the open state by using a two-plate structure. For example, when the housing apparatus 5 is in an open state, the first support plate 524 and the second support plate 525 are spliced, to better provide strong support for the flexible display 6.

As shown in FIG. 127, when the first housing 51 and the second housing 53 arm in a closed state, the first support plate 524 partially extends into the inner space 5212 of the middle housing 521, and the second support plate 525 partially extends into the inner space 5212. In this case, a part of the space between the first support plate 524 and the second support plate 525 in the inner space 5212 of the middle housing 521 is released, to form display accommodating space, and the flexible display 6 may partially extend into the inner space 5212 of the middle housing 521, thereby improving space utilization. In this way, components of the electronic device 300 are arranged more compactly, thereby facilitating miniaturization of the electronic device 300.

In conclusion, in this embodiment of this application, as shown in FIG. 112 and FIG. 113, because the first fixing bracket 522 is rotatably connected to the middle housing 521, and the second fixing bracket 523 is rotatably connected ted to the middle housing 521, in a process in which the first housing 51 and the second housing 53 are unfolded or folded relative to each other, a relative moving track of the first fixing bracket 522 and the middle housing 521 is determined, and a relative moving track of the second fixing bracket 523 and the middle housing 521 is determined. As shown in FIG. 119 and FIG. 120, because the first support plate 524 is slidably and rotatably connected to the first fixing bracket 522, and is rotatably connected to the middle housing 521, a moving track of the first support plate 524 is restricted by the first fixing bracket 522 and the middle housing 521. Because the second support plate 525 is slidably and rotatably connected to the second fixing bracket 523, and is rotatably connected to the middle housing 521, a moving track of the second support plate 525 is restricted by the second fixing bracket 523 and the middle housing 521. When the moving tracks of the first fixing bracket 522 and the second fixing bracket 523 relative to the middle housing 521 are determined, the moving tracks of the first support plate 524 and the second support plate 525 are accurate. In this case, the first support plate 524 and the second support plate 525 can automatically avoid in a closed state, to form display accommodating space, and the display accommodating space is accurately controlled, so that a folding action performed by the housing apparatus 5 on the flexible display 6 is stable, and a squeezing force is small. This helps reduce a risk that the flexible display 6 is damaged due to excessive squeezing of the folding mechanism 52, and makes the flexible display 6 more reliable.

In this embodiment of this application, there may be one or more rotatable connection structures between the first rotation part 5244 of the first support plate 524 and the middle housing 521, and there may be one or more slidable and rotatable connection structure; between the first movable part 5243 and the first fixing bracket 522. There may be one or more rotatable connection structures between the second rotation part 5254 of the second support plate 525 and the middle housing 521, and there may be one or more slidable and rotatable connection structures between the second movable part 5253 and the second fixing bracket 523.

It may be understood that the first rotation part 5244 and the middle housing 521 may be rotatably connected by using a physical shaft, and the first movable part 5243 and the first fixing bracket 522 may be slidably and rotatably connected by using a rotatable connecting member. The second rotation part 5254 and the middle housing 521 may be rotatably connected by using a physical shall, and the second movable part 5253 and the second fixing bracket 523 may be slidably and rotatably connected by using a rotatable connecting member. A specific implementation structure of the foregoing connection relationship is not strictly limited in this embodiment of this application.

Figure 128:
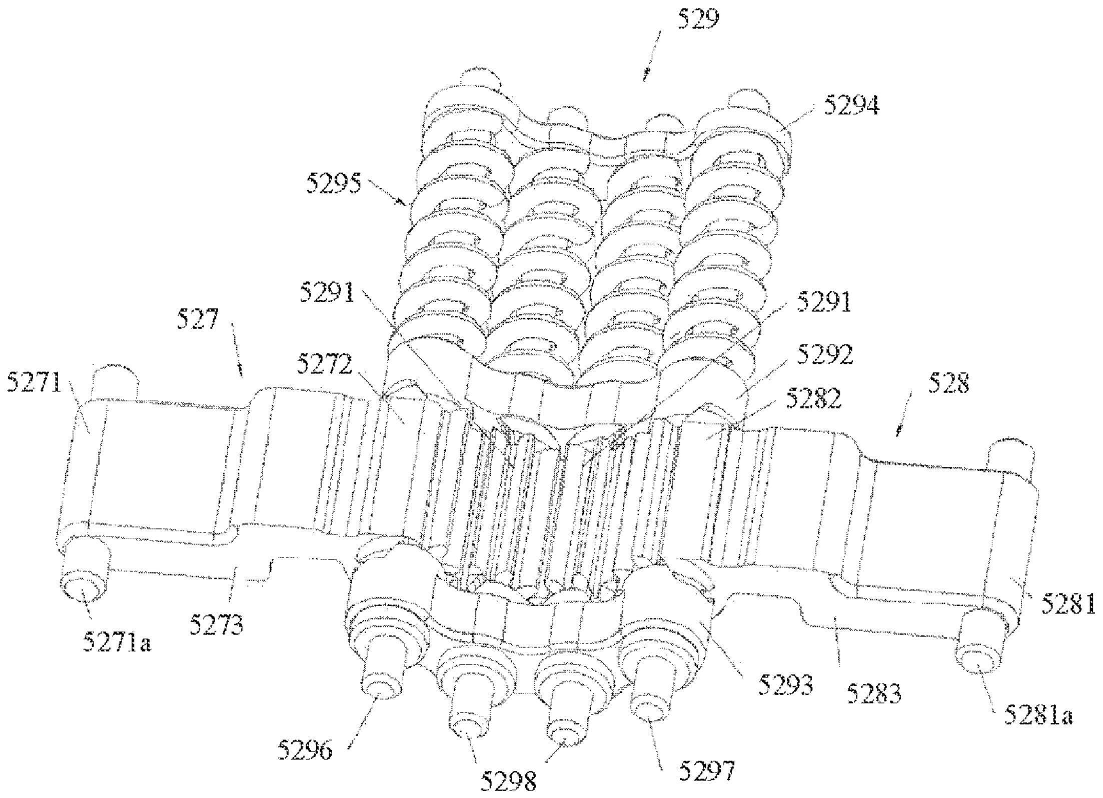
Figure 129:
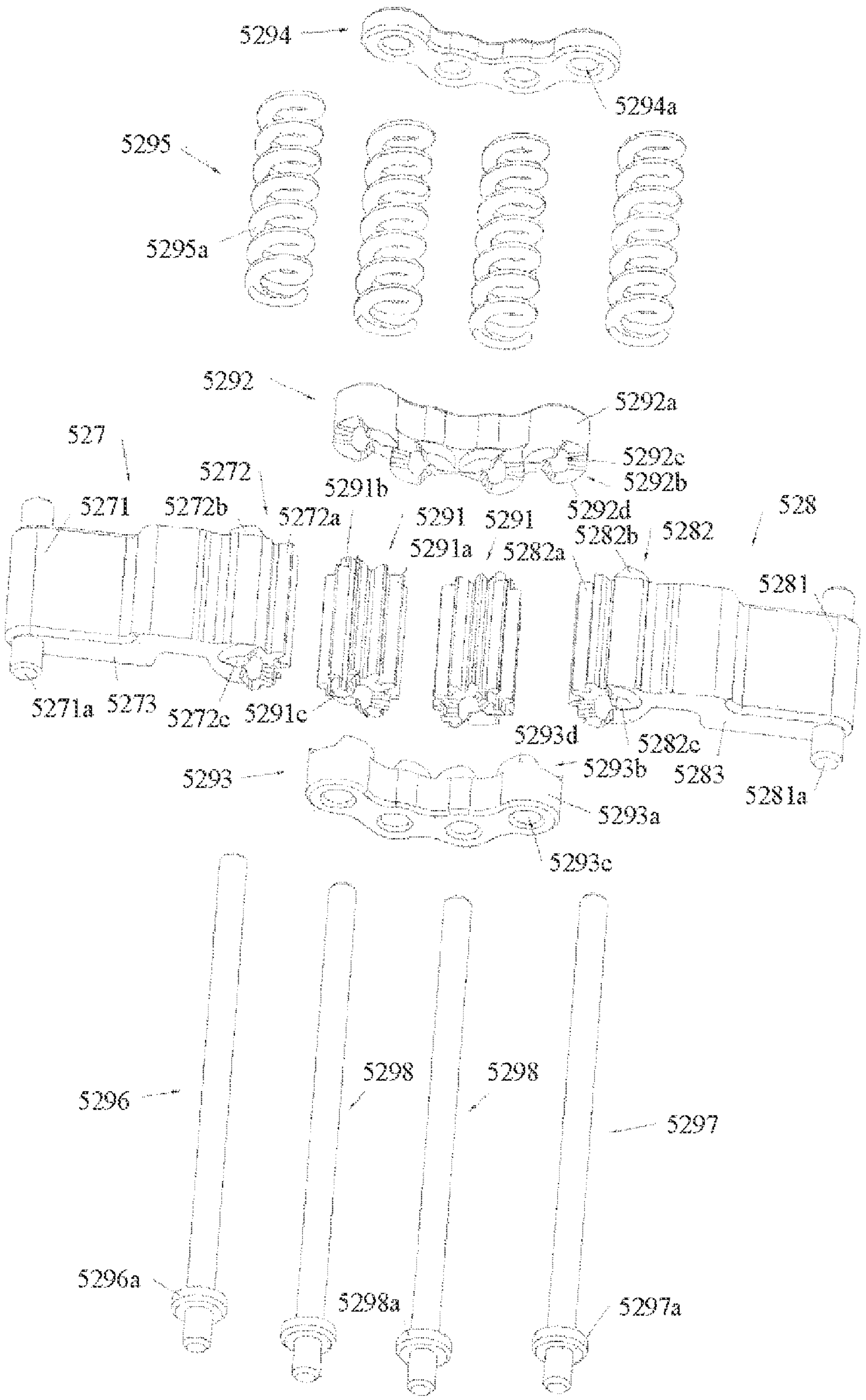
Figure 130:
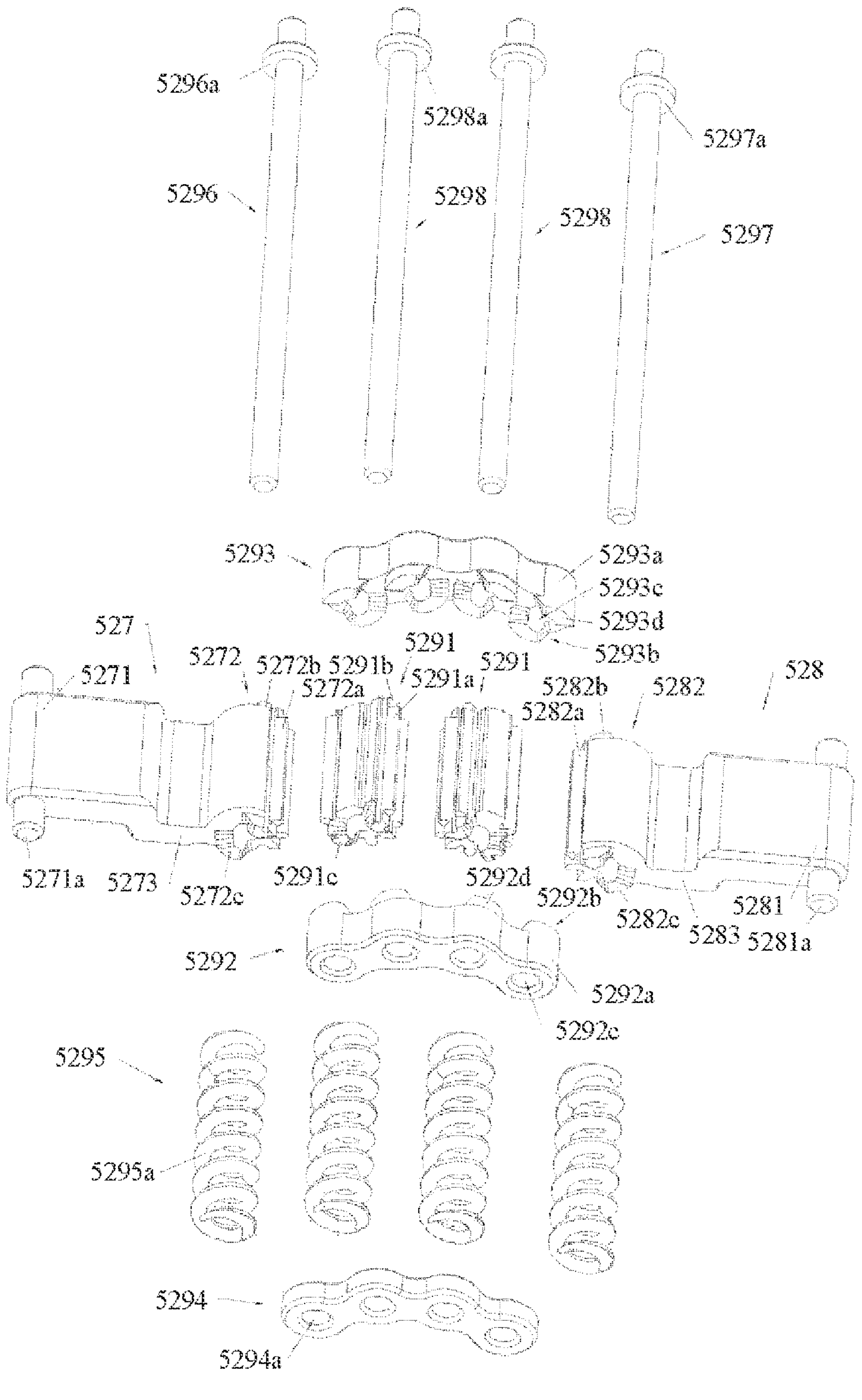

In some embodiments, FIG. 128 is a schematic diagram of structures of the first swing arm 527, the second swing arm 528, and the synchronization assembly 529 shown in FIG. 100. FIG. 129 is a schematic exploded view of the structure shown in FIG. 128. FIG. 130 is a schematic diagram of the structure shown in FIG. 129 from another angle. A field of view shown in FIG. 130 is vertically reversed relative to a field of view shown in FIG. 129.

The first swing arm 527 includes a movable end 5271 and a rotation end 5272. The first swing arm 527 may further hide a connection segment 5273 that connects the movable end 5271 and the rotation end 5272. The first swing arm 527 may be an integrally formed mechanical part, so as to have high structural strength. For example, the movable end 5271 of the first swing arm 527 includes a hinge 5271*a*. The rotation end 5272 of the first swing arm 527 includes a gear part 5272*a*, a plurality of first protrusions 5272*b*, and a plurality of second protrusions 5272*c*. The gear part 5272*a* may be provided with a lunge hole. The plurality of lint protrusions 5272*b* and the plurality of second protrusions 5272*c* are disposed back to each other at two ends of the gear part 5272*a*, and the plurality of first protrusions 5272*b* are arranged in a ring shape and are spaced front each other. The plurality of first protrusions 5272*b* are disposed around the hinge hole of the gear part 5272*a*, the plurality of second protrusions 5272*c* an: arranged in a ring shape and are spaced from each other, and the plurality of second protrusions 5272*c* are disposed around the hinge hole of the gear part 5272*a*.

The second swing arm 528 includes a movable end 5281 and a rotation end 5282. The second swing arm 528 may further include a connection segment 5283 that connects the movable end 5281 and the rotation end 5282. The second swing arm 528 may be an integrally formed mechanical part, so as to have high structural strength. For example, the movable end 5281 of the second swing arm 528 includes a hinge 5281*a*. The rotation end 5282 of the second swing arm 528 includes a gear part 5282*a*, a plurality of first protrusions 5282*b*, and a plurality of second protrusions 5282*c*. The gear part 5282*a* may be provided with a hinge hole. The plurality of first protrusions 5282*b* and the plurality of second protrusions 5282*c* are disposed back to each other at two ends of the gear part 5282*a*, and the plurality of first protrusions 5282*b* are arranged in a ring shape and are spaced from each other. The plurality of first protrusions 5282*b* are disposed around the hinge hole of the gear part 5282*a*, the plurality of second protrusions 5282*c* are arranged in a ring shape and are spaced from each other, and the plurality of second protrusions 5282*c* are disposed around the hinge hole of the gear part 5282*a*.

In some embodiments, as shown in FIG. 128 to FIG. 130, the synchronization assembly 529 includes a plurality of synchronous gears 5291, the plurality of synchronous gears 5291 are engaged with each other, and the rotation end 5272 of the first swing arm 527 is engaged with the rotation end 5282 of the second swing arm 528 by using the plurality of synchronous gears 5291. For example, the plurality of synchronous gears 5291 may be arranged into a string, two adjacent synchronous gears 5291 are engaged with each other, and the two synchronous gears 5291 located at the end parts are respectively engaged with the rotation end 5272 of the first swing arm 527 and the rotation end 5282 of the second swing arm 528.

In this embodiment, the rotation end 5272 of the first swing arm 527 is connected to the rotation end 5282 of the second swing arm 528 by using the plurality of synchronous gears 5291, so that a rotation angle of the rotation end 5272 of the first swing arm 527 and a rotation angle of the rotation end 5282 of the second swing arm 528 are the same in size and opposite in direction. In this are, rotation actions of the first swing arm 527 and the second swing arm 528 relative to the middle housing 521 are synchronous, that is, the first swing arm 527 and the second swing arm 528 are synchronously close to each other or away from each other.

For example, the synchronous gear 5291 includes a gear part 5291*a*, a plurality of first protrusions 5291*b*, and a plurality of second protrusions 5291*c*. The gear part 5291*a* may be provided with a hinge hole. The plurality of first protrusions 5291*b* and the plurality of second protrusions 5291*c* are disposed back to each other at two ends of the gear part 5291*a*, and the plurality of first protrusions 5291*b* are arranged aged in a ring shape and are spaced from each other. The plurality of first protrusions 5291*b* are disposed around the hinge hole of the gear part 5291*a*, the plurality of second protrusions 5291*c* are arranged in a ring shape and are spaced from each other, and the plurality of second protrusions 5291*c* are disposed around the hinge hole of the gear part 5291*a*. The synchronous gear 5291 may be an integrally formed mechanical part, so as to have high structural strength.

In some embodiments, the synchronization assembly 529 further includes a first blocker 5292, a second blocker 5293, a fastening plate 5294, an elastic part 5295, a first rotatable connecting shaft 5296, a second rotatable connecting shaft 5297, and a plurality of third rotatable connecting shafts 5298. The first blocker 5292 is located between the elastic part 5295 and the synchronous gear 5291. The second blocker 5293 is located on a side that is of the synchronous gear 5291 and that is away from the first blocker 5292, and the fastening plate 5294 is located on a side that is of the elastic part 5295 and that is away from the first blocker 5292. The second blocker 5293, the plurality of synchronous gears 5291, the first blocker 5292, the elastic part 5295, and the fastening plate 5294 are sequentially arranged in a direction parallel to a rotation center of the housing apparatus 5. The rotation end 5272 of the first swing arm 527 and the rotation end 5282 of the second swing arm 528 are located between the first blocker 5292 and the second blocker 5293.

In some embodiments, as shown in FIG. 129 and FIG. 130, the first blocker 5292 includes a first blocking plate 5292*a* and a plurality of first bump groups 5292*b*, and the plurality of first bump groups 5292*b* are fastened on a same side surface of the first blocking plate 5292*a*. The first blocking plate 5292*a* includes a plurality of first through holes 5292*c*, and the plurality of first through holes 5292*c* are spaced from each other. The plurality of first bump groups 5292*h* are disposed in a one-to-one correspondence with the plurality of first through holes 5292*c*. Each of the first bump groups 5292*b* may include a plurality of first bumps 5292*d*. The plurality of first bumps 5292*d* are arranged in a ring shape and are spaced from each other. The plurality of first bumps 5292*d* are disposed around the first through hole 5292*c*. A blocking slot is formed between two adjacent first bumps 5292*d*. The first blocker 5292 may be an integrally formed mechanical part, so as to have high structural strength.

In some embodiment, as shown in FIG. 129 and FIG. 130, the second blocker 5293 includes a second blocking plate 5293*a* and a plurality of second bump groups 5293*b*, and the plurality of second bump groups 5293*b* are fastened on a same side surface of the second blocking plate 5293*a* The second blocking plate 5293*a* includes a plurality of second through holes 5293*c*, and the plurality of second through holes 5293*c* are spaced from each other. The plurality of second bump groups 5293*b* are disposed in a one-to-one correspondence with the plurality of second through holes 5293*c*. Each of the second bump groups 5293*b* may include a plurality of second bumps 5293*d*. The plurality of second bumps 5293*d* are arranged in a ring shape and are spaced from each other. The plurality of second bumps 5293*ci* are disposed around the second through hole 5293*c*. A blocking slot is formed between two adjacent second bumps 5293*d*. The second blocker 5293 may be an integrally formed mechanical part, so as to have high structural al strength.

In some embodiments, as shown in FIG. 129 and FIG. 130, the fastening plate 5294 may be of a plate body structure. The fastening plate 5294 includes a plurality of third through holes 5294*a*, and the plurality of third through holes 5294*a* are spaced from each other. For example, the plurality of first through holes 5292*c*, the plurality of second through holes 5293*c*, and the plurality of third through holes 5294*a* may have a same arrangement shape and arrangement spacing.

In some embodiments, as shown in FIG. 128 to FIG. 130, the elastic part 5295 includes a plurality of springs 5295*a*. The first rotatable connecting shaft 5296 is inserted into the second blocker 5293, the rotation end 5272 of the first swing arm 527, the first blocker 5292, one of the springs 5295*a*, and the fastening plate 5294. The first rotatable connecting shaft 5296 passes through one second through hole 5293*c* of the second blocker 5293, a hinge hole of the first swing arm 527, one first through hole 5292*c* of the first blocker 5292, inner space of one spring 5295*a*, and one third through hole 5294*a* of the fastening plate 5294. The first rotatable connecting shaft 5296 includes a first end part and a second end part that are disposed back to each other. The first end part of the first rotatable connecting shaft 5296 is close to the second blocker 5293 and protrudes from the second blocker 5293, and the second end part of the first rotatable connecting shaft 5296 is close to the fastening plate 5294 and protrudes from the fastening plate 5294. For example, a limiting flange 5296*a* may be disposed at the first end part of the first rotatable connecting shaft 5296, the limiting flange 5296*a* is located on a side that is of the second blocker 5293 and that is away from the first blocker 5292, and the limiting flange 5296*a* may abut against the second blocker 5293 to implement limiting. The first end part of the first rotatable connecting shaft 5296 may be fixedly connected to the fastening plate 5294 by welding, bonding, or the like. The spring 5295*a* is in a compressed state.

A quantity of third rotatable connecting shaft 5298 is the same as a quantity of synchronous gears 5291, and the thud rotatable connecting shaft 5298, the synchronous gear 5291, and some of the plurality of springs 5295*a* are disposed in a one-to-one correspondence. The third rotatable connecting shaft 5298 is inserted into the second blocker 5293, the synchronous gear 5291, the first blocker 5292, another spring 5295*a*, and the fastening plate 5294. The third rotatable connecting shaft 5298 passes through another second through hole 5293*c* of the second blocker 5293, a hinge hole of the synchronous gear 5291, another first through hole 5292*c* of the first blocker 5292, inner space of another spring 5295*a*, and another third through hole 5294*a* of the fastening plate 5294. The third rotatable connecting shaft 5298 includes a first end part and a second end part that are disposed back to each other. The first end part of the third rotatable connecting shaft 5298 is close to the second blocker 5293 and protrudes from the second blocker 5293, and the second end part of the third rotatable connecting shall 5298 is close to the fastening plate 5294 and protrudes from the fastening plate 5294. For example, a limiting flange 5298*a* may be disposed at the first aid part of the third rotatable connecting shaft 5298, the limiting flange 5298*a* is located on a side that is of the second blocker 5293 and that is away from the first blocker 5292, and the limiting flange 5298*a* may abut against the second blocker 5293 to implement limiting. The first end part of the third rotatable connecting shaft 5298 may be fixedly connected to the fastening plate 5294 by welding, bonding, or the like. The spring 5295*a* is in a compressed state.

The second rotatable connecting shaft 5297 is inserted into the second blocker 5293, the rotation end 5282 of the second swing arm 528, the first blocker 5292, another spring 5295*a*, and the fastening plate 5294. The second rotatable connecting shaft 5297 passes through another second through hole 5293*c* of the second blocker 5293, a hinge hole of the second swing arm 528, another first through hole 5292*c* of the first blacker 5292, inner space of another spring 5295*a*, and another third through hole 5294*a* of the fastening plate 5294. The second rotatable connecting shaft 5297 includes a first end part and a second end part that are disposed back to each other. The first end part of the second rotatable connecting shaft 5297 is close to the second blocker 5293 and protrudes from the second blocker 5293, and the second end part of the second rotatable connecting shaft 5297 is close to the fastening plate 5294 and protrudes from the fastening plate 5294. For example, a limiting flange 5297*a* may be disposed at the first end part of the second rotatable connecting shaft 5297, the limiting flange 5297*a* is located on a side that is of the second blocker 5293 and that is away from the first blocker 5292, and the limiting flange 5297*a* may abut against the second blocker 5293 to implement limiting. The first end part of the second rotatable connecting shaft 5297 may be fixedly connected to the fastening plate 5294 by welding, bonding, or the like. The spring 5295*a* is in a compressed state.

In some embodiments, as shown in FIG. 128 to FIG. 130, the rotation end 5272 of the first swing arm 527, the synchronous gear 5291, and the rotation end 5282 of the second swing arm 528 are arranged in an arc shape. For example, the plurality of first through holes 5292*c* of the first blocker 5292 are arranged in an arc shape, and the first blocking plate 5292*a* may be arc-shaped or approximately arc-shaped. The plurality of second through holes 5293*c* of the second blocker 5293 are arranged in an arc shape, and the second blocking plate 5293*a* may be arc-shaped or approximately arc-shaped. The plurality of third through holes 5294*a* of the fastening plate 5294 are arranged in an arc shape, and the fastening plate 5294 may be arc-shaped or approximately arc-shaped. Positions of the first rotatable connecting shaft 5296, the third rotatable connecting shaft 5298, and the second rotatable connecting shaft 5297 are limited by using positions of the first through hole 5292*c*, the second through hole 5293*c*, and the third through hole 5294*a*, so that the rotation end 5272 of the first swing arm 527, the synchronous gear 5291, and the rotation end 5282 of the second swing arm 528 are arranged in an arc shape.

In some embodiments, as shown in FIG. 128 to FIG. 130, a plurality of first protrusions 5272*b* of the first swing arm 527 and a plurality of first bumps 5292*d* of one first bump group 5292*b* are alternately arranged to form a clamping structure. A plurality of second protrusions 5272*c* of the first swing arm 527 and a plurality of second bumps 5293*d* of one second bump group 5293*b* are alternately arranged to form a clamping structure. A plurality of first protrusions 5272*b* of the synchronous gear 5291 and a plurality of first bumps 5292*d* of another first bump group 5292*b* are alternately arranged to form a clamping structure A plurality of second protrusions 5272*c* of the synchronous gear 5291 and a plurality of second bumps 5293*d* of another second bump group 5293*b* are alternately arranged to form a clamping structure. A plurality of first protrusions 5272*h* of the second swing arm 528 and a plurality of first bumps 5292*d* of another first bump group 5292*b* are alternately arranged to form a clamping structure. A plurality of second protrusions

5272*c* of the second swing arm 528 and a plurality of second bumps 5293*d* of another second bump group 5293*b* are alternately arranged to form a clamping structure.

In this embodiment, the rotation end 5272 of the first swing arm 527, the rotation end 5282 of the second swing arm 528, and the synchronous gear 5291 are all clamped to the first blacker 5292 and the second blocker 5293 to form a clamping structure, so that the first swing arm 527 and the second swing arm 528 can stay at some positions.

In addition, when the elastic part 5295 is in a compressed state, the fast blocker 5292 abuts against the synchronous gear 5291 through an elastic force generated by the elastic part 5295. In this case, the first blocker 5292 and the second blocker 5293 cooperate with each other to press the rotation end 5272 of the first swing arm 527, the synchronous gear 5291, and the rotation end 5282 of the second swing arm 528, so that the clamping structure between the rotation end 5272 of the first swing arm 527, the synchronous gear 5291, and the rotation end 5282 of the second swing arm 528 and the first blocker 5292, and the clamping structure between the rotation end 5272 of the first swing arm 527, the synchronous gear 5291, and the rotation end 5282 of the second swing arm 528 and second blocker 5293 are stable.

When the rotation end 5272 of the first swing arm 527, the rotation end 5282 of the second swing arm 528, and the synchronous gear 5291 rotate relative to the first blocker 5292 and the second blocker 5293, relative positions of the plurality of first protrusions 5272*b* and the plurality of first bumps 5292*d* can change to form different clamping structures, and relative positions of the plurality of second protrusions 5272*c* and the plurality of second bumps 5293*d* can change to form different clamping structures.

In some embodiments, as shown in FIG. 128 to FIG. 130, the first blocker 5292 and the second blocker 5293 may be of a mirror symmetric structure, the plurality of first protrusions 5272*b* and the plurality of second protrusions 5272*c* of the first swing arm 527 may be of a mirror symmetric structure, the plurality of first protrusions 5272*b* and the plurality of second protrusions 5272*c* of the second swing arm 528 may be of a mirror symmetric structure, and the plurality of first protrusions 5272*b* and the plurality of second protrusions 5272*c* of the synchronous gear 5291 may be of a mirror symmetric structure.

In some embodiments, FIG. 131 is a schematic diagram of a partial structure of the folding mechanism 52 shown in FIG. 96. FIG. 132 is a schematic diagram of another partial structure of the folding mechanism 52 shown in FIG. 96. FIG. 133 is a schematic diagram of another partial structure of the folding mechanism 52 shown in FIG. 96. FIG. 131 shows an assembly structure of a middle housing 521, a third fixing bracket 5261, a fourth fixing bracket 5262, a first swing arm 527, a second swing arm 528, and a synchronization assembly 529. As shown in FIG. 131, the middle housing 521 may include a first part 521*a* and a second part 521*h*. FIG. 132 shows an assembly structure of the first part 521*a* of the middle housing 521 and another structure, and FIG. 133 shows an assembly structure of the second part 521*b* of the middle housing 521 and another structure. As shown in FIG. 131 to FIG. 133, the folding mechanism 52 is in an open state. In the open state, the third fixing bracket 5261 and the fourth fixing bracket 5262 are unfolded relative to each other, are respectively located on two sides of the middle housing 521, and are at open positions.

As shown in FIG. 131, one end of the first swing arm 527 is connected to the middle horning 521, and the other end of the first swing arm 527 is connected to the third fixing bracket 5261. One end of the second swing arm 528 is connected to the middle housing 521, and the other end of the second swing arm 528 is connected to the fourth fixing bracket 5262. The synchronization assembly 529 is mounted in the middle housing 521, and the synchronization assembly 529 connects an end of the first swing arm 527 and an end of the second swing arm 528. The second part 521*b* of the middle housing 521 blocks a partial structure of the first swing arm 527, a partial structure of the synchronization assembly 529, and a partial structure of the second swing arm 528.

As shown in FIG. 132, the rotation end 5272 of the first swing arm 27 is mounted in the mounting space 5212*e* of the middle housing 521, the movable end 5271 of the first swing arm 527 is mounted in the third sliding slot 5261*e* of the third fixing bracket 5261, and the first swing arm 527 is connected between the middle housing 521 and the third fixing bracket 5261. The rotation end 5282 of the second swing arm 528 is mounted on the middle housing 521, the movable end 5281 of the second swing arm 528 is mounted in the fourth sliding slot 5262*e* of the fourth fixing bracket 5262, and the second swing arm 528 is connected between the middle housing 521 and the fourth fixing bracket 5262. The synchronization assembly 529 is mounted in the mounting space 5212*e* of the middle housing 521, and the synchronization assembly 529 connects the rotation end 5272 of the first swing arm 527 and the rotation end 5282 of the second swing arm 528.

With reference to FIG. 130 and FIG. 132, the hinge 5271*a* of the movable end 5271 of the first swing arm 527 may be mounted in the third sliding slot 5261*e*, and can slide and rotate in the third sliding slot 5261*e*, so that the movable end 5271 of the first swing arm 527 is slidably and rotatably connected to the third fixing bracket 5261. The hinge 5281*a* of the movable end 5281 of the second swing arm 528 may be mounted in the fourth sliding slot 5262*e*, and can slide and rotate in the fourth sliding slot 5262*e*, so that the movable end 5281 of the second swing arm 528 is slidably and rotatably connected to the fourth fixing bracket 5262.

With reference to FIG. 110 and FIG. 132, the rotation end 5272 of the first swing arm 527 may be mounted in the main body space 5212*f* of the mounting space 5212*e* of the middle housing 521, and the movable end 5271 of the first swing arm 527 may extend out of the middle housing 521 through an avoidance notch 5212*h*. The rotation end 5282 of the second swing arm 528 may be mounted in the main body space 5212*f* of the mounting space 5212*e* of the middle housing 521, and the movable end 5281 of the second swing arm 528 may extend out of the middle housing 521 through an avoidance notch 5212*i*. The synchronization assembly 529 is mounted in the main body space 5212*f*.

With reference to FIG. 110 and FIG. 133, two ends of the first rotatable connecting shaft 5296 of the synchronization assembly 529 are respectively mounted in a first hinge groove 5212*g* and a second hinge groove 5212*j* that are in pair, and the first rotatable connecting shaft 5296 passes through the main body space 5212*f*. The first rotatable connecting shaft 5296 is inserted into the rotation end 5272 of the first swing arm 527, and the rotation end 5272 of the first swing arm 527 is rotatably connected to the middle housing 521. Two ends of the second rotatable connecting shaft 5297 are respectively mounted in another first hinge grooves 5212*g* and another second hinge grooves 5212*j* that are in pair, and the second rotatable connecting shaft 5297 passes through the main body space 5212*f*. The second rotatable connecting shaft 5297 is inserted into the rotation end 5282 of the second swing arm 528, and the rotation end 5282 of the second swing arm 528 is rotatably connected to the middle housing 521. Two ends of the third rotatable connecting shaft 5298 are respectively mounted in another first hinge groove 5212*g* and another second hinge groove 5212*j* that are in pair, and the third rotatable connecting shaft 5298 passes through the main body space 5212*f* The third rotatable connecting shaft 5298 is inserted into the synchronous gear 5291, and the synchronous gear 5291 is rotatably connected to the middle housing 521.

As shown in FIG. 132 and FIG. 133, the second blocker 5293, the plurality of synchronous gears 5291, the first blocker 5292, the elastic part 5295, and the fastening plate 5294 may be mounted in the main body space 5212*f*.

FIG. 134 is a schematic diagram of the structure shown in FIG. 131 when cut along G-G. FIG. 135 is a schematic diagram of a structure of the structure shown in FIG. 134 in a closed state. The movable end 5271 of the first swing arm 527 is mounted in the third sliding slot 5261*e*, so as to slidably and rotatably connect the third fixing bracket 5261. The rotation end 5272 of the first swing arm 527 is rotatably connected to the middle housing 521 by using the first rotatable connecting shaft 5296. The movable end 5281 of the second swing runt 528 is mounted in the fourth sliding slot 5262*e*, so as to slidably and rotatably connect the fourth fixing bracket 5262. The rotation end 5282 of the second swing arm 528 is rotatably connected to the middle housing 521 by using the second rotatable connecting shaft 5297. Adjacent synchronous gears 5291 are engaged with each other, and each synchronous gear 5291 is rotatably connected to the middle housing 521 by using the third rotatable connecting shaft 5298. The rotation aid 5282 of the second swing arm 528 is engaged with the rotation end 5272 of the first swing arm 527 by using a plurality of synchronous gears 5291.

In this embodiment, when the third fixing bracket 5261 and the fourth fixing bracket 5262 rotate relative to the middle housing 521, the first swing arm 527 and the second swing arm 528 are driven to rotate relative to the middle housing. Because the rotation end 5282 of the second swing arm 528 is engaged with the rotation end 5272 of the first swing arm 527 by using the plurality of synchronous gears 5291, rotation actions of the first swing arm 527 and the second swing arm 528 relative to the middle housing 521 are synchronous, that is, the two are synchronously close to or away from each other, to improve operation experience of the mechanism.

In addition, because the first blocker 5292 is fixedly mounted on the middle housing 521 (as shown in FIG. 132), in a process in which the first housing 51 and the second housing 53 rotate relative to each other, the first swing arm 527 and the second swing arm 528 rotate relative to the first blocker 5292, and the synchronous gear 5291 rotates with the first swing arm 527 and the second swing rarer 528 relative to the first blocker 5292, to form different clamping structures between the synchronous gear 5291 and the first blacker 5292.

For example, when the first housing 51 and the second housing 53 are in an open state, the first blocker 5292 and the synchronous gear 5291 form a first clamping structure; or when the first housing Si and the second housing 53 are in a closed state, the first blocker 5292 and the synchronous gear 5291 form a second clamping structure. In this embodiment, the first clamping structure and the second clamping structure can keep the synchronous gear 5291 at a specific position relative to the first blacker 5292, even if the first swing arm 527 and the second swing arm 528 maintain a specific relative position relationship relative to the middle housing 521, so that the first housing 51 and the second housing 53 can better remain in the open state or the closed state, thereby improving user experience.

In addition, the synchronization assembly 529 enables the first blocker 5292 to press the synchronous gear 5291 through an elastic force of the elastic part 5295, so that a relative position relationship between the first clamping structure and the second clamping structure is maintained between the first blocker 5292 and the synchronous gear 5291. The synchronization assembly 529 has motion resistance that prevents the relative position relationship from changing. Therefore, the first clamping structure and the second clamping structure may provide sped fic resistance in a process in which the electronic device 300 is unfolded to enter the open state and in a process in which the electronic device 300 is folded to end the open state, so that the user can experience a better sense of operation of the mechanism.

Refer to FIG. 128 to FIG. 130 again. When the first blocker 5292 and the synchronous gear 5291 are in the first clamping structure or the second clamping structure, a plurality of first protrusions 5291*b* of the synchronous gear 5291 and a plurality of first bumps 5292*d* on the first blocker 5292 are in an alternately arranged clamping structure. In other words, the plurality of first protrusions 5291*b* of the synchronous gear 5291 and a groove (formed between two adjacent first bumps 5292*d*) on the first blocker 5292 are in a concave and convex clamping structure. A difference between the first clamping structure and the second clamping structure lies in that the synchronous gear 5291 rotates relative to the first blocker 5292, and a same first protrusion 5291*b* on the synchronous gear 5291 matches different grooves on the first blocker 5292.

For example, when the first blocker 5292 and the synchronous gear 5291 are in the first clamping structure or the second clamping structure, the rotation end 5272 of the first swing arm 527, the synchronous gear 5291, and the protrusion on the rotation end 5282 of the second swing arm 528 may all be in an alternately arranged clamping structure with the bumps on the first blocker 5292 and the second blocker 5293. In other words, the protrusions on the rotation end 5272 of the first swing arm 527, the synchronous gear 5291, and the rotation end 5282 of the second swing arm 528 may all in a concave and convex clamping structure with the grooves (formed between two adjacent bumps) on the first blocker 5292 and the second blocker 5293. A difference between the first clamping structure and the second clamping structure lies in that the rotation end 5272 of the first swing arm 527, the synchronous gear 5291, and the rotation end 5282 of the second swing arm 528 rotate relative to the first blocker 5292 and the second blocker 5293, a same protrusion on the rotation end 5272 of the first swing arm 527, the synchronous gear 5291, and the rotation end 5282 of the second swing arm 528 matches different grooves on the first blocker 5292 and the second blocker 5293.

When the folding mechanism 12 is in an intermediate state, the rotation end 5272 of the first swing arm 527, the synchronous gear 5291, and the rotation end 5282 of the second swing arm 528 rotate relative to the first blocker 5292 and the second blocker 5293. A same protrusion on the rotation end 5272 of the first swing arm 527, the synchronous gear 5291, and the rotation end 5282 of the second swing arm 528 may slide out from one of the grooves on the first blocker 5292 and the second blocker 5293, and then slide into another groove, that is, a “protrusion-groove” fitting structure is changed to a “protrusion-bump” transition structure, and then to a fitting structure of “protrusion-another groove”. The first blocker 5292 and the second blocker 5293 are in a position relationship of “close-away-close" relative to the rotation end 5272 of the first swing arm 527, the synchronous gear 5291, and the rotation end 5282 of the second swing arm 528.

In some embodiments, with reference to FIG. 134 and FIG. 135, the rotation end 5272 of the first swing arm 527, the plurality of synchronous gears 5291, and the rotation end 5282 of the second swing arm 528 are arranged in an arc shape, so that the inner space 5212 of the middle housing 521 can be fully used, and the inner space 5212 of the middle housing 521 can be released more to form display accommodating space for accommodating a part of the flexible display 6 when the electronic device 300 is closed. This helps improve compactness of component arrangement of the electronic device 300 and reduce a size of the electronic device 300.

It may be understood that a quantity, sizes, and the like of the synchronous gears 5291 may be designed based on a specific model such as a product form and a size. This is not strictly limited in this application. The larger quantity of synchronous gears 5291, the smaller size of the synchronous gear 5291, so that more space is released. The smaller quantity of synchronous gears 5291, the larger size of the synchronous gear 5291, and the smaller accumulated transmission error of the synchronous gear 5291, which helps improve movement accuracy.

FIG. 136 is a schematic diagram of a structure of a cross section of the electronic device 300 shown in FIG. 93 when cut along L-L. FIG. 137 is a schematic diagram of a structure of a cross section of the electronic device 300 shown in 11G. 94 when cut along M-M.

The third fixing bracket 5261 is fixedly connected to the first housing 51, and the third fixing bracket 5262 is fixedly connected to the second housing 53. The movable end 5271 of the first swing arm 527 is slidably and rotatably connected to the third fixing bracket 5262, and the rotation and 5272 of the first swing arm 527 is rotatably connected to the middle housing 521. The movable end 5281 of the second swing arm 528 is slidably and rotatably connected to the fourth fixing bracket 5262, and the rotation end 5282 of the second swing arm 528 is rotatably connected to the middle horning 521. The rotation end 5272 of the first swing arm 527 is engaged with the rotation end 5282 of the second swing arm 528 by using the plurality of synchronous gears 5291, two adjacent synchronous gears 5291 are engaged with each other, and the synchronous gear 5291 is rotatably connected to the middle housing 521. The movable end 5271 of the first swing arm 527 is mounted in the third sliding slot 5261*e*, the movable end 5281 of the second swing arm 528 is mounted in the fourth sliding slot 5262*e*, and the rotation end 5272 of the first swing arm 527, the rotation end 5282 of the second swing arm 528, and the synchronous gear 5291 are rotatably connected to the middle housing 521 by using different rotatable connecting shafts.

In this embodiment, because the rotation end 5272 of the first swing arm 527 and the rotation end 5282 of the second swing arm 528 are associated by using the plurality of synchronous gears 5291, the plurality of synchronous gears 5291 are used to enable the first swing arm 527 and the second swing arm 528 to synchronously rotate in a moving process of the housing apparatus 5, that is, to be synchronously close to or away front each other. In addition, the first swing arm 527 is connected to the third fixing bracket 5261 fastened on the first housing 51, and the second swing arm 528 is connected to the fourth fixing bracket 5262 fastened on the second housing 53. Therefore, synchronous rotation of the first swing arm 527 and the second swing arm 528 can enable the first housing 51 and the second housing 53 to rotate synchronously. Therefore, rotation actions of the first housing 51 and the second housing 53 relative to the middle housing 521 are good in synchronization, so that mechanism operation experience of the housing apparatus 5 and the electronic device 300 is improved.

As shown in FIG. 136 and FIG. 137, the rotation end 5272 of the first swing arm 527, the plurality of synchronous gears 5291, and the rotation end 5282 of the second swing arm 528 are arranged in an arc shape, to fully use the inner space 5212 of the middle housing 521, so that the inner space 5212 of the middle housing 521 is released more to form display accommodating space. The flexible display 6 can be partially accommodated in the inner space 5212 of the middle housing 521 in a closed state. This helps improve compactness of component arrangement of the electronic device 300 and reduce a size of the electronic device 300.

It may be understood that the synchronization assembly 529 in this application may have a plurality of implementation structures. In some other embodiments, the synchronization assembly 529 may indirectly limit a position of the first swing arm 527 and a position of the second swing arm 528 by limiting a position of the synchronous gear 5291. For example, a clamping structure is formed between the first blocker 5292 and the second blocker 5293 and the synchronous gear 5291, and there is no clamping structure between the rotation end 5272 of the first swing arm 527 and the rotation end 5282 of the second swing arm 528 and the first blocker 5292 and the second blocker 5293. In some other embodiments, the second blocker 5293 may not be disposed on the synchronization assembly 529, and the first swing arm 527 and the second swing arm 528 can stay at some positions by using a clamping structure between the first blocker 5292 and the synchronous gear 5291, the first swing arm 527, and the second swing arm 528. In some other embodiments, the synchronization assembly 529 may not be provided with the fastening plate 5294, two ends of the elastic part 5295 may respectively abut against the first blocker 5292 and a wall surface of the mounting space 5212*e*, and the elastic part 5295 is compressed between the first blocker 5292 and the middle housing 521. In some other embodiments, the elastic part 5295 may alternatively use another structure, for example, an elastic rubber block. The foregoing embodiment is an example structure or the synchronization assembly 529. The synchronization assembly 529 may also have another implementation structure. This is not strictly limited in this application.

In some other embodiments, no synchronization assembly 529 connecting the rotation end 5272 of the first swing arm 527 and the rotation end 5282 of the second swing arm 528 is disposed between the rotation end 5272 of the first swing arm 527 and the rotation and 5282 of the second swing arm 528. The rotation end 5272 of the first swing arm 527 may be rotatably connected to the middle housing 521 through a hinge, where the hinge may be a part of the rotation end 5272 of the first swing arm 527, or may be an independent mechanical part and is inserted into the rotation end 5272 of the first swing arm 527. Alternatively, the rotation end 5282 of the second swing arm 528 may be rotatably connected to the middle housing 521 through a hinge, where the hinge may be a part of the rotation end 5282 of the second swing arm 528, or may be an independent mechanical part and is inserted into the rotation end 5282 of the second swing arm 528.

FIG. 138 is a schematic diagram of a structure of the electronic device 300 in an open state in some other embodiments according to an embodiment of this application. FIG. 139 is a schematic diagram of a structure of the electronic device 300 shown in FIG. 138 in a closed state. FIG. 140 is a schematic exploded view of a partial structure of a housing apparatus 5 of the electronic device 300 shown in FIG. 138. The electronic device 300 in this embodiment may include most technical features of the electronic device 300 in the foregoing embodiment. The following mainly describes a difference between the electronic device 300 and the electronic device 300 in the foregoing embodiment, most same technical content of the two is not described again.

In some embodiments, the electronic device 300 includes a housing apparatus 5 and a flexible display 6. The flexible display 6 is mounted on the housing apparatus 5. The flexible display 6 is configured to display an image, and the housing apparatus 5 is configured to drive the flexible display 6 to move. The housing apparatus 5 includes a first housing 51, a folding mechanism 52, and a second housing 53 that are sequentially connected. The folding mechanism 52 can deform, so that the first housing 51 and the second housing 53 are folded or unfolded relative to each other.

As shown in FIG. 140, the first housing 51 may include a first body 514 and two first baffles 515, and the two first baffles 515 are separately fastened on two sides of the first body 514. The first body 514 includes the support surface 511 of the first housing 51 and the first fastening groove 512, and the two first baffles 515 may form groove side walls of the first fastening groove 512. The second housing 53 includes a second body 534 and two second baffles 535, and the two second baffles 535 are separately fastened on two sides of the second body 534. The second body 534 includes the support surface 531 of the second housing 53 and the second fastening groove 532, and the two second baffles 535 may form groove side walls of the second fastening groove 532.

Refer to FIG. 138 and FIG. 140. When the first housing 51 and the second housing 53 are in an open state, an and part that is of the first baffle 515 and that is close to the first fastening groove 512 is spliced with an end part that is of the second baffle 535 and that is close to the second fastening groove 532. The folding mechanism 52 is shielded by the first housing 51 and the second housing 53. The electronic device 300 can implement self-shielding in the open state, thereby improving waterproof and dust-proof performance.

Refer to FIG. 139 and FIG. 140. When the first housing 51 and the second housing 53 are in a closed state, a top that is of the first baffle 515 and that is close to the support surface 511 of the first housing 51 is spliced with a top that is of the second baffle 535 and that is close to the support surface 531 of the second housing 53, so that the first housing 51 and the second housing 53 are completely closed, and the middle housing 521 of the folding mechanism 52 partially extends out. In this case, the electronic device 300 can implement appearance self-shielding in the closed state, thereby improving waterproof and dust-proof performance.

In this embodiment, the electronic device 300 implements appearance self-shielding in the open state and the closed state by using structural designs of the first housing 51 and the second housing 53, and an end cover component used to implement appearance shielding may be omitted. Therefore, a structural design of the electronic device 300 is simple, and costs are low.

A case in which the first baffle 515 and the second baffle 535 are spliced may include a case in which the first baffle 515 and the second baffle 535 are in contact with each other, or may include a case in which a small gap is formed between the first baffle 515 and the second baffle 535. This is not strictly limited in this application.

The foregoing descriptions are merely specific implementations of this application, but are not intended to limit the protection scope of this application. Any variation or replacement readily figured out by a person skilled in the an within the technical scope disclosed in this application shall fall within the protection scope of this application. When no conflict occurs, embodiments of this application and the features in the embodiments may be mutually combined. Therefore, the protection scope of this application shall be subject to the protection scope of the claims.

What is claimed is:

1. A folding mechanism, comprising a middle housing (121), a first fixing bracket (122), a second fixing bracket (123), a first swing arm (126), a second swing arm (127), a first support plate (124), and a second support plate (125), wherein the first support plate (124) is rotatably connected to the first fixing bracket (122), and the first support plate (124) is rotatably connected to the middle housing (121);

the second support plate (125) is rotatably connected to the second fixing bracket (123), and the second support plate (125) is rotatably connected to the middle housing (121);

the first swing arm (126) comprises a first rotation end (1262) and a first sliding end (1261), wherein the first rotation end (1262) is rotatably connected to the middle housing (121), the first sliding end (1261) is slidably connected to the first fixing bracket (122);

the second swing arm (127) comprises a second rotation end (1272) and a second sliding end (1271), wherein the second rotation end (1272) is rotatably connected to the middle housing (121), the second sliding end (1271) is slidably connected to the second fixing bracket (123), wherein the first support plate (124) comprises a first plate body (1242), a first rotation part (1243), and a second rotation part (1244), the first rotation part (1243) and the second rotation part (1244) are fastened on the first plate body (1242) in a mutually spaced manner, the first rotation part (1243) is rotatably connected to the first fixing bracket (122), and the second rotation part (1244) is rotatably connected to the middle housing (121);

the second support plate (125) comprises a second plate body (1252), a third rotation part (1253), and a fourth rotation part (1254), the third rotation part (1253) and the fourth rotation part (1254) are fastened on the second plate body (1252) in a mutually spaced manner, the third rotation part (1253) is rotatably connected to the second fixing bracket (123), and the fourth rotation part (1254) is rotatably connected to the middle housing (121); wherein when the folding mechanism is in the open state, the second rotation part (1244) and the fourth rotation part (1254) are located between the first rotation part (1243) and the third rotation part (1253); and when the folding mechanism is in the closed state, a spacing between the first rotation part (1243) and the third rotation part (1253) is less than a spacing between the second rotation part (1244) and the fourth rotation part (1254).

2. The folding mechanism of claim 1, wherein when the folding mechanism is in an open state, a support surface (1241) of the first support plate (124) is flush with a support surface (1251) of the second support plate (125); and when the folding mechanism (12) is in a closed state, the support surface (1241) of the first support plate (124) and the support surface (1251) of the second support plate (125) are away from each other in a direction close to the middle housing (121).

3. The folding mechanism of claim 1, wherein the middle housing (121) comprises an outer cover (1211), and the outer cover (1211) is bent to form an inner space (1213); and when the folding mechanism is in an open state, the first support plate (124) covers a first part of the inner space (1213), and the second support plate (125) covers a second part of the inner space (1213); and when the folding mechanism is in the closed state, the first support plate (124) partially extends into the inner space (1213), and the second support plate (125) partially extends into the inner space (1213).

4. The folding mechanism of claim 1, wherein the middle housing (121) comprises an outer cover (1211), when the folding mechanism is in an open state, a first side end of the outer cover (1211) abut against and support the first support plate (124), and a second side end of the outer cover (1211) abut against and support the second support plate (125).

5. The folding mechanism of claim 1, wherein when the folding mechanism is in an open state, the first support plate (124) is spliced with the second support plate (125).

6. The folding mechanism of claim 1, the folding mechanism further comprising a first hinge (1210*a*), a second hinge (1210*b*), a third hinge (1210*c*) and a fourth hinge (1210*d*), wherein the first hinge (1210*a*) is inserted into the first rotation part (1243) and the first fixing bracket (122), the second hinge (1210*b*) is inserted into the second rotation part (1244) and the middle housing (121); the third hinge (1210*c*) is inserted into the third rotation part (1253) and the second fixing bracket (123), and the fourth hinge (1210*d*) is inserted into the fourth rotation part (1254) and the middle housing (121).

7. The folding mechanism of claim 6, wherein the middle housing (121) comprises a first convex part (1211*a*) and a second convex part (1211*b*), the second hinge (1210*b*) is inserted into the first convex part (1211*a*), the first convex part (1211*a*) is embedded into the first support plate (124), the fourth hinge (1210*d*) is inserted into the second convex part (1211*b*), and the second convex part (1211*b*) is embedded into the second support plate (125).

8. The folding mechanism of claim 1, wherein the first fixing bracket (122) is provided with a first sliding slot (1225), the first sliding end (1261) of the first swing arm (126) is mounted in the first sliding slot (1225), and the first rotation end (1262) of the first swing arm (126) is rotatably connected to the middle housing (121); and the second fixing bracket (123) is provided with a second sliding slot (1235), the second sliding end (1271) of the second swing arm (127) is mounted in the second sliding slot (1235), and the second rotation end (1272) of the second swing arm (127) is rotatably connected to the middle housing (121).

9. The folding mechanism of claim 1, wherein the folding mechanism further comprises a plurality of synchronous gears (1281), each of the synchronous gears (1281) is rotatably connected to the middle housing (121), the plurality of synchronous gears (1281) are engaged with each other, and the first rotation end (1262) of the first swing arm (126) is engaged with the second rotation end (1272) of the second swing arm (127) by using the plurality of synchronous gears (1281).

10. An electronic device, comprising a first housing, a second housing, and a folding mechanism;

wherein the folding mechanism comprising a middle housing (121), a first fixing bracket (122), a second fixing bracket (123), a first swing arm (126), a second swing arm (127), a first support plate (124), and a second support plate (125), the first fixing bracket (122) is fastened to the first housing, and the second fixing bracket (123) is fastened to the second housing, the first support plate (124) is rotatably connected to the first fixing bracket (122), and the first support plate (124) is rotatably connected to the middle housing (121);

the second support plate (125) is rotatably connected to the second fixing bracket (123), and the second support plate (125) is rotatably connected to the middle housing (121);

the first swing arm (126) comprises a first rotation end (1262) and a first sliding end (1261), wherein the first rotation end (1262) is rotatably connected to the middle housing (121), the first sliding end (1261) is slidably connected to the first fixing bracket (122);

the second swing arm (127) comprises a second rotation end (1272) and a second sliding end (1271), wherein the second rotation end (1272) of the second swing arm (127) is rotatably connected to the middle housing (121), the second sliding end (1271) of the second swing arm (127) is slidably connected to the second fixing bracket (123), wherein the first support plate (124) comprises a first plate body (1242), a first rotation part (1243), and a second rotation part (1244), the first rotation part (1243) and the second rotation part (1244) are fastened on the first plate body (1242) in a mutually spaced manner, the first rotation part (1243) is rotatably connected to the first fixing bracket (122), and the second rotation part (1244) is rotatably connected to the middle housing (121);

the second support plate (125) comprises a second plate body (1252), a third rotation part (1253), and a fourth rotation part (1254), the third rotation part (1253) and the fourth rotation part (1254) are fastened on the second plate body (1252) in a mutually spaced manner, the third rotation part (1253) is rotatably connected to the second fixing bracket (123), and the fourth rotation part (1254) is rotatably connected to the middle housing (121); wherein when the folding mechanism is in the open state, the second rotation part (1244) and the fourth rotation part (1254) are located between the first rotation part (1243) and the third rotation part (1253); and when the folding mechanism is in the closed state, a spacing between the first rotation part (1243) and the third rotation part (1253) is less than a spacing between the second rotation part (1244) and the fourth rotation part (1254).

11. The electronic device of claim 10, further comprising a flexible display, wherein the flexible display comprises a first non-bending portion, a bending portion, and a second non-bending portion that are sequentially arranged, wherein the first non-bending portion is fixedly connected to the first housing, the second non-bending portion is fixedly connected to the second housing, and the bending portion deforms in a process in which the first housing and the second housing are folded or unfolded relative to each other.

12. The electronic device of claim 10, wherein when the folding mechanism is in an open state, a support surface (1241) of the first support plate (124) is flush with a support surface (1251) of the second support plate (125); and when the folding mechanism (12) is in a closed state, a support surface (1241) of the first support plate (124) and a support surface (1251) of the second support plate (125) are away from each other in a direction close to the middle housing (121).

13. The electronic device of claim 10, wherein the middle housing (121) comprises an outer cover (1211), and the outer cover (1211) is bent to form an inner space (1213); and when the folding mechanism is in an open state, the first support plate (124) covers a first part of the inner space (1213), and the second support plate (125) covers a second part of the inner space (1213); and when the folding mechanism is in the closed state, the first support plate (124) partially extends into the inner space (1213), and the second support plate (125) partially extends into the inner space (1213).

14. The electronic device of claim 10, wherein the middle housing (121) comprises an outer cover (1211), when the folding mechanism is in an open state, a first side end of the outer cover (1211) abut against and support the first support plate (124), and a second side end of the outer cover (1211) abut against and support the second support plate (125).

15. The electronic device of claim 10, wherein when the folding mechanism is in an open state, the first support plate (124) is spliced with the second support plate (125).

16. The electronic device of claim 10, wherein the folding mechanism further comprises a first hinge (1210*a*), a second hinge (1210*b*), a third hinge (1210*c*) and a fourth hinge (1210*d*), wherein the first hinge (1210*a*) is inserted into the first rotation part (1243) and the first fixing bracket (122), the second hinge (1210*b*) is inserted into the second rotation part (1244) and the middle housing (121); the third hinge (1210*c*) is inserted into the third rotation part (1253) and the second fixing bracket (123), and the fourth hinge (1210*d*) is inserted into the fourth rotation part (1254) and the middle housing (121).

17. The electronic device of claim 16, wherein the middle housing (121) comprises a first convex part (1211*a*) and a second convex part (1211*b*), the second hinge (1210*b*) is inserted into the first convex part (1211*a*), the first convex part (1211*a*) is embedded into the first support plate (124), the fourth hinge (1210*d*) is inserted into the second convex part (1211*b*), and the second convex part (1211*b*) is embedded into the second support plate (125).

18. The electronic device of claim 10, wherein the folding mechanism further comprises a plurality of synchronous gears (1281), each of the synchronous gears (1281) is rotatably connected to the middle housing (121), the plurality of synchronous gears (1281) are engaged with each other, and the first rotation end (1262) of the first swing arm (126) is engaged with the second rotation end (1272) of the second swing arm (127) by using the plurality of synchronous gears (1281).

* * * * *